(12) United States Patent
Kirino et al.

(10) Patent No.: US 10,608,345 B2
(45) Date of Patent: Mar. 31, 2020

(54) SLOT ARRAY ANTENNA

(71) Applicants: NIDEC CORPORATION, Kyoto (JP); WGR Co., Ltd., Shimogyo-ku, Kyoto (JP)

(72) Inventors: Hideki Kirino, Kyoto (JP); Hiroyuki Kamo, Kyoto (JP); Takeshi Ichinose, Kyoto (JP); Hideaki Kitamura, Kyoto (JP)

(73) Assignees: NIDEC CORPORATION, Kyoto (JP); WGR CO., LTD., Kyoto (JP)

( * ) Notice: Subject to any disclaimer, the term of this patent is extended or adjusted under 35 U.S.C. 154(b) by 47 days.

(21) Appl. No.: 15/950,333

(22) Filed: Apr. 11, 2018

(65) Prior Publication Data

US 2018/0301819 A1 Oct. 18, 2018

(30) Foreign Application Priority Data

Apr. 13, 2017 (JP) .................................. 2017-080019

(51) Int. Cl.
*H01Q 21/00* (2006.01)
*H01Q 21/06* (2006.01)
(Continued)

(52) U.S. Cl.
CPC .............. *H01Q 21/064* (2013.01); *G01S 1/00* (2013.01); *G01S 3/043* (2013.01); *G01S 3/74* (2013.01);
(Continued)

(58) Field of Classification Search
CPC .... H01Q 21/005; H01Q 21/064; H01Q 21/06; H01Q 13/22; H01Q 13/10; H01Q 13/206;
(Continued)

(56) References Cited

U.S. PATENT DOCUMENTS 6,191,704 B1 2/2001 Takenaga et al.
6,339,395 B1 1/2002 Hazumi et al.
(Continued)

FOREIGN PATENT DOCUMENTS

CN 104852139 A 8/2015
CN 105006656 A 10/2015
(Continued)

OTHER PUBLICATIONS

Ichinose et al., "Slot Antenna Array", U.S. Appl. No. 15/952,311, filed Apr. 13, 2018.
(Continued)

*Primary Examiner* — Hoang V Nguyen
*Assistant Examiner* — Awat M Salih
(74) *Attorney, Agent, or Firm* — Keating & Bennett

(57) ABSTRACT

A slot array antenna includes: a first electrically conductive member having a first electrically conductive surface; a second electrically conductive member having a second electrically conductive surface opposed to the first electrically conductive surface; a waveguide member located between the first and second electrically conductive members; and an artificial magnetic conductor extending on both sides of the waveguide member in between the first and second electrically conductive members. The first or second electrically conductive member has a plurality of slots. The waveguide member includes an electrically-conductive waveguide face of a stripe shape opposed to the first electrically conductive surface. The plurality of slots include at least two slots that couple to the waveguide face. In between two positions respectively coupled to the two slots, the waveguide face includes at least one deflecting portion at which the direction that the waveguide face extends changes.

66 Claims, 65 Drawing Sheets

(51) Int. Cl.

| | | |
|---|---|---|
| *G01S 3/04* | (2006.01) | |
| *H01Q 13/16* | (2006.01) | |
| *G01S 7/03* | (2006.01) | |
| *G01S 13/42* | (2006.01) | |
| *H01P 3/123* | (2006.01) | |
| *G01S 3/74* | (2006.01) | |
| *H01Q 13/10* | (2006.01) | |
| *G01S 1/00* | (2006.01) | |
| *G01S 13/931* | (2020.01) | |
| *G01S 13/93* | (2020.01) | |
| *G01S 13/87* | (2006.01) | |
| *G01S 13/86* | (2006.01) | |
| *H01Q 1/32* | (2006.01) | |
| *H01Q 13/02* | (2006.01) | |
| *H01P 5/12* | (2006.01) | |
| *G01S 13/34* | (2006.01) | |

(52) U.S. Cl.
CPC ............... *G01S 7/03* (2013.01); *G01S 13/42* (2013.01); *H01P 3/123* (2013.01); *H01Q 13/10* (2013.01); *H01Q 13/16* (2013.01); *H01Q 21/005* (2013.01); *G01S 7/032* (2013.01); *G01S 13/345* (2013.01); *G01S 13/867* (2013.01); *G01S 13/878* (2013.01); *G01S 13/931* (2013.01); *G01S 2013/9375* (2013.01); *G01S 2013/9392* (2013.01); *H01P 5/12* (2013.01); *H01Q 1/3233* (2013.01); *H01Q 13/0233* (2013.01)

(58) Field of Classification Search
CPC ........ H01Q 13/106; H01Q 13/06; H01Q 1/38; H01Q 1/3266
See application file for complete search history.

(56) References Cited

U.S. PATENT DOCUMENTS

| | | |
|---|---|---|
| 6,403,942 B1 | 6/2002 | Stam |
| 6,611,610 B1 | 8/2003 | Stam et al. |
| 6,628,299 B2 | 9/2003 | Kitayama |
| 6,661,367 B2 | 12/2003 | Sugiyama et al. |
| 6,703,967 B1 | 3/2004 | Kuroda et al. |
| 6,903,677 B2 | 6/2005 | Takashima et al. |
| 6,943,726 B2 | 9/2005 | Schneider |
| 7,161,561 B2 | 1/2007 | Kitayama |
| 7,355,524 B2 | 4/2008 | Schofield |
| 7,358,889 B2 | 4/2008 | Abe et al. |
| 7,417,580 B2 | 8/2008 | Abe et al. |
| 7,420,159 B2 | 9/2008 | Heslin et al. |
| 7,425,983 B2 | 9/2008 | Izumi et al. |
| 7,570,198 B2 | 8/2009 | Tokoro |
| 7,978,122 B2 | 7/2011 | Schmidlin |
| 8,068,134 B2 | 11/2011 | Yoshizawa |
| 8,446,312 B2 | 5/2013 | Kanamoto et al. |
| 8,543,277 B2 | 9/2013 | Higgins-Luthman |
| 8,593,521 B2 | 11/2013 | Schofield et al. |
| 8,604,968 B2 | 12/2013 | Alland et al. |
| 8,610,620 B2 | 12/2013 | Katoh |
| 8,614,640 B2 | 12/2013 | Lynam |
| 8,636,393 B2 | 1/2014 | Schofield |
| 8,730,096 B2 | 5/2014 | Kanamoto et al. |
| 8,730,099 B2 | 5/2014 | Kanamoto et al. |
| 8,803,638 B2 | 8/2014 | Kildal |
| 8,861,842 B2 | 10/2014 | Jung et al. |
| 9,286,524 B1 | 3/2016 | Mei et al. |
| 2003/0011522 A1* | 1/2003 | McKinzie, III ......... H01Q 1/52 343/700 MS |
| 2004/0066346 A1* | 4/2004 | Huor .................... H01Q 21/005 343/770 |
| 2011/0187614 A1 | 8/2011 | Kirino et al. |
| 2012/0092224 A1 | 4/2012 | Sauleau et al. |
| 2013/0033404 A1 | 2/2013 | Abe |
| 2015/0236414 A1 | 8/2015 | Rosen et al. |
| 2015/0264230 A1 | 9/2015 | Takeda |
| 2016/0140424 A1 | 5/2016 | Wang et al. |
| 2016/0264065 A1 | 9/2016 | Takeda |

FOREIGN PATENT DOCUMENTS

| | | |
|---|---|---|
| EP | 1 331 688 A1 | 7/2003 |
| JP | 10-284928 A | 10/1998 |
| JP | 2001-267838 A | 9/2001 |
| JP | 2004-257848 A | 9/2004 |
| JP | 2007-259047 A | 10/2007 |
| JP | 2010-021828 A | 1/2010 |
| JP | 2012-004700 A | 1/2012 |
| JP | 2012-523149 A | 9/2012 |
| JP | 2013-032979 A | 2/2013 |
| JP | 2013-187752 A | 9/2013 |
| WO | 01/67540 A1 | 9/2001 |
| WO | 2008/081807 A1 | 7/2008 |
| WO | 2010/050122 A1 | 5/2010 |
| WO | 2015/172948 A2 | 11/2015 |

OTHER PUBLICATIONS

Kamo et al., "Slot Array Antenna", U.S. Appl. No. 15/952,307, filed Apr. 13, 2018.

Kirino et al., "Slot Array Antenna, and Radar, Radar System, and Wireless Communication System Including the Slot Array Antenna", U.S. Appl. No. 15/387,891, filed Dec. 22, 2016.

Kirino et al., "Waveguide Device and Antenna Device Including the Waveguide Device,", U.S. Appl. No. 15/292,431, filed Oct. 13, 2016.

Kirino et al., "A 76 GHz Multi-Layered Phased Array Antenna Using a Non-Metal Contact Metamaterial Waveguide", IEEE Transactions on Antennas and Propagation, vol. 60, No. 2, Feb. 2012, pp. 840-853.

Zaman et al., "Ku Band Linear Slot-Array in Ridge Gapwaveguide Technolgy", 7th European Conference on Antennas and Propagation (EUCAP 2013)—Convened Sessions, 2013, pp. 2968-2971.

Kildal et al., "Local Metamaterial-Based Waveguides in Gaps Between Parallel Metal Plates", IEEE Antennas and Wireless Propagation Letters, vol. 8, 2009, pp. 84-87.

Pucci et al., "Design of a Dual-Mode Horn Element for Microstrip Gap Waveguide Fed Array", 7th European Conference on Antennas and Propagation (EUCAP 2013)—Convened Sessions, 2013, pp. 2976-2979.

Kildal, "Metasurting Since 1987—A Personal Story Involving Soft and Hard Surfaces, EBG Surfaces, Cloaking, Gap Waveguides and Mass Production", 2014 IEEE Antennas and Propagation Society International Symposium, 2014, pp. 529-530.

Sehm et al., "A High-Gain 58-GHz Box-Horn Array Antenna with Suppressed Grating Lobes", IEEE Transactions on Antennas and Propagation, vol. 47, No. 7, Jul. 1999, pp. 1125-1130.

Kamo et al., "Slot Array Antenna and Radar Having the Slot Array Antenna,", U.S. Appl. No. 15/923,053, filed Mar. 16, 2018.

Kamo et al., "Slot Antenna Device,", U.S. Appl. No. 15/945,984, filed Apr. 5, 2018.

Zarifi et al., "Design and Fabrication of a High-Gain 60-GHz Corrugated Slot Antenna Array With Ridge Gap Waveguide Distribution Layer", IEEE Transactions on Antennas and Propagation, vol. 64, No. 7, Jul. 2016, pp. 2905-2913.

Mustafa, "Hybrid Analog-Digital Beam-Steered Slot Antenna Array for mm-Wave Applications in Gap Waveguide Technology", Department of Electronics and Telecommunications Master of Science in Telecommunications Engineering Master's Thesis, Oct. 2015, 67 pages.

* cited by examiner

SLOT ARRAY ANTENNA

BACKGROUND

1. Technical Field

The present disclosure relates to a slot array antenna.

2. Description of the Related Art

An antenna device which includes one or more antenna elements (which may hereinafter be also referred to as "radiating elements") finds its use in various applications, e.g., radar and communication systems. In order to radiate electromagnetic waves from an antenna device, it is necessary to supply electromagnetic waves (e.g., radio-frequency signal waves) to each antenna element, from a circuit which generates electromagnetic waves ("feed"). Such feeding is performed via a waveguide. A waveguide is also used to send electromagnetic waves that are received at the antenna elements to a reception circuit.

Conventionally, feed to an antenna device has often been achieved by using a microstrip line(s). However, in the case where the frequency of an electromagnetic wave to be transmitted or received by an antenna device is a high frequency above 30 gigahertz (GHz), as in the millimeter band, a microstrip line will incur a large dielectric loss, thus detracting from the efficiency of the antenna. Therefore, in such a radio frequency region, an alternative waveguide to replace a microstrip line is needed.

It is known that feeding power to each antenna element by using a hollow waveguide instead of a microstrip line can reduce losses in frequency regions above 30 GHz, e.g., the millimeter wave band. A hollow waveguide, also referred to as a hollow metallic waveguide, is a metal tube having a circular or square cross section. Inside the waveguide tube, an electromagnetic field mode is created which is in accordance with the shape and size of the tube. As a result, an electromagnetic wave is able to propagate within the tube in a specific electromagnetic field mode. Since the interior of the tube is hollow, there is no problem of dielectric loss even if the electromagnetic wave to propagate has a high frequency. However, when using hollow waveguides, it is difficult for the antenna elements to be disposed with a high density. The reasons are that the hollow portion of a hollow waveguide needs to have a width which is equal to or greater than a half of the wavelength of the electromagnetic wave to propagate, and that the tube (metal wall) itself of the hollow waveguide needs to have a certain thickness or greater.

As alternative waveguide structures to the microstrip line and the hollow waveguide, Patent Documents 1 to 3, and Non-Patent Documents 1 and 2 disclose structures which guide electromagnetic waves by utilizing an artificial magnetic conductor (AMC) extending on both sides of a ridge-type waveguide. Such a waveguiding structure may be referred to as a WRG (Waffle-iron Ridge waveGuide) in the present specification. Patent Document 1 and Non-Patent Document 1 disclose a structure in which a WRG and a plurality of slots are combined to function as an antenna.

Patent Document 1: International Publication No. 2010/050122
Patent Document 2: the specification of U.S. Pat. No. 8,803,638
Patent Document 3: the specification of European Patent Application Publication No. 1331688
Non-Patent Document 1: Kirino et al., "A 76 GHz Multi-Layered Phased Array Antenna Using a Non-Metal Contact Metamaterial Waveguide", IEEE Transaction on Antennas and Propagation, Vol. 60, No. 2, February 2012, pp 840-853
Non-Patent Document 2: Kildal et al., "Local Metamaterial-Based Waveguides in Gaps Between Parallel Metal Plates", IEEE Antennas and Wireless Propagation Letters, Vol. 8, 2009, pp 84-87
Non-Patent Document 3: Kildal et al., "Ku Band Linear Slot-Array in Ridge Gapwaveguide Technology", EUCAP 2013, 7th European Conference on Antenna and Propagation

SUMMARY

In a conventional slot antenna in which a WRG and slots are combined, once a phase relationship between two adjacent slots is established in a direction which extends along the ridge, the two slots need to be kept apart by a corresponding distance. For example, in order to excite two slots with an equal phase, the two slots need to be separated by a distance which is equal to the wavelength of an electromagnetic wave in the waveguide extending above the ridge. This has imposed a restriction on the interval at which the two adjacent slots may be disposed. In particular, it has been difficult to dispose two slots so as to be close to each other.

The present disclosure provides a slot array antenna which, irrespective of the phase relationship between two adjacent slots, allows the interval between the two slots to be flexibly set.

A slot array antenna according to one implementation of the present disclosure is to be connected to a transmitter or a receiver in use. The slot array antenna includes: a first electrically conductive member having a first electrically conductive surface; a second electrically conductive member having a second electrically conductive surface opposed to the first electrically conductive surface; a waveguide member located between the first electrically conductive member and the second electrically conductive member and extending alongside the first electrically conductive surface, the waveguide member having a stripe-shaped electrically-conductive waveguide face opposed to the first electrically conductive surface; and an artificial magnetic conductor extending on both sides of the waveguide member in between the first electrically conductive member and the second electrically conductive member. At least one of the first electrically conductive member and the second electrically conductive member has a plurality of slots arranged along the first electrically conductive surface or the second electrically conductive surface. The plurality of slots include two slots which are adjacent to each other and which couple to the waveguide face. In between two positions respectively coupled to the two slots, the waveguide face includes at least one deflecting portion at which a direction that the waveguide face extends changes. As viewed from a normal direction of the waveguide face, the waveguide face includes an extension that extends beyond at least one of the two slots and away from the deflecting portion. A distance between the two slots as measured along the waveguide face is greater than half a length of at least one of the two slots. A straight distance between centers of the two slots is smaller than four times the length of either of the two slots. The transmitter or the receiver couples to the waveguide face at the extension side.

A slot array antenna according to another implementation of the present disclosure is to be connected to a transmitter or a receiver in use. The slot array antenna includes: a first electrically conductive member having a first electrically conductive surface; a second electrically conductive member having a second electrically conductive surface opposed to the first electrically conductive surface; a waveguide member located between the first electrically conductive member and the second electrically conductive member and extending alongside the first electrically conductive surface, the waveguide member having a stripe-shaped electrically-conductive waveguide face opposed to the first electrically conductive surface; and an artificial magnetic conductor extending on both sides of the waveguide member in between the first electrically conductive member and the second electrically conductive member. At least one of the first electrically conductive member and the second electrically conductive member has a plurality of slots arranged along the first electrically conductive surface or the second electrically conductive surface. The plurality of slots include two slots which are adjacent to each other and which couple to the waveguide face. The waveguide face includes at least two deflecting portions at which a direction that the waveguide face extends changes. The two slots respectively couple to the two deflecting portions. A distance between the two slots as measured along the waveguide face is greater than half a length of at least one of the two slots. A straight distance between centers of the two slots is smaller than four times the length of either of the two slots. The transmitter or the receiver couples to the waveguide face.

According to an embodiment of the present disclosure, irrespective of the phase relationship between two adjacent slots, the interval between the two slots can be set.

BRIEF DESCRIPTION OF THE DRAWINGS

FIG. 11A is a diagram showing an exemplary slot array antenna 300 in which slots 112 are disposed adjoining the waveguide face 122a.

FIG. 11C is a diagram showing an upper plan view showing an example where only a part of each slot 112 is opposed to the second conductive surface 120a.

FIG. 11D is an upper plan view showing another example where only a part of each slot 112 is opposed to the second conductive surface 120a.

FIG. 12A is a diagram showing an example of a U-shaped slot 112, such that a portion of the opening of the slot 112 is opposed to the waveguide face 122a.

FIG. 12B is a diagram showing an example of a U-shaped slot 112, where the entire opening of the slot 112 is not opposed to the waveguide face 122a.

FIG. 12C is a diagram showing an example of a curve-shaped slot 112, where a portion of the opening of a slot 112 is opposed to the waveguide face 122a.

FIG. 12D is a diagram showing an example of a Z-shaped slot 112, where only an end portion of the opening of a slot 112 is opposed to the waveguide face 122a.

FIG. 12E is a diagram showing an H-shaped slot 112, where the opening of the slot 112 is disposed astride the two edges of the waveguide face 122a.

FIG. 38C is a diagram showing a planar layout of waveguide members 122U in a first waveguide device 100a.

DETAILED DESCRIPTION

Prior to describing embodiments of the present disclosure, findings that form the basis of the present disclosure will be described.

A ridge waveguide which is disclosed in the aforementioned Patent Documents 1 to 3, and Non-Patent Documents 1 and 2 is provided in a waffle iron structure which is capable of functioning as an artificial magnetic conductor. A ridge waveguide (WRB) in which such an artificial magnetic conductor is utilized based on the present disclosure is able to realize an antenna feeding network with low losses in the microwave or the millimeter wave band. Moreover, use of such a ridge waveguide allows antenna elements to be disposed with a high density. Hereinafter, an exemplary fundamental construction and operation of such a waveguide structure will be described.

An artificial magnetic conductor is a structure which artificially realizes the properties of a perfect magnetic conductor (PMC), which does not exist in nature. One property of a perfect magnetic conductor is that "a magnetic field on its surface has zero tangential component". This property is the opposite of the property of a perfect electric conductor (PEC), i.e., "an electric field on its surface has zero tangential component". Although no perfect magnetic conductor exists in nature, it can be embodied by an artificial structure, e.g., an array of a plurality of electrically conductive rods. An artificial magnetic conductor functions as a perfect magnetic conductor in a specific frequency band which is defined by its structure. An artificial magnetic conductor restrains or prevents an electromagnetic wave of any frequency that is contained in the specific frequency band (propagation-restricted band) from propagating along the surface of the artificial magnetic conductor. For this reason, the surface of an artificial magnetic conductor may be referred to as a high impedance surface.

In the waveguide devices disclosed in Patent Documents 1 to 3 and Non-Patent Documents 1 and 2, an artificial magnetic conductor is realized by a plurality of electrically conductive rods which are arrayed along row and column directions. Such rods are projections which may also be referred to as posts or pins. Each of these waveguide devices includes, as a whole, a pair of opposing electrically conductive plates. One conductive plate has a ridge protruding toward the other conductive plate, and stretches of an artificial magnetic conductor extending on both sides of the ridge. An upper face (i.e., its electrically conductive face) of the ridge opposes, via a gap, an electrically conductive surface of the other conductive plate. An electromagnetic wave (signal wave) of a wavelength which is contained in the propagation-restricted band of the artificial magnetic conductor propagates along the ridge, in the space (gap) between this conductive surface and the upper face of the ridge.

Figure 1:
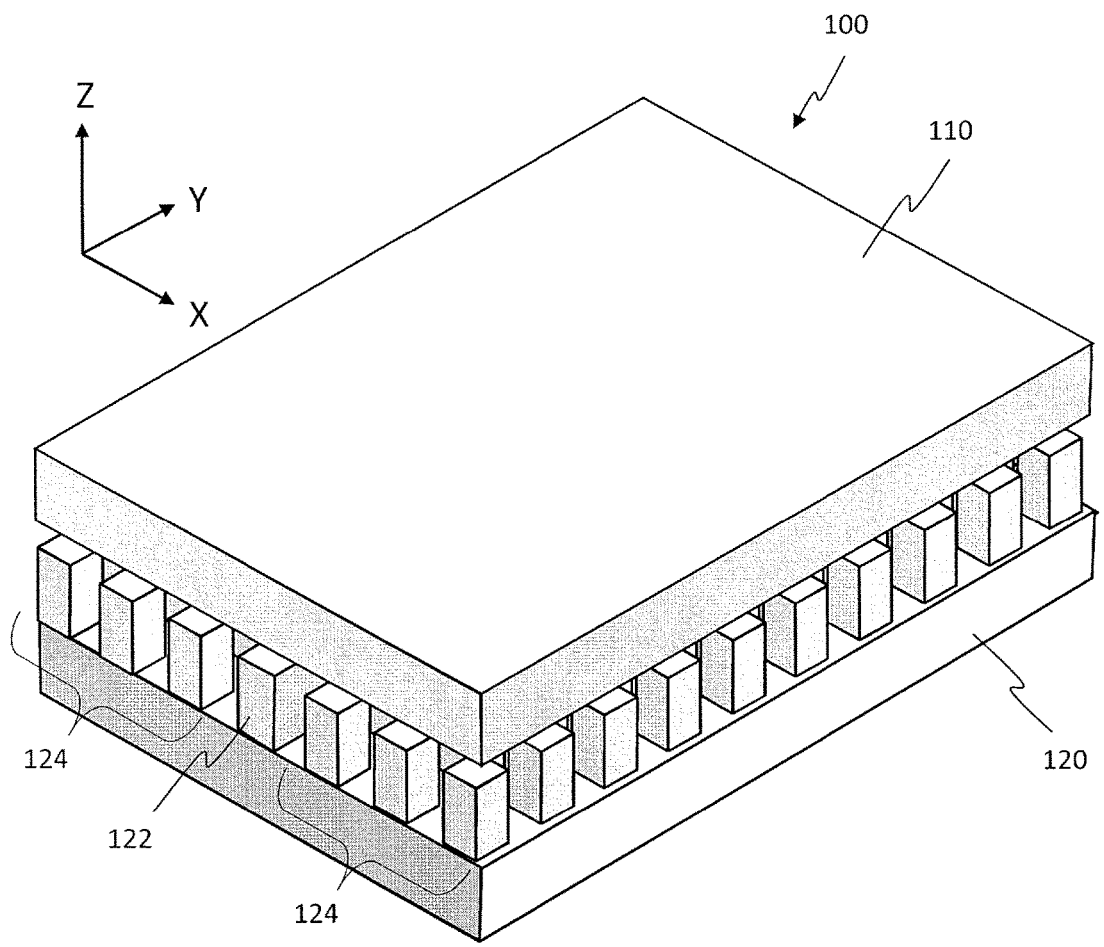
FIG. 1 is a perspective view schematically showing a non-limiting example of the fundamental construction of a waveguide device.

FIG. 1 is a perspective view schematically showing a non-limiting example of a fundamental construction of such a waveguide device. FIG. 1 shows XYZ coordinates along X, Y and Z directions which are orthogonal to one another. The waveguide device 100 shown in the figure includes a plate-like first electrically conductive member 110 and a plate shape (plate-like) second electrically conductive member 120, which are in opposing and parallel positions to each other. A plurality of electrically conductive rods 124 are arrayed on the second conductive member 120.

Note that any structure appearing in a figure of the present application is shown in an orientation that is selected for ease of explanation, which in no way should limit its orientation when an embodiment of the present disclosure is actually practiced. Moreover, the shape and size of a whole or a part of any structure that is shown in a figure should not limit its actual shape and size.

Figure 2A:
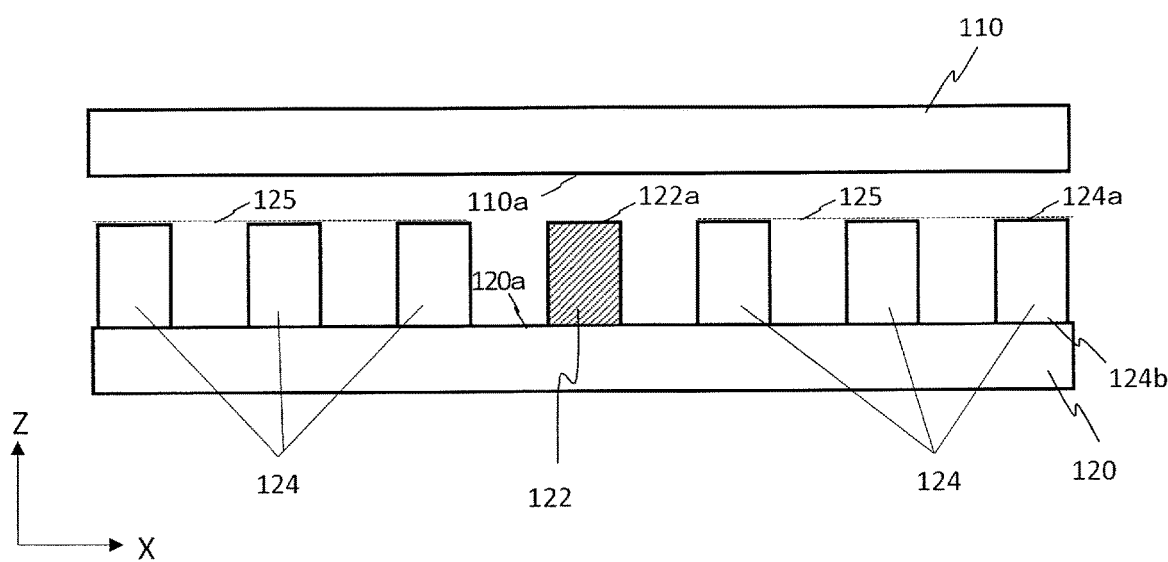
FIG. 2A is a diagram schematically showing an exemplary cross-sectional construction of a waveguide device 100 as taken parallel to the XZ plane.

FIG. 2A is a diagram schematically showing the construction of a cross section of the waveguide device 100 in FIG. 1, taken parallel to the XZ plane. As shown in FIG. 2A, the first conductive member 110 has an electrically conductive surface (first electrically conductive surface) 110a on the side facing the second conductive member 120. The conductive surface 110a has a two-dimensional expanse along a plane which is orthogonal to the axial direction (i.e., the Z direction) of the conductive rods 124 (i.e., a plane which is parallel to the XY plane). Although the conductive surface 110a is shown to be a smooth plane in this example, the conductive surface 110a does not need to be a plane, as will be described later.

Figure 3:
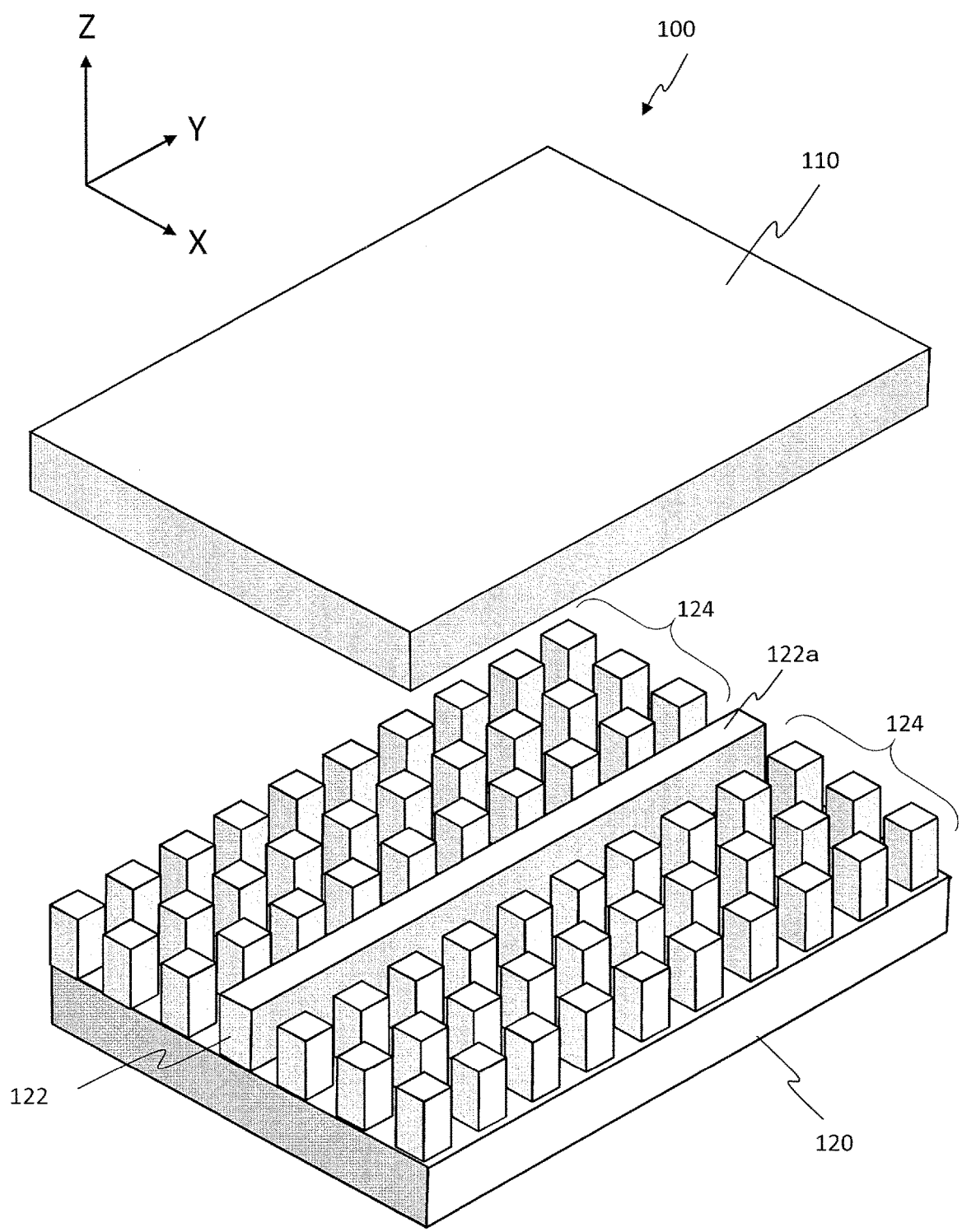
FIG. 3 is a perspective view schematically showing the waveguide device 100, illustrated so that the spacing between a first conductive member 110 and a second conductive member 120 is exaggerated.

FIG. 3 is a perspective view schematically showing the waveguide device 100, illustrated so that the spacing between the first conductive member 110 and the second conductive member 120 is exaggerated for ease of understanding. In an actual waveguide device 100, as shown in FIG. 1 and FIG. 2A, the spacing between the first conductive member 110 and the second conductive member 120 is narrow, with the first conductive member 110 covering over all of the conductive rods 124 on the second conductive member 120.

See FIG. 2A again. The plurality of conductive rods 124 arrayed on the second conductive member 120 each have a leading end 124a opposing the conductive surface 110a. In the example shown in the figure, the leading ends 124a of the plurality of conductive rods 124 are on the same plane. This plane defines the surface 125 of an artificial magnetic conductor. Each conductive rod 124 does not need to be entirely electrically conductive, so long as it at least includes an electrically conductive layer that extends along the upper face and the side face of the rod-like structure. Although this electrically conductive layer may be located at the surface layer of the rod-like structure, the surface layer may be composed of an insulation coating or a resin layer with no electrically conductive layer existing on the surface of the rod-like structure. Moreover, each second conductive member 120 does not need to be entirely electrically conductive, so long as it can support the plurality of conductive rods 124 to constitute an artificial magnetic conductor. Of the surfaces of the second conductive member 120, a face (second electrically conductive surface) 120a carrying the plurality of conductive rods 124 may be electrically conductive, such that the electrical conductor electrically interconnects the surfaces of adjacent ones of the plurality of conductive rods 124. Moreover, the electrically conductive layer of the second conductive member 120 may be covered with an insulation coating or a resin layer. In other words, the entire combination of the second conductive member 120 and the plurality of conductive rods 124 may at least include an electrically conductive layer with rises and falls opposing the conductive surface 110a of the first conductive member 110.

On the second conductive member 120, a ridge-like waveguide member 122 is provided among the plurality of conductive rods 124. More specifically, stretches of an artificial magnetic conductor are present on both sides of the waveguide member 122, such that the waveguide member 122 is sandwiched between the stretches of artificial magnetic conductor on both sides. As can be seen from FIG. 3, the waveguide member 122 in this example is supported on the second conductive member 120, and extends linearly along the Y direction. In the example shown in the figure, the waveguide member 122 has the same height and width as those of the conductive rods 124. As will be described later, however, the height and width of the waveguide member 122 may have respectively different values from those of the conductive rod 124. Unlike the conductive rods 124, the waveguide member 122 extends along a direction (which in this example is the Y direction) in which to guide electromagnetic waves along the conductive surface 110a. Similarly, the waveguide member 122 does not need to be entirely electrically conductive, but may at least include an electrically conductive waveguide face 122a opposing the conductive surface 110a of the first conductive member 110.

The second conductive member 120, the plurality of conductive rods 124, and the waveguide member 122 may be portions of a continuous single-piece body. Furthermore, the first conductive member 110 may also be a portion of such a single-piece body.

On both sides of the waveguide member 122, the space between the surface 125 of each stretch of artificial magnetic conductor and the conductive surface 110a of the first conductive member 110 does not allow an electromagnetic wave of any frequency that is within a specific frequency band to propagate. This frequency band is called a "prohibited band". The artificial magnetic conductor is designed so that the frequency of a signal wave to propagate in the waveguide device 100 (which may hereinafter be referred to as the "operating frequency") is contained in the prohibited band. The prohibited band may be adjusted based on the following: the height of the conductive rods 124, i.e., the depth of each groove formed between adjacent conductive rods 124; the width of each conductive rod 124; the interval between conductive rods 124; and the size of the gap between the leading end 124a and the conductive surface 110a of each conductive rod 124.

Next, with reference to FIG. 4, the dimensions, shape, positioning, and the like of each member will be described.

Figure 4:
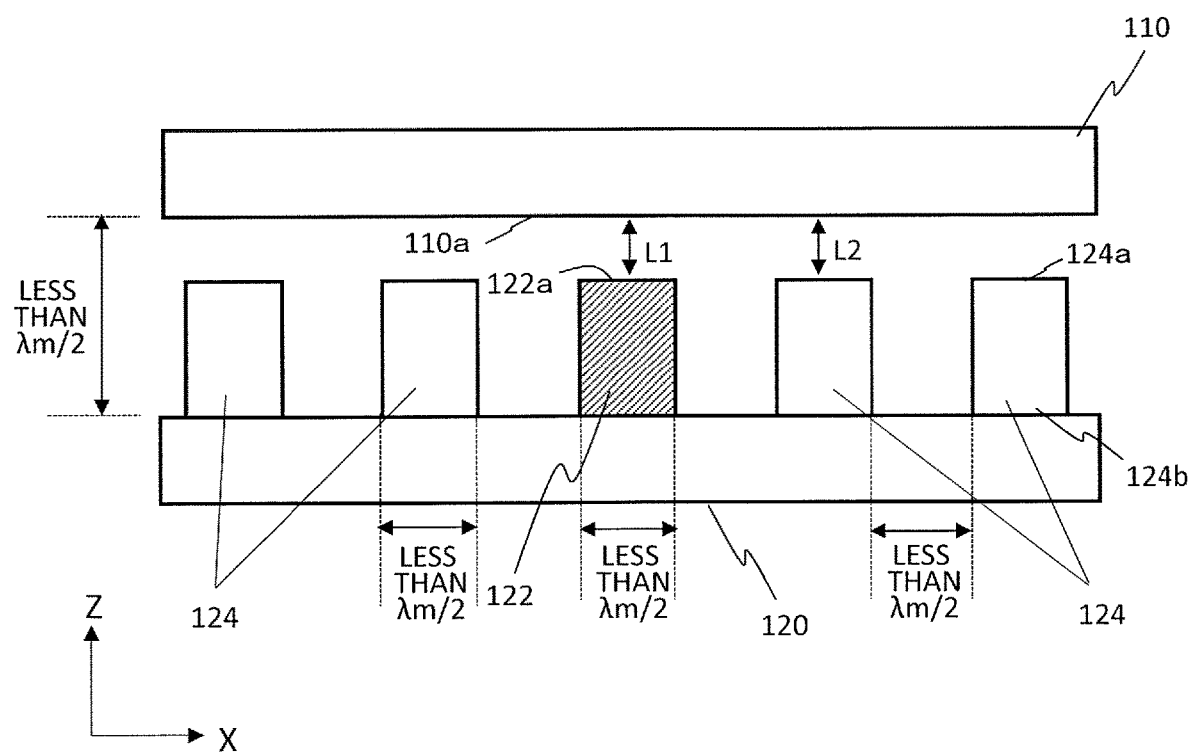
FIG. 4 is a diagram showing an exemplary range of dimension of each member in the structure shown in FIG. 2A.

FIG. 4 is a diagram showing an exemplary range of dimension of each member in the structure shown in FIG. 2A. The waveguide device is used for at least one of transmission and reception of electromagnetic waves of a predetermined band (referred to as the "operating frequency band"). In the present specification, $\lambda o$ denotes a representative value of wavelengths in free space (e.g., a central wavelength corresponding to a center frequency in the operating frequency band) of an electromagnetic wave (signal wave) propagating in a waveguide extending between the conductive surface 110a of the first conductive member 110 and the waveguide face 122a of the waveguide member 122. Moreover, $\lambda m$ denotes a wavelength, in free space, of an electromagnetic wave of the highest frequency in the operating frequency band. The end of each conductive rod 124 that is in contact with the second conductive member 120 is referred to as the "root". As shown in FIG. 4, each conductive rod 124 has the leading end 124a and the root 124b. Examples of dimensions, shapes, positioning, and the like of the respective members are as follows.

(1) Width of the Conductive Rod

The width (i.e., the size along the X direction and the Y direction) of the conductive rod 124 may be set to less than $\lambda m/2$. Within this range, resonance of the lowest order can be prevented from occurring along the X direction and the Y direction. Since resonance may possibly occur not only in the X and Y directions but also in any diagonal direction in an X-Y cross section, the diagonal length of an X-Y cross section of the conductive rod 124 is also preferably less than $\lambda m/2$. The lower limit values for the rod width and diagonal length will conform to the minimum lengths that are producible under the given manufacturing method, but is not particularly limited.

(2) Distance from the Root of the Conductive Rod to the Conductive Surface of the First Conductive Member The distance from the root 124b of each conductive rod 124 to the conductive surface 110a of the first conductive member 110 may be longer than the height of the conductive rods 124, while also being less than $\lambda m/2$. When the distance is $\lambda m/2$ or more, resonance may occur between the root 124b of each conductive rod 124 and the conductive surface 110a, thus reducing the effect of signal wave containment.

The distance from the root 124b of each conductive rod 124 to the conductive surface 110a of the first conductive member 110 corresponds to the spacing between the first conductive member 110 and the second conductive member 120. For example, when a signal wave of 76.5±0.5 GHz (which belongs to the millimeter band or the extremely high frequency band) propagates in the waveguide, the wavelength of the signal wave is in the range from 3.8934 mm to 3.9446 mm. Therefore, $\lambda$m equals 3.8934 mm in this case, so that the spacing between the first conductive member 110 and the second conductive member 120 may be set to less than a half of 3.8934 mm. So long as the first conductive member 110 and the second conductive member 120 realize such a narrow spacing while being disposed opposite from each other, the first conductive member 110 and the second conductive member 120 do not need to be strictly parallel. Moreover, when the spacing between the first conductive member 110 and the second conductive member 120 is less than $\lambda$m/2, a whole or a part of the first conductive member 110 and/or the second conductive member 120 may be shaped as a curved surface. On the other hand, the first and second conductive members 110 and 120 each have a planar shape (i.e., the shape of their region as perpendicularly projected onto the XY plane) and a planar size (i.e., the size of their region as perpendicularly projected onto the XY plane) which may be arbitrarily designed depending on the purpose.

Figure 2B:
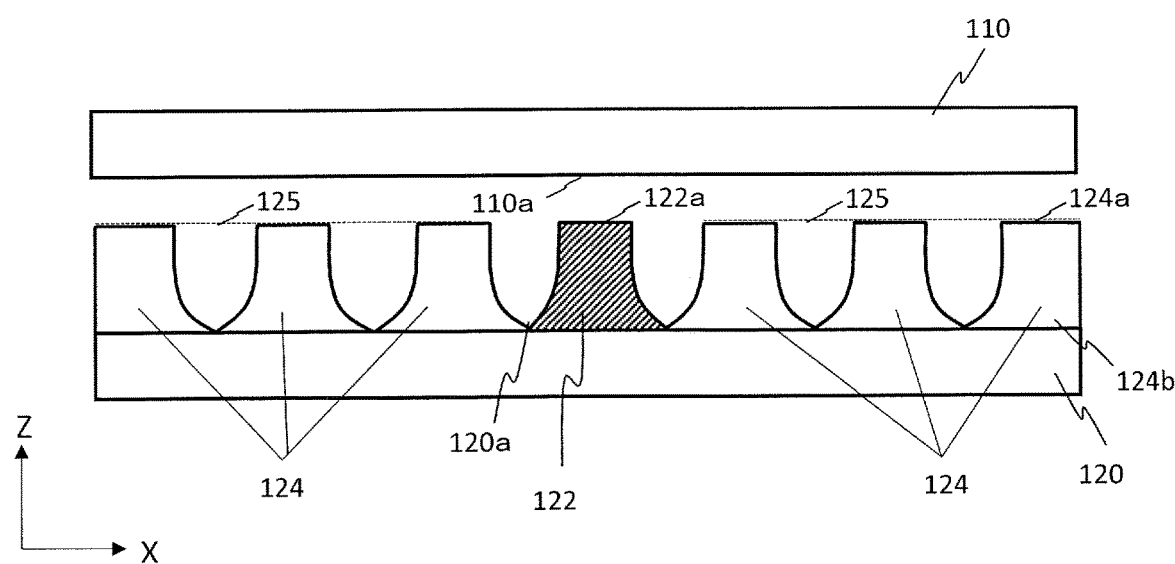
FIG. 2B is a diagram schematically showing another exemplary cross-sectional construction of the waveguide device 100 as taken parallel to the XZ plane.

Although the conductive surface 120a is illustrated as a plane in the example shown in FIG. 2A, embodiments of the present disclosure are not limited thereto. For example, as shown in FIG. 2B, the conductive surface 120a may be the bottom parts of faces each of which has a cross section similar to a U-shape or a V-shape. The conductive surface 120a will have such a structure when each conductive rod 124 or the waveguide member 122 is shaped with a width which increases toward the root. Even with such a structure, the device shown in FIG. 2B can function as the waveguide device according to an embodiment of the present disclosure so long as the distance between the conductive surface 110a and the conductive surface 120a is less than a half of the wavelength $\lambda$m.

(3) Distance L2 from the Leading End of the Conductive Rod to the Conductive Surface The distance L2 from the leading end 124a of each conductive rod 124 to the conductive surface 110a is set to less than $\lambda$m/2. When the distance is $\lambda$m/2 or more, a propagation mode where electromagnetic waves reciprocate between the leading end 124a of each conductive rod 124 and the conductive surface 110a may occur, thus no longer being able to contain an electromagnetic wave. Note that, among the plurality of conductive rods 124, at least those which are adjacent to the waveguide member 122 do not have their leading ends in electrical contact with the conductive surface 110a. As used herein, the leading end of a conductive rod not being in electrical contact with the conductive surface means either of the following states: there being an air gap between the leading end and the conductive surface; or the leading end of the conductive rod and the conductive surface adjoining each other via an insulating layer which may exist in the leading end of the conductive rod or in the conductive surface.

(4) Arrangement and Shape of Conductive Rods

The interspace between two adjacent conductive rods 124 among the plurality of conductive rods 124 has a width of less than $\lambda$m/2. The width of the interspace between any two adjacent conductive rods 124 is defined by the shortest distance from the surface (side face) of one of the two conductive rods 124 to the surface (side face) of the other. This width of the interspace between rods is to be determined so that resonance of the lowest order will not occur in the regions between rods. The conditions under which resonance will occur are determined based by a combination of: the height of the conductive rods 124; the distance between any two adjacent conductive rods; and the capacitance of the air gap between the leading end 124a of each conductive rod 124 and the conductive surface 110a. Therefore, the width of the interspace between rods may be appropriately determined depending on other design parameters. Although there is no clear lower limit to the width of the interspace between rods, for manufacturing ease, it may be e.g. $\lambda$m/16 or more when an electromagnetic wave in the extremely high frequency range is to be propagated. Note that the interspace does not need to have a constant width. So long as it remains less than $\lambda$m/2, the interspace between conductive rods 124 may vary.

The arrangement of the plurality of conductive rods 124 is not limited to the illustrated example, so long as it exhibits a function of an artificial magnetic conductor. The plurality of conductive rods 124 do not need to be arranged in orthogonal rows and columns; the rows and columns may be intersecting at angles other than 90 degrees. The plurality of conductive rods 124 do not need to form a linear array along rows or columns, but may be in a dispersed arrangement which does not present any straightforward regularity. The conductive rods 124 may also vary in shape and size depending on the position on the second conductive member 120.

The surface 125 of the artificial magnetic conductor that are constituted by the leading ends 124a of the plurality of conductive rods 124 does not need to be a strict plane, but may be a plane with minute rises and falls, or even a curved surface. In other words, the conductive rods 124 do not need to be of uniform height, but rather the conductive rods 124 may be diverse so long as the array of conductive rods 124 is able to function as an artificial magnetic conductor.

Each conductive rod 124 does not need to have a prismatic shape as shown in the figure, but may have a cylindrical shape, for example. Furthermore, each conductive rod 124 does not need to have a simple columnar shape. The artificial magnetic conductor may also be realized by any structure other than an array of conductive rods 124, and various artificial magnetic conductors are applicable to the waveguide device of the present disclosure. Note that, when the leading end 124a of each conductive rod 124 has a prismatic shape, its diagonal length is preferably less than $\lambda$m/2. When the leading end 124a of each conductive rod 124 is shaped as an ellipse, the length of its major axis is preferably less than $\lambda$m/2. Even when the leading end 124a has any other shape, the dimension across it is preferably less than $\lambda$m/2 even at the longest position.

(5) Width of the Waveguide Face

The width of the waveguide face 122a of the waveguide member 122, i.e., the size of the waveguide face 122a along a direction which is orthogonal to the direction that the waveguide member 122 extends, may be set to less than $\lambda$m/2 (e.g. $\lambda$o/8). If the width of the waveguide face 122a is $\lambda$m/2 or more, resonance will occur along the width direction, which will prevent any WRG from operating as a simple transmission line.

(6) Height of the Waveguide Member

The height (i.e., the size along the Z direction in the example shown in the figure) of the waveguide member 122 is set to less than $\lambda$m/2. The reason is that, if the distance is $\lambda$m/2 or more, the distance between the root 124b of each conductive rod 124 and the conductive surface 110a will be λm/2 or more. Similarly, the height of the conductive rods 124 (in particular, those conductive rods 124 which are adjacent to the waveguide member 122) is also set to less than λm/2.

(7) Distance L1 Between the Waveguide Face and the Conductive Surface

The distance L1 between the waveguide face 122a of the waveguide member 122 and the conductive surface 110a is set to less than λm/2. If the distance is λm/2 or more, resonance will occur between the waveguide face 122a and the conductive surface 110a, which will prevent functionality as a waveguide. In one example, the distance L1 is λm/4 or less. In order to ensure manufacturing ease, when an electromagnetic wave in the extremely high frequency range is to propagate, the distance L1 is preferably λm/16 or more, for example.

The lower limit of the distance L1 between the conductive surface 110a and the waveguide face 122a and the lower limit of the distance L2 between the conductive surface 110a and the leading end 124a of each conductive rod 124 depends on the machining precision, and also on the precision when assembling the two upper/lower conductive members 110 and 120 so as to be apart by a constant distance. When a pressing technique or an injection technique is used, the practical lower limit of the aforementioned distance is about 50 micrometers (μm). In the case of using an MEMS (Micro-Electro-Mechanical System) technique to make a product in e.g. the terahertz range, the lower limit of the aforementioned distance is about 2 to about 3 μm.

In the waveguide device 100 of the above-described construction, a signal wave of the operating frequency is unable to propagate in the space between the surface 125 of the artificial magnetic conductor and the conductive surface 110a of the first conductive member 110, but propagates in the space between the waveguide face 122a of the waveguide member 122 and the conductive surface 110a of the first conductive member 110. Unlike in a hollow waveguide, the width of the waveguide member 122 in such a waveguide structure does not need to be equal to or greater than a half of the wavelength of the electromagnetic wave to propagate. Moreover, the first conductive member 110 and the second conductive member 120 do not need to be interconnected by a metal wall that extends along the thickness direction (i.e., in parallel to the YZ plane).

Figure 5A:
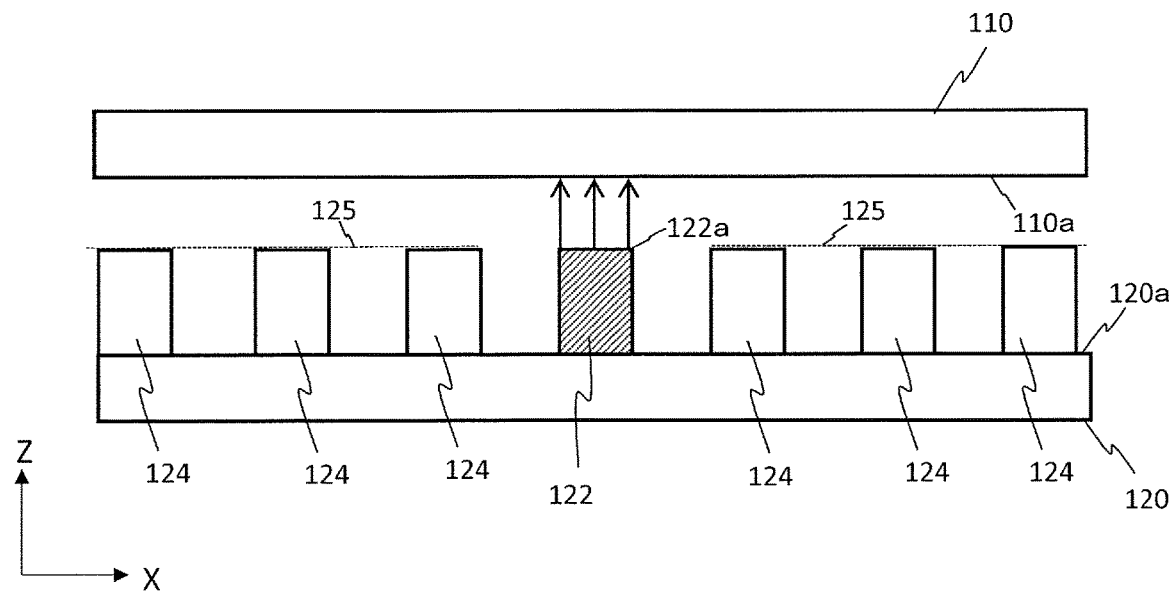
FIG. 5A is a diagram schematically showing an electromagnetic wave that propagates in a narrow space, i.e., a gap between a waveguide face 122a of a waveguide member 122 and a conductive surface 110a of a first conductive member 110.

FIG. 5A schematically shows an electromagnetic wave that propagates in a narrow space, i.e., a gap between the waveguide face 122a of the waveguide member 122 and the conductive surface 110a of the first conductive member 110. Three arrows in FIG. 5A schematically indicate the orientation of an electric field of the propagating electromagnetic wave. The electric field of the propagating electromagnetic wave is perpendicular to the conductive surface 110a of the first conductive member 110 and to the waveguide face 122a.

On both sides of the waveguide member 122, stretches of artificial magnetic conductor that are created by the plurality of conductive rods 124 are present. An electromagnetic wave propagates in the gap between the waveguide face 122a of the waveguide member 122 and the conductive surface 110a of the first conductive member 110. FIG. 5A is schematic, and does not accurately represent the magnitude of an electromagnetic field to be actually created by the electromagnetic wave. A part of the electromagnetic wave (electromagnetic field) propagating in the space over the waveguide face 122a may have a lateral expanse, to the outside (i.e., toward where the artificial magnetic conductor exists) of the space that is delineated by the width of the waveguide face 122a. In this example, the electromagnetic wave propagates in a direction (i.e., the Y direction) which is perpendicular to the plane of FIG. 5A. As such, the waveguide member 122 does not need to extend linearly along the Y direction, but may include a bend(s) and/or a branching portion(s) not shown. Since the electromagnetic wave propagates along the waveguide face 122a of the waveguide member 122, the direction of propagation would change at a bend, whereas the direction of propagation would ramify into plural directions at a branching portion.

In the waveguide structure of FIG. 5A, no metal wall (electric wall), which would be indispensable to a hollow waveguide, exists on both sides of the propagating electromagnetic wave. Therefore, in the waveguide structure of this example, "a constraint due to a metal wall (electric wall)" is not included in the boundary conditions for the electromagnetic field mode to be created by the propagating electromagnetic wave, and the width (size along the X direction) of the waveguide face 122a is less than a half of the wavelength of the electromagnetic wave.

Figure 5B:
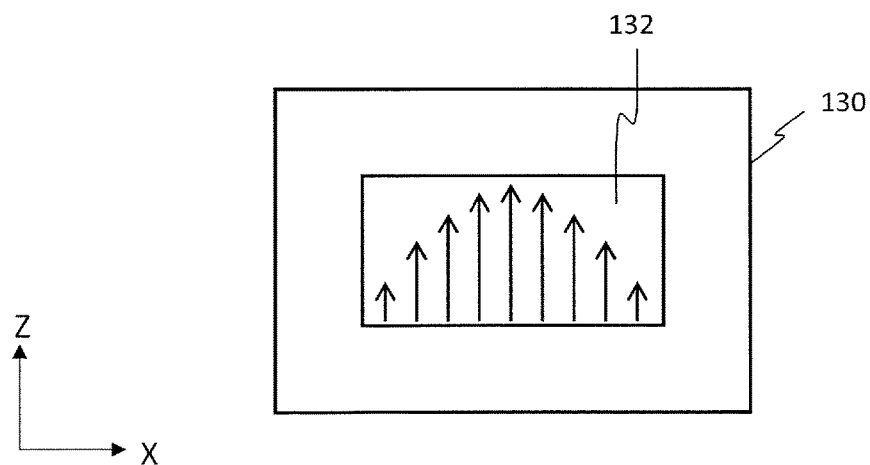
FIG. 5B is a diagram schematically showing a cross section of a hollow waveguide 130, for reference sake.

For reference, FIG. 5B schematically shows a cross section of a hollow waveguide 130. With arrows, FIG. 5B schematically shows the orientation of an electric field of an electromagnetic field mode ($TE_{10}$) that is created in the internal space 132 of the hollow waveguide 130. The lengths of the arrows correspond to electric field intensities. The width of the internal space 132 of the hollow waveguide 130 needs to be set to be broader than a half of the wavelength. In other words, the width of the internal space 132 of the hollow waveguide 130 cannot be set to be smaller than a half of the wavelength of the propagating electromagnetic wave.

Figure 5C:
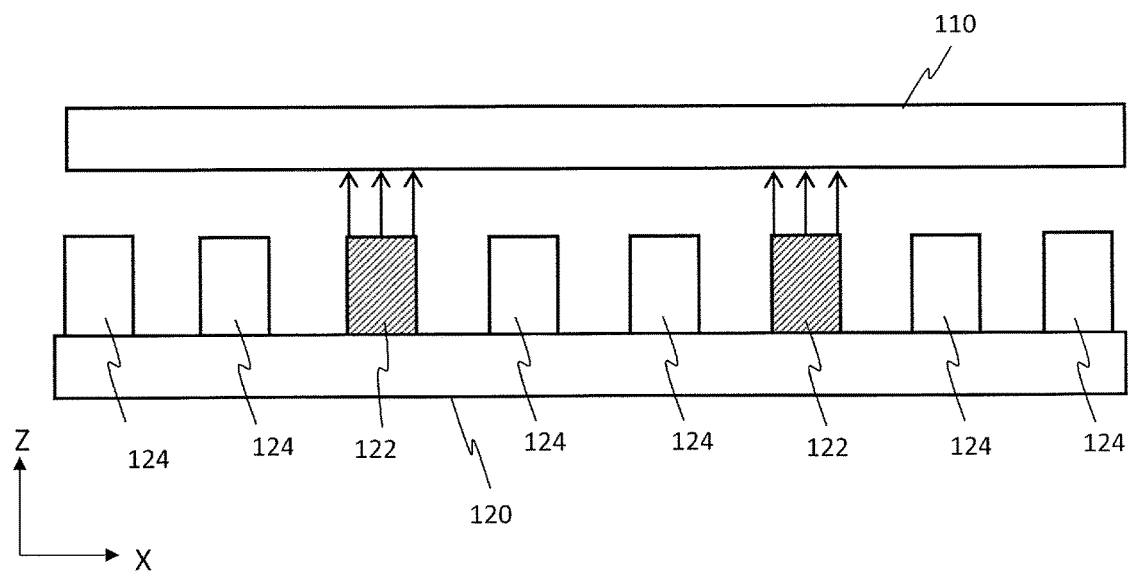
FIG. 5C is a cross-sectional view showing an implementation where two waveguide members 122 are provided on the second conductive member 120.

FIG. 5C is a cross-sectional view showing an implementation where two waveguide members 122 are provided on the second conductive member 120. Thus, an artificial magnetic conductor that is created by the plurality of conductive rods 124 exists between the two adjacent waveguide members 122. More accurately, stretches of artificial magnetic conductor created by the plurality of conductive rods 124 are present on both sides of each waveguide member 122, such that each waveguide member 122 is able to independently propagate an electromagnetic wave.

Figure 5D:
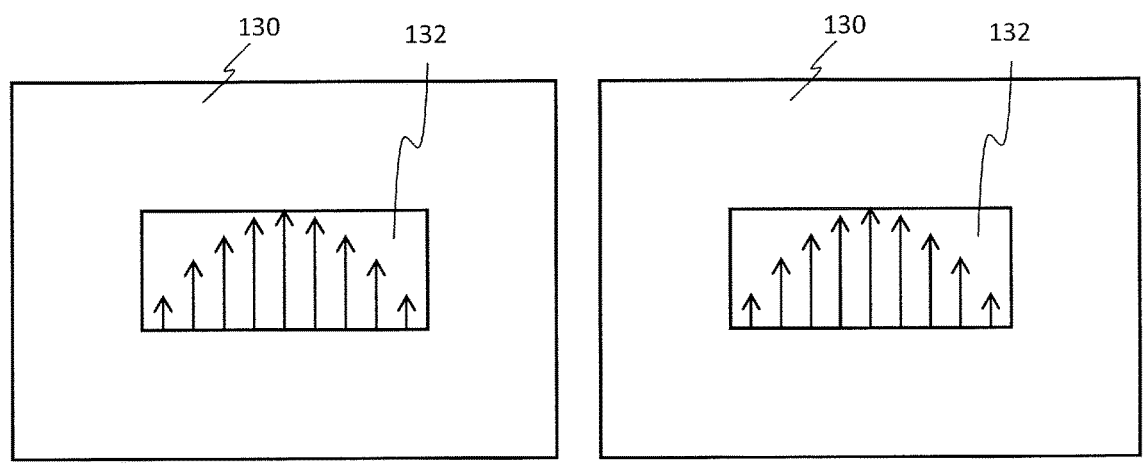
FIG. 5D is a diagram schematically showing a cross section of a waveguide device in which two hollow waveguides 130 are placed side-by-side, for reference sake.

For reference's sake, FIG. 5D schematically shows a cross section of a waveguide device in which two hollow waveguides 130 are placed side-by-side. The two hollow waveguides 130 are electrically insulated from each other. Each space in which an electromagnetic wave is to propagate needs to be surrounded by a metal wall that defines the respective hollow waveguide 130. Therefore, the interval between the internal spaces 132 in which electromagnetic waves are to propagate cannot be made smaller than a total of the thicknesses of two metal walls. Usually, a total of the thicknesses of two metal walls is longer than a half of the wavelength of a propagating electromagnetic wave. Therefore, it is difficult for the interval between the hollow waveguides 130 (i.e., interval between their centers) to be shorter than the wavelength of a propagating electromagnetic wave. Particularly for electromagnetic waves of wavelengths in the extremely high frequency range (i.e., electromagnetic wave wavelength: 10 mm or less) or even shorter wavelengths, a metal wall which is sufficiently thin relative to the wavelength is difficult to be formed. This presents a cost problem in commercially practical implementation.

On the other hand, a waveguide device 100 including an artificial magnetic conductor can easily realize a structure in which a plurality of waveguide members 122 are placed close to one another. Thus, such a waveguide device 100 can be suitably used in an array antenna that includes plural antenna elements in a close arrangement.

Next, an exemplary construction of a slot antenna incorporating the aforementioned waveguide structure will be described. A "slot antenna" means an antenna device having one or more slots (throughhole(s)) as antenna elements. In particular, a slot antenna having a plurality of slots as its antenna elements is referred to as a "slot array antenna" or a "slot antenna array". Any device that includes a slot antenna may be referred to as an "antenna device".

Figure 6A:
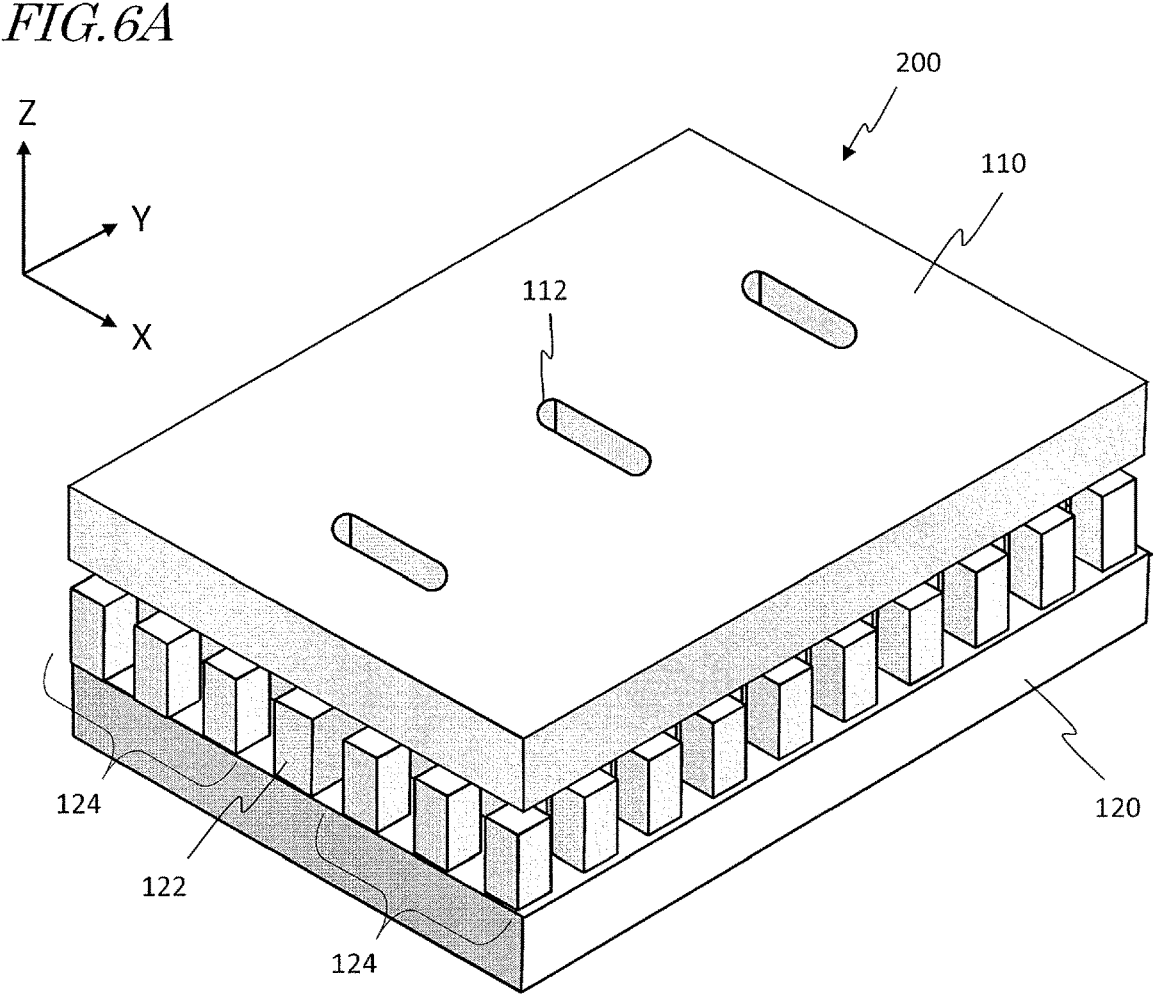
FIG. 6A is a perspective view schematically showing an exemplary construction of a slot array antenna 200 (Comparative Example).

FIG. 6A is a perspective view schematically showing an exemplary construction of a slot antenna 200 (Comparative Example). Similarly to the above-described waveguide device, the slot antenna 200 includes a first conductive member 110, a second conductive member 120, a waveguide member 122, and a plurality of conductive rods 124. The slot antenna 200 differs from the above-described waveguide device in that the first conductive member 110 has three slots 112 that are arranged along the Y direction. In the example of FIG. 6A, there is one waveguide member 122; however, a plurality of waveguide members 122 may be arranged along the X direction. In such a construction, a plurality of slots respectively opposing the plurality of waveguide members 122 are provided on the first conductive member 110, thus realizing a two-dimensional slot array antenna.

Figure 6B:
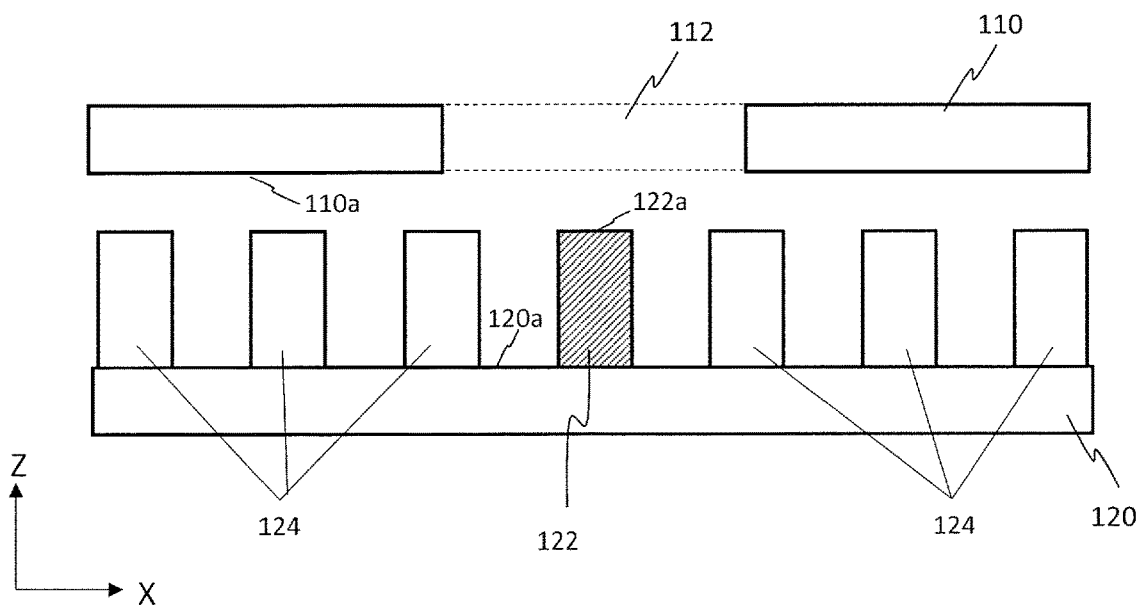
FIG. 6B is a diagram schematically showing a partial cross section which passes through the center of a slot 112 of the slot antenna 200 shown in FIG. 6A, the cross section being taken parallel to the XZ plane.

FIG. 6B is a diagram schematically showing a cross section which passes through the center of a slot 112 of the slot antenna 200 shown in FIG. 6A, the cross section being taken parallel to the XZ plane. In the slot antenna 200, the first conductive member 110 has three slots 112 that are arranged along the Y direction. The waveguide member 122 is located between the first conductive member 110 and the second conductive member 120, and extends in the Y direction alongside the conductive surface 110a of the first conductive member 110. On both sides of the waveguide member 122, a plurality of conductive rods 124 functioning as an artificial magnetic conductor are provided.

The waveguide member 122 has a stripe-shaped electrically-conductive waveguide face 122a opposing the conductive surface 110a. In the present specification, a "stripe shape" means a shape which is defined by a single stripe, rather than a shape constituted by stripes. Not only shapes that extend linearly in one direction, but also any shape that bends or branches along the way is also encompassed by a "stripe shape". Note that the waveguide face 122a may have a portion that undergoes a change in height or width; in that case, the shape falls under the meaning of "stripe shape" so long as it includes a portion that extends in one direction as viewed from the normal direction of the waveguide face 122a. A "stripe shape" may also be referred to as a "strip shape". In Comparative Example as shown in FIG. 6A, the waveguide face 122a of the waveguide member 122 is opposed to the three slots 112. In this Comparative Example, the center of each slot 112 along the X direction is identical in position to the center of the waveguide face 122a along the X direction.

Figure 6C:
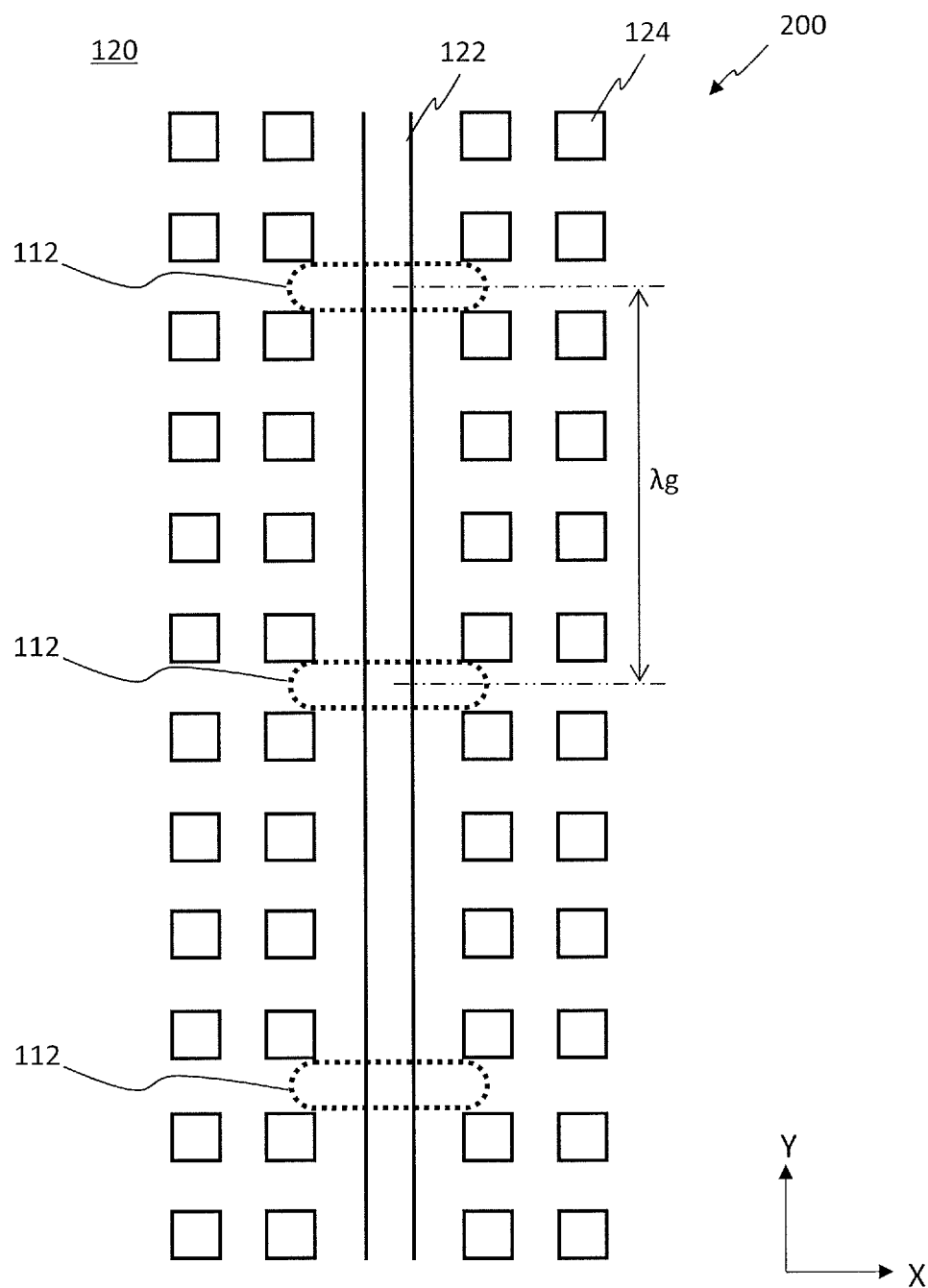
FIG. 6C is an upper plan view showing a relative positioning between a plurality of slots 112, a waveguide member 122, and a plurality of conductive rods 124 in Comparative Example.

FIG. 6C is an upper plan view showing a relative positioning between the plurality of slots 112, the waveguide member 122, and the plurality of conductive rods 124. FIG. 6C illustrates the second conductive member 120, the waveguide member 122, and the plurality of conductive rods 124 as viewed from the normal direction of the second conductive member 120 (i.e., the Z direction). In FIG. 6C, the waveguide member 122 and the plurality of conductive rods 124 are depicted by solid lines, whereas the plurality of slots 112 are depicted by dotted lines.

The slot antenna 200 is connected to an electronic circuit not shown (e.g., a millimeter wave integrated circuit). During transmission, an electromagnetic wave (signal wave) is supplied from the electronic circuit to the waveguide extending between the waveguide face 122a of the waveguide member 122 and the conductive surface 110a of the first conductive member 110. The distance between the centers of two adjacent ones of the plurality of slots 112 that are arranged along the Y direction (i.e., a length indicated by arrows shown in FIG. 6C) is set to the same length as the wavelength $\lambda g$ of the signal wave propagating in the waveguide, for example. As a result, electromagnetic waves with an equal phase are radiated from the plurality of slots 112 that are arranged along the Y direction.

In Comparative Example, as shown in FIGS. 6A through 6C, each slot 112 has a planar shape which is longer along the X direction and shorter along the Y direction. Such a shape resembles the alphabetical letter "I", and therefore may be referred to as an "I shape" in the present specification. A slot having an I shape may be referred to as an "I-shaped slot". Without being limited to such an I shape, the shape of each slot 112 may be other shapes, as will be described below. The size (length) L along the X direction and the size (width) W along the Y direction of each slot 112 shown in FIG. 6C are set to values at which higher-order mode oscillation does not occur and at which the slot impedance is not too small. For example, L may be set to a range of $\lambda o/2 < L < \lambda o$. The width W may be less than $\lambda o/2$. In order to actively utilize higher-order modes, L may possibly be larger than $\lambda o$. With such slots 112, the slot antenna 200 is able to transmit or receive an electromagnetic wave (linearly polarized wave) whose electric field oscillates along the direction that waveguide member 122 extends (i.e., the Y direction). By ensuring that the length direction of the slots 112 is distinct from the X direction, the plane of polarization can be tilted.

In this Comparative Example, the waveguide face 122a of the waveguide member 122 extends linearly along the row of slots 112 (i.e., the Y direction). For this reason, when electromagnetic waves with an equal phase are to be radiated from two adjacent slots 112 along the Y direction, the distance between the centers of two slots 112 (which hereinafter may be referred to as a "slot interval") needs to equal $\lambda g$ or an integer multiple thereof. Because of this constraint, the slot interval cannot be made shorter than $\lambda g$. On the other hand, when electromagnetic waves with phases that are different by a predetermined amount (e.g. a half of the wavelength) are to be radiated from two adjacent slots 112, the slot interval needs to span a distance which corresponds to the phase difference. The slot interval cannot be any longer or any shorter than this distance. In other words, in the construction of Comparative Example, once the phase relationship between two adjacent slots is established, then the two slots need to be kept apart by the corresponding distance. Because of this constraint, the slot interval cannot be made shorter than the distance which is dictated by the phase relationship between the two slots.

The inventors have located the aforementioned problem which arises from the use of the construction of Comparative Example, and sought for a construction to solve this problem. The inventors have successfully solved this problem by adopting an unprecedented, characteristic structure for the structure of the waveguide member 122. A waveguide face 122a of a waveguide member 122 according to an embodiment of the present disclosure includes, in a region between two adjacent slots, a portion(s) at which the direction that the waveguide face extends changes ("deflecting portion(s)"). Introducing such a deflecting portion(s) allows the interval between two slots to be set to any arbitrary length that is adapted to the required antenna performance.

Hereinafter, more specific exemplary constructions for slot antennas according to embodiments of the present disclosure will be described. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art. The accompanying drawings and the following description, which are provided by the inventors so that those skilled in the art can sufficiently understand the present disclosure, are not intended to limit the scope of claims. In the present specification, identical or similar constituent elements are denoted by identical reference numerals.

(Embodiments)

A slot array antenna according to an embodiment of the present disclosure includes, as in the aforementioned Comparative Example, a first conductive member having a first conductive surface, a second conductive member having a second conductive surface opposed to the first conductive surface, a waveguide member extending between the first and second conductive members and alongside the first conductive surface, and an artificial magnetic conductor extending on both sides of the waveguide member. The artificial magnetic conductor according to the present embodiment is composed of an array of plural conductive rods. At least one of the first conductive member and the second conductive member has a plurality of slots arranged along the first conductive surface or the second conductive surface. The waveguide member has an electrically-conductive waveguide face which is stripe-shaped and opposed to the first conductive surface. The plurality of slots include at least two slots that couple to the waveguide face of the waveguide member. These slots include two slots which are adjacent to each other along the waveguide face.

A slot array antenna according to the present embodiment is used for at least one of transmission and reception of an electromagnetic wave of a predetermined band. Given a wavelength $\lambda m$ in free space of an electromagnetic wave of the highest frequency among electromagnetic waves of the predetermined band, the width of the waveguide member, the width of each conductive rod, the width of a space existing between two adjacent conductive rods, the distance between the first conductive surface and the second conductive surface, and the width of a space existing between the waveguide member and a conductive rod that is adjacent to the waveguide member are each less than $\lambda m/2$. The structures of each conductive member, the waveguide member, and each conductive rod are as already described above, and any detailed description thereof is omitted.

The slot array antenna is to be connected to a transmitter or a receiver in use. The transmitter is a device or circuit which feeds power to the waveguide in the slot array antenna and causes signal waves to be radiated from the plurality of slots. The receiver is a device or circuit which receives signal waves that have impinged on the plurality of slots of the slot array antenna and propagated through the waveguide. Each of the transmitter and the receiver may be implemented as a millimeter wave integrated circuit, for example. The slot array antenna may be connected to a device that functions both as a transmitter and as a receiver.

An embodiment of the present disclosure differs from the aforementioned Comparative Example mainly in that the waveguide face of the waveguide member includes, between two positions respectively coupled to two slots, at least one deflecting portion at which the direction that the waveguide face extends changes. As used herein, a "deflecting portion" means a portion on the waveguide face that bends without branching out. Since an artificial magnetic conductor is provided on both sides of the waveguide member, an electromagnetic wave which has propagated along the waveguide face and arrived at a deflecting portion is unable to keep traveling straight, but changes its direction of propagation at the deflecting portion, and then continues to propagate. Providing such a deflecting portion(s) allows the straight distance between the centers of two adjacent slots ("slot interval") to be shorter than the distance between the centers of the two slots as measured along the waveguide face. Furthermore, by adjusting the structure (number, angle(s) of deflection, etc.) of the deflecting portion(s), the slot interval can be set to any arbitrary distance, irrespective of the phase relationship between electromagnetic waves at the positions of two slots.

In the present specification, a slot and the waveguide face being "coupled" or "coupling" means there being a physical relationship under which electromagnetic wave transmission can occur between the waveguide face and the slot. For example, when an electromagnetic wave propagates along the waveguide face, if at least a portion of the electromagnetic wave passes through the slot so as to be radiated into the external space, then the slot and the waveguide face are of coupling relationship. Conversely, when an electromagnetic wave impinges on a slot from the external space, if the electromagnetic wave passes through the slot and thereafter propagates along the waveguide face, the slot and the waveguide face are also of coupling relationship. A typical example of a slot and the waveguide face being "coupled" or "coupling" is where the slot is opposed to the waveguide face. However, as will be described later, the slot may be shifted in position from an opposing position to the waveguide face. Furthermore, an implementation may be possible where not the first conductive member but the second conductive member has a slot, the slot splitting the waveguide member on the second conductive member; in such an implementation, too, so long as electromagnetic wave transmission is possible between the waveguide face of the waveguide member and the slot, the slot and the waveguide face are of "coupling" relationship. On the waveguide face, a "position that is coupled to a slot" is typically a position opposing the slot. However, in an implementation where the position of the slot on the waveguide face is shifted from an exactly opposing position, the position on the waveguide face that is located the closest to the slot corresponds to a "position that is coupled to the slot". In an implementation where the second conductive member has a slot, such that the slot splits the waveguide member on the second conductive member, the position of an edge of the waveguide face that is the closest to the slot corresponds to the "position that is coupled to the slot". In an implementation where a slot is provided in the first conductive member, if the waveguide face and the slot are too distant, electromagnetic wave transmission between the waveguide face and the slot will be impossible; in this state, the waveguide face and the slot are not coupled.

Figure 7A:
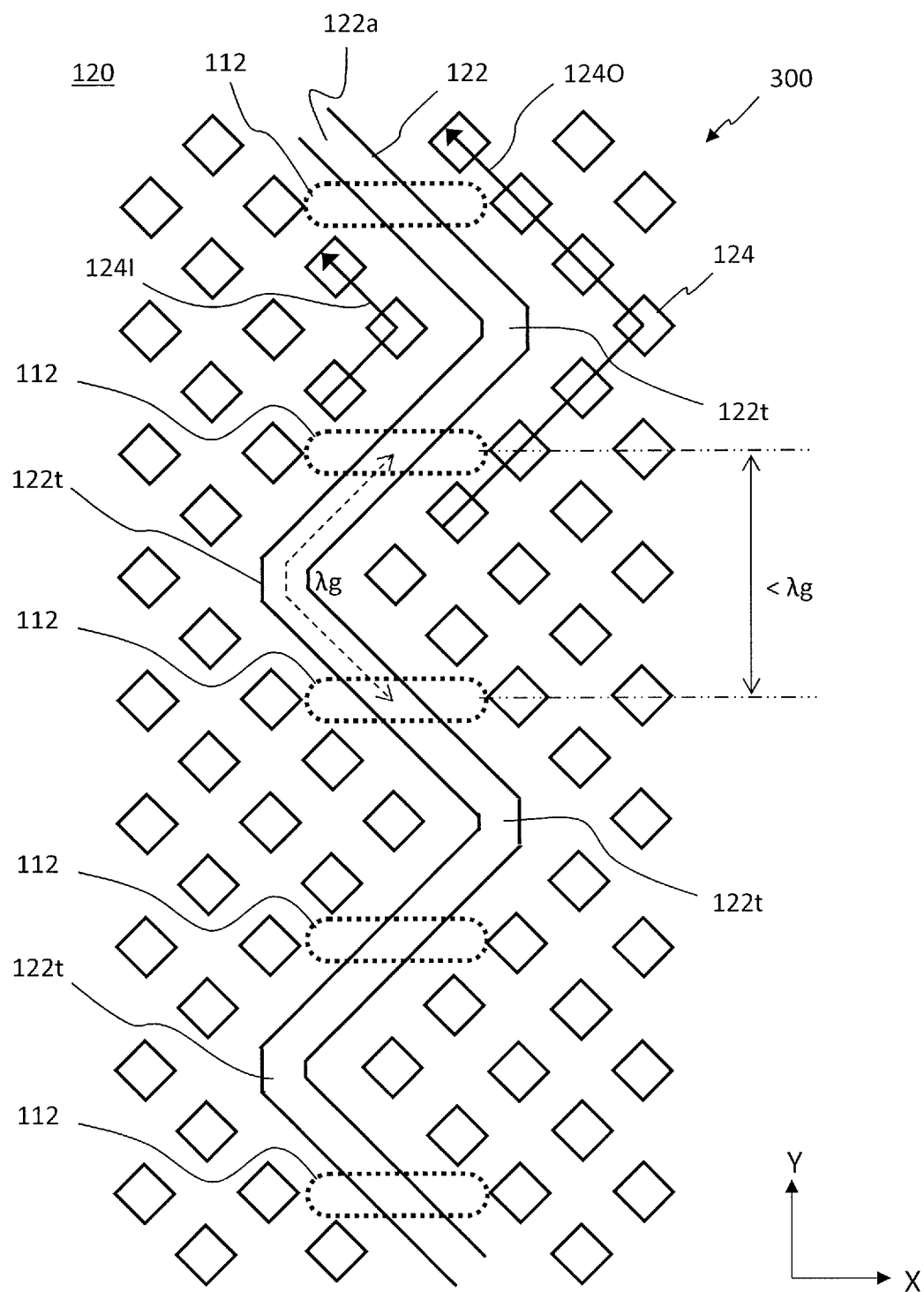
FIG. 7A is an upper plan view schematically showing a partial construction of a slot array antenna 300 according to an illustrative embodiment of the present disclosure.

FIG. 7A is an upper plan view schematically showing a partial construction of a slot array antenna 300 according to an illustrative embodiment of the present disclosure. FIG. 7A shows an arrangement where a waveguide member 122 and a plurality of conductive rods 124 (artificial magnetic conductor) on a second conductive member 120 are viewed from the Z direction. For ease of understanding, FIG. 7A indicates the positions of the plurality of slots 112 with dotted lines. Unlike in the aforementioned Comparative Example, the waveguide member 122 of the slot array antenna 300 extends in directions that undergo zigzag changes. The waveguide face 122a of the waveguide member 122 includes a plurality of deflecting portions 122t, at each of which the direction that the waveguide face 122a extends changes. In each deflecting portion 122t, the direction that the waveguide face 122a extends changes by 90 degrees. The direction of deflection of a given deflecting portion 122t and the direction of deflection of the next deflecting portion 122t are opposite. In other words, if an electromagnetic wave swerves right at a given deflecting portion 122t, the electromagnetic wave will swerve left at the next deflecting portion 122t. Each portion of the waveguide face 122a that is interposed between a plurality of deflecting portions 122t extends linearly. In the present specification, such a linearly-extending portion may be referred to as a "linear portion". In the present embodiment, each linear portion has a substantially equal length to the central wavelength $\lambda g$ of a signal wave in the waveguide. With such structure, while changing its direction of propagation in a zigzag manner, an electromagnetic wave propagating along the waveguide face 122a propagates in the Y direction as a whole.

The plurality of slots 112 are respectively opposed to the central portions of the plurality of linear portions that are interconnected by the plurality of deflecting portions 122t. As in the aforementioned Comparative Example, the plurality of slots 112 are arrayed on a straight line extending along the Y direction. However, the interval between slots 112 is shorter than the interval $\lambda g$ in the aforementioned Comparative Example. The reason is that the waveguide face 122a includes deflecting portions 122t in regions between two adjacent slots 112 along the Y direction. In the case where electromagnetic waves with an equal phase are to be radiated from two adjacent slots 112, the distance between the centers of two slots 112 as measured along the waveguide face 122a (i.e., the length indicated by broken-line arrowheads in FIG. 7A) is set equal to the wavelength $\lambda g$ of a signal wave in the waveguide. As a result, the straight distance between the centers of two adjacent slots 112 (i.e., the length indicated by solid-line arrowheads in FIG. 7A) is shorter than $\lambda g$.

The distance between the centers of two slots 112 as measured along the waveguide face 122a may be different from $\lambda g$. When a phase difference from slot to slot is to be intentionally imparted to the electromagnetic waves to be radiated from the respective slots, the distance may be set to a value other than an integer multiple of $\lambda g$. Depending on the application, the distance may be set to any of various values, e.g., an odd multiple of $\lambda g/2$ or an odd multiple of $\lambda g/4$. In one embodiment, the difference between the distance and either one of $\lambda g$, an odd multiple of $\lambda g/2$, and an odd multiple of $\lambda g/4$ is smaller than a sum of the widths of two slots 112. In another embodiment, given a distance a which is equal to or greater than $0.5\lambda o$ but less than $1.5\lambda o$, the difference between the distance and either one of a, an odd multiple of a/2, and an odd multiple of a/4 is smaller than a sum of the widths of the two slots.

Although FIG. 7A five slots 112, this is only an example. The number of slots 112 may be any number that is two or greater. As for the shape of each slot 112, too, slots of various shapes can be adopted, without being limited to an I shape. The relative positioning between the slots 112 and the waveguide face 122a may also be determined as appropriate, in accordance with the required antenna characteristics.

In accordance with the purpose of use, the number of deflecting portions 122t between two adjacent slots 112, their angles of deflection, and the shapes of the deflecting portions 122t may be determined as appropriate. As used herein, an "angle of deflection" is an angle that represents a change in the direction of propagation of an electromagnetic wave before and after a deflecting portion 122t. Although FIG. 7A illustrates an example where the angle of deflection is 90 degrees, it may be any other angle. By adjusting the angle of deflection, it becomes possible to freely adjust the slot interval. As the angle of deflection becomes decreases, the slot interval becomes longer; as the angle of deflection increases, the slot interval becomes shorter.

The slot array antenna 300 shown in FIG. 7A includes a plurality of conductive rods 124. Some of the conductive rods 124 lie adjacent to the waveguide member 122, while forming rows along the waveguide member 122. These rows include an outer rod row 124O that is located outside a deflecting portion 122t and an inner rod row 124I located inside the deflecting portion 122t. At positions adjacent to the deflecting portion 122t of the waveguide member 122, the outer rod row 124O and the inner rod row 124I are deflected in the same direction as the deflecting portion 122t. When the angle of deflection of the waveguide member 122 is small, the conductive row of conductive rods 124 is not necessarily required to deflect. However, in the slot array antenna 300 of the present embodiment, it is an objective to reduce the interval at which the slots 122 are disposed, and thus the angle of deflection of the waveguide member 122 will be somewhat large. When the angle of deflection is somewhat large, at least any row of conductive rods 124 that is adjacent to the waveguide member 122 will change its orientation at the position where it comes adjacent to the deflecting portion 122t, in the same direction of deflection as the waveguide member 122. In this manner, even under a construction where slots 112 are disposed before and after places where the waveguide member 122 and the conductive row of conductive rods 124 are significantly deflected, the slot array antenna 300 can still function properly.

The distance from a place that is adjacent to one of two adjacent slots 112 to a place that is adjacent to the other will be longer in the outer rod row 124O than in the inner rod row 124I. In this case, as a way to counteract the difference in length, at least one of the number, dimensions, and intervals of rods 122 may be adjusted; any one of these methods of adjustment may be adopted. Typically, there are more conductive rods 124 included in the outer rod row 124O than there are conductive rods 124 included in the inner rod row 124I. From a place that is adjacent to one of two adjacent slots 112 to a place that is adjacent to the other, the interval between the conductive rods 124 in the outer rod row 124O does not need to be equal to the interval between the conductive rods 124 in the inner rod row 124I. For example, the interval between the conductive rods 124 in the outer rod row 124O may be larger.

Figure 7B:
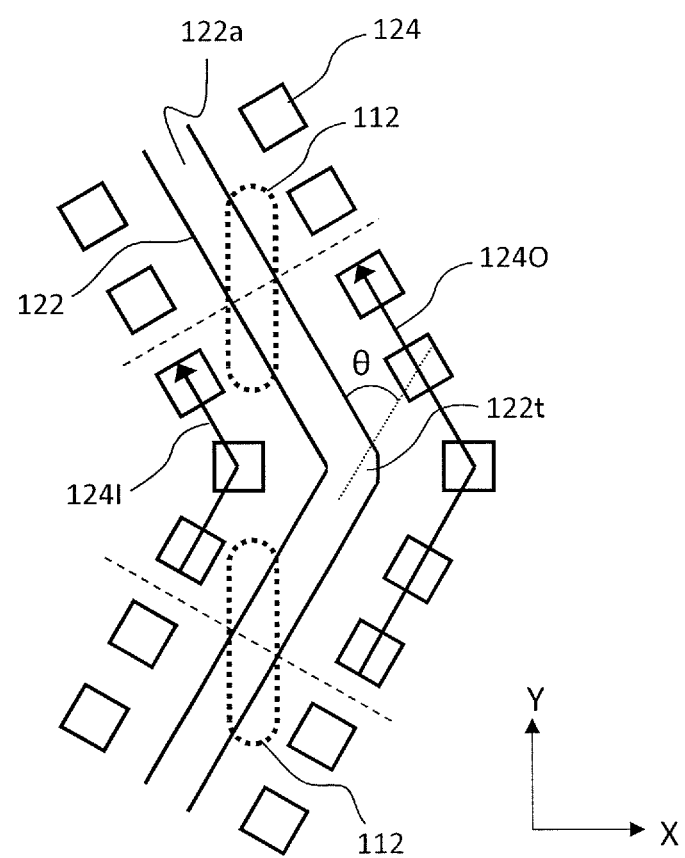
FIG. 7B is an upper plan view schematically showing another exemplary construction for the slot array antenna 300.

FIG. 7B is an upper plan view schematically showing another exemplary construction of the slot array antenna 300.

In FIG. 7B, for ease of understanding, only a part of waveguide member 122, some of the plurality of conductive rods 124, and two slots 112 are illustrated. In this example, the deflecting portion 122t has an angle of deflection θ which is smaller than 90 degrees. The angle of deflection θ may be set to e.g. not less than 10 degrees and not more than 150 degrees, or, in one example, not less than 30 degrees and not more than 120 degrees. The angle of deflection θ may be set to an optimum value in accordance with the required slot interval.

In the example of FIG. 7B, unlike in the example of FIG. 7A, the length direction of each slot 112 coincides with the Y direction. By adopting such an arrangement of slots 112, a polarized wave whose electric field oscillates along the X direction can be transmitted or received.

In the example of FIG. 7B, too, some of the conductive rods 124 lie adjacent to the waveguide member 122, while forming rows along the waveguide member 122. These rows include an outer rod row 124O that is located outside a deflecting portion 122t and an inner rod row 124I located inside the deflecting portion 122t. At a position adjacent to the deflecting portion 122t of the waveguide member 122, the rod rows 124O and 124I are deflected in the same direction as the direction of deflection of the deflecting portion 122t. Moreover, over the distance from a position that is adjacent to the center of one of two adjacent slots 112 to a position that is adjacent to the center of the other as measured the along the waveguide member 122, there are more conductive rods 124 included in the outer rod row 124O than there are conductive rods 124 included in the inner rod row 124I. For reference sake, FIG. 7B illustrates, with broken lines: a plane which passes through the center of one of the two adjacent slots 112 and which contains the width direction of the waveguide face 122a; and a plane which passes through the center of the other of the two slots 112 and which contains the width direction of the waveguide face 122a. Between these two planes, there are more conductive rods 124 included in the outer rod row 124O than there are conductive rods 124 included in the inner rod row 124I.

Thus, the plurality of conductive rods 124 may include one or more rows of conductive rods 124 that are adjacent to and arrayed along the waveguide member 122. At a position adjacent to the deflecting portion 122t, the conductive row of conductive rods 124 is deflected in accordance with the direction of deflection of the deflecting portion 122t.

Figure 8:
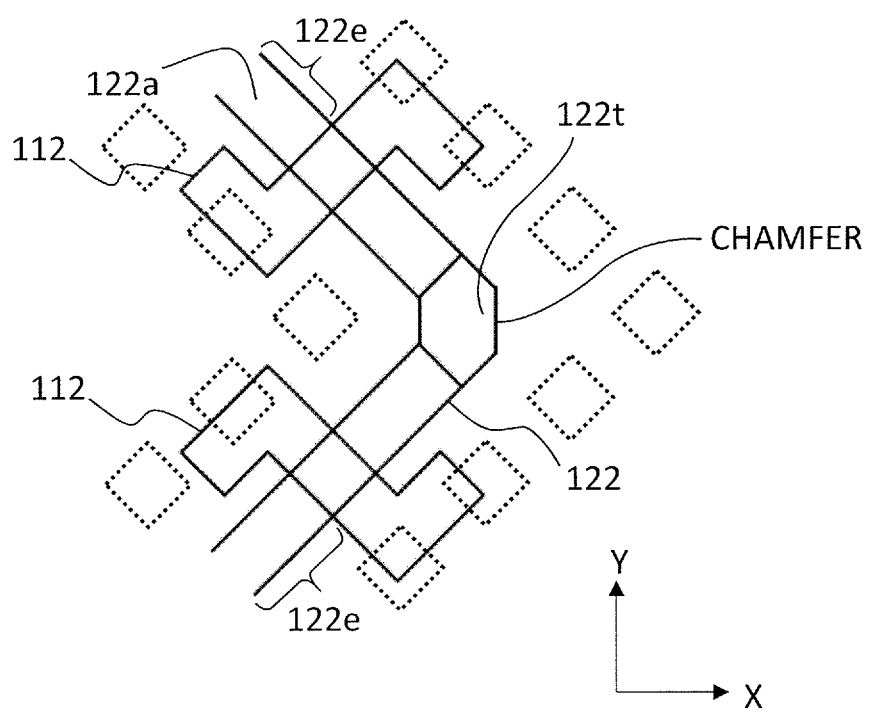
FIG. 8 is an upper plan view schematically showing still another exemplary construction for the slot array antenna 300.

FIG. 8 is an upper plan view schematically showing still another exemplary construction for the slot array antenna 300. In this example, in order to suppress reflection of an electromagnetic wave at the deflecting portion 122t, a dent is provided in the deflecting portion 122t. Specifically, the distance between the conductive surface 110a of the first conductive member 110 and the waveguide face 122a of the waveguide member 122 is larger in the deflecting portion 122t than in places that are adjacent to the deflecting portion 122t. With such construction, energy losses associated with reflection of an electromagnetic wave at the deflecting portion 122t can be reduced. Similar dents are also provided in the examples which are illustrated in FIG. 30, FIG. 31, FIG. 32, FIG. 33, and FIG. 39 to be described below. Instead of providing a dent, the outside corner of the deflecting portion 122t may be chamfered. Both a dent and a chamfer may be provided. In the examples of FIGS. 8, 7A and 7B, the surface resulting after chamfering is planar; however, the shape is not limited to being planar. As in the example shown in FIG. 13A described later, the outside corner of the deflecting portion 122t may be chamfered into a curved surface. An array antenna according to the present disclosure is for use in series feed. Therefore, especially in a construction with a plurality of deflecting portions 122t are successively present, there will be a plurality of reflections occurring at the deflecting portion 122t, and their unfavorable influences may be cumulative. By providing a dent on each deflecting portion 122t so as to sufficiently suppress reflection at the deflecting portion 122t, the properties of an array antenna can be attained even with the presence of a plurality of deflecting portions.

A dent may be made not on the waveguide face 122a but on the first conductive surface 110a. Alternatively, a dent may be made on both of the waveguide face 122a and the first conductive surface 110a. Furthermore, one of the waveguide face 122a and the first conductive surface 110a may have a bump, while the other may have a dent that is deeper than the bump. In either construction, reflection of an electromagnetic wave at the deflecting portion 122t can be suppressed so long as the deflecting portion 122t presents a gap enlarging portion where the gap between the waveguide face 122a and the first conductive surface 110a is locally enlarged relative to regions that are located before and after the deflecting portion 122t along the waveguide face 122a.

In the example of FIG. 8, each slot 112 has a different shape from that of each slot 112 in FIGS. 7A and 7B. Each slot 112 is bent at both end portions thereof. Using slots 112 of such shape allows any two adjacent slots 112 to be closer to each other.

As viewed from its normal direction, the waveguide face 122a of the waveguide member 122 according to an embodiment of the present disclosure includes an extension 122e that extends beyond at least one of two adjacent slots 112 and away from the deflecting portion 122t. As a result, beyond the two slots 112, the waveguide face 122a is able to couple to further other slots, or couple to a transmitter that generates a signal wave or a receiver that receives a signal wave. The transmitter or receiver couples to the waveguide face 122a at the extension side. That the transmitter or receiver "couples" to the waveguide face 122a indicates that a relationship which permits electromagnetic wave transmission exists between the transmitter or receiver and the waveguide extending above the waveguide face 122a. The transmitter or receiver does not need to be directly connected to the waveguide extending above the waveguide face 122a, but may be connected via another waveguide, e.g., a hollow waveguide. In other words, a slot array antenna according to an embodiment of the present disclosure is a so-called series-fed antenna array. In the present disclosure, "a slot array antenna in which a transmitter or receiver couple to the waveguide face at the extension side" might be restated as a "series-feed slot array antenna". Based on the above construction, in a slot array antenna according to an embodiment of the present disclosure, the distance (as taken along the waveguide) between any of the plurality of slots that are arranged along the waveguide and the transmitter or receiver differs from slot to slot.

Figure 9:
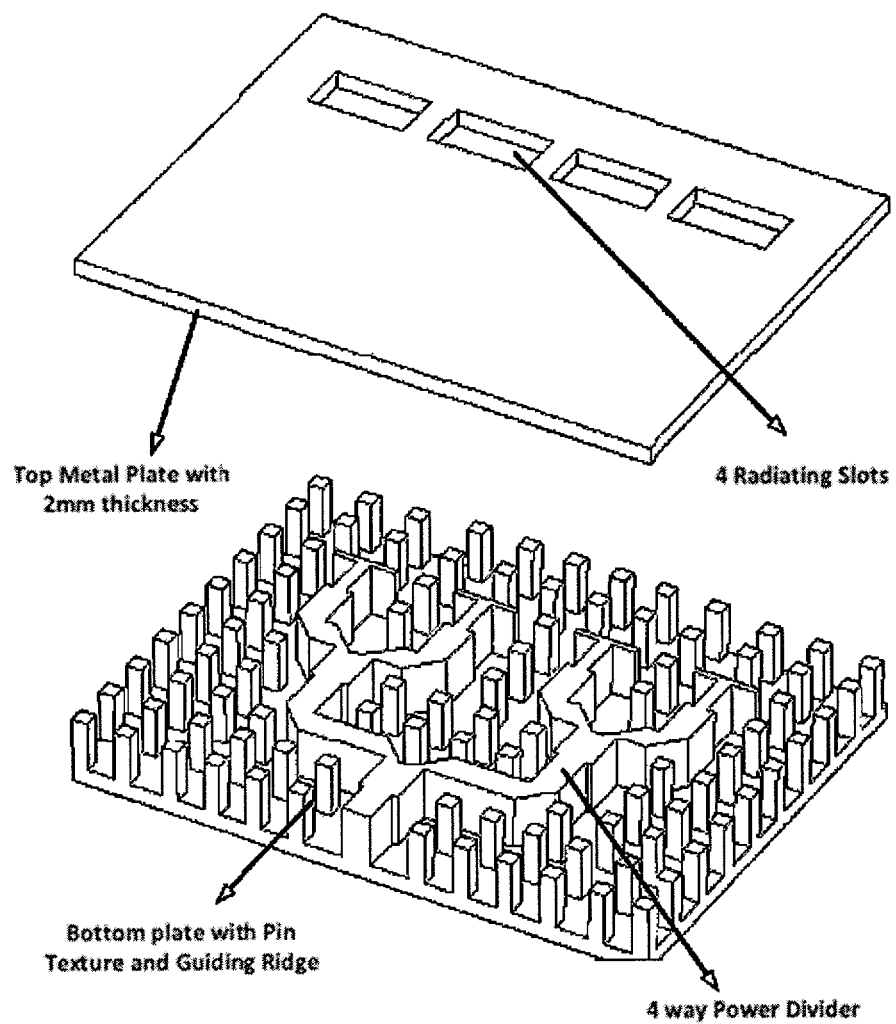
FIG. 9 is a perspective view showing the structure of a slot antenna which is disclosed in Non-Patent Document 3.

A structure according to an embodiment of the present disclosure, where the waveguide member 122 includes a deflecting portion(s) 122t between two slots 112, such that the waveguide member 122 extends further beyond at least one slot 112, has not been known before. A less dissimilar structure to an embodiment of the present disclosure may be a structure that is disclosed in FIG. 4 of Non-Patent Document 3. For reference sake, FIG. 4 of Non-Patent Document 3 is reproduced herein as FIG. 9. FIG. 9 is a perspective view showing the structure of a slot antenna which is disclosed in Non-Patent Document 3. As will be clear from FIG. 9, the structure disclosed in Non-Patent Document 3 is significantly distinct from the structure according to an embodiment of the present disclosure. In the structure of Non-Patent Document 3, four slots are respectively opposed to four-branched ends of the ridge. In this construction, unlike in an embodiment of the present disclosure, an electromagnetic wave that has excited a given slot will never excite further other slots beyond that slot.

According to an embodiment of the present disclosure, the distance between two adjacent slots 112 as measured along the waveguide face 122a may be set to any length which is equal to or greater than half the length of at least one of the two slots 112. In the case where the two slots 112 are equal in length, the distance is equal to or greater than half the length of each slot. In the case where the two slots 112 differ in length, the distance is equal to or greater than half the length of the shorter slot. The length of each slot 112 is set to be $\lambda o/2$ or greater, as mentioned earlier. Therefore, the distance between two slots 112 as measured along the waveguide face 122a may be equal to or greater than $\lambda o/4$.

According to an embodiment of the present disclosure, the straight distance (slot interval) between the centers of two adjacent slots 112 is smaller than four times the length ($\geq 2\lambda o$) of either of the two slots 112. When the two slots 112 are equal in length, the slot interval is smaller than four times the length of each slot. When the two slots 112 differ in length, the slot interval is smaller than four times the length of the shorter slot. The slot interval is typically designed to have a value which is smaller than $\lambda o$. However, the slot interval may intentionally be made long. For example, in an application where grating lobes are intentionally allowed to occur, the slot interval may be set to a value as large as near $2\lambda o$.

Next, details of the slots 112 that may be used in an embodiment of the present disclosure will be described.

A slot 112, which is a throughhole made in the first conductive member 110, is a region that is surrounded by an electrically-conductive inner-peripheral surface of the first conductive member 110 or the second conductive member 120. A slot 112 has an opening that extends through the first conductive member 110 or the second conductive member 120 and is open on the first conductive surface 110a. The opening of a slot 112 refers to a portion that can be regarded as coplanar with the first conductive surface 110a or the second conductive surface 120a. The opening of a slot 112 has: a length that is defined by a straight line (or a line segment) or a curve (including a combination of line segments); and a width, i.e., a dimension along a perpendicular direction to the length direction. A straight line or curve that defines the length of an opening is an imaginary straight line or curve (including a combination of line segments) connecting between central points on the width of the opening from one end to the other end of the opening, rather than any line or curve that constitutes a part of an edge of the opening 112a. In the case of an I-shaped slot 112 that extends like a line as in the above example, the length of the opening is equal to the length of that line.

FIGS. 10A through 10E show some exemplary shapes of the opening of a slot 112 that may be used in the slot antenna 300. In these figures, arrowheads indicate the length direction of the opening of a slot 112. The length indicated by the arrowheads represents the length of the opening of the slot 112. The opening of the slot 112 in each example has: a length that is defined by a straight line (or a line segment) or a curve (including a combination of line segments); and a width, i.e., a dimension along a perpendicular direction to the length direction. In the present specification, a slot opening 112 may simply be referred to as a slot 112. In each example, the length of the slot 112 is set to a value that will prevent higher-order resonance and does not allow the slot impedance to be too small. Typically, the length of the slot 112 is set to a value which is greater than $\lambda o/2$ and smaller than $\lambda o$, where $\lambda o$ is the wavelength in free space of an electromagnetic wave having the center frequency of the operating frequency band of the slot antenna 300.

Figure 10A:
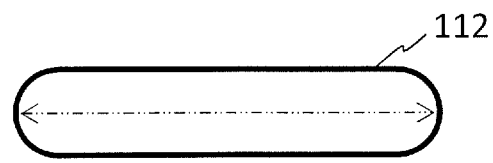
FIG. 10A is a diagram showing an example of an I-shaped slot 112.

FIG. 10A shows an example of an I-shaped slot 112 that has been described above. The length of an I-shaped slot 112 is defined by a line segment connecting both ends of the slot 112. Regardless of positions along the length direction, the width direction always runs in a constant direction. Both ends of the slot 112 may be round or flat. In other words, an I-shaped slot of either a shape resembling an ellipse or a rectangular shape may be used.

Figure 10B:
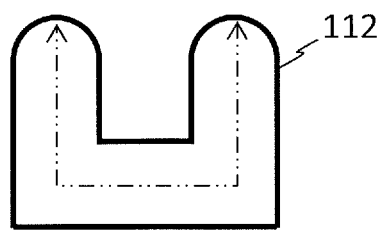
FIG. 10B is a diagram showing an exemplary slot 112 whose length is defined by a U-shaped curve (which in this example consists of a combination of three line segments).

FIG. 10B shows an exemplary slot 112 whose length is defined by a U-shaped curve (which in this example consists of a combination of three line segments). The slot 112 of this example includes a pair of parallel linear portions and another linear portion connecting between these end portions. The shape of the slot 112 shown in FIG. 10B resembles the alphabetical letter "U". Therefore, such a slot 112 may in the present specification be referred to as a "U-shaped slot".

Figure 10C:
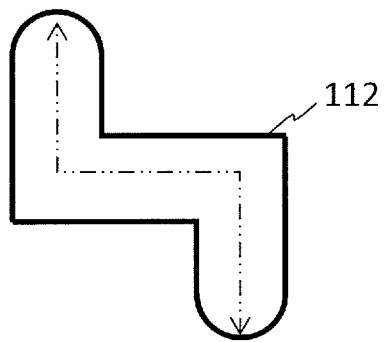
FIG. 10C is a diagram showing another exemplary slot 112 whose length is defined along a combination of three line segments.

FIG. 10C shows another exemplary slot 112 whose length is defined along a combination of three line segments. Rotating the slot 112 shown in FIG. 10C by 90 degrees would result in an inverted shape of the alphabetical letter "Z". Any such slot 112 or a slot of a shape resembling the alphabetical letter "z" itself may in the present specification be referred to as a "Z-shaped slot". A Z-shaped slot also includes a pair of parallel linear portions and another linear portion connecting between these end portions.

Figure 10D:
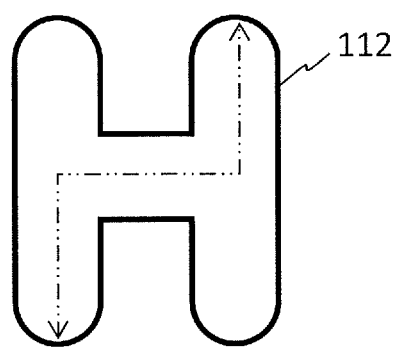
FIG. 10D is a diagram showing an exemplary slot 112 having a shape resembling the alphabetical letter "H".

FIG. 10D shows an exemplary slot 112 having a shape resembling the alphabetical letter "H". Such a slot 112 includes a pair of parallel linear portions (also referred to as "vertical portions") and another linear portion connecting between (also referred to as "lateral portion") connecting between the central portions of the pair of linear portions. Such a slot 112 may be referred to as an "H-shaped slot". The length of an H-shaped slot 112 is defined by a sum of: a half of the sum of the lengths of the pair of parallel linear portions; and the distance between the centers of the pair of linear portions.

Figure 10E:
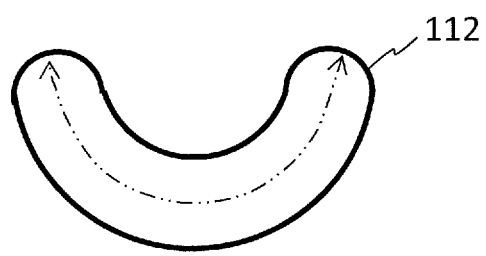
FIG. 10E is a diagram showing an exemplary slot 112 whose length is defined by a curve in an arc shape.

FIG. 10E shows an exemplary slot 112 whose length is defined by a curve in an arc shape. A slot whose length is defined by a curve other than an arc may also be used. Any such slot 112 may be referred to as a "curve-shaped slot". In a curve-shaped slot which does not include any linear portion, its width direction gradually changes along the length direction.

Thus, the shape of the slot 112 to be used in embodiments of the present disclosure may be various. When a slot 112 as shown in any of FIGS. 10B through 10E is used, the dimension along the lateral direction in the figure can be made small as compared to the case of using the I-shaped slot 112 shown in FIG. 10A. On the other hand, when the slot 112 shown in FIG. 10A is used, the dimension along the vertical direction in the figure can be made small. An optimum shape of the slot 112 may be selected in accordance with the layout of the plurality of slots 112 and the waveguide member 122 coupling thereto.

It is not necessary for all of the plurality of slots 112 in the slot array antenna 300 to be identical in shape and size. In order to attain the desired antenna characteristics, the plurality of slots 112 may be allowed to differ in shape and size depending on the place.

The relative positioning between each slot 112 and the waveguide face 122a may also be various. While transmission or reception is being performed, an electric field that oscillates along the width direction occurs in the interior of each slot 112 (especially in its central portion) occurs. In the example shown in FIG. 7A, for instance, an electric field that intensively oscillates along the Y direction occurs in the central portion of each slot 112. A change in the direction of polarization can be caused by disposing the slot 112 so as to be rotated around an axis which passes through its center and is parallel to the Z direction. For instance, in the example shown FIG. 7B, an electric field that intensively oscillates along the X direction occurs in the central portion of each slot 112. Assuming that the X direction is the horizontal direction and that the Y direction is the vertical direction, a vertically-polarized wave can be transmitted or received in the example of FIG. 7A, and a horizontally-polarized wave can be transmitted or received in the example of FIG. 7B.

Embodiments of the present disclosure are not limited to the implementation where, as in the above-described examples, the slots 112 are disposed immediately above the waveguide face 122a. The center of each slot 112 may be shifted from the center line of the waveguide face 122a. By making such a shift and making the angle between the width direction of the slot 112 and the width direction of the waveguide face 122a small, it becomes possible to radiate a polarized wave whose electric field oscillates intensively along the width direction of the waveguide face 122a.

Figure 11A:
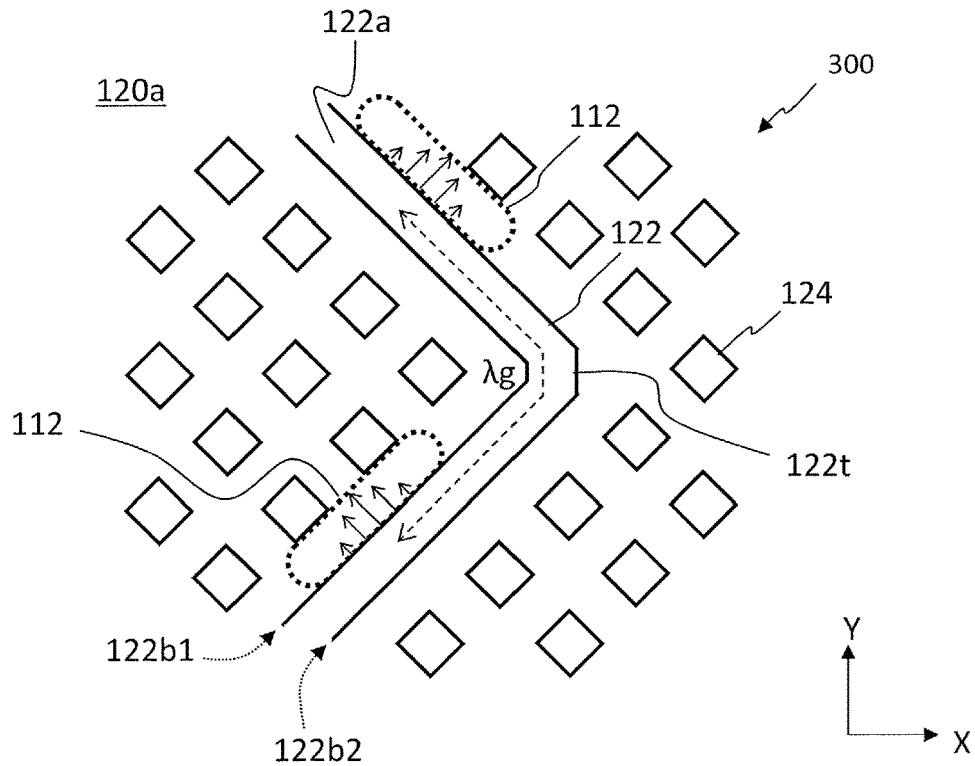

FIG. 11A is a diagram showing an example of such construction. FIG. 11A shows an exemplary slot array antenna 300 in which slots 112 are disposed adjoining the waveguide face 122a. The waveguide face 122a has two edges 122b1 and 122b2 that together define the width of the waveguide face 122a. In the example shown in FIG. 11A, as viewed from the normal direction of the conductive surfaces 110a and 120a, the width direction of the opening of each slot 112 is identical to the width direction of the waveguide face 122a. On the outside of one edge 122b1 of the waveguide face 122a, the entirety of the opening of the lower slot 112 shown in FIG. 11A is opposed to the second conductive surface 120a. As viewed from the normal direction of the conductive surfaces 110a and 120a, the opening of that slot 112 is located near the one edge 122b1, without intersecting either of the two edges 122b1 and 122b2 of the waveguide face 122a. On the other hand, on the outside of another edge 122b2 of the waveguide face 122a, the entirety of the opening of the upper slot 112 shown in FIG. 11A is opposed to the second conductive surface 120a. As viewed from the normal direction of the first conductive surface 110a, the opening of that slot 112 is located near the other edge 122b2, without intersecting either of the two edges 122b1 and 122b2 of the waveguide face 122a.

FIG. 11A schematically shows also an example of an electric field to be created inside each slot 112. In this example, the distance between the centers of the two slots shown in FIG. 11A as measured along the waveguide face 122a is equal to the central wavelength g of a signal wave in the waveguide. Each slot 112 of this example has an I shape that extends in a direction along the waveguide face 122a, such that the center of the slot 112 is shifted off the center line of the waveguide face 122a. As a result, an electric field that oscillates along the width direction of the waveguide face 122a is created near the central portion of each slot 112. Arrows inside each slot 112 shown in FIG. 11A represent an electric field to be created in the slot 112 at a given moment. The lengths of the arrows are indicative of the intensity of the electric field. A composition between the electric fields created in the interiors of the two slots 112 corresponds to an electric field of an electromagnetic wave to be radiated from the slot array antenna 300. Therefore, in the example of FIG. 11A, a polarized wave having a field component that oscillates along the Y direction can be radiated. Assuming that the X direction is the horizontal direction and that the Y direction is the vertical direction, the construction of FIG. 11A is able to transmit or receive a vertically-polarized wave.

Figure 11B:
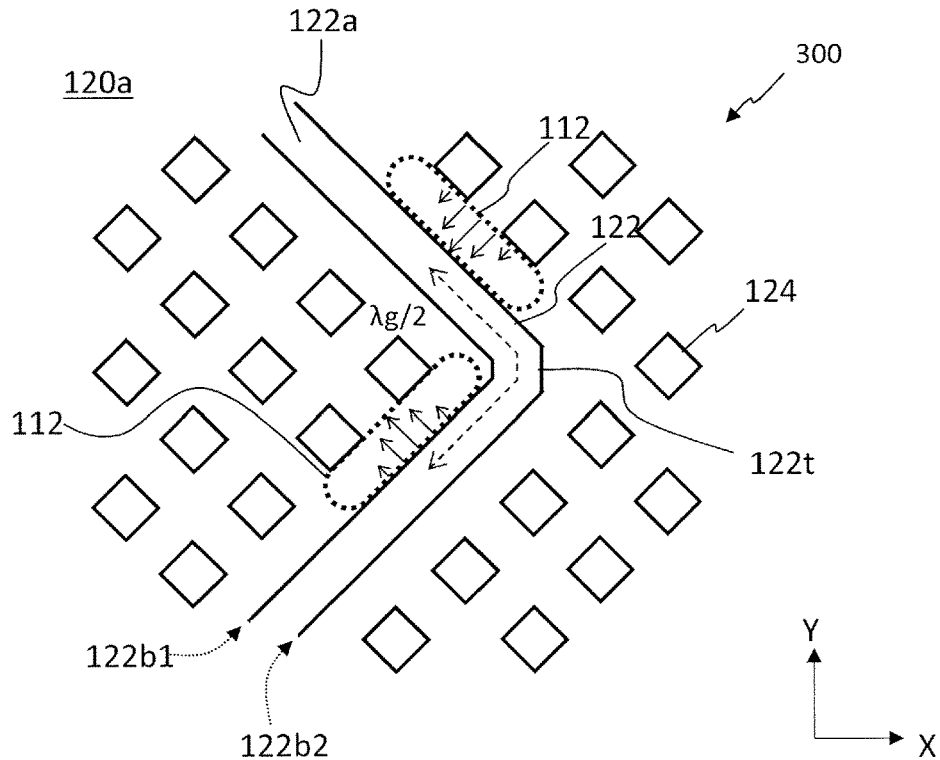
FIG. 11B is a diagram showing an exemplary construction in which the two slots 112 are disposed closer together than in the construction shown in FIG. 11A.

FIG. 11B shows an exemplary construction in which the two slots 112 are disposed closer together than in the construction shown in FIG. 11A. In this example, the distance between the centers of two slots 112 as measured along the waveguide face 122a is equal to λg/2. Therefore, in the waveguide face 122a, a difference in phase between signal waves at two positions that are close to the midpoint between the two slots 112 is a half of the difference in phase in the example of FIG. 11A. As a result, at a given moment, an electric field as indicated by arrows in FIG. 11B is created inside the two slots 112. A composition between these electric fields corresponds to an electric field of an electromagnetic wave to be radiated from the slot array antenna 300. Therefore, in this example, a polarized wave whose electric field oscillates along the X direction can be radiated. Assuming that the X direction is the horizontal direction and that the Y direction is the vertical direction, the construction of FIG. 11B is able to transmit or receive a horizontally-polarized wave.

Thus, by adjusting the relative positioning between the waveguide face 122a and the two slots 112, it becomes possible to transmit or receive a polarized wave whose electric field oscillates along the desired direction.

In the examples shown in FIG. 11A and FIG. 11B, the entirety of the opening of each slot 112 is opposed to the second conductive surface 120a, and is not opposed to the waveguide face 122a and the conductive rods 112. Without being limited to such construction, only a part of the opening of at least one slot 112 may be opposed to the second conductive surface 120a. In other words, as viewed from the normal direction of the conductive surfaces 110a and 120a, that slot 112 may overlap at least one of the waveguide face 122a and the conductive rod(s) 124.

Figure 11C:
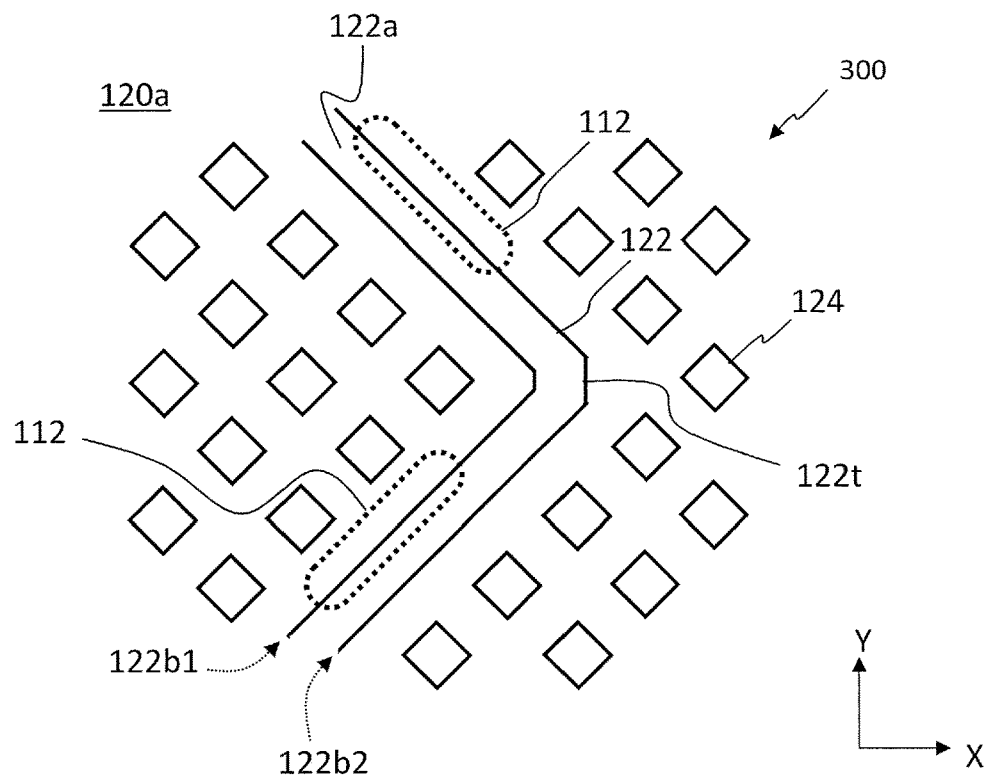

FIG. 11C is an upper plan view showing an example where only a part of each slot 112 is opposed to the second conductive surface 120a. In this construction, each slot 112 is disposed closer to the center line of the waveguide face 122a than in the construction shown in FIG. 11A. As a result, a portion of the slot 112 is opposed to the second conductive surface 120a, while another portion of the slot 112 is opposed to the waveguide face 122a. With such an arrangement of slots 112, too, an electromagnetic wave similar to that in the aforementioned example can be transmitted or received.

Figure 11D:
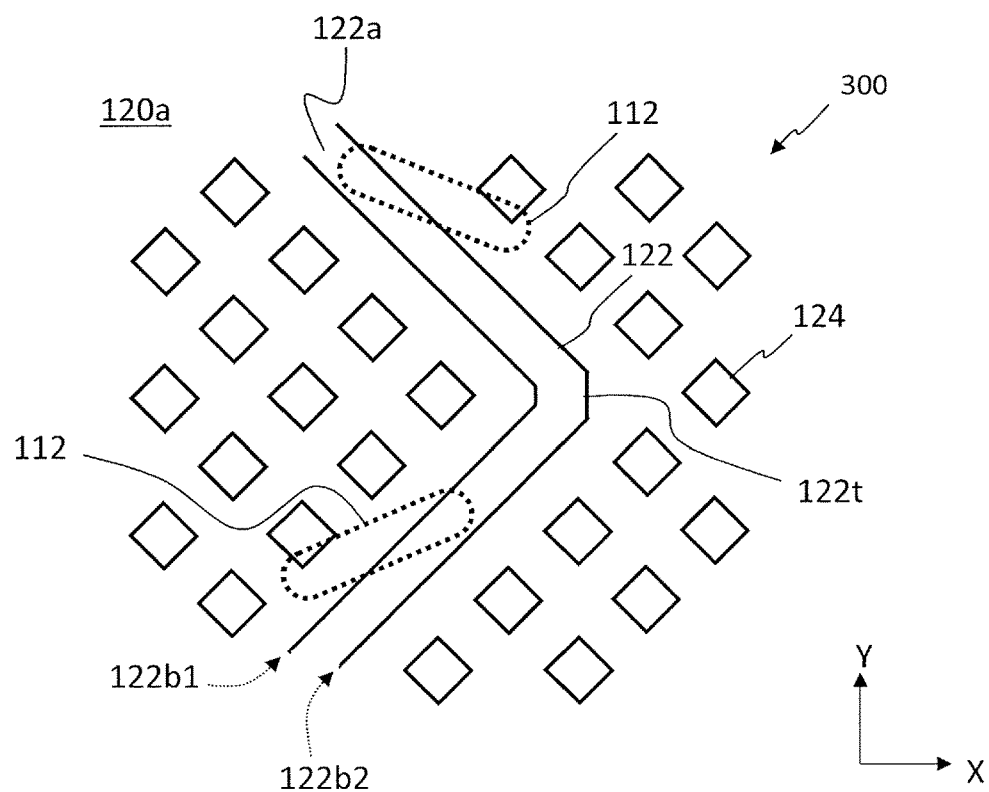

FIG. 11D is an upper plan view showing another example where only a part of each slot 112 is opposed to the second conductive surface 120a. In this example, in plan view, the length direction of each slot 112 intersects the direction that the waveguide face 122a coupling to that slot extends. The angle formed by the length direction of the slot 112 and the direction that the waveguide face 122a extends is smaller than 45 degrees. As viewed from the normal direction of the conductive surfaces 110a and 120a, each slot 112 has a portion overlapping the conductive surface 120a, a portion overlapping the waveguide face 122a, and a portion overlapping a conductive rod(s) 124. In this case, too, an electromagnetic wave having a field component which is more intense along the width direction of the waveguide face 122a than along the direction that the waveguide face 122a extends can be transmitted or received.

As described above, in the examples shown in FIG. 11A through FIG. 11D, as viewed from the normal direction of the first conductive surface 110a, the length direction of each slot 112 intersects the direction that the waveguide face 122a coupling to that slot extends, at an angle which is smaller than 45 degrees; and the center of the opening of each slot 112 is shifted off the center line of the waveguide face 122a. With such construction, it is possible to transmit or receive an electromagnetic wave having a greater field component in the width direction of the waveguide face 122a than in the direction along the waveguide face 122a.

In the examples shown in FIG. 11A through FIG. 11D, the shape of each slot 112 is illustrated as an I shape; however, each slot 112 may have any other shape as illustrated in FIGS. 10B through 10E, for example. So long as at least one slot 112 satisfies the following requirements (1) to (3), effects similar to the effects that have been described with reference to FIG. 11A through FIG. 11D can be obtained.

(1) As viewed from the normal direction of the first conductive surface 110a, the opening of each slot 112 includes, at least in the central portion of the opening along the length direction, a portion where an angle formed by the width direction of the opening and the width direction of the waveguide face 122a is smaller than 45 degrees (referred to as a "small-angle portion").

(2) As viewed from the normal direction of the first conductive surface 110a, at least a portion of the small-angle portion overlaps the second conductive surface 120a on the outside of one of the two edges of the waveguide face 122a.

(3) As viewed from the normal direction of the first conductive surface 110a, the small-angle portion intersects the one edge of the waveguide face 122a while not intersecting the other of the two edges, or is located from the one edge at a distance which is shorter than the width of the waveguide face 122a.

In the examples shown in FIG. 11A through FIG. 11D, one of the two adjacent slots 112 is located near one edge of the waveguide face 122a while the other slot is located near the other edge of the waveguide face 122a. More specifically, assuming that the opening of one of the two slots 112 is a first opening and the opening of the other is a second opening, then, the first opening satisfies the above requirements (1) to (3), while the second opening satisfies the requirements (1') to (3') below.

(1') As viewed from the normal direction of the first conductive surface 110a, the second opening includes, at least in the central portion of the second opening along the length direction, a second small-angle portion where an angle formed by the width direction of the second opening and the width direction of the waveguide face 122a is smaller than 45 degrees.

(2') As viewed from the normal direction of the first conductive surface 110a, at least a portion of the second small-angle portion overlaps the second conductive surface 120a on the outside of the other of the two edges of the waveguide face 122a.

(3') As viewed from the normal direction of the first conductive surface 110a, the second small-angle portion intersects the other of the two edges of the waveguide face 122a while not intersecting the one edge, or is located from the other of the two edges at a distance which is shorter than the width of the waveguide face 122a.

With such construction, the two slots 112 can be disposed with an ample margin of space.

Next, with reference to FIGS. 12A through 12E, several examples of relative positioning between a slot 112 and the waveguide face 122a will be described. In FIGS. 12A through 12E, a small-angle portion of the opening of a slot 112 is shown hatched. FIGS. 12A through 12E are all as viewed from the normal direction of the conductive surfaces 110a and 120a, illustrating nothing but one slot 112 and a portion of the waveguide face 122a near it. For ease of illustration, elements other than the slot 112 and the waveguide face 122a are omitted from illustration.

Figure 12A:
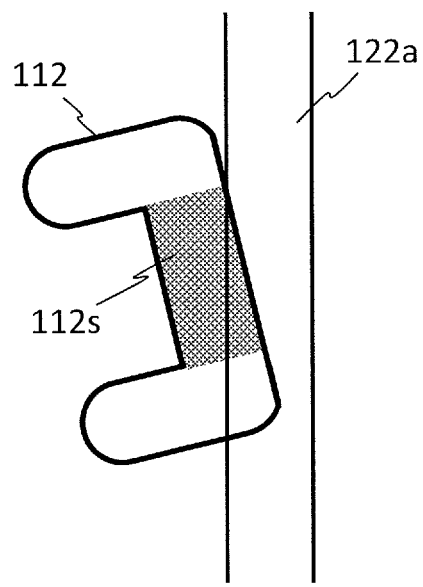

FIG. 12A shows an example of a U-shaped slot 112, such that a portion of the opening of the slot 112 is opposed to the waveguide face 122a. As viewed from the normal direction of the conductive surfaces 110a and 120a (which is identical to the normal direction of the waveguide face 122a), a small-angle portion 112s of the slot 112 of this example intersects one of the two edges of the waveguide face 122a, while not intersecting the other edge. A part of the small-angle portion 112s is opposed to the waveguide face 122a, while the other part is opposed to the second conductive surface 120a. In this example, an electric field occurring in the central portion of the slot 112 oscillates along a direction that is inclined by an angle which is smaller than 45 degrees from the width direction of the waveguide face 122a.

Figure 12B:
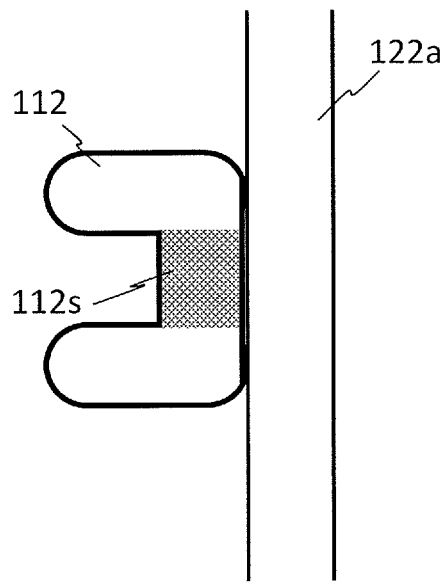

FIG. 12B shows an example of a U-shaped slot 112, where the entire opening of the slot 112 is not opposed to the waveguide face 122a. As viewed from the normal direction of the conductive surfaces 110a and 120a, a small-angle portion 112s of the slot 112 of this example intersects neither of the two edges of the waveguide face 122a, but abuts with one of the two edges. The entire small-angle portion 112s is opposed to the second conductive surface 120a. The width direction of the small-angle portion 112s is identical to the width direction of the waveguide face 122a. Therefore, an electric field occurring in the central portion of the slot 112 oscillates along the width direction of the waveguide face 122a.

Figure 12C:
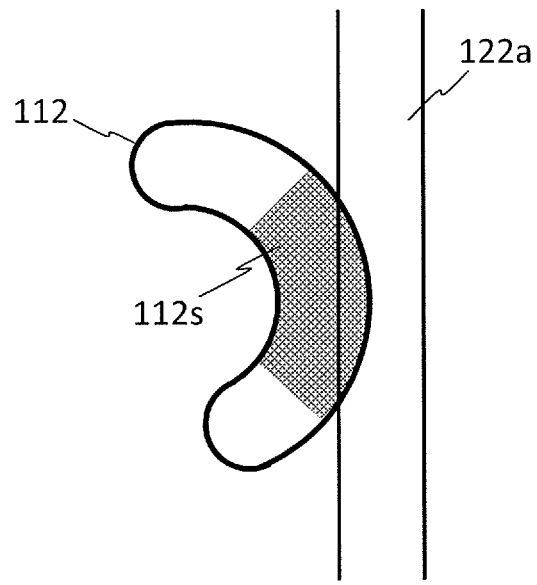

FIG. 12C shows an example of a curve-shaped slot 112, where a portion of the opening of a slot 112 is opposed to the waveguide face 122a. As viewed from the normal direction of the conductive surfaces 110a and 120a, a small-angle portion 112s of the slot 112 of this example intersects one of the two edges of the waveguide face 122a, while not intersecting the other. A part of the small-angle portion 112s is opposed to the waveguide face 122a, while the other part is opposed to the second conductive surface 120a. In this example, near the central portion of the slot 112, an electric field that oscillates along a direction close to the width direction of the waveguide face 122a is induced.

Figure 12D:
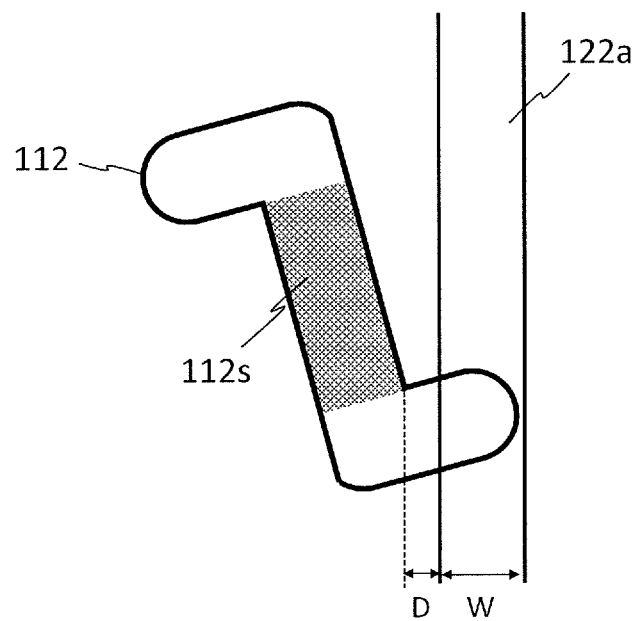

FIG. 12D shows an example of a Z-shaped slot 112, where only an end portion of the opening of a slot 112 is opposed to the waveguide face 122a. As viewed from the normal direction of the conductive surfaces 110a and 120a, the small-angle portion 112s overlaps the second conductive surface 120a on the outside of one of the two edges of the waveguide face 122a. The small-angle portion 112s is located from the one edge at a distance D which is shorter than the width W of the waveguide face 122a. Thus, in plan view, the small-angle portion 112s may be located away from the waveguide face 122a. However, if the small-angle portion 112s is too distant, an electromagnetic field of adequate intensity will not be created in the slot 112. Therefore, in the example of FIG. 12D, in plan view, the distance D between the small-angle portion 112s and the closer edge of the waveguide face 122a is shorter than the width W of the waveguide face 122a. When this condition is satisfied, the electromagnetic field in the slot 112 will be prevented from having too small an intensity. In the present specification, the distance D between the small-angle portion 112s and one edge of the waveguide face 122a means a distance between that edge and a position in the region of the small-angle portion 112s that possesses the smallest distance with the edge. When the slot 112 shown in FIG. 12D is adopted, near the central portion of the small-angle portion 112s, an electric field that oscillates along a direction intersecting the width direction of the waveguide face 122a at an angle which is smaller than 45 degrees is induced.

Figure 12E:
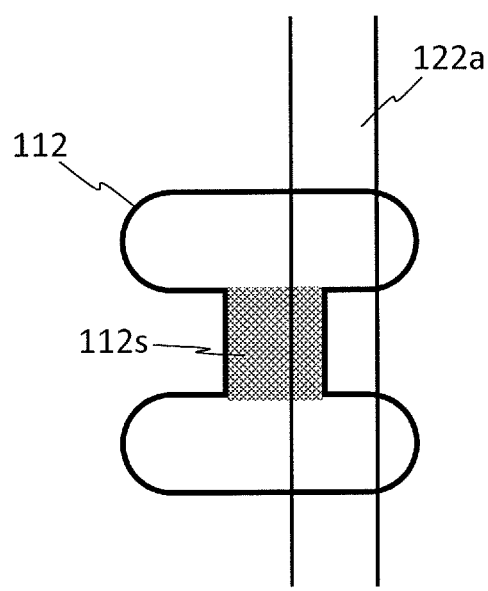

FIG. 12E shows an example of an H-shaped slot 112, where the opening of the slot 112 is disposed astride the two edges of the waveguide face 122a. As viewed from the normal direction of the conductive surfaces 110a and 120a, the small-angle portion 112s intersects one of the two edges of the waveguide face 122a, while not intersecting the other. However, any portion of the opening of the slot 112 other than its small-angle portion 112s (i.e., two end portions) intersect both of the two edges of the waveguide face 122a. With such construction, too in the central portion of the slot 112, an electric field that oscillates along the width direction of the waveguide face 122a can be created.

Thus, there may be various implementations where each slot 112 is disposed adjoining the waveguide face 122a, rather than immediately above the waveguide face 122a. By allowing each slot 112 to be disposed adjoining the waveguide face 122a, such that the width direction of the central portion of the slot is close to the width direction of the waveguide face 122a, a polarized wave can be realized that cannot be obtained by disposing each slot 112 immediately above the waveguide face 122a.

Next, other exemplary constructions of the waveguide member 122 will be described. Although the upper face (waveguide face 122a) of the waveguide member 122 is illustrated as flat in the above-described examples, one or more dents and/or bumps may be provided thereon. Such a dent(s) and/or bump(s) will modulate the phase of an electromagnetic wave propagating along the waveguide face 122a, and locally alter the wavelength within the waveguide. Similar effects can also be obtained by providing one or more dents and/or bumps at places on the conductive surface 110a of the first conductive member 110 that are opposed to the waveguide face 122a, or locally varying the width of the waveguide face 122a. Stated otherwise, the spacing between the waveguide face 122a and the conductive surface 110a and/or the width of the waveguide face 122a may undergo changes along the direction that the waveguide face 122a extends. Such changes may be periodic or aperiodic along the direction that the waveguide face 122a extends.

In the above-described examples, the waveguide face 122a includes one deflecting portion 122t between two positions that are coupled to two adjacent slots 112 (which may hereinafter be expressed as "between two slots 112"). Without being limited to such examples, the deflecting portion 122t may take various structures. For example, the waveguide face 122a may include a plurality of deflecting portions 122t between two adjacent slots 112. Providing a plurality of deflecting portions 122t will allow the direction of propagation of an electromagnetic wave to be deflected to an even greater degree. Moreover a deflecting portion 122t that bends in a curve may be adopted. Adopting a deflecting portion 122t that bends in a curve will alleviate impedance mismatching, and suppress signal wave reflection.

Figure 13A:
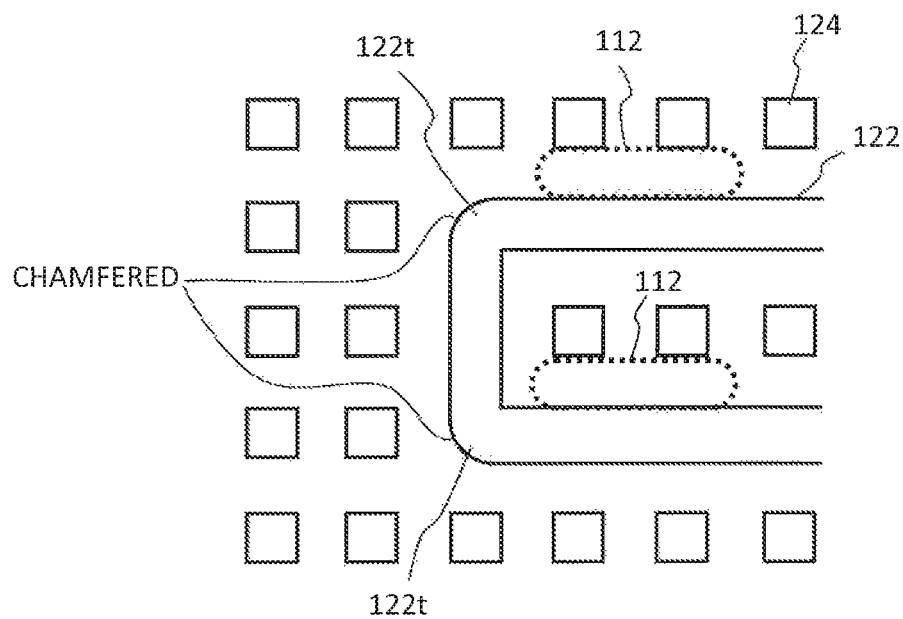
FIG. 13A is a diagram showing an example where the waveguide member 122 includes two deflecting portions 122t.

FIG. 13A is a diagram showing an example where the waveguide member 122 includes two deflecting portions 122t. In this example, the waveguide face 122a includes two linear portions that couple to the two slots 112, such that the two linear portions are connected via the two deflecting portions 122t. Each deflecting portion 122t is bent by 90 degrees in the same angular direction. As a result, the propagation path of an electromagnetic wave is bent by 90 degrees at the first deflecting portion 122t, and further bent by 90 degrees at the second deflecting portion 122t, thus realizing 180 degrees of deflection in total. The two slots 112 are disposed respectively adjoining the two parallel linear portions. Therefore, a polarized wave whose electric field oscillates along the up-down direction shown in FIG. 13A can be transmitted or received. Although the number of deflecting portions 122t is two in this example, there may be three or more. By providing a plurality of deflecting portions 122t, the overall angle of deflection can be made large.

Figure 13B:
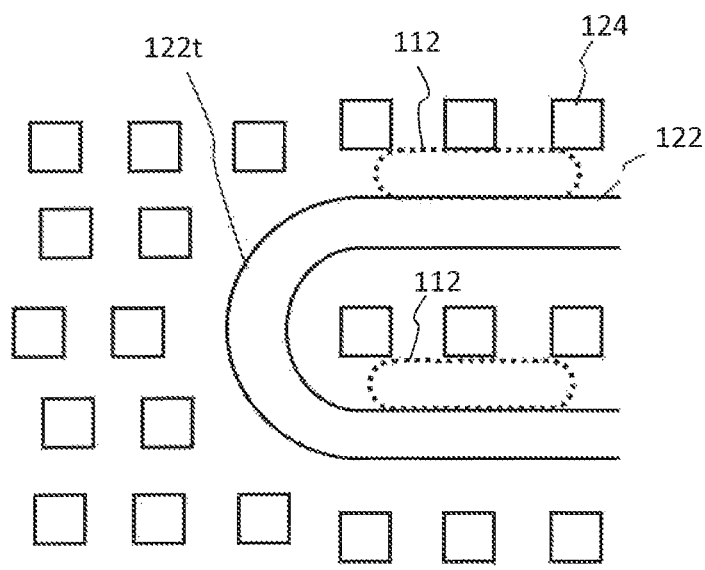
FIG. 13B is a diagram showing an example where the waveguide member 122 is bent so as to present a gentle arc at a deflecting portion 122t.

FIG. 13B shows an example where the waveguide member 122 is bent so as to present a gentle arc at a deflecting portion 122t. The deflecting portion 122t in this example has a structure that extends in the form of a curve spanning a relatively wide range. The waveguide face 122a includes two linear portions that extend in the form of straight lines, these two linear portions being connected via the curve-shaped deflecting portion 122t. The two slots 112 are disposed respectively adjoining the two linear portions. In this example, too, the two linear portions are parallel, and 180 degrees of deflection is realized in total. Thus, by adopting a curve-shaped deflecting portion 122t, the overall angle of deflection can be made large, and also electromagnetic wave reflection can be suppressed.

Figure 13C:
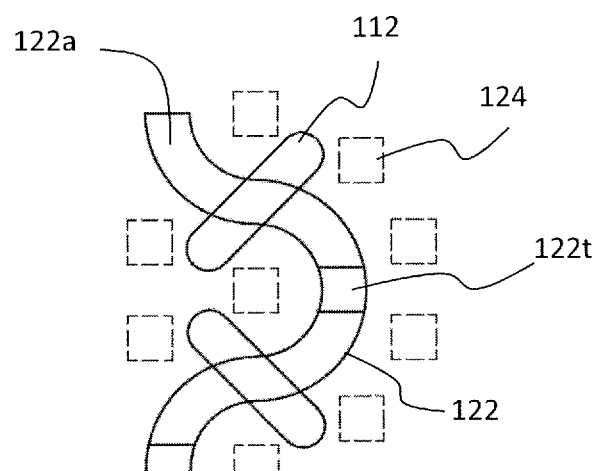
FIG. 13C is a diagram showing an example where the entire waveguide face 122a of the waveguide member 122 has a meandering shape, without having any linear portions.
Figure 13D:
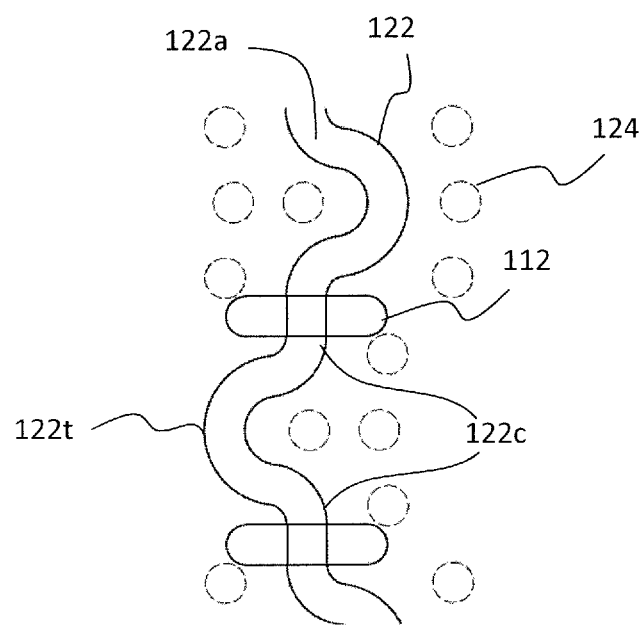
FIG. 13D is a diagram showing an example where the waveguide face 122a includes two linear portions 122c that extend on one straight line, and a curve-shaped deflecting portion 122t connecting between the linear portions 122c.

FIG. 13C and FIG. 13D are diagrams each showing another exemplary construction of the waveguide member 122. FIG. 13C shows an example where the entire waveguide face 122a of the waveguide member 122 has a meandering shape, without having any linear portions. The deflecting portion 122t is structured in an arc shape (curve shape). Two slots 112 are opposed to curve-shaped portions on both sides of the deflecting portion 122t of the waveguide face 122a. FIG. 13D shows an example where the waveguide face 122a includes two linear portions 122c that extend on one straight line, and a curve-shaped deflecting portion 122t connecting between the linear portions 122c. Two slots 112 are opposed to the two linear portions 122c on both sides of the deflecting portion 122t. In this example, an electromagnetic wave propagating in one of the linear portion 122c may swerve e.g. left at the deflecting portion 122t, and then gently swerve right, and finally swerve left again to reach the other linear portion 122c. In this example, it may be said that a plurality of deflections are made between the two slots 112. This is as though a plurality of deflecting portions 122t existed between the two slots 112.

The above description assumes a one-dimensional slot array antenna 300 in which a plurality of slots 112 are disposed in one row. However, the present disclosure is not limited to such construction. Combinations of one-dimensional construction, each including the plurality of slots 112, the waveguide member 122, and the plurality of conductive rods 124, may be arranged along a direction intersecting the direction in which the slots 112 are arrayed. As a result, a two-dimensional slot array antenna 300 can be constructed.

As described above, embodiments of the present disclosure permit a great range of variations. These variations may be classified from standpoints (A) through (H) below, for example. In the following description, unless otherwise specified, "two slots" mean two adjacent slots that couple to the waveguide face of one waveguide member.

(A) distance between the centers of two slots as measured along the waveguide face
- an integer multiple of $\lambda g$ (equal phase at positions that are coupled to two slots)
- a half-integer multiple of $\lambda g$ (opposite phases at positions that are coupled to two slots)
- otherwise (B) change in the direction of propagation of an electromagnetic wave at the positions of two slots (change in the direction of the waveguide face)
  changing
    changing by an angle of less than 180 degrees
    changing by 180 degrees (i.e., into the reverse direction)
  not changing
(C) how the slots and the waveguide face are coupled (manner of coupling)
  slots are immediately above the waveguide face
    orthogonal (electric field oscillates along the same direction as the waveguide direction)
    oblique (electric field oscillates along a different direction from the waveguide direction)
  slots are disposed adjoining the waveguide face (shifted off the center line of the waveguide face)
    parallel (electric field oscillates along a perpendicular direction to the waveguide direction)
    oblique (electric field oscillates along a direction different from the perpendicular direction to the waveguide direction)
(D) angle of deflection by the entirety of deflecting portions between two slots
  90 degrees
  180 degrees
  otherwise
(E) structure of deflecting portion(s)
  one deflecting portion (bend)
  two deflecting portions (bends)
  three or more deflecting portions (bends)
  curve shape
(F) slot shape
  linear
  H shape
  Z shape
  angular U shape
  otherwise
(G) number of slots per waveguide face
  two
  three or more
(H) number of waveguide faces (waveguide members)
  one (one-dimensional array)
  two or more (two-dimensional array)
(I) direction of polarization
  horizontal
  vertical
  oblique Hereinafter, based on standpoints (A) through (H) above, illustrative embodiments of the present disclosure will further be described.

<(1) Construction with Two Slots (One-Dimensional Array)>

First, an exemplary construction of a slot array antenna 300 having two slots 112 will be described.

Figure 14:
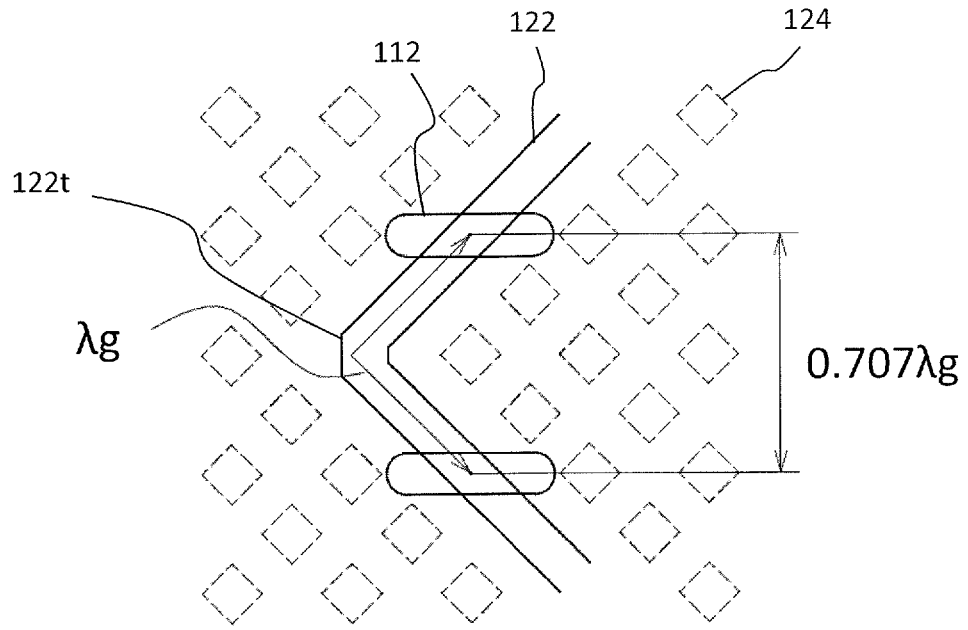
FIG. 14 is an upper plan view showing an exemplary slot array antenna 300 having two slots 112.

FIG. 14 is an upper plan view showing an exemplary slot array antenna 300 having two slots 112. The slot array antenna 300 in this example has attributes as shown in Table 1 below.

TABLE 1

| A. distance between slots, along waveguide face | $\lambda g$ |
| B. change in direction of waveguide face | changing |
| C. manner of slot coupling | oblique |

TABLE 1-continued

| D. angle of deflection of deflecting portion | 90 degrees |
| E. shape of deflecting portion | 1 corner |
| F. slot shape | linear |
| G. slots/waveguide face | 2 |
| H. number of waveguide faces | 1 |
| I. direction of polarization | vertical |

As for I. direction of polarization, the vertical direction and the lateral direction in FIG. 14 are respectively supposed to be the vertical direction and the horizontal direction. The same applies to any subsequent figure. The width of the waveguide face 122a and the width of each conductive rod 124 are (⅛) λo. In any subsequent example, these dimensions remain the same, unless otherwise specified. In this example, the straight distance between two slots 112 can be reduced to 0.707λg.

Figure 15:
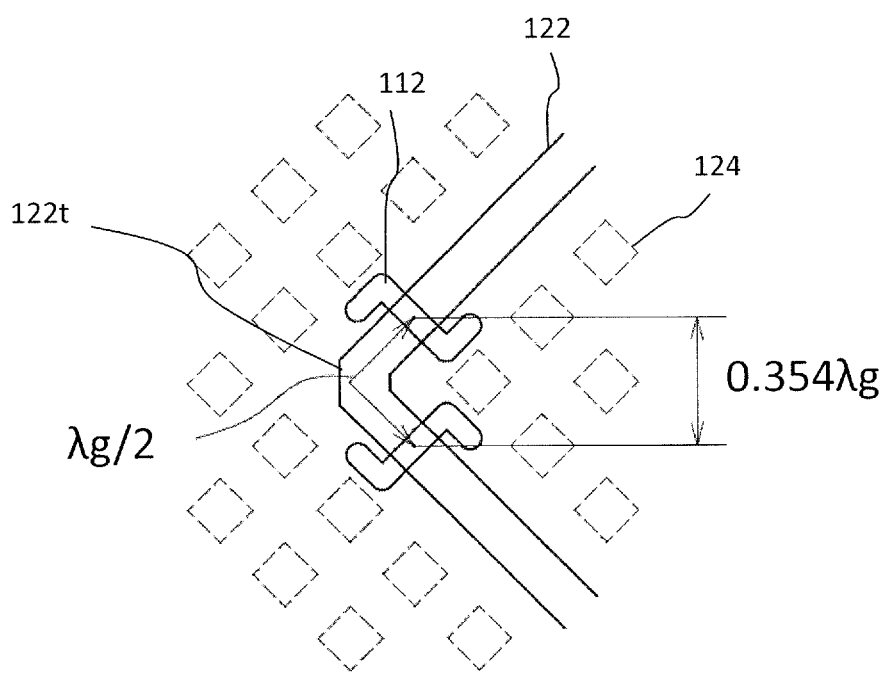
FIG. 15 is an upper plan view showing another example of a slot array antenna 300 having two slots 112.

FIG. 15 is an upper plan view showing another example of a slot array antenna 300 having two slots 112. The slot array antenna 300 in this example has attributes as shown in Table 2 below.

TABLE 2

| A. distance between slots, along waveguide face | $\lambda g/2$ |
| B. change in direction of waveguide face | changing |
| C. manner of slot coupling | orthogonal |
| D. angle of deflection of deflecting portion | 90 degrees |
| E. shape of deflecting portion | 1 corner |
| F. slot shape | Z shape |
| G. slots/waveguide face | 2 |
| H. number of waveguide faces | 1 |
| I. direction of polarization | horizontal |

In this example, the distance between slots as measured along the waveguide face is set to λg/2. Therefore, the straight distance between the centers of two slots 112 is reduced to 0.354 λg. Although equiphase feeding is not achieved in this example, it is still usable in a special application where feeding is performed in such a manner that the phases are supposed to differ by π at the positions of two slots 112.

Figure 16:
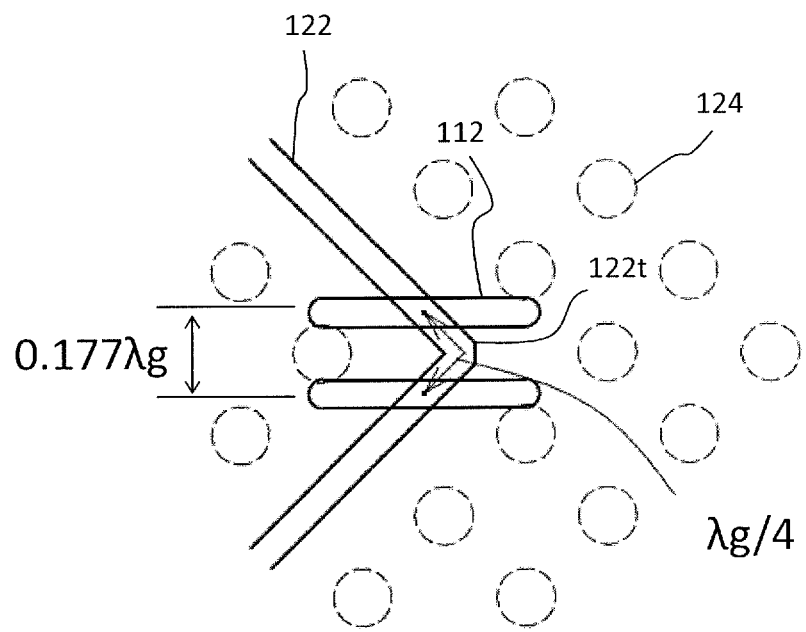
FIG. 16 is an upper plan view showing still another example of a slot array antenna 300 having two slots 112.

FIG. 16 is an upper plan view showing still another example of a slot array antenna 300 having two slots 112. The slot array antenna 300 in this example has attributes as shown in Table 3 below.

TABLE 3

| A. distance between slots, along waveguide face | $\lambda g/4$ |
| B. change in direction of waveguide face | changing |
| C. manner of slot coupling | oblique |
| D. angle of deflection of deflecting portion | 90 degrees |
| E. shape of deflecting portion | 1 corner |
| F. slot shape | linear |
| G. slots/waveguide face | 2 |
| H. number of waveguide faces | 1 |
| I. direction of polarization | otherwise |

In this example, the distance between slots as measured along the waveguide face is set to λg/4. Therefore, the straight distance between the centers of two slots 112 is reduced to 0.177 λg. In the example of FIG. 16, cylindrical conductive rods 124 are used. The waveguide face 122a and the rods 124 have a width of (1/16)λo, which is shorter than in the aforementioned example. Although equiphase feeding is not achieved in this example either, it is still usable in a special application where feeding is performed in such a manner that the phases are supposed to differ by π/4 at the positions of two slots 112.

Figure 17:
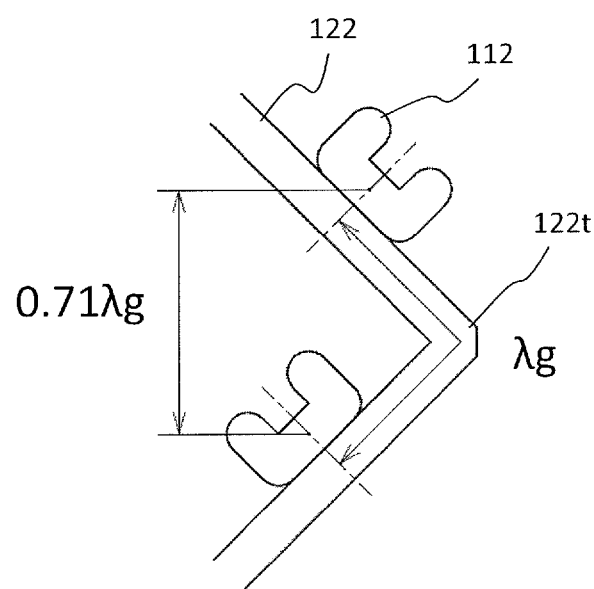
FIG. 17 is an upper plan view showing still another example of a slot array antenna 300 having two slots 112.

FIG. 17 is an upper plan view showing still another example of a slot array antenna 300 having two slots 112. The slot array antenna 300 in this example has attributes as shown in Table 4 below. In this example, characteristics similar to those of FIG. 14 are also obtained.

TABLE 4

| | |
|---|---|
| A. distance between slots, along waveguide face | λ g |
| B. change in direction of waveguide face | changing |
| C. manner of slot coupling | adjoining |
| D. angle of deflection of deflecting portion | 90 degrees |
| E. shape of deflecting portion | 1 corner |
| F. slot shape | U shape |
| G. slots/waveguide face | 2 |
| H. number of waveguide faces | 1 |
| I. direction of polarization | vertical |

Figure 18:
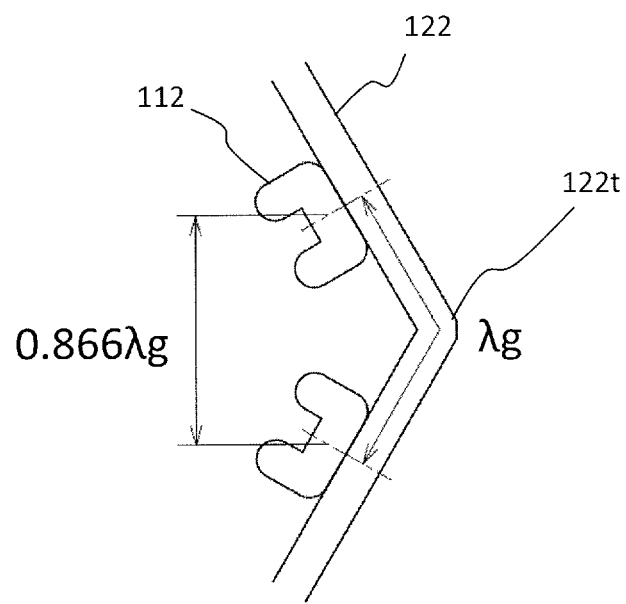
FIG. 18 is an upper plan view showing still another example of a slot array antenna 300 having two slots 112.

FIG. 18 is an upper plan view showing still another example of a slot array antenna 300 having two slots 112. The slot array antenna 300 in this example has attributes as shown in Table 5 below.

TABLE 5

| | |
|---|---|
| A. distance between slots, along waveguide face | λ g |
| B. change in direction of waveguide face | changing |
| C. manner of slot coupling | adjoining |
| D. angle of deflection of deflecting portion | 60 degrees |
| E. shape of deflecting portion | 1 corner |
| F. slot shape | U shape |
| G. slots/waveguide face | 2 |
| H. number of waveguide faces | 1 |
| I. direction of polarization | horizontal |

In this example, the angle of deflection is 60 degrees, which makes the slot interval 0.866λg. Unlike the foregoing examples, a horizontally-polarized wave can be transmitted or received.

Figure 19:
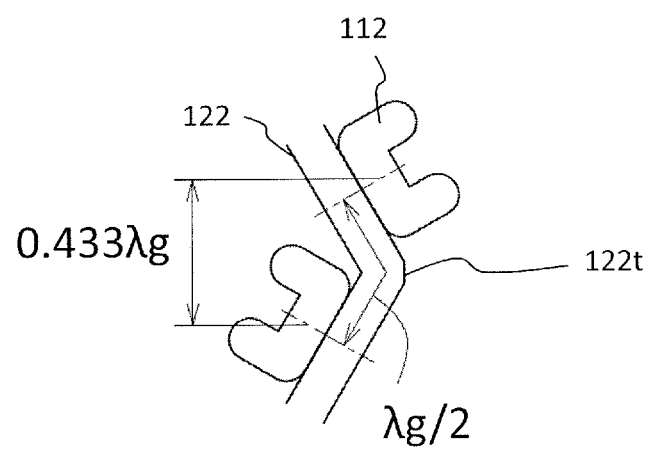
FIG. 19 is an upper plan view showing still another example of a slot array antenna 300 having two slots 112.

FIG. 19 is an upper plan view showing still another example of a slot array antenna 300 having two slots 112. The slot array antenna 300 in this example has attributes as shown in Table 6 below. The slot interval is reduced to 0.433 λg.

TABLE 6

| | |
|---|---|
| A. distance between slots, along waveguide face | λ g/2 |
| B. change in direction of waveguide face | changing |
| C. manner of slot coupling | adjoining |
| D. angle of deflection of deflecting portion | 60 degrees |
| E. shape of deflecting portion | 1 corner |
| F. slot shape | U shape |
| G. slots/waveguide face | 2 |
| H. number of waveguide faces | 1 |
| I. direction of polarization | horizontal |

Next, an example where the waveguide member 122 include a plurality of deflecting portions 122t will be described.

Figure 20:
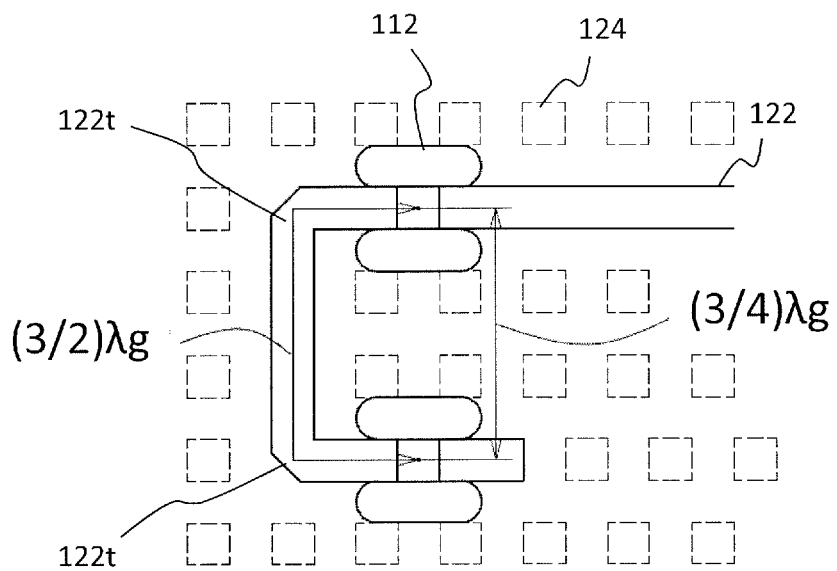
FIG. 20 is an upper plan view showing an exemplary slot array antenna 300 in which the waveguide member 122 includes a plurality of deflecting portions 122t.

FIG. 20 is an upper plan view showing an exemplary slot array antenna 300 in which the waveguide member 122 includes a plurality of deflecting portions 122t. The slot array antenna 300 in this example has attributes as shown in Table 7 below.

TABLE 7

| | |
|---|---|
| A. distance between slots, along waveguide face | 3/2 λ g |
| B. change in direction of waveguide face | changing |
| C. manner of slot coupling | orthogonal |
| D. angle of deflection of deflecting portion | 180 degrees |
| E. shape of deflecting portion | 2 corners |
| F. slot shape | H shape |
| G. slots/waveguide face | 2 |
| H. number of waveguide faces | 1 |
| I. direction of polarization | horizontal |

Figure 21:
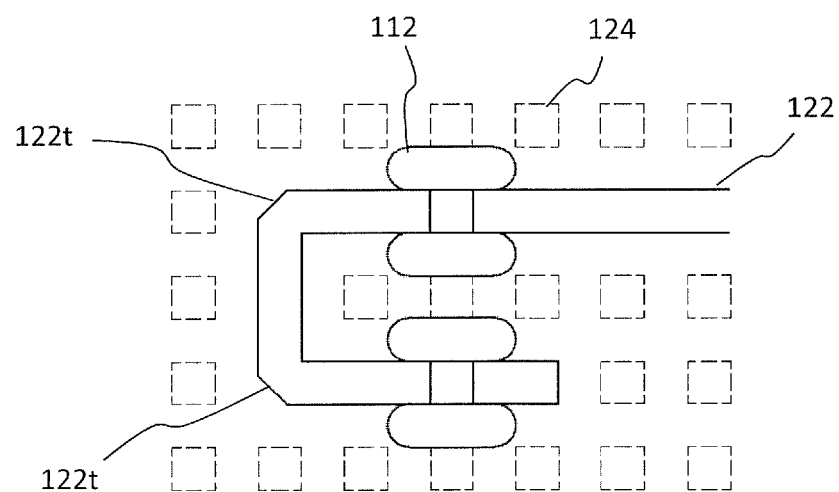
FIG. 21 is an upper plan view showing another example of a slot array antenna 300 in which the waveguide member 122 includes a plurality of deflecting portions 122t.

FIG. 21 is an upper plan view showing another example of a slot array antenna 300 in which the waveguide member 122 includes a plurality of deflecting portions 122t. The slot array antenna 300 in this example has attributes as shown in Table 8 below.

TABLE 8

| | |
|---|---|
| A. distance between slots, along waveguide face | 3/2 λ g |
| B. change in direction of waveguide face | changing |
| C. manner of slot coupling | orthogonal |
| D. angle of deflection of deflecting portion | 180 degrees |
| E. shape of deflecting portion | 2 corners |
| F. slot shape | H shape |
| G. slots/waveguide face | 2 |
| H. number of waveguide faces | 1 |
| I. direction of polarization | horizontal |

Figure 22:
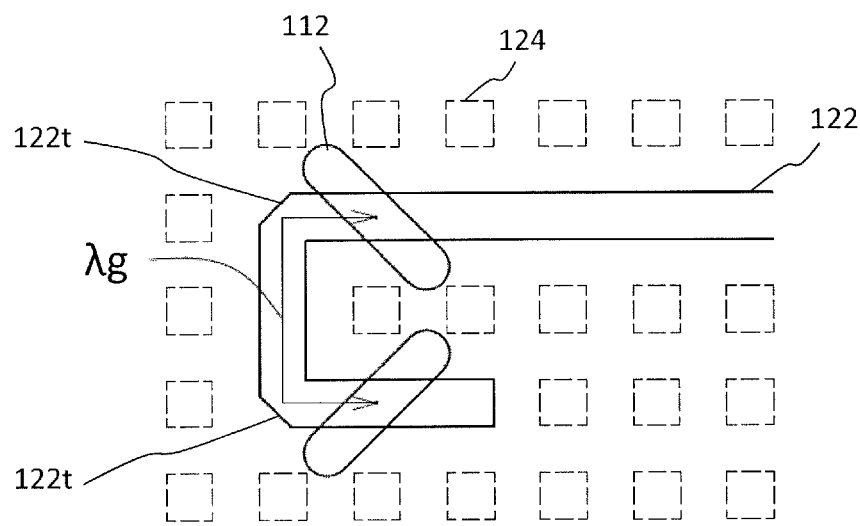
FIG. 22 is an upper plan view showing still another example of a slot array antenna 300 in which the waveguide member 122 includes a plurality of deflecting portions 122t.

FIG. 22 is an upper plan view showing still another example of a slot array antenna 300 in which the waveguide member 122 includes a plurality of deflecting portions 122t. The slot array antenna 300 in this example has attributes as shown in Table 9 below.

TABLE 9

| | |
|---|---|
| A. distance between slots, along waveguide face | λ g |
| B. change in direction of waveguide face | changing |
| C. manner of slot coupling | oblique |
| D. angle of deflection of deflecting portion | 180 degrees |
| E. shape of deflecting portion | 2 corners |
| F. slot shape | linear |
| G. slots/waveguide face | 2 |
| H. number of waveguide faces | 1 |
| I. direction of polarization | vertical |

Figure 23:
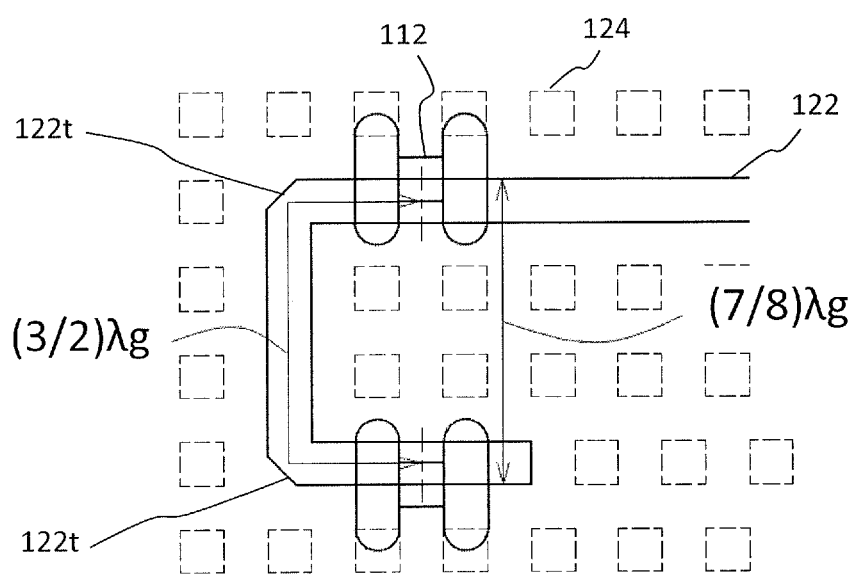
FIG. 23 is an upper plan view showing still another example of a slot array antenna 300 in which the waveguide member 122 includes a plurality of deflecting portions 122t.

FIG. 23 is an upper plan view showing still another example of a slot array antenna 300 in which the waveguide member 122 includes a plurality of deflecting portions 122t. The slot array antenna 300 in this example has attributes as shown in Table 10 below.

TABLE 10

| | |
|---|---|
| A. distance between slots, along waveguide face | 3/2 λ g |
| B. change in direction of waveguide face | changing |
| C. manner of slot coupling | adjoining |
| D. angle of deflection of deflecting portion | 180 degrees |
| E. shape of deflecting portion | 2 corners |
| F. slot shape | H shape |
| G. slots/waveguide face | 2 |
| H. number of waveguide faces | 1 |
| I. direction of polarization | vertical |

Figure 24:
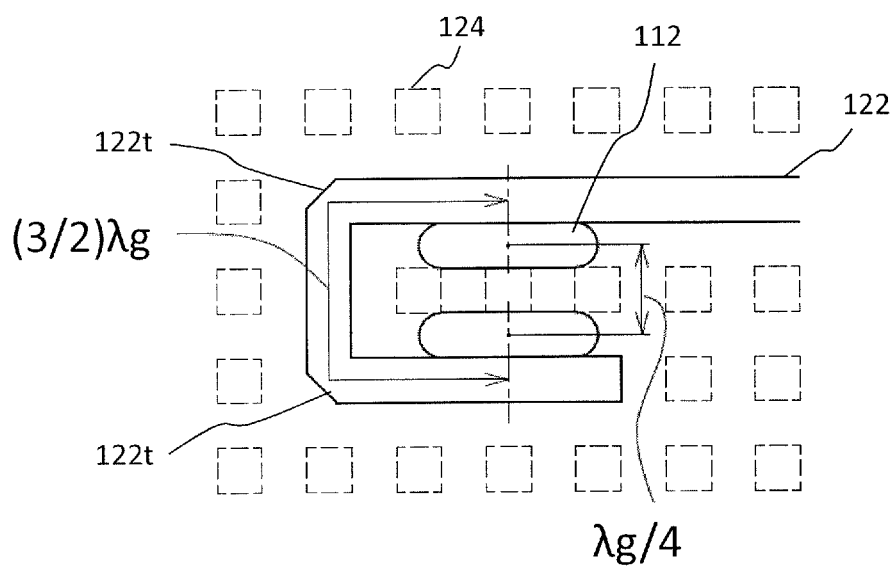
FIG. 24 is an upper plan view showing still another example of a slot array antenna 300 in which the waveguide member 122 includes a plurality of deflecting portions 122t.

FIG. 24 is an upper plan view showing still another example of a slot array antenna 300 in which the waveguide member 122 includes a plurality of deflecting portions 122t. The slot array antenna 300 in this example has attributes as shown in Table 11 below.

TABLE 11

| | |
|---|---|
| A. distance between slots, along waveguide face | 3/2 λ g |
| B. change in direction of waveguide face | changing |
| C. manner of slot coupling | adjoining |
| D. angle of deflection of deflecting portion | 180 degrees |
| E. shape of deflecting portion | 2 corners |
| F. slot shape | linear |
| G. slots/waveguide face | 2 |
| H. number of waveguide faces | 1 |
| I. direction of polarization | vertical |

Figure 25:
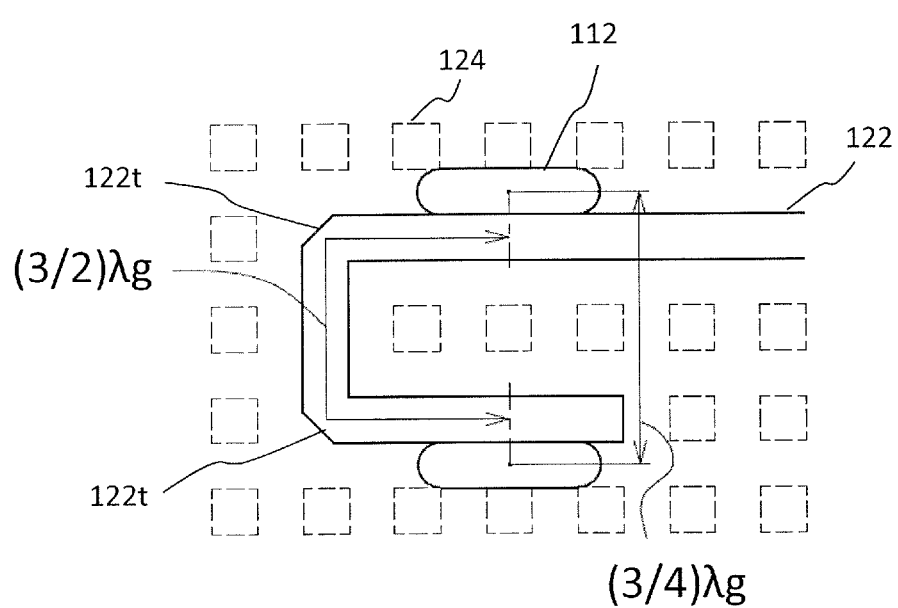
FIG. 25 is an upper plan view showing still another example of a slot array antenna 300 in which the waveguide member 122 includes a plurality of deflecting portions 122t.

FIG. 25 is an upper plan view showing still another example of a slot array antenna 300 in which the waveguide member 122 includes a plurality of deflecting portions 122t. The slot array antenna 300 in this example has attributes as shown in Table 12 below.

TABLE 12

| | |
|---|---|
| A. distance between slots, along waveguide face | 3/2 λ g |
| B. change in direction of waveguide face | changing |
| C. manner of slot coupling | adjoining |
| D. angle of deflection of deflecting portion | 180 degrees |
| E. shape of deflecting portion | 2 corners |
| F. slot shape | linear |
| G. slots/waveguide face | 2 |
| H. number of waveguide faces | 1 |
| I. direction of polarization | vertical |

Figure 26:
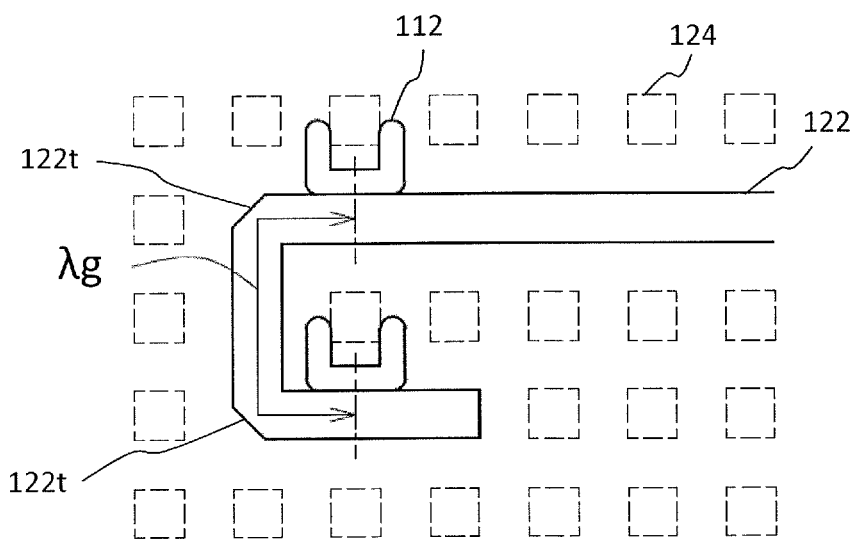
FIG. 26 is an upper plan view showing still another example of a slot array antenna 300 in which the waveguide member 122 includes a plurality of deflecting portions 122t.

FIG. 26 is an upper plan view showing still another example of a slot array antenna 300 in which the waveguide member 122 includes a plurality of deflecting portions 122t. The slot array antenna 300 in this example has attributes as shown in Table 13 below.

TABLE 13

| | |
|---|---|
| A. distance between slots, along waveguide face | λ g |
| B. change in direction of waveguide face | changing |
| C. manner of slot coupling | adjoining |
| D. angle of deflection of deflecting portion | 180 degrees |
| E. shape of deflecting portion | 2 corners |
| F. slot shape | U shape |

TABLE 13-continued

| | |
|---|---|
| G. slots/waveguide face | 2 |
| H. number of waveguide faces | 1 |
| I. direction of polarization | vertical |

Figure 27:
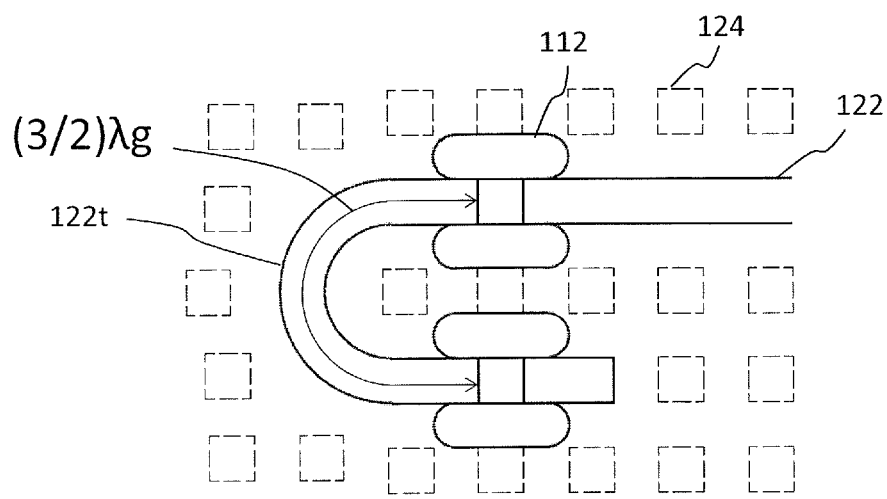
FIG. 27 is an upper plan view still another example of a slot array antenna 300 in which the waveguide member 122 includes a curve-shaped deflecting portion 122t.

FIG. 27 is an upper plan view still another example of a slot array antenna 300 in which the waveguide member 122 includes a curve-shaped deflecting portion 122t. The slot array antenna 300 in this example has attributes as shown in Table 14 below.

TABLE 14

| | |
|---|---|
| A. distance between slots, along waveguide face | 3/2 λ g |
| B. change in direction of waveguide face | changing |
| C. manner of slot coupling | orthogonal |
| D. angle of deflection of deflecting portion | 180 degrees |
| E. shape of deflecting portion | curve |
| F. slot shape | H shape |
| G. slots/waveguide face | 2 |
| H. number of waveguide faces | 1 |
| I. direction of polarization | horizontal |

In this example, since the deflecting portion 122t has a curve shape, signal wave reflection can be suppressed as compared to any structure where the deflecting portion 122t is sharply bent.

<(2) Construction with Three or More Slots (One-Dimensional Array)>

Next, an exemplary construction of a slot array antenna 300 having three or more slots 112 arrayed along one direction will be described.

Figure 28:
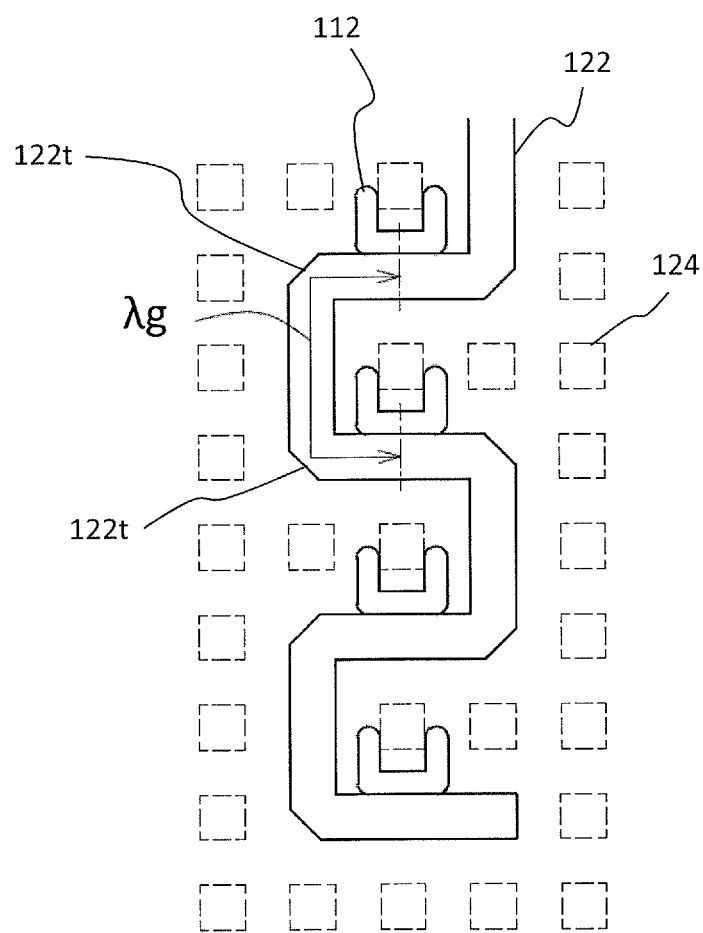
FIG. 28 is an upper plan view schematically showing an exemplary construction of a slot array antenna 300 having three or more slots 112.

FIG. 28 is an upper plan view schematically showing an exemplary construction of a slot array antenna 300 having three or more slots 112. The slot array antenna 300 in this example has attributes as shown in Table 15 below.

TABLE 15

| | |
|---|---|
| A. distance between slots, along waveguide face | λ g |
| B. change in direction of waveguide face | changing |
| C. manner of slot coupling | adjoining |
| D. angle of deflection of deflecting portion | 180 degrees |
| E. shape of deflecting portion | 2 corners |
| F. slot shape | U shape |
| G. slots/waveguide face | 4 |
| H. number of waveguide faces | 1 |
| I. direction of polarization | vertical |

This slot array antenna 300 has four slots 112 arrayed along one direction. In the waveguide member 122, portions coupling to any two adjacent slots 112 and any intervening structure therebetween are identical to those shown in FIG. 26. Without being limited to the structure of FIG. 26, any of the above-described structures may be used. In a slot array antenna 300 having three or more slots 112 as in this example, the waveguide face 122a includes, between two positions respectively coupling to any two adjacent slots 112, at least one deflecting portion at which the direction that the waveguide face 122a extends changes. Assuming that the plurality of slots 112 include a first slot, a second slot, and a third slot which flank one another in this order, then the direction of deflection (e.g. clockwise) of the deflecting portion located between the first slot and the second slot and the direction of deflection (e.g. counterclockwise) of the deflecting portion located between the second slot and the third slot are opposite. In this example, the distance between any two adjacent slots as measured along the waveguide face is equal to or greater than half the length of the shorter one of the two slots. Moreover, the straight distance between the centers of the two slots is smaller than four times the length of the shorter slot.

<(3) Construction with Two or More Waveguide Members (Two-Dimensional Array)>

Alternatively the above examples illustrate the number of waveguide members 122 to be one, there may be two or more waveguide members 122. By providing a plurality of slot rows respectively coupling to the plurality of waveguide members 122, a slot array antenna 300 in which antenna elements are arranged in a two-dimensional array can be realized.

Figure 29:
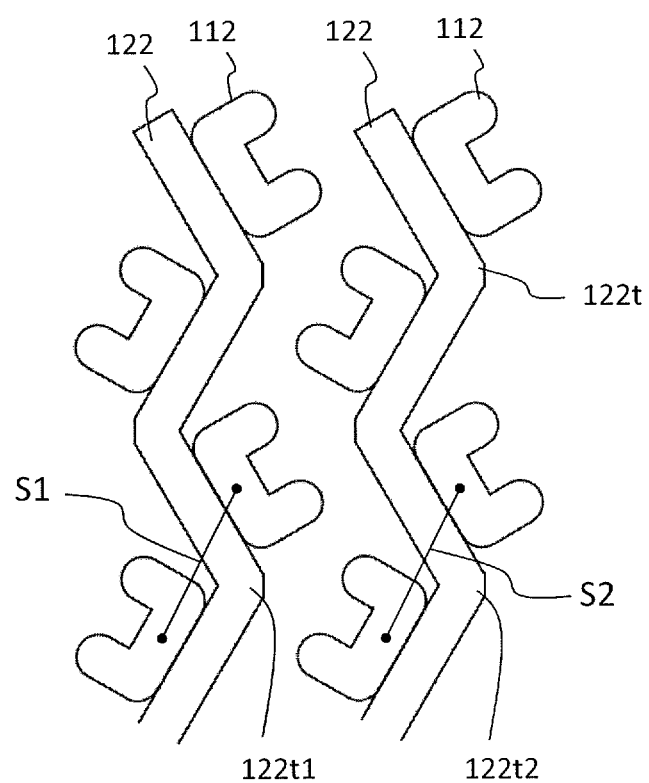
FIG. 29 is an upper plan view schematically showing an exemplary slot array antenna 300 having a plurality of waveguide members 122.

FIG. 29 is an upper plan view schematically showing an exemplary slot array antenna 300 having a plurality of waveguide members 122. This slot array antenna 300 has the following attributes.

TABLE 16

| A. distance between slots, along waveguide face | λ g/2 |
|---|---|
| B. change in direction of waveguide face | changing |
| C. manner of slot coupling | adjoining |
| D. angle of deflection of deflecting portion | 60 degrees |
| E. shape of deflecting portion | 1 corner |
| F. slot shape | U shape |
| G. slots/waveguide face | 4 |
| H. number of waveguide faces | 2 |
| I. direction of polarization | horizontal |

In this example, the slot array antenna 300 includes two waveguide members 122. The two waveguide members 122 have the same structure. Four slots 112 couple to the waveguide face 122a of each waveguide member 122. Between any two adjacent slots 112 among the four slots 112, the waveguide face 122a has at least one deflecting portion 112t. The slot array antenna 300 may include three or more waveguide members 122. The number of slots 112 coupling to one waveguide face 122a is not limited to four; there may be at least two such slots 112. Although not shown in FIG. 29, an artificial magnetic conductor exists on the outside of the region where the plurality of waveguide members 122 are arranged. The artificial magnetic conductor may further exist in between at least two adjacent waveguide members 122 among the plurality of waveguide members 122. When there is no problem if intermixing of electromagnetic waves occurs between waveguides, as in the case where the plurality of slots 112 are excited with an equal phase, the artificial magnetic conductor between the plurality of waveguide members 122 may be omitted. In the present disclosure, a situation where an artificial magnetic conductor exists on both sides of the region where the plurality of waveguide members 122 are arranged is interpreted to mean that an artificial magnetic conductor exists on both sides of each of the plurality of waveguide members 122.

In the example of FIG. 29, a first line segment S1 connecting between the centers of two adjacent slots 112 that couple to one waveguide face 122a (first waveguide face) and a second line segment S2 connecting between the centers of two other adjacent slots 112 that couple to another waveguide face 122a (second waveguide face) are parallel.

As used herein, "parallel" is not limited to the case of being exact parallel, but if the two segments form an angle which is 15 degrees or less, they are still regarded as being parallel. In this example, if the first line segment S1 is shifted by a predetermined distance in a direction which is orthogonal to the direction that the first line segment S1 extends, at least a portion of the first line segment S1 will overlap the second line segment S2. In such an example, the direction of deflection (which is counterclockwise in the example of FIG. 29) of at least one deflecting portion 122t1 that is located between two slots 112 which are at both ends of the first line segment S1 is identical to the direction of deflection of at least one deflecting portion 122t2 that is located between two other slots 112 which are at both ends of the second line segment S2. Lines interconnecting the respective centers of the two slots 112 which are at both ends of the first line segment S1 and the respective centers of the two other slots 112 which are at both ends of the second line segment S2 present a convex quadrilateral. In the example of FIG. 29, the centers of these four slots 112 form a parallelogram whose two opposite sides are the line segments S1 and S2.

Next, another example of a slot array antenna 300 in which the plurality of slots 112 are arranged in a two-dimensional array will be described.

Figure 30:
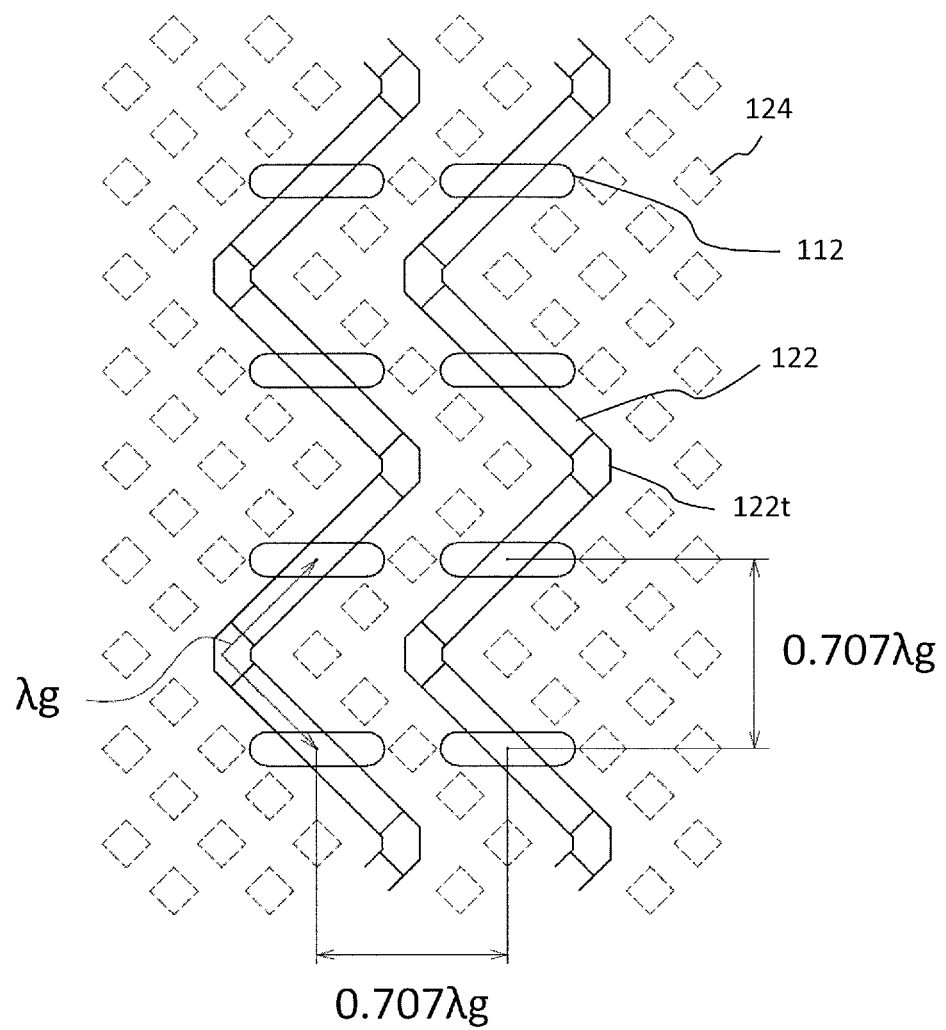
FIG. 30 is an upper plan view schematically showing another example of a slot array antenna 300 having a plurality of waveguide members 122.

FIG. 30 is an upper plan view schematically showing another example of a slot array antenna 300 having a plurality of waveguide members 122. This slot array antenna 300 has the following attributes.

TABLE 17

| A. distance between slots, along waveguide face | λ g |
|---|---|
| B. change in direction of waveguide face | changing |
| C. manner of slot coupling | oblique |
| D. angle of deflection of deflecting portion | 90 degrees |
| E. shape of deflecting portion | 1 corner |
| F. slot shape | linear |
| G. slots/waveguide face | 4 |
| H. number of waveguide faces | 2 |
| I. direction of polarization | vertical |

Figure 31:
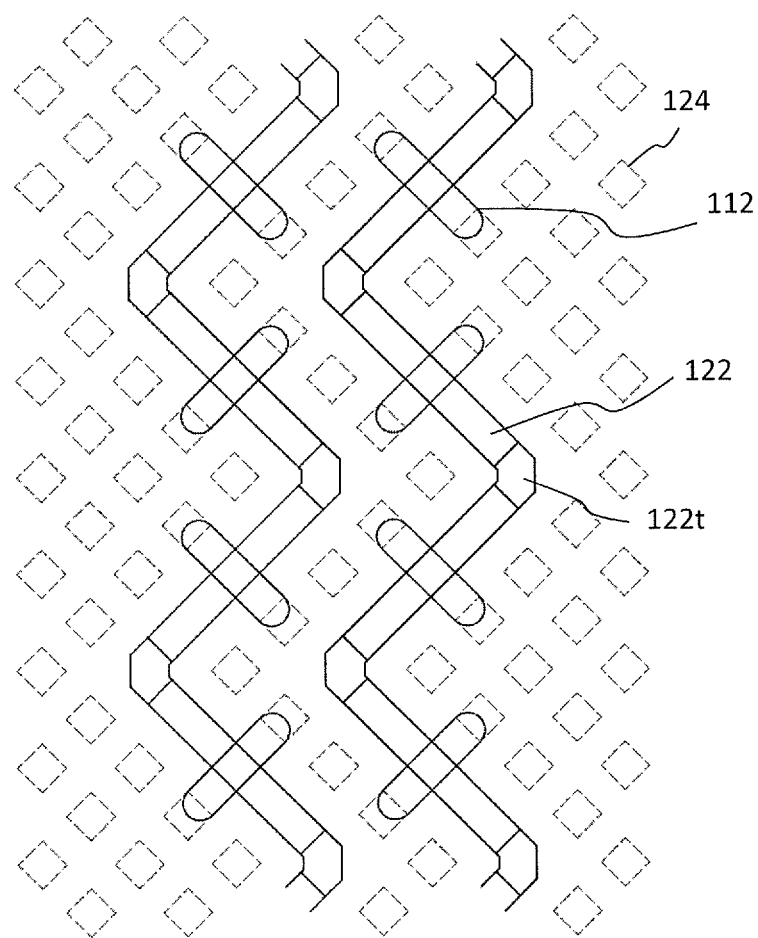
FIG. 31 is an upper plan view schematically showing still another example of a slot array antenna 300 having a plurality of waveguide members 122.

FIG. 31 is an upper plan view schematically showing still another example of a slot array antenna 300 having a plurality of waveguide members 122. This slot array antenna 300 has the following attributes.

TABLE 18

| A. distance between slots, along waveguide face | λ g |
|---|---|
| B. change in direction of waveguide face | changing |
| C. manner of slot coupling | orthogonal |
| D. angle of deflection of deflecting portion | 90 degrees |
| E. shape of deflecting portion | 1 corner |
| F. slot shape | linear |
| G. slots/waveguide face | 4 |
| H. number of waveguide faces | 2 |
| I. direction of polarization | vertical |

Figure 32:
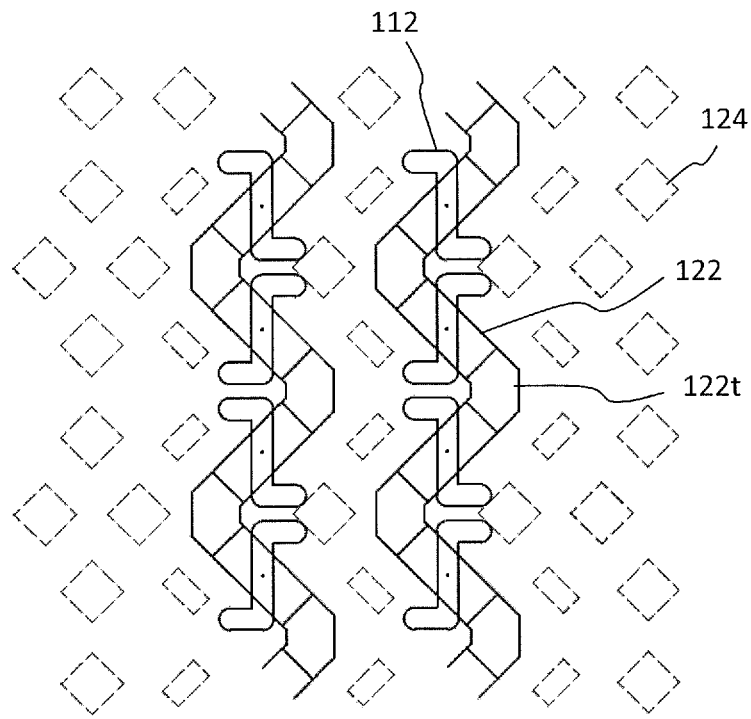
FIG. 32 is an upper plan view schematically showing still another example of a slot array antenna 300 having a plurality of waveguide members 122.

FIG. 32 is an upper plan view schematically showing still another example of a slot array antenna 300 having a plurality of waveguide members 122. This slot array antenna 300 has the following attributes.

TABLE 19

| | |
|---|---|
| A. distance between slots, along waveguide face | $\lambda g/2$ |
| B. change in direction of waveguide face | changing |
| C. manner of slot coupling | oblique |
| D. angle of deflection of deflecting portion | 90 degrees |
| E. shape of deflecting portion | 1 corner |
| F. slot shape | Z shape |
| G. slots/waveguide face | 4 |
| H. number of waveguide faces | 2 |
| I. direction of polarization | horizontal |

In the case where two slots 112 are distanced by a half of the wavelength λg (λg/2) on the waveguide member 122 for use in an antenna to handle horizontally-polarized waves (lateral polarization) as in this example, I-shaped slots 112 will be difficult to be deployed. Therefore, in this example, Z-shaped slots 112 with bent ends are used.

Figure 33:
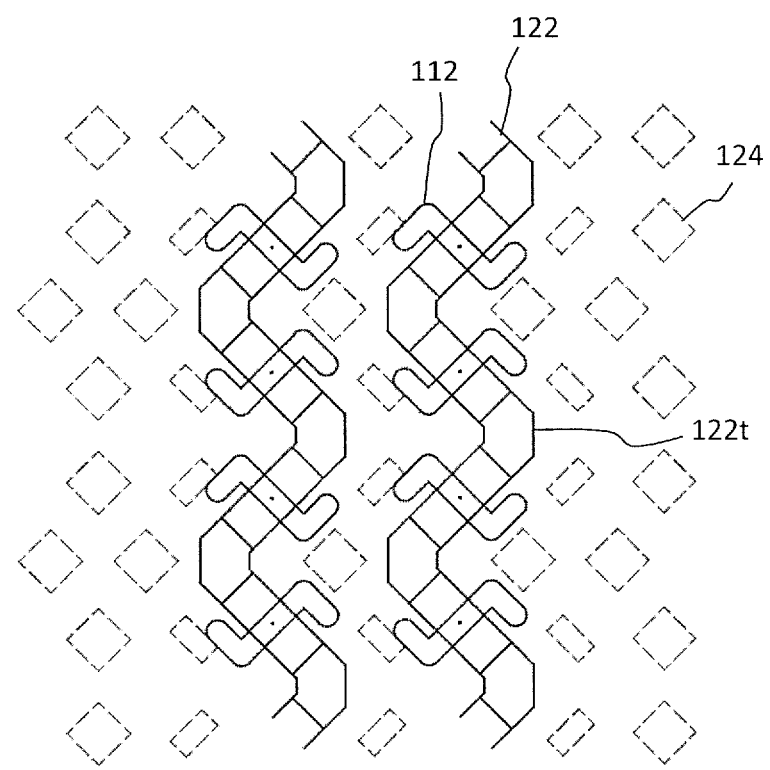
FIG. 33 is an upper plan view schematically showing still another example of a slot array antenna 300 having a plurality of waveguide members 122.

FIG. 33 is an upper plan view schematically showing still another example of a slot array antenna 300 having a plurality of waveguide members 122. This slot array antenna 300 has the following attributes.

TABLE 20

| | |
|---|---|
| A. distance between slots, along waveguide face | $\lambda g/2$ |
| B. change in direction of waveguide face | changing |
| C. manner of slot coupling | orthogonal |
| D. angle of deflection of deflecting portion | 90 degrees |
| E. shape of deflecting portion | 1 corner |
| F. slot shape | Z shape |
| G. slots/waveguide face | 4 |
| H. number of waveguide faces | 2 |
| I. direction of polarization | horizontal |

Figure 34:
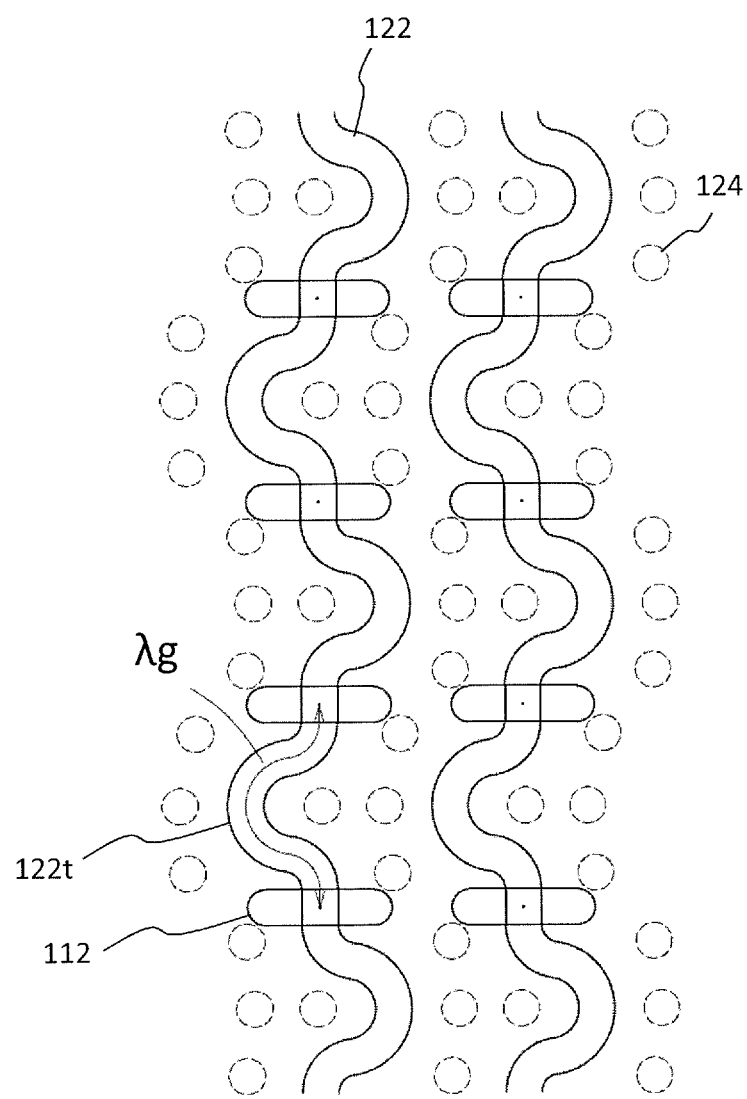
FIG. 34 is an upper plan view schematically showing still another example of a slot array antenna 300 having a plurality of waveguide members 122.

FIG. 34 is an upper plan view schematically showing still another example of a slot array antenna 300 having a plurality of waveguide members 122. This slot array antenna 300 has the following attributes.

TABLE 21

| | |
|---|---|
| A. distance between slots, along waveguide face | $\lambda g$ |
| B. change in direction of waveguide face | not changing |
| C. manner of slot coupling | orthogonal |
| D. angle of deflection of deflecting portion | about 165 degrees |
| E. shape of deflecting portion | curve |
| F. slot shape | linear |
| G. slots/waveguide face | 4 |
| H. number of waveguide faces | 2 |
| I. direction of polarization | vertical |

As for D. angle of deflection of deflecting portion (about 165 degrees), a total angle of deflection by the curve-shaped portions excluding both end portions of each deflecting portion 122t as shown in FIG. 34 is indicated.

Figure 35:
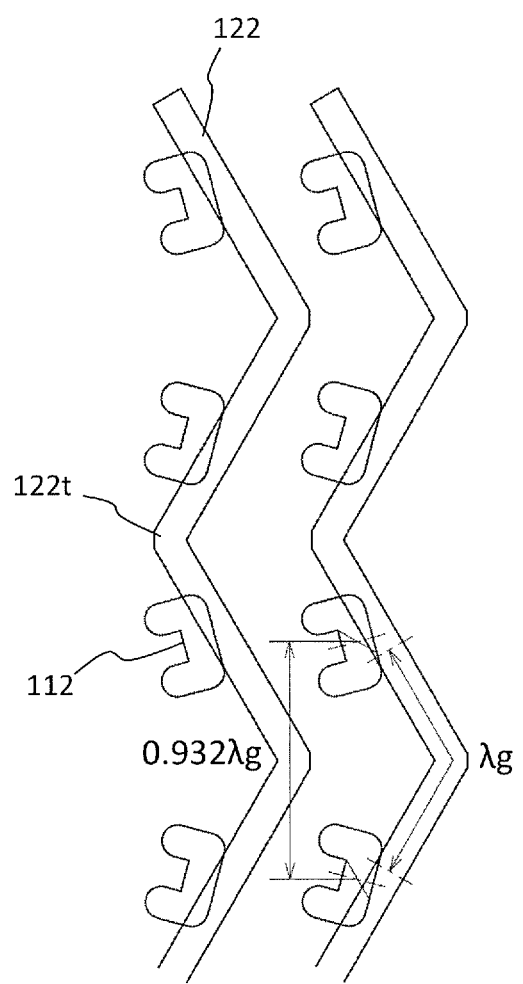
FIG. 35 is an upper plan view schematically showing still another example of a slot array antenna 300 having a plurality of waveguide members 122.

FIG. 35 is an upper plan view schematically showing still another example of a slot array antenna 300 having a plurality of waveguide members 122. This slot array antenna 300 has the following attributes.

TABLE 22

| | |
|---|---|
| A. distance between slots, along waveguide face | $\lambda g$ |
| B. change in direction of waveguide face | changing |
| C. manner of slot coupling | adjoining (oblique) |
| D. angle of deflection of deflecting portion | 60 degrees |
| E. shape of deflecting portion | 1 corner |
| F. slot shape | U shape |
| G. slots/waveguide face | 4 |
| H. number of waveguide faces | 2 |
| I. direction of polarization | horizontal |

Figure 36:
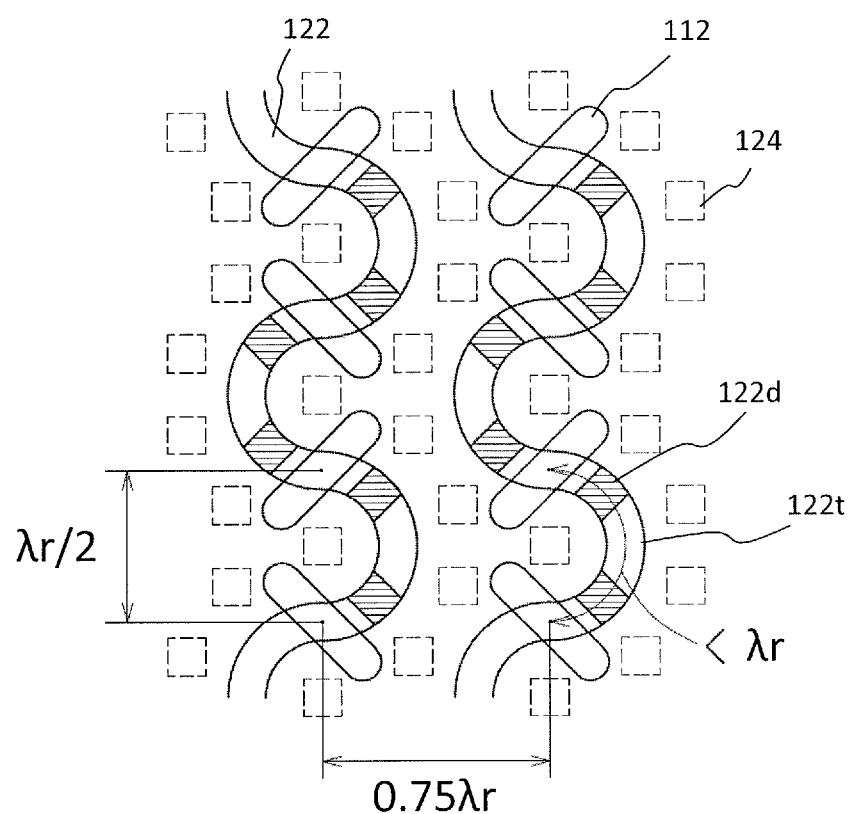
FIG. 36 is an upper plan view schematically showing still another example of a slot array antenna 300 having a plurality of waveguide members 122.

FIG. 36 is an upper plan view schematically showing still another example of a slot array antenna 300 having a plurality of waveguide members 122. This slot array antenna 300 has the following attributes.

TABLE 23

| | |
|---|---|
| A. distance between slots, along waveguide face | $< \lambda r$ |
| B. change in direction of waveguide face | changing |
| C. manner of slot coupling | oblique |
| D. angle of deflection of deflecting portion | 180 degrees |
| E. shape of deflecting portion | curve |
| F. slot shape | linear |
| G. slots/waveguide face | 4 |
| H. number of waveguide faces | 2 |
| I. direction of polarization | vertical |

In this example, a plurality of dents 122d are provided in the waveguide face 122a of each waveguide member 122. The plurality of dents 122d provide similar effects to reducing the wavelength of an electromagnetic wave in the waveguide. Based on a wavelength λr of an imaginary case where such dents 122d were not present (i.e., where the waveguide face 122a was flat), the straight distance between the centers of two adjacent slots is set to λr/2. In this example, the distance between the centers of two slots 112 as measured along the waveguide face 122a, which would equal the perimeter of a semicircle having a diameter of λr/2, is about 0.79λr. By providing the plurality of dents 122d, the distance between two adjacent slots 122 as measured along the waveguide face 122a can be made shorter than λr.

<(4) Construction with Horns>

Figure 37A:
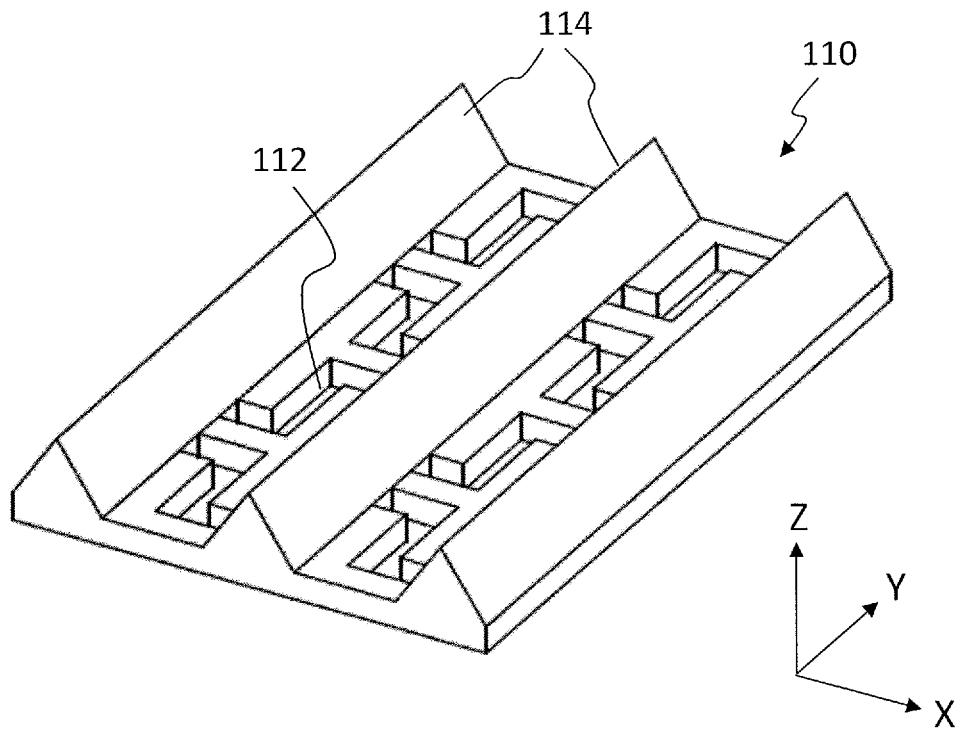
FIG. 37A is a perspective view showing an exemplary construction of a first conductive member 110 having horns 114.
Figure 37B:
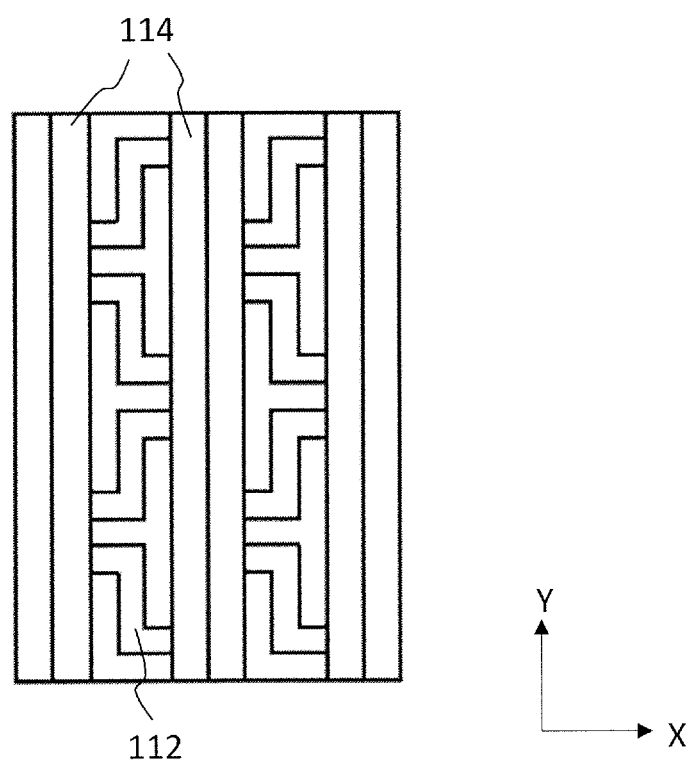
FIG. 37B is an upper plan view showing the structure of FIG. 37A as viewed from the Z direction.

FIG. 37A is a perspective view showing another exemplary construction for the first conductive member 110 in the slot array antenna 300. FIG. 37B is an upper plan view showing the structure of FIG. 37A as viewed from the Z direction. In this example, the first conductive member 110 includes horns 114 on the outer sides of a plurality of slots 112 that are arranged along the Y direction. Each horn 114 in this example is composed of an electrically-conductive structure of a triangular prism shape that protrudes toward the front side (+Z side) of the first conductive member 110 and extends along the Y direction, there being a plurality of such horns 114. Providing the horns 114 improves directivity and impedance matching, thus enhancing the gain. In the examples shown in FIGS. 37A and 37B, a polarized wave whose electric field oscillates along the X direction can be radiated from each slot 112.

Figure 37C:
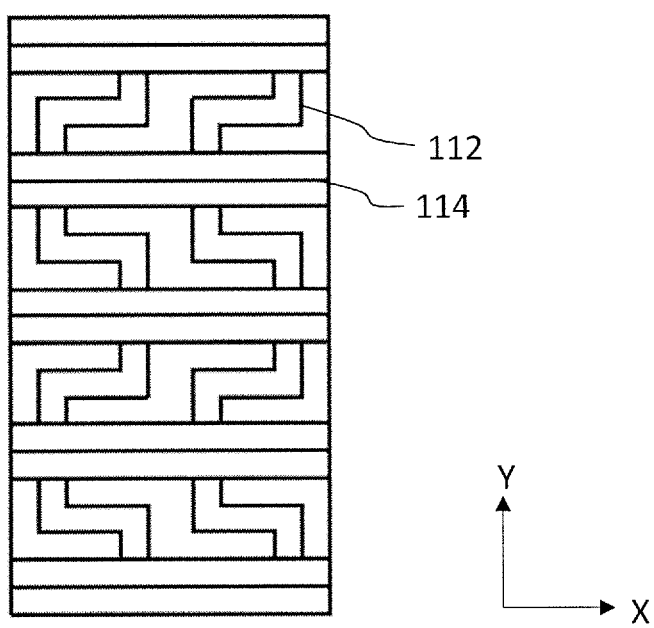
FIG. 37C is a perspective view showing another exemplary construction of a first conductive member 110 having horns 114.

FIG. 37C is a perspective view showing another exemplary construction of a first conductive member 110 having horns 114. In this example, each horn 114 is composed of an electrically-conductive structure of a triangular prism shape that protrudes toward the front side of the first conductive member 110 and extends along the X direction, there being a plurality of such horns 114. In this example, a polarized wave whose electric field oscillates along the Y direction can be radiated from each slot 112.

Next, more specific exemplary constructions for a slot array antenna 300 (also referred to as the "array antenna device 300") having such horns 114 will be described.

Figure 38A:
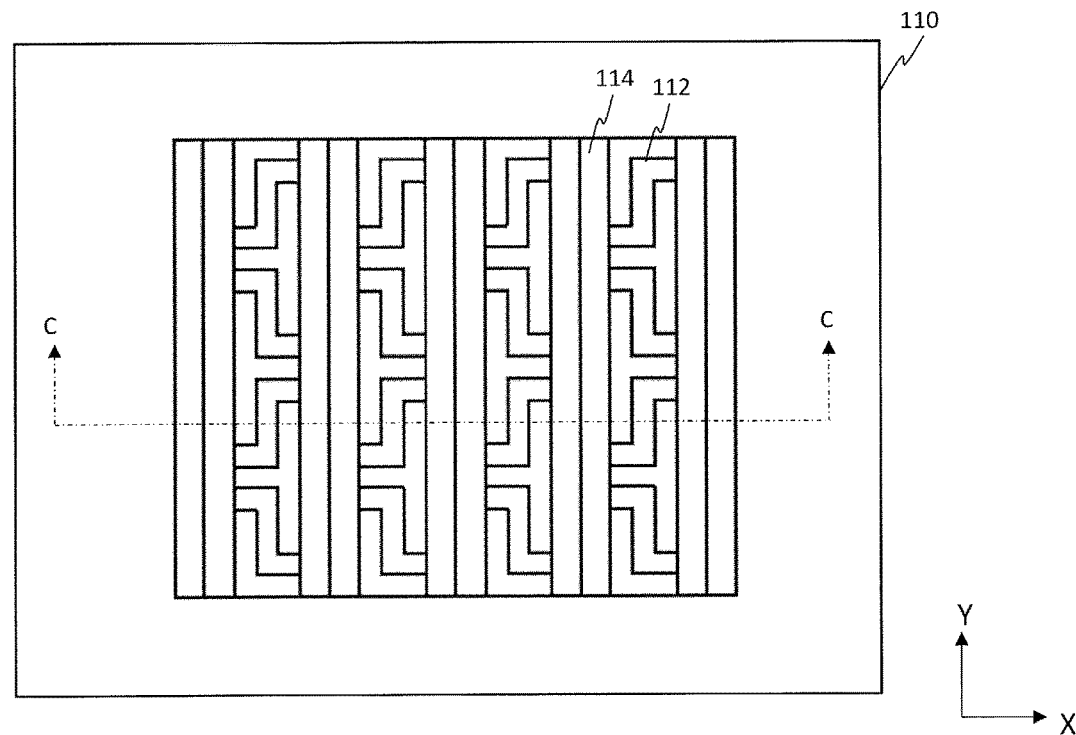
FIG. 38A is an upper plan view showing an array antenna device 300 as viewed from the Z direction.
Figure 38B:
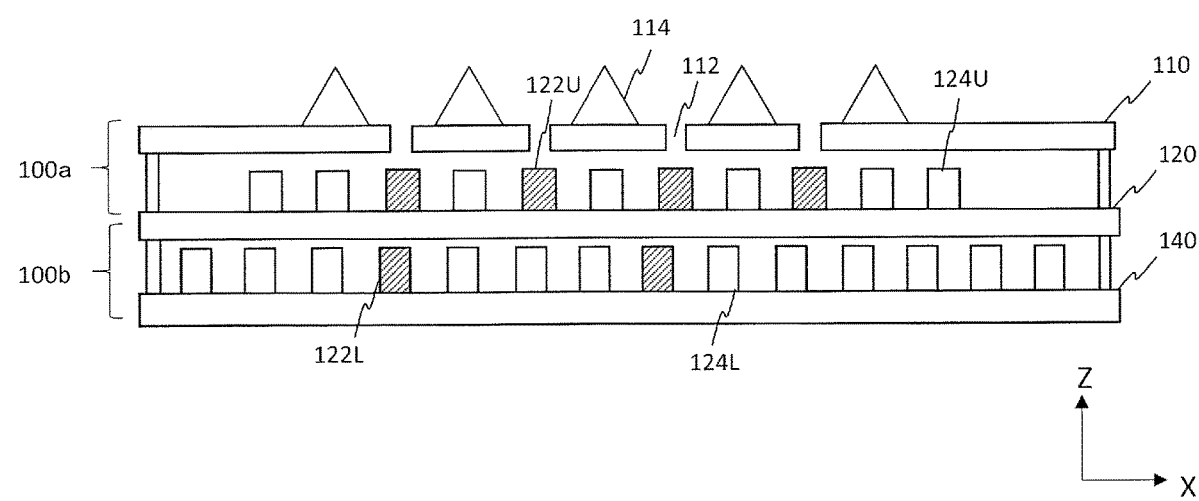
FIG. 38B is a cross-sectional view taken along line C-C in FIG. 38A.

FIG. 38A is an upper plan view showing the array antenna device 300 as viewed from the Z direction. FIG. 38B is a cross-sectional view taken along line C-C in FIG. 38A. In the array antenna device 300 shown in the figure, a first waveguide device 100a having waveguide members 122U that directly couple to the slots 112, and a second waveguide device 100b having another waveguide member 122L that couples to the waveguide members 122U of the first waveguide device 100a are layered. The waveguide member 122L and the conductive rods 124L of the second waveguide device 100b are placed on a third conductive member 140. The second waveguide device 100b is basically similar in construction to the first waveguide device 100a.

As shown in FIG. 38A, the conductive member 110 includes a plurality of slots 112 that are arrayed along a first direction (the Y direction) and a second direction (the X direction) which is orthogonal to the first direction. The waveguide faces 122a of the plurality of waveguide members 122U each extend in a zigzag manner along the Y direction. The waveguide face 122a of each waveguide member 122U is opposed (i.e., couples) to a slot row of four slots 112 that are arranged along the Y direction. Although this example illustrates the conductive member 110 as having 16 slots 112, the number of slots 112 is not limited to this example. Moreover, the shapes and positions of the slots 112 are not limited to this example. For example, the distance between the centers of two adjacent waveguide faces 122a is set to be shorter than the wavelength λo, and more preferably shorter than λo/2.

Figure 38C:
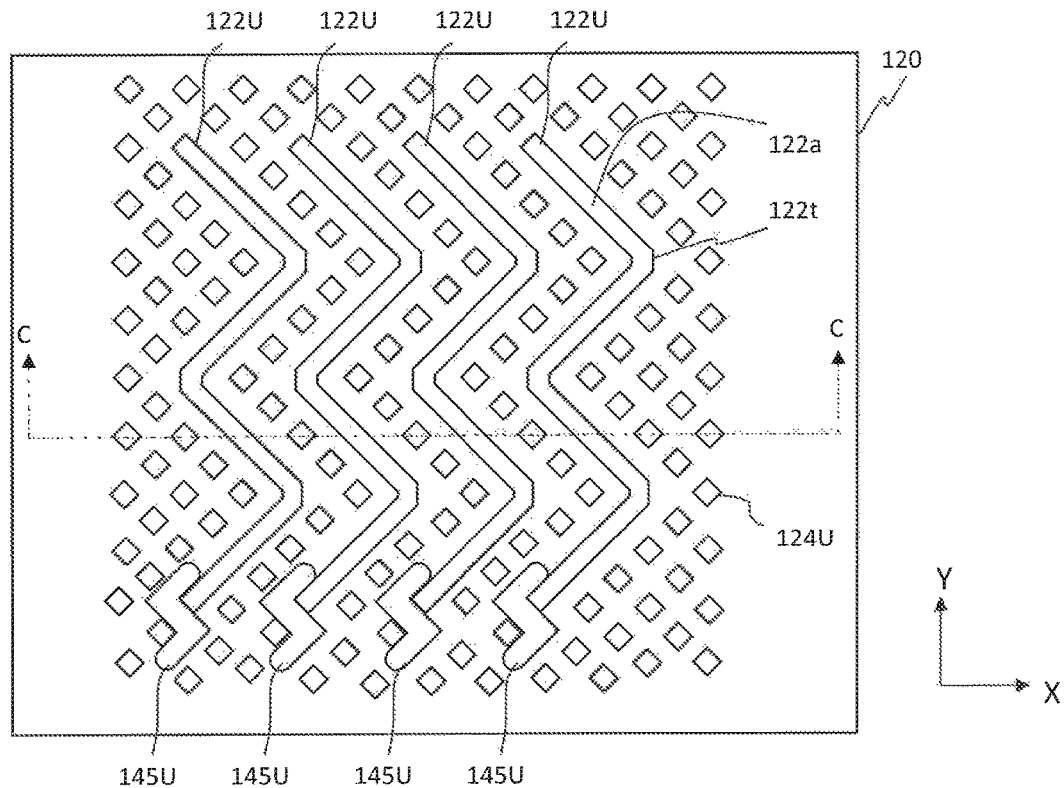
Figure 38D:
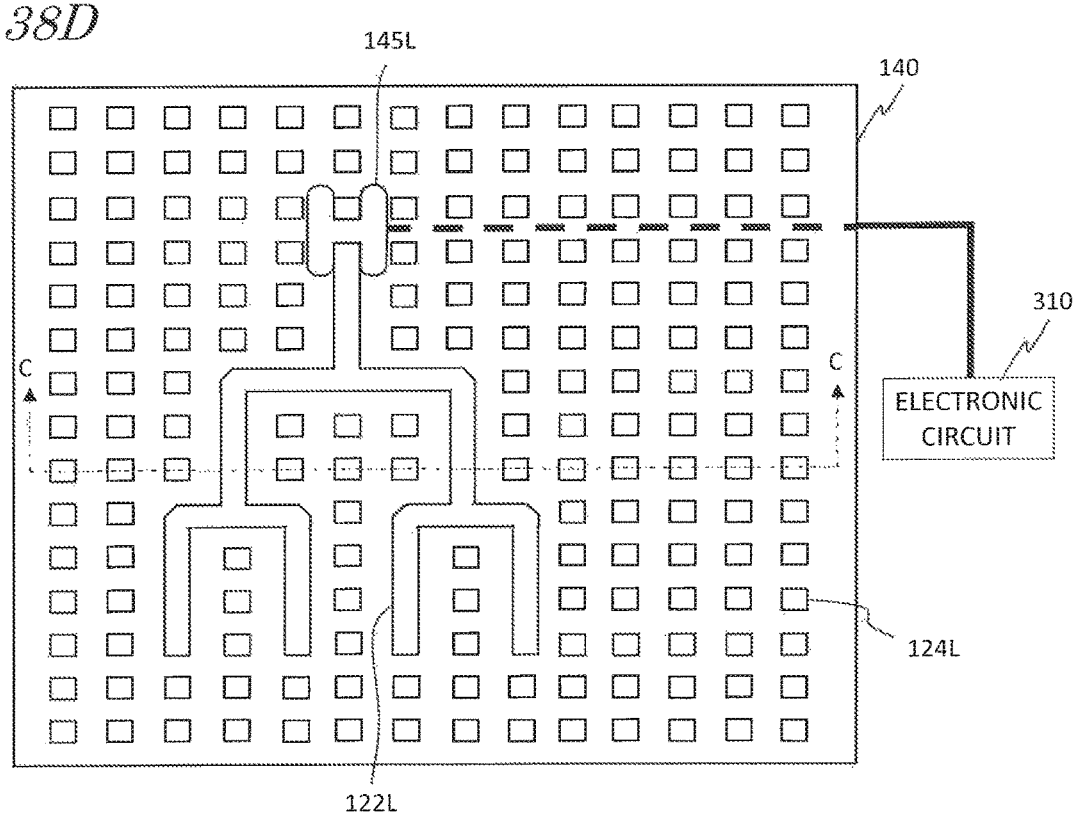
FIG. 38D is a diagram showing a planar layout of a waveguide member 122L in a second waveguide device 100b.

FIG. 38C is a diagram showing a planar layout of waveguide members 122U in the first waveguide device 100a. FIG. 38D is a diagram showing a planar layout of the waveguide member 122L in the second waveguide device 100b. As will be clear from these figures, each waveguide member 122U of the first waveguide device 100a extends in a zigzag manner along the Y direction as a whole. Each waveguide member 122U includes three deflecting portions 122t. On the waveguide face 122a, each slot 112 is opposed to a linear portion between two deflecting portions 122t. On the other hand, the waveguide member 122L of the second waveguide device 100b includes a plurality of branching portions and a plurality of bends. The combination of the "second conductive member 120" and the "third conductive member 140" in the second waveguide device 100b would correspond to the combination of the "first conductive member 110" and the "second conductive member 120" in the first waveguide device 100a.

Each waveguide member 122U of the first waveguide device 100a couples to the waveguide member 122L of the second waveguide device 100b, via a port (opening) 145U in the second conductive member 120. Stated otherwise, an electromagnetic wave which has propagated through the waveguide member 122L of the second waveguide device 100b passes through the port 145U to reach a waveguide member 122U of the first waveguide device 100a, and propagates through the waveguide member 122U of the first waveguide device 100a. In this case, each slot 112 functions as an antenna element (radiating element) to allow an electromagnetic wave which has propagated through the waveguide to be radiated into space. Conversely, when an electromagnetic wave which has propagated in space impinges on a slot 112, the electromagnetic wave couples to the waveguide member 122U of the first waveguide device 100a that lies directly under that slot 112, and propagates through the waveguide member 122U of the first waveguide device 100a. An electromagnetic wave which has propagated through a waveguide member 122U of the first waveguide device 100a may also pass through a port 145U to reach the waveguide member 122L of the second waveguide device 100b, and propagate through the waveguide member 122L of the second waveguide device 100b. Via a port 145L of the third conductive member 140, the waveguide member 122L of the second waveguide device 100b may couple to an external waveguide device or radio frequency circuit (electronic circuit). As one example, FIG. 38D illustrates an electronic circuit 310 which is connected to the port 145L. Without being limited to a specific position, the electronic circuit 310 may be provided at any arbitrary position. The electronic circuit 310 may be provided on a circuit board which is on the rear surface side (i.e., the lower side in FIG. 38B) of the third conductive member 140, for example. Such an electronic circuit may be a microwave integrated circuit, e.g., an MMIC (Monolithic Microwave Integrated Circuit) that generates or receives millimeter waves, for example.

The first conductive member 110 shown in FIG. 38A may be called a "radiation layer". Moreover, the entirety of the second conductive member 120, the waveguide members 122U, and the conductive rods 124U shown in FIG. 38C may be called an "excitation layer", whereas the entirety of the third conductive member 140, the waveguide member 122L, and the conductive rods 124L shown in FIG. 38D may be called a "distribution layer". Moreover, the "excitation layer" and the "distribution layer" may be collectively called a "feeding layer". Each of the "radiation layer", the "excitation layer", and the "distribution layer" can be mass-produced by processing a single metal plate. The radiation layer, the excitation layer, the distribution layer, and any electronic circuitry to be provided on the rear face side of the distribution layer may be produced as a single-module product.

In the array antenna of this example, as can be seen from FIG. 38B, a radiation layer, an excitation layer, and a distribution layer are layered, which are in plate form; therefore, a flat and low-profile flat panel antenna is realized as a whole. For example, the height (thickness) of a multilayer structure having a cross-sectional construction as shown in FIG. 38B can be 10 mm or less.

With the waveguide member 122L shown in FIG. 38D, the distances from the port 145L of the third conductive member 140 to the respective ports 145U (see FIG. 38C) of the second conductive member 120 as measured along the waveguide are all equal. Therefore, from the port 145L of the third conductive member 140, a signal wave which is input to the waveguide member 122L reaches the four ports 145U disposed in the center of the second waveguide member 122U along the Y direction all in the same phase. As a result, the four waveguide members 122U on the second conductive member 120 can be excited in the same phase.

Depending on the application, it is not necessary for all slots 112 functioning as antenna elements to radiate electromagnetic waves in the same phase. The distances from the port 145L of the third conductive member 140 shown in FIG. 38D to the plurality of ports 145U (see FIG. 38C) of the second conductive member 120 as measured along the waveguide may respectively be different. The network patterns of the waveguide members 122 in the excitation layer and the distribution layer (i.e., layer included in the feeding layer) may be arbitrary, without being limited to the implementation shown in the figure.

Via the ports 145U and 145L shown in FIG. 38C and FIG. 38D, the electronic circuit 310 is connected to the waveguide extending on each waveguide member 122U. A signal wave which is output from the electronic circuit 310 branches out on the distribution layer, then propagates over the plurality of waveguide members 122U, and reaches the plurality of slots 112. In order to ensure an identical signal wave phase at the positions of two adjacent slots 112 along the X direction, total waveguide lengths from the electronic circuit 310 to two adjacent slots 112 along the X direction may be designed to be substantially equal, for example.

With the above construction, the slot array antenna 300 is able to transmit or receive electromagnetic waves by using the plurality of slots 112. In the present embodiment, on the waveguide face of each waveguide member, at least one deflecting portion is included between two positions that are opposed to two adjacent slots. As a result, the interval between two adjacent slots can be made shorter than conventional. The constructions shown in FIGS. 38A through 39D are examples, and it may also be possible to construct a similar slot array antenna 300 by combining the structures of various embodiments that have already been described.

<(5) Example where the Second Conductive Member has a Plurality of Slots>

Next, an exemplary construction where the second conductive member 120, rather than the first conductive member 110, has a plurality of slots 112 will be described.

Figure 39:
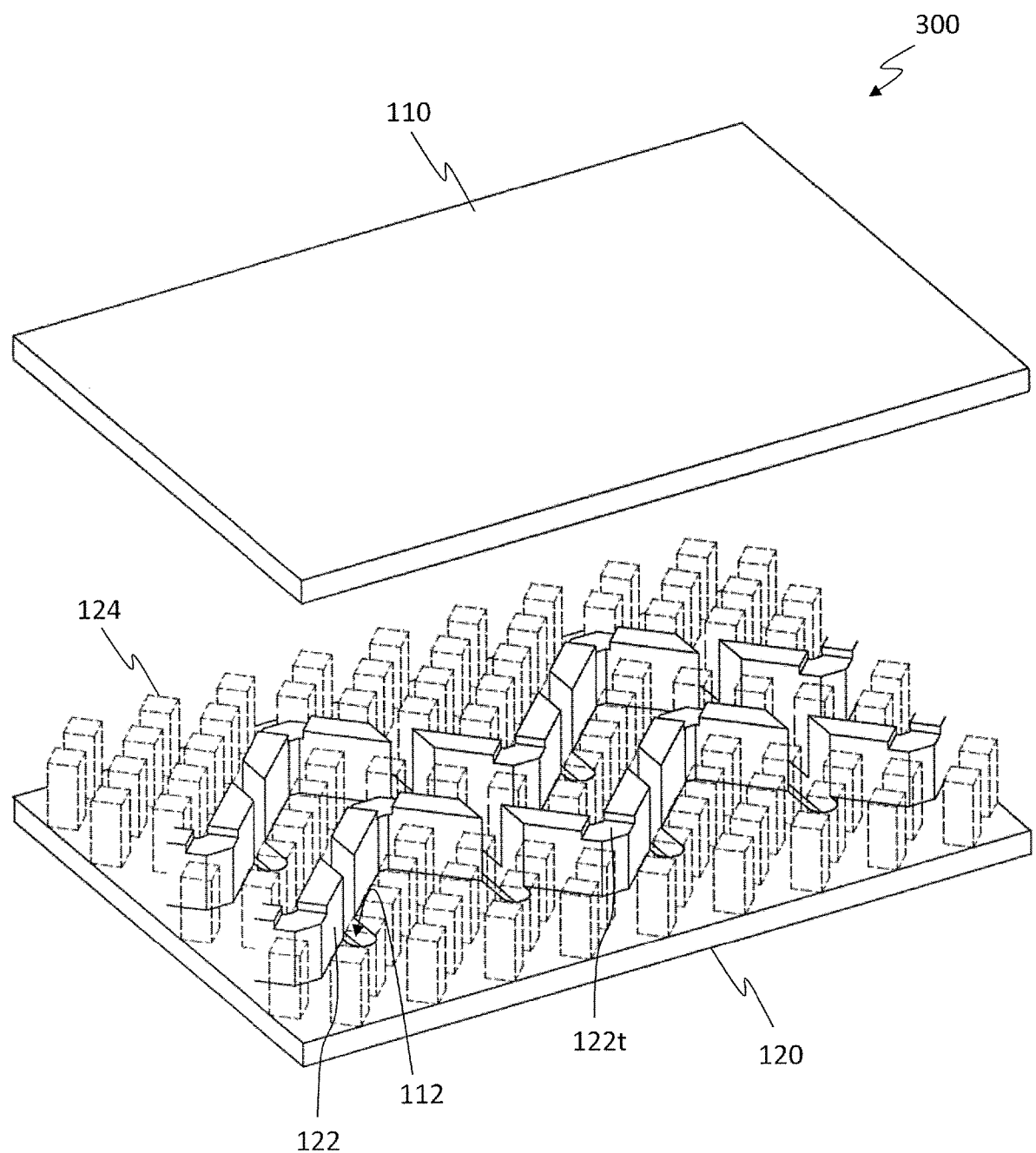
FIG. 39 is a perspective view showing an example where the second conductive member 120 has a plurality of slots 112.

FIG. 39 is a perspective view showing an exemplary construction of a slot array antenna 300 which includes a second conductive member 120 having a plurality of slots 112. The second conductive member 120 includes a slot array of two rows, each row including four slots 112. On the second conductive member 120, two waveguide members 122 and a multitude of conductive rods 124 surrounding them are provided. Each of the plurality of slots 112 splits a waveguide member 122. At the split position of each waveguide member 122, a pair of opposing end faces connect to the inner wall surface of the slot 112.

In this example, the plurality of slots 112 in the second conductive member 120 are open to the external space. Each slot 112 functions as an antenna element. A signal wave which is output from a transmitter and has propagated in a waveguide extending between the first conductive member 110 and the waveguide member 122 is radiated from each slot 112. Conversely, signal waves that have impinged on the plurality of slots 112 propagate through the waveguides, so as to be received by a receiver. The construction in which the slots 112 are open to the external space may take various implementations. For example, each slot may open at the bottom of a horn, such that the slot is open to the external space through the horn. In such construction, the lower conductive surface of the second conductive member 120 as shown in FIG. 39 will have a shape defining a horn. Alternatively, each slot 112 may open into a resonator, such that the resonator is open to the external space. These are also examples of implementations where slots are open to the external space.

The number of waveguide members 122, the number of slots 112, and the orientation of each slot 112 are not limited to the example shown in FIG. 39. The aforementioned various variants are also applicable to any construction where the second conductive member 120 has the plurality of slots 112.

In the slot array antennas 300 of the above embodiments, a plate-shaped second conductive member 120 has a plurality of waveguide members 122 and an artificial magnetic conductor (a plurality of conductive rods 124) provided thereon, and a plate-shaped first conductive member 110 is provided so as to cover over them. Without being limited to such construction, for example, a plurality of slot array antennas may be combined (e.g., bonded together) to construct an antenna device having similar functions to those attained in the present embodiment. In that case, each slot array antenna is structurally similar to a slot array antenna having one row of slots as described in any of the above embodiments; in other words, each slot antenna will include a first conductive member, a second conductive member, a waveguide member therebetween, and an artificial magnetic conductor on both sides of the waveguide member. The plurality of waveguide members of the plurality of slots antennas are arranged side by side. The respective first conductive members and second conductive members of the slot antennas may be parts of a single conductive member of a plate shape.

<(6) Example where Slots Couple to Deflecting Portions>

In the above examples, each slot 112 couples to a linearly-extending portion of the waveguide member 122. However, the slot array antenna according to the present disclosure is not limited to such structure. The slot array antenna may include at least one slot 112 that couple to a deflecting portion(s) 122t of the waveguide member 122.

Figure 40A:
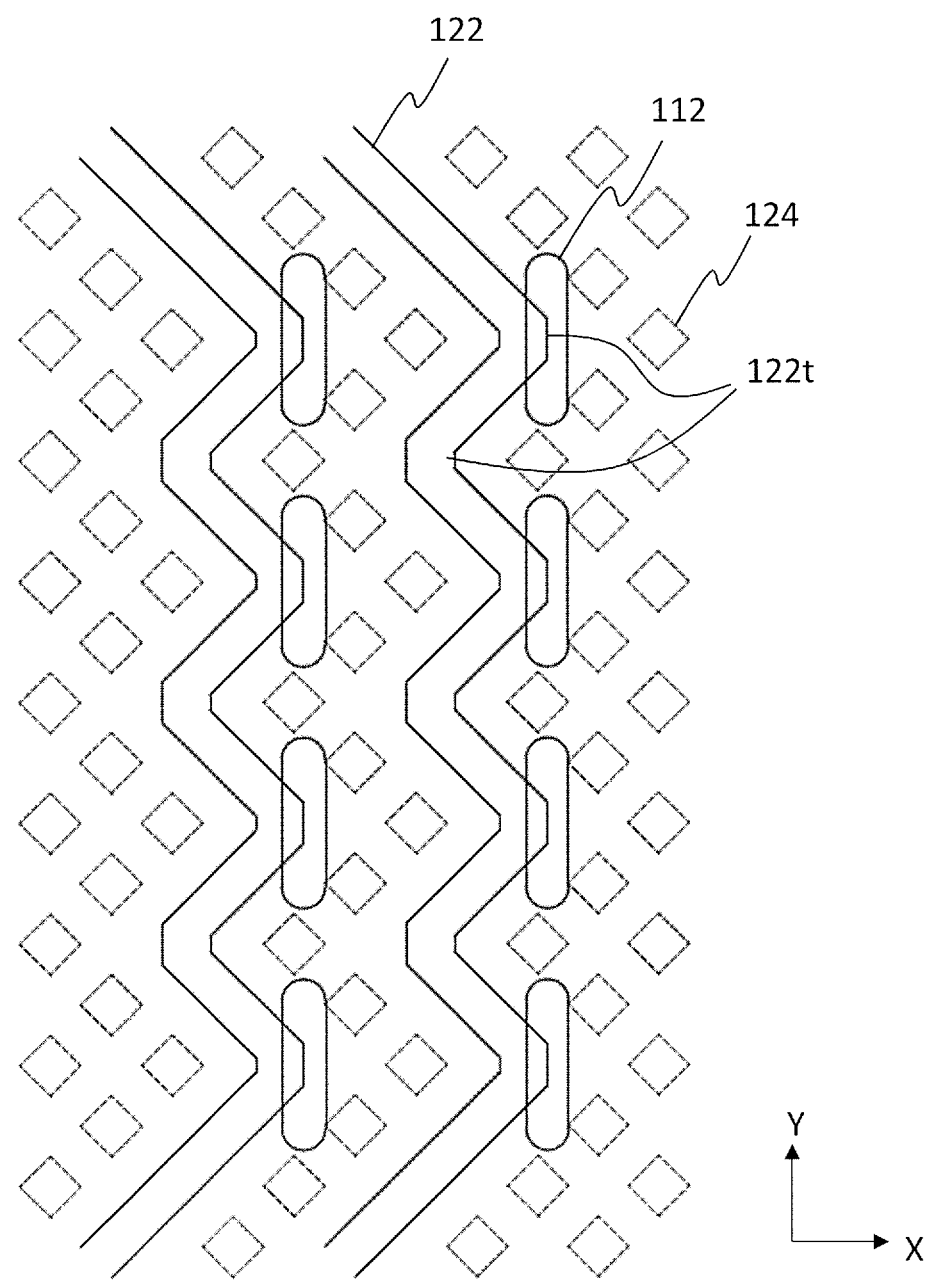
FIG. 40A is an upper plan view showing an example where slots 112 couple to deflecting portions 122t.

FIG. 40A is an upper plan view showing an example where each of a plurality of slots 112 couples to a deflecting portion 122t of a waveguide member 122. The slot array antenna shown in FIG. 40A includes two waveguide members 122 extending in a zigzag manner along the Y direction. The first conductive member has eight slots 112 forming two rows. Four slots 112 that are arranged along the Y direction couple to one waveguide member 122. Each slot 112 is in a position overlapping a deflecting portion 122t of the waveguide member 122 as viewed from the Z direction. The central portion of each slot 112 is opposed to a part of the deflecting portion 122t. Each slot 112 has an I shape extending along the Y direction. Each slot 112 may have any other shape having a small-angle portion which forms a small angle with an edge of the waveguide face of the deflecting portion 122t. The waveguide face of each waveguide member 122 has one deflecting portion 122t between two positions that are respectively coupled to two adjacent slots 112 along the Y direction. The distance between the centers of two adjacent slots 112 as measured along the waveguide face of the waveguide member 122 is around λr. The straight distance between the centers of two adjacent slots 112 may be e.g. 0.707λr, along both the X direction and the Y direction. The slot array antenna shown in FIG. 40A is able to transmit or receive a radio wave having a field component in the X direction.

Figure 40B:
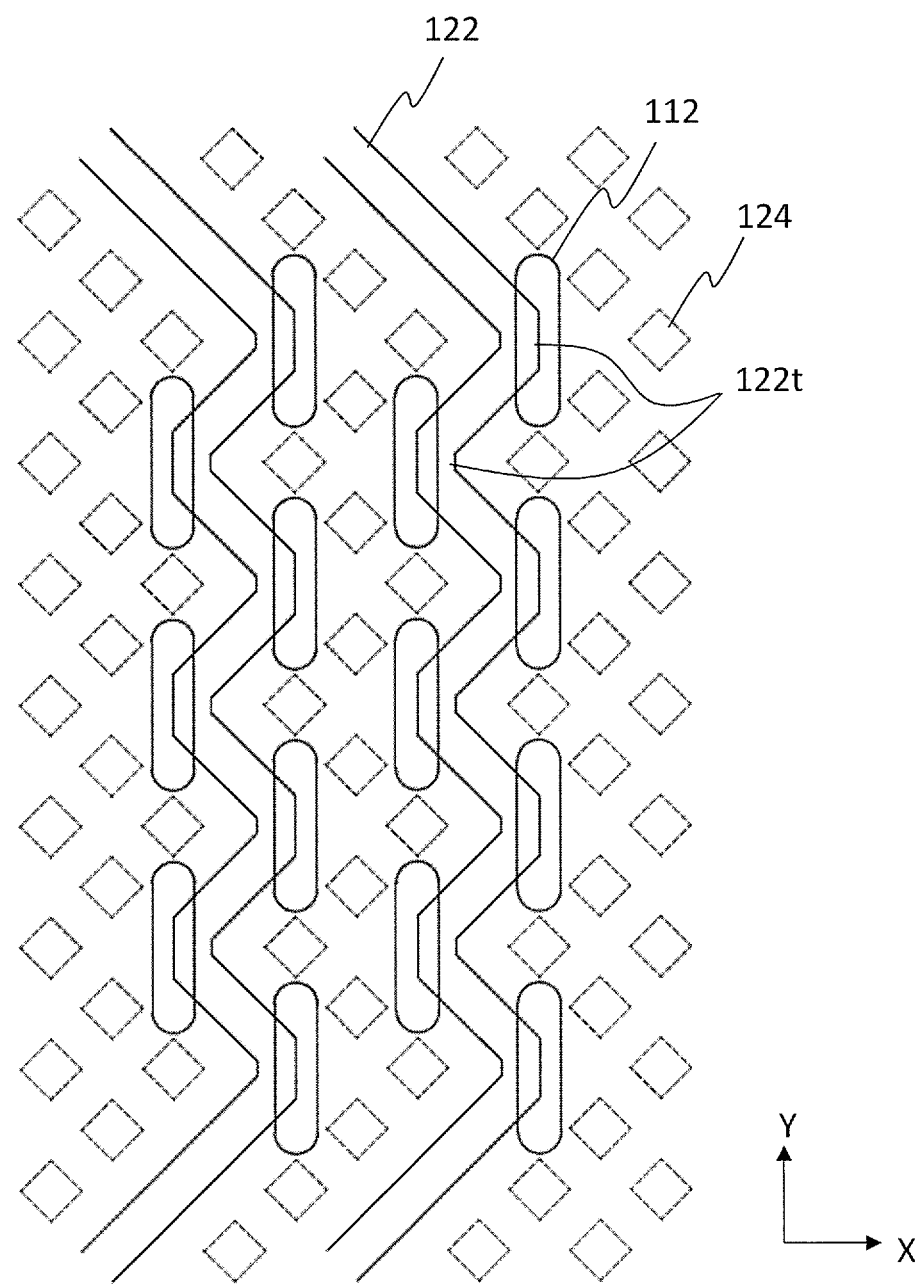
FIG. 40B is an upper plan view showing another example where slots 112 couple to deflecting portions 122t.

FIG. 40B is an upper plan view showing another example where each of a plurality of slots 112 couples to a deflecting portion 122t of a waveguide member 122. This slot array antenna is based on the construction shown in FIG. 40A, with six more slots 112 being added. Each of these six additional slots 112 also couples to a deflecting portion 122t. In the example of FIG. 40B, the waveguide face of each waveguide member 122 does not have a deflecting portion 122t between two positions respectively coupling to two adjacent slots 112. The distance between the centers of two adjacent slots 112 as measured along the waveguide face of the waveguide member 122 is about λr/2. A signal wave propagating along each waveguide member 122 will differ in phase by π at the positions of two adjacent slots 112. One of the two adjacent slots 112 is located near one edge of the waveguide face, while the other slot is located near the other edge of the waveguide face. As a result, if a signal wave propagating along the waveguide member 122 is identical in phase at the positions of two adjacent slots 112, the radio waves to be radiated by the two slots 112 will differ in phase by π. In this example, since the signal wave differ in phase by π, the electromagnetic waves to be transmitted or received at the two slots 112 will be equal in phase. The density with which the slots 112 are arranged is twice the density in the example of FIG. 40A. The slot array antenna shown in FIG. 41B is able to transmit or receive a radio wave having a field component in the X direction.

Figure 40C:
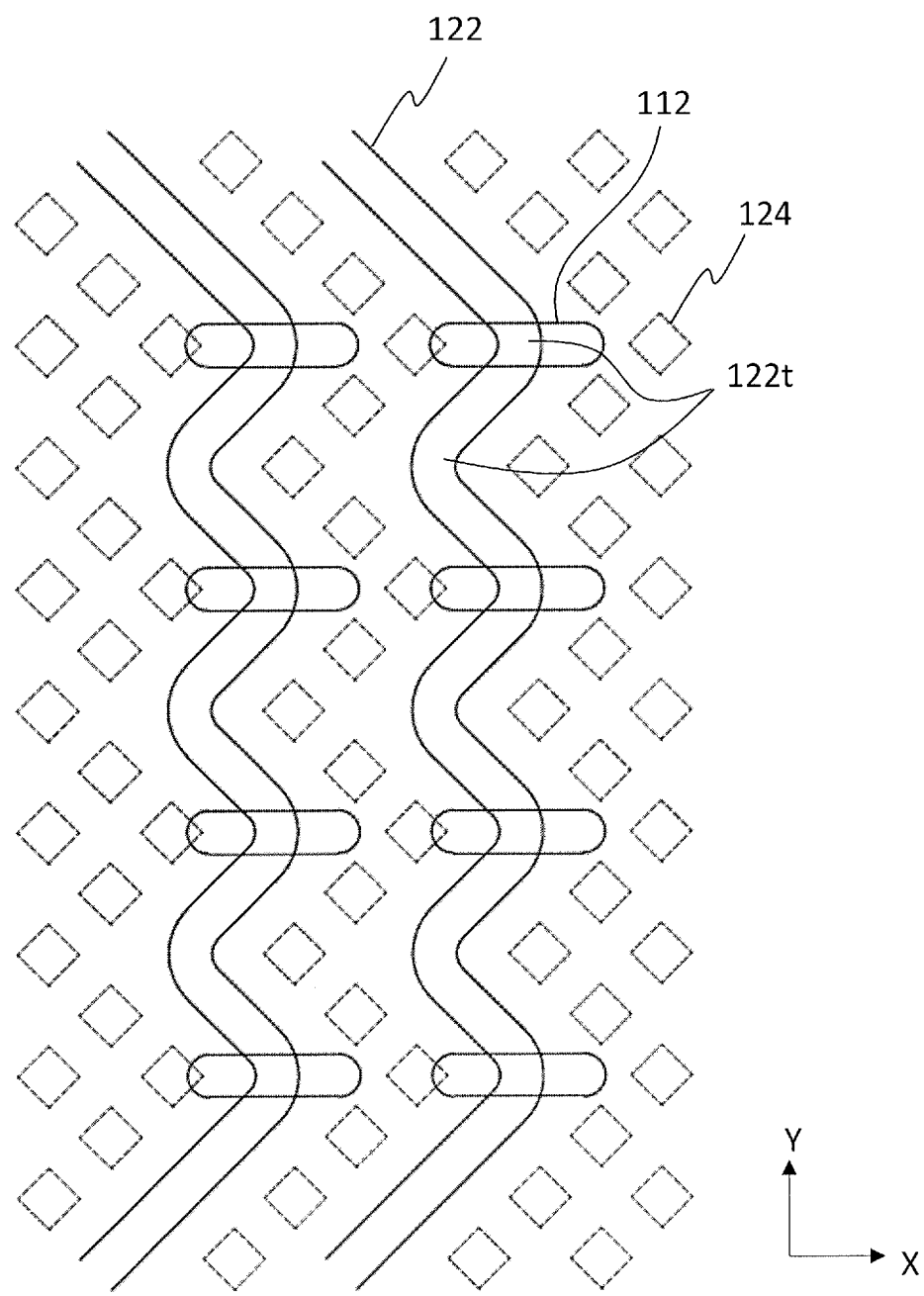
FIG. 40C is an upper plan view showing still another example where slots 112 couple to deflecting portions 122t.

FIG. 40C is an upper plan view showing still another example where each of a plurality of slots 112 couples to a deflecting portion 122t of a waveguide member 122. In this slot array antenna, the direction that each slot 112 extends coincides with the X direction. Each waveguide member 122 couples to four slots 112 that are arranged along the Y direction. Each slot 112 intersects the waveguide face at a deflecting portion 112t. The waveguide face of the waveguide member 122 includes a deflecting portion 122t between two positions respectively coupling to two adjacent slots 112. The straight distance between the centers of two adjacent slots 112 is e.g. 0.707λr, along both the X direction and the Y direction. The slot array antenna shown in FIG. 40C is able to transmit or receive a radio wave having a field component in the Y direction.

As in the examples shown in FIGS. 40A through 40C, the waveguide face of each waveguide member 122 may include at least two deflecting portions 122t respectively coupling to two slots 112.

The present specification employs the term "artificial magnetic conductor" in describing the technique according to the present disclosure, this being in line with what is set forth in a paper by one of the inventors Kirino (Non-Patent Document 1) as well as a paper by Kildal et al., who published a study directed to related subject matter around the same time. However, it has been found through a study by the inventors that the invention according to the present disclosure does not necessarily require an "artificial magnetic conductor" under its conventional definition. That is, while a periodic structure has been believed to be a requirement for an artificial magnetic conductor, the invention according to the present disclosure does not necessary require a periodic structure in order to be practiced.

The artificial magnetic conductor that is described in the present disclosure consists of rows of conductive rods. Therefore, in order to prevent electromagnetic waves from leaking away from the waveguide face, it has been believed essential that there exist at least two rows of conductive rods on one side of the waveguide member(s), such rows of conductive rods extending along the waveguide member(s) (ridge(s)). The reason is that it takes at least two rows of conductive rods for them to have a "period". However, according to a study by the inventors, even when only one row of conductive rods exists between two waveguide members that extend in parallel to each other, the intensity of a signal that leaks from one waveguide member to the other waveguide member can be suppressed to −10 dB or less, which is a practically sufficient value in many applications. The reason why such a sufficient level of separation is achieved with only an imperfect periodic structure is so far unclear. However, in view of this fact, in the present disclosure, the notion of "artificial magnetic conductor" is extended so that the term also encompasses a structure including only one row of conductive rods.

<Other Variants>

Next, variants of waveguide structures including the waveguide member 122, the conductive members 110 and 120, and the plurality of conductive rods 124 will be described. The following variants are applicable to the WRG structure in any place in each embodiment described above.

Figure 41A:
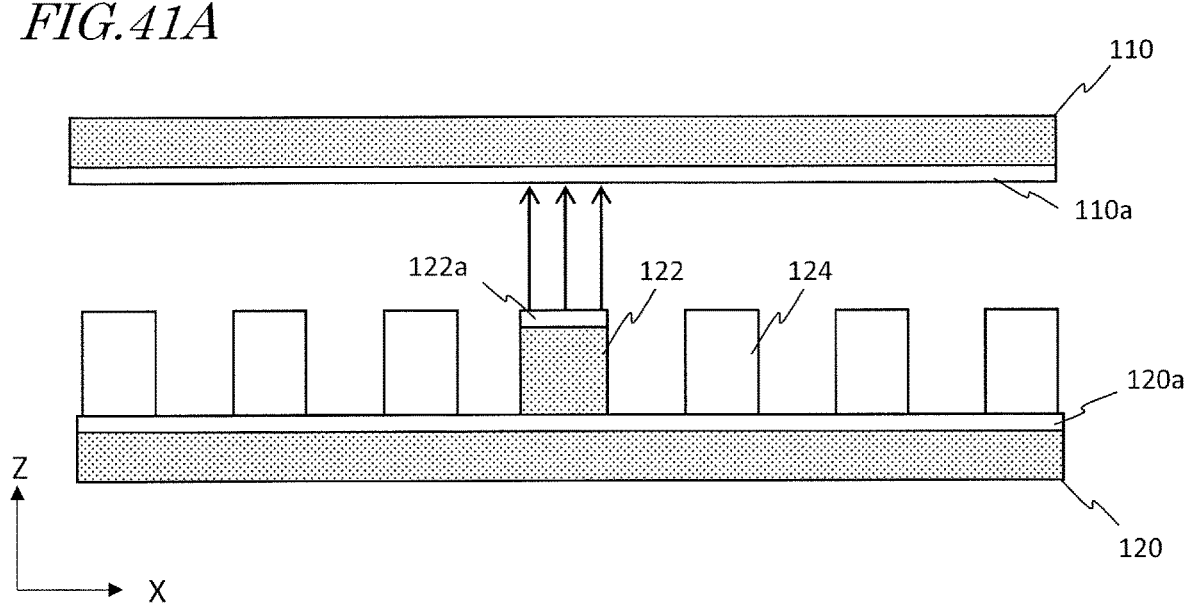
FIG. 41A is a cross-sectional view showing an exemplary structure in which only a waveguide face 122a, defining an upper face of the waveguide member 122, is electrically conductive, while any portion of the waveguide member 122 other than the waveguide face 122a is not electrically conductive.
Figure 41B:
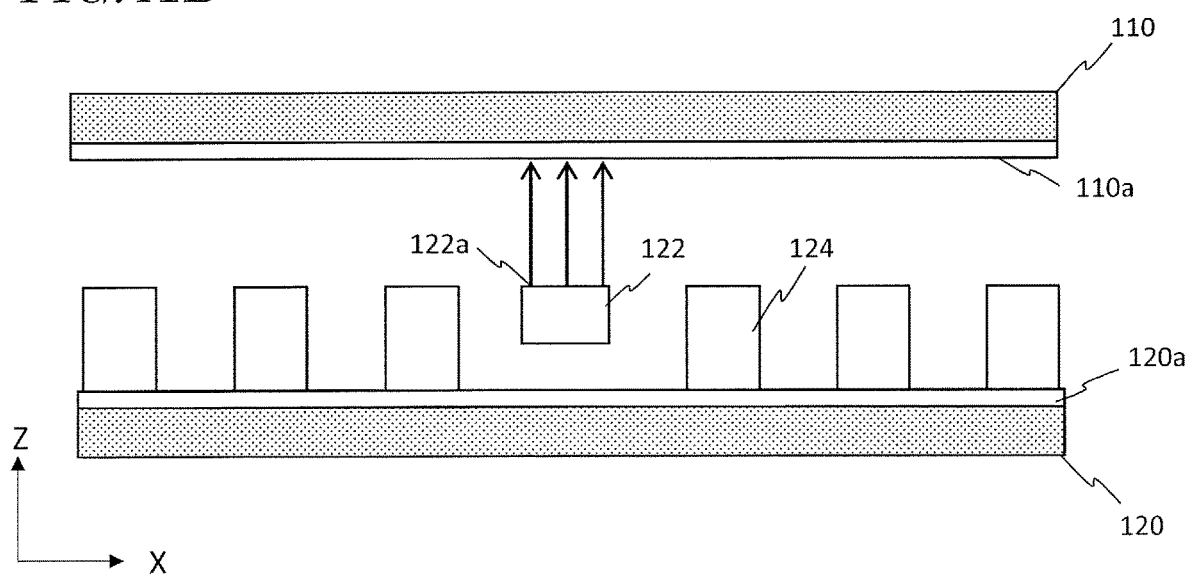
FIG. 41B is a diagram showing a variant in which the waveguide member 122 is not formed on the conductive member 120.

FIG. 41A is a cross-sectional view showing an exemplary structure in which only the waveguide face 122a, defining an upper face of the waveguide member 122, is electrically conductive, while any portion of the waveguide member 122 other than the waveguide face 122a is not electrically conductive. Both of the conductive member 110 and the conductive member 120 alike are only electrically conductive at their surface that has the waveguide member 122 provided thereon (i.e., the conductive surface 110a, 120a), while not being electrically conductive in any other portions. Thus, each of the waveguide member 122, the conductive member 110, and the conductive member 120 does not need to be electrically conductive.

FIG. 41B is a diagram showing a variant in which the waveguide member 122 is not formed on the conductive member 120. In this example, the waveguide member 122 is fixed to a supporting member (e.g., the inner wall of the housing) that supports the conductive member 110 and the conductive member. A gap exists between the waveguide member 122 and the conductive member 120. Thus, the waveguide member 122 does not need to be connected to the conductive member 120.

Figure 41C:
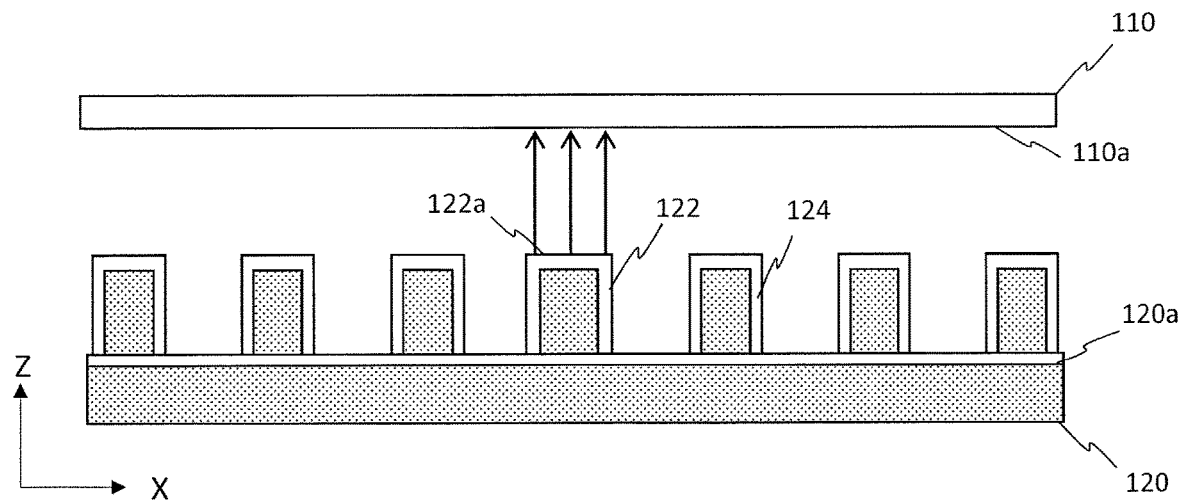
FIG. 41C is a diagram showing an exemplary structure where the conductive member 120, the waveguide member 122, and each of the plurality of conductive rods 124 are composed of a dielectric surface that is coated with an electrically conductive material such as a metal.

FIG. 41C is a diagram showing an exemplary structure where the conductive member 120, the waveguide member 122, and each of the plurality of conductive rods 124 are composed of a dielectric surface that is coated with an electrically conductive material such as a metal. The conductive member 120, the waveguide member 122, and the plurality of conductive rods 124 are connected to one another via the electrical conductor. On the other hand, the conductive member 110 is made of an electrically conductive material such as a metal.

Figure 41D:
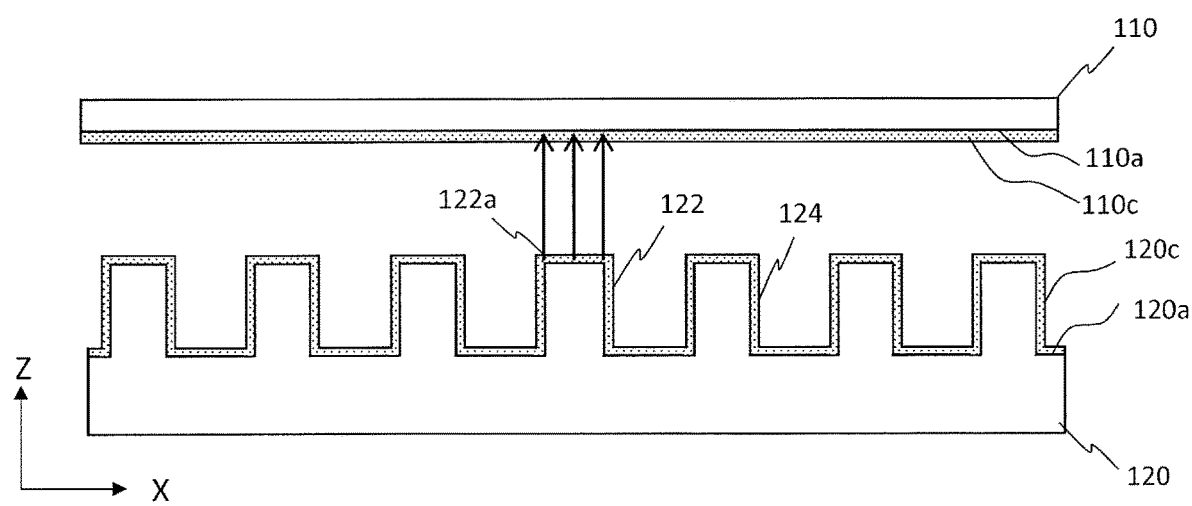
FIG. 41D is a diagram showing an exemplary structure in which the surface of metal conductive members, which are electrical conductors, are covered with a dielectric layer.
Figure 41E:
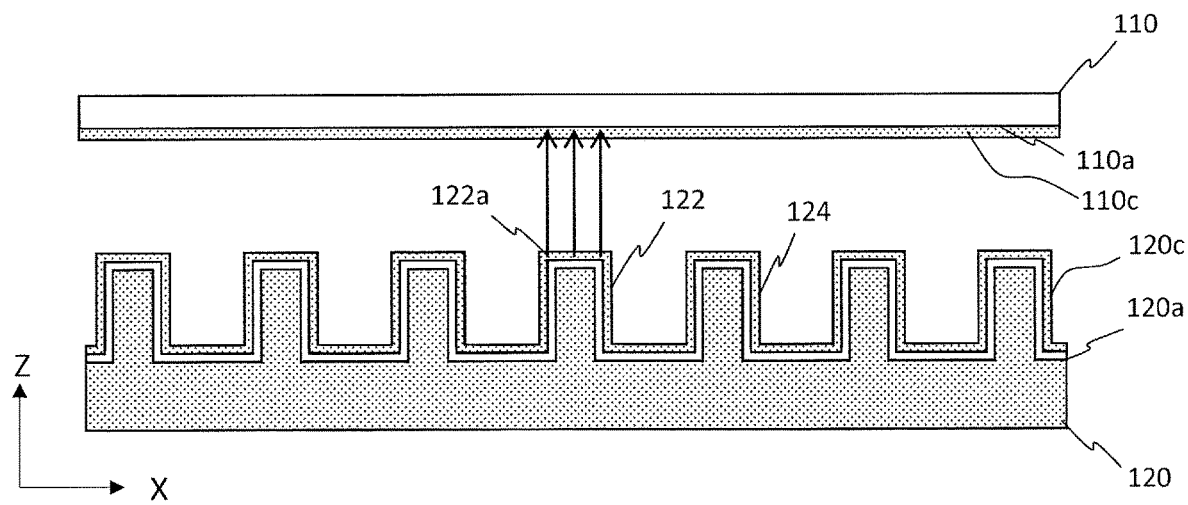
FIG. 41E is a diagram showing an example where the conductive member 120 is structured so that the surface of members which are composed of a dielectric, e.g., resin, is covered with an electrical conductor such as a metal, this metal layer being further coated with a dielectric layer.

FIG. 41D and FIG. 41E are diagrams each showing an exemplary structure in which dielectric layers 110c and 120c are respectively provided on the outermost surfaces of conductive members 110 and 120, a waveguide member 122, and conductive rods 124. FIG. 41D shows an exemplary structure in which the surface of metal conductive members, which are electrical conductors, are covered with a dielectric layer. FIG. 41E shows an example where the conductive member 120 is structured so that the surface of members which are composed of a dielectric, e.g., resin, is covered with an electrical conductor such as a metal, this metal layer being further coated with a dielectric layer. The dielectric layer that covers the metal surface may be a coating of resin or the like, or an oxide film of passivation coating or the like which is generated as the metal becomes oxidized.

The dielectric layer on the outermost surface will allow losses to be increased in the electromagnetic wave propagating through the WRG waveguide, but is able to protect the conductive surfaces 110a and 120a (which are electrically conductive) from corrosion. It also prevents short-circuiting even if a DC voltage, or an AC voltage of such a low frequency that it is not capable of propagation on certain WRG waveguides is applied on a conductor line that is located in a place where it may come in contact with the conductive rods 124.

Figure 41F:
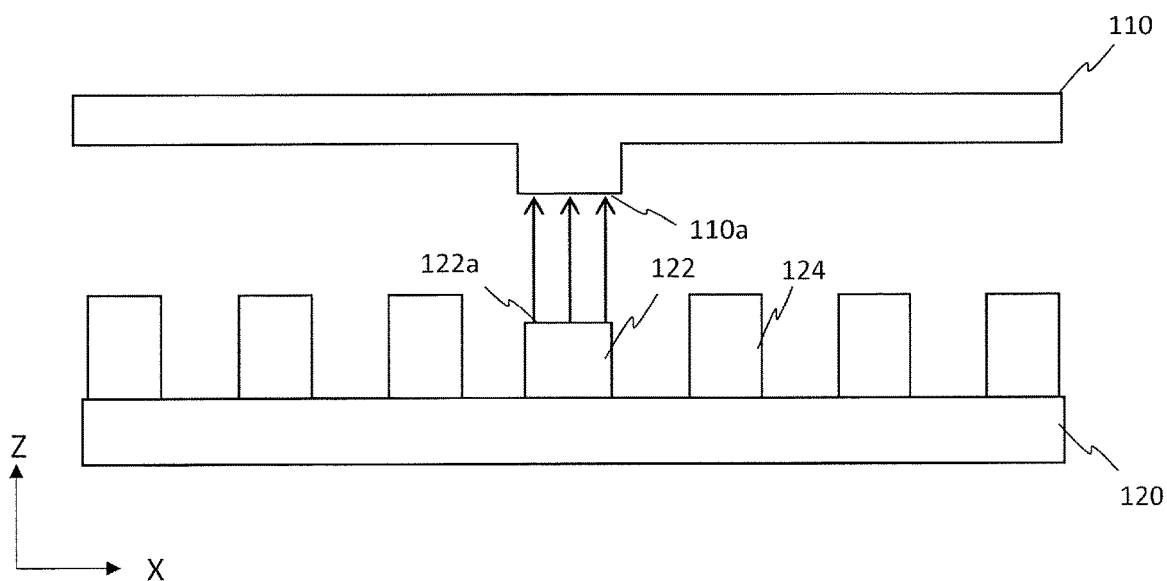
FIG. 41F is a diagram showing an example where the height of the waveguide member 122 is lower than the height of the conductive rods 124, and a portion of a conductive surface 110a of the conductive member 110 that opposes the waveguide face 122a protrudes toward the waveguide member 122.

FIG. 41F is a diagram showing an example where the height of the waveguide member 122 is lower than the height of the conductive rods 124, and the portion of the conductive surface 110a of the conductive member 110 that opposes the waveguide face 122a protrudes toward the waveguide member 122. Even such a structure will operate in a similar manner to the above-described embodiment, so long as the ranges of dimensions depicted in FIG. 4 are satisfied.

Figure 41G:
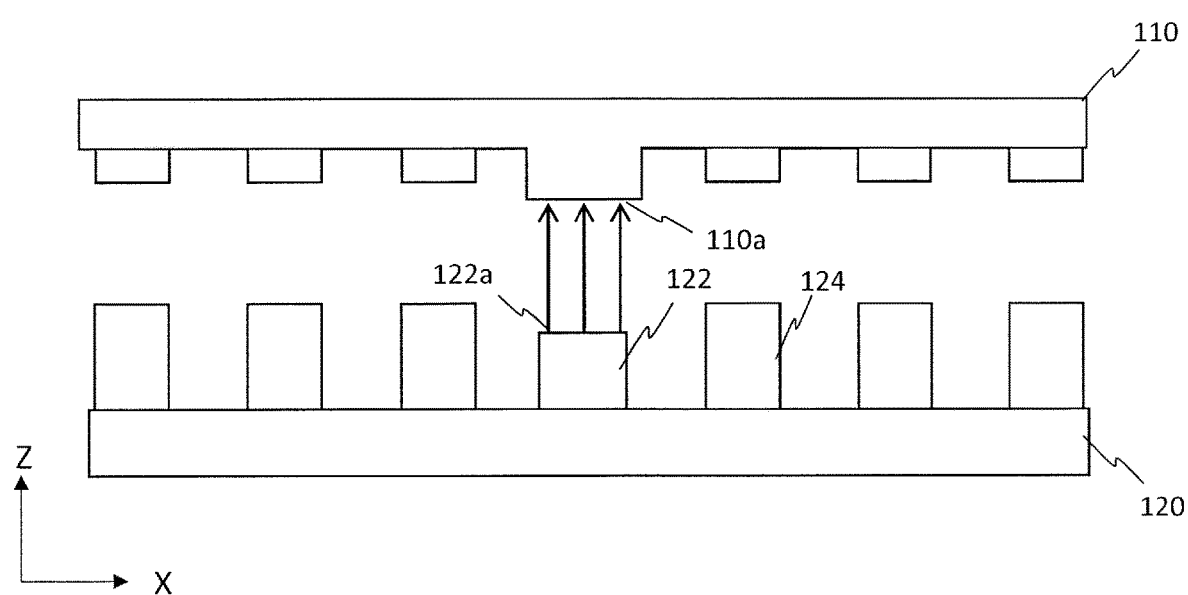
FIG. 41G is a diagram showing an example where, further in the structure of FIG. 41F, portions of the conductive surface 110a that oppose the conductive rods 124 protrude toward the conductive rods 124.

FIG. 41G is a diagram showing an example where, further in the structure of FIG. 41F, portions of the conductive surface 110a that oppose the conductive rods 124 protrude toward the conductive rods 124. Even such a structure will operate in a similar manner to the above-described embodiment, so long as the ranges of dimensions depicted in FIG. 4 are satisfied. Instead of a structure in which the conductive surface 110a partially protrudes, a structure in which the conductive surface 110a is partially dented may be adopted.

Figure 41H:
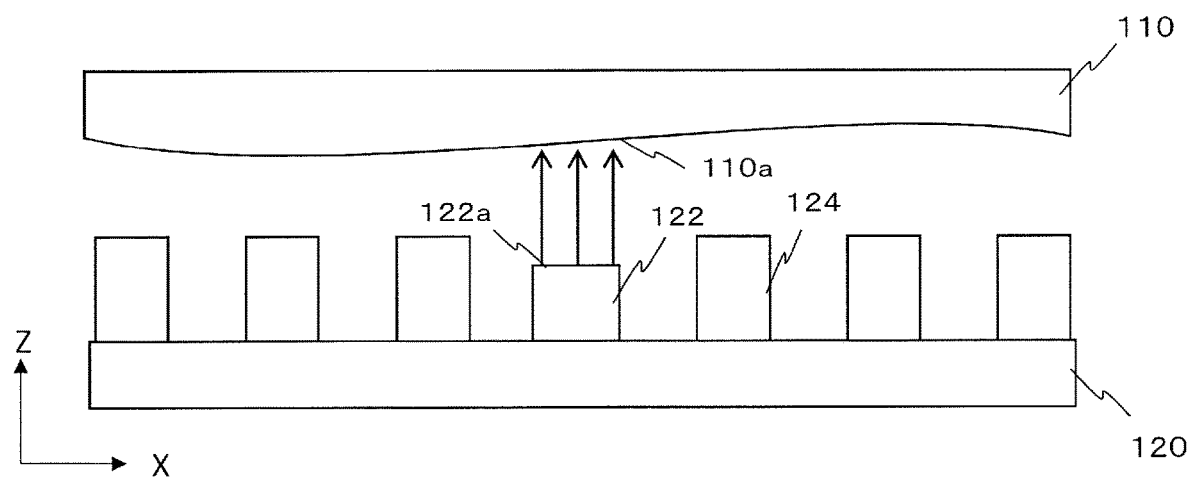
FIG. 41H is a diagram showing an example where a conductive surface 110a of the conductive member 110 is shaped as a curved surface.
Figure 41I:
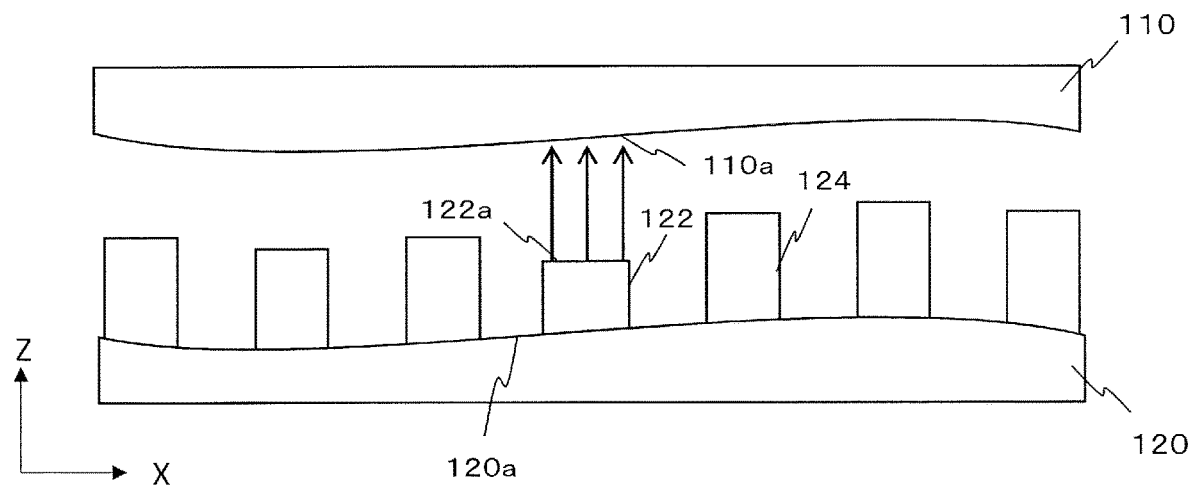
FIG. 41I is a diagram showing an example where also a conductive surface 120a of the conductive member 120 is shaped as a curved surface.

FIG. 41H is a diagram showing an example where a conductive surface 110a of the conductive member 110 is shaped as a curved surface. FIG. 41I is a diagram showing an example where also a conductive surface 120a of the conductive member 120 is shaped as a curved surface. As demonstrated by these examples, the conductive surfaces 110a and 120a may not be shaped as planes, but may be shaped as curved surfaces.

A slot array antenna or antenna device according to an embodiment of the present disclosure can be suitably used in a radar device (hereinafter simply referred to as a "radar") or a radar system to be incorporated in moving entities such as vehicles, marine vessels, aircraft, robots, or the like, for example. A radar would include a slot array antenna according to an embodiment of the present disclosure and a microwave integrated circuit that is connected to the slot array antenna. A radar system would include the radar device and a signal processing circuit that is connected to the microwave integrated circuit of the radar device. An antenna device according to an embodiment of the present disclosure includes a WRG structure which permits downsizing, and thus allows the area of the face on which antenna elements are arrayed to be significantly reduced, as compared to a construction in which a conventional hollow waveguide is used. Therefore, a radar system incorporating the antenna device can be easily mounted in a narrow place such as a face of a rearview mirror in a vehicle that is opposite to its specular surface, or a small-sized moving entity such as a UAV (an Unmanned Aerial Vehicle, a so-called drone). Note that, without being limited to the implementation where it is mounted in a vehicle, a radar system may be used while being fixed on the road or a building, for example.

A slot array antenna according to an embodiment of the present disclosure can also be used in a wireless communication system. Such a wireless communication system would include a slot array antenna according to any of the above embodiments and a communication circuit (a transmission circuit or a reception circuit). Details of exemplary applications to wireless communication systems will be described later.

A slot array antenna according to an embodiment of the present disclosure can further be used as an antenna in an indoor positioning system (IPS). An indoor positioning system is able to identify the position of a moving entity, such as a person or an automated guided vehicle (AGV), that is in a building. An array antenna can also be used as a radio wave transmitter (beacon) for use in a system which provides information to an information terminal device (e.g., a smartphone) that is carried by a person who has visited a store or any other facility. In such a system, once every several seconds, a beacon may radiate an electromagnetic wave carrying an ID or other information superposed thereon, for example. When the information terminal device receives this electromagnetic wave, the information terminal device transmits the received information to a remote server computer via telecommunication lines. Based on the information that has been received from the information terminal device, the server computer identifies the position of that information terminal device, and provides information which is associated with that position (e.g., product information or a coupon) to the information terminal device.

Application Example 1: Onboard Radar System

Next, as an Application Example of utilizing the above-described slot array antenna, an instance of an onboard radar system including a slot array antenna will be described. A transmission wave used in an onboard radar system may have a frequency of e.g. 76 gigahertz (GHz) band, which will have a wavelength $\lambda o$ of about 4 mm in free space.

In safety technology of automobiles, e.g., collision avoidance systems or automated driving, it is particularly essential to identify one or more vehicles (targets) that are traveling ahead of the driver's vehicle. As a method of identifying vehicles, techniques of estimating the directions of arriving waves by using a radar system have been under development.

Figure 42:
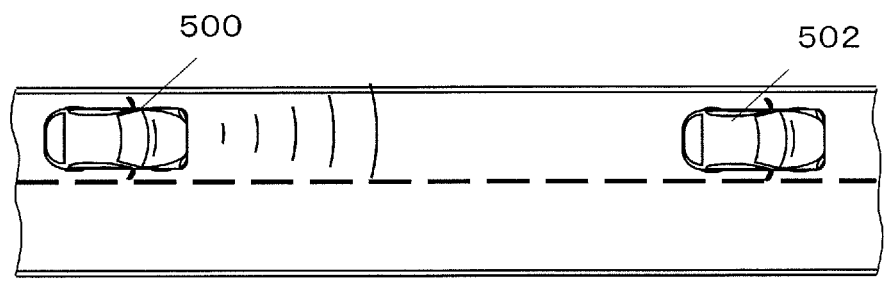
FIG. 42 is a diagram showing a driver's vehicle 500, and a preceding vehicle 502 that is traveling in the same lane as the driver's vehicle 500.

FIG. 42 shows a driver's vehicle 500, and a preceding vehicle 502 that is traveling in the same lane as the driver's vehicle 500. The driver's vehicle 500 includes an onboard radar system which incorporates a slot array antenna according to any of the above-described embodiments. When the onboard radar system of the driver's vehicle 500 radiates a radio frequency transmission signal, the transmission signal reaches the preceding vehicle 502 and is reflected therefrom, so that a part of the signal returns to the driver's vehicle 500. The onboard radar system receives this signal to calculate a position of the preceding vehicle 502, a distance ("range") to the preceding vehicle 502, velocity, etc.

Figure 43:
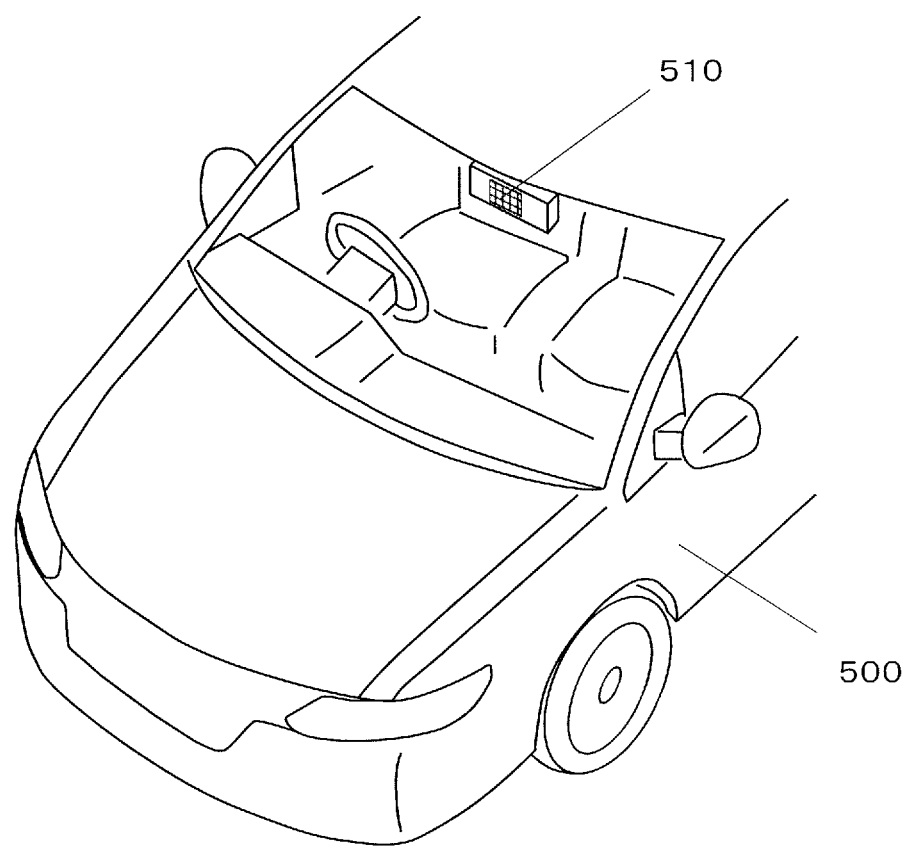
FIG. 43 is a diagram showing an onboard radar system 510 of the driver's vehicle 500.

FIG. 43 shows the onboard radar system 510 of the driver's vehicle 500. The onboard radar system 510 is provided within the vehicle. More specifically, the onboard radar system 510 is disposed on a face of the rearview mirror that is opposite to its specular surface. From within the vehicle, the onboard radar system 510 radiates a radio frequency transmission signal in the direction of travel of the vehicle 500, and receives a signal(s) which arrives from the direction of travel.

The onboard radar system 510 of this Application Example includes a slot array antenna according to an embodiment of the present disclosure. The slot array antenna may include a plurality of waveguide members that are parallel to one another. They are to be arranged so that the plurality of waveguide members each extend in a direction which coincides with the vertical direction, and that the plurality of waveguide members are arranged in a direction which coincides with the horizontal direction. As a result, the lateral and vertical dimensions of the plurality of slots as viewed from the front can be further reduced.

Exemplary dimensions of an antenna device including the above array antenna may be 60 mm (wide)×30 mm (long)× 10 mm (deep). It will be appreciated that this is a very small size for a millimeter wave radar system of the 76 GHz band.

Note that many a conventional onboard radar system is provided outside the vehicle, e.g., at the tip of the front nose. The reason is that the onboard radar system is relatively large in size, and thus is difficult to be provided within the vehicle as in the present disclosure. The onboard radar system 510 of this Application Example may be installed within the vehicle as described above, but may instead be mounted at the tip of the front nose. Since the footprint of the onboard radar system on the front nose is reduced, other parts can be more easily placed.

The Application Example allows the interval between a plurality of waveguide members (ridges) that are used in the transmission antenna to be narrow, which also narrows the interval between a plurality of slots to be provided opposite from a number of adjacent waveguide members. This reduces the influences of grating lobes. For example, when the interval between the centers of two laterally adjacent slots is shorter than the free-space wavelength λo of the transmission wave (i.e., less than about 4 mm), no grating lobes will occur frontward. As a result, influences of grating lobes are reduced. Note that grating lobes will occur when the interval at which the antenna elements are arrayed is greater than a half of the wavelength of an electromagnetic wave. If the interval at which the antenna elements are arrayed is less than the wavelength, no grating lobes will occur frontward. Therefore, in the case where no beam steering is performed to impart phase differences among the radio waves radiated from the respective antenna elements composing an array antenna, grating lobes will exert substantially no influences so long as the interval at which the antenna elements are arrayed is smaller than the wavelength. By adjusting the array factor of the transmission antenna, the directivity of the transmission antenna can be adjusted. A phase shifter may be provided so as to be able to individually adjust the phases of electromagnetic waves that are transmitted on plural waveguide members. In that case, in order to avoid the influences of grating lobes, it is preferable that the interval between antenna elements is less than the free-space wavelength λo of the transmission wave. Even in that case, grating lobes will appear as the phase shift amount is increased. However, when the intervals between the antenna elements is reduced to less than a half of the free space wavelength λo of the transmission wave, grating lobes will not appear irrespective of the phase shift amount. By providing a phase shifter, the directivity of the transmission antenna can be changed in any desired direction. Since the construction of a phase shifter is well-known, description thereof will be omitted.

A reception antenna according to the Application Example is able to reduce reception of reflected waves associated with grating lobes, thereby being able to improve the precision of the below-described processing. Hereinafter, an example of a reception process will be described.

Figure 44A:
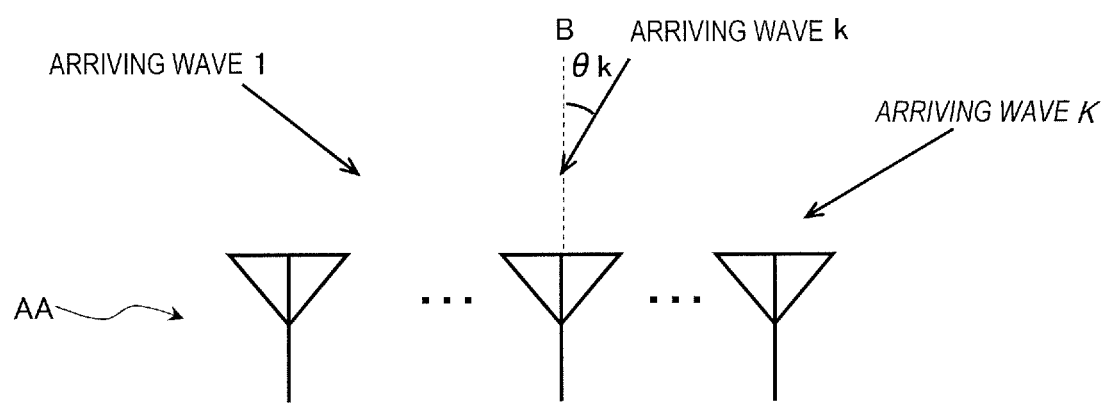
FIG. 44A is a diagram showing a relationship between an array antenna AA of the onboard radar system 510 and plural arriving waves k.

FIG. 44A shows a relationship between an array antenna AA of the onboard radar system 510 and plural arriving waves k (k: an integer from 1 to K; the same will always apply below. K is the number of targets that are present in different azimuths). The array antenna AA includes M antenna elements in a linear array. Principle wise, an antenna can be used for both transmission and reception, and therefore the array antenna AA can be used for both a transmission antenna and a reception antenna. Hereinafter, an example method of processing an arriving wave which is received by the reception antenna will be described.

The array antenna AA receives plural arriving waves that simultaneously impinge at various angles. Some of the plural arriving waves may be arriving waves which have been radiated from the transmission antenna of the same onboard radar system 510 and reflected by a target(s). Furthermore, some of the plural arriving waves may be direct or indirect arriving waves that have been radiated from other vehicles.

The incident angle of each arriving wave (i.e., an angle representing its direction of arrival) is an angle with respect to the broadside B of the array antenna AA. The incident angle of an arriving wave represents an angle with respect to a direction which is perpendicular to the direction of the line along which antenna elements are arrayed.

Now, consider a $k^{th}$ arriving wave. Where K arriving waves are impinging on the array antenna from K targets existing at different azimuths, a "$k^{th}$ arriving wave" means an arriving wave which is identified by an incident angle $\theta_k$.

Figure 44B:
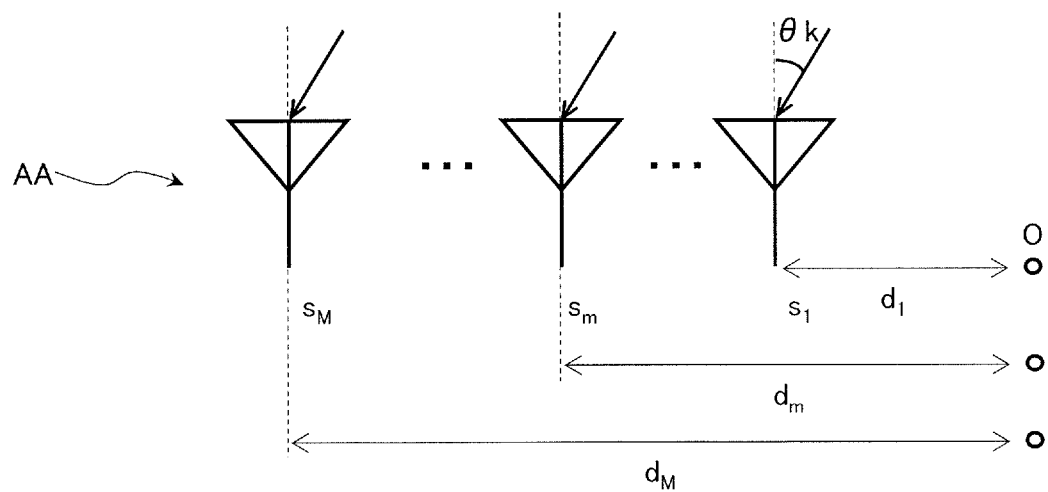
FIG. 44B is a diagram showing the array antenna AA receiving the $k^{th}$ arriving wave.

FIG. 44B shows the array antenna AA receiving the $k^{th}$ arriving wave. The signals received by the array antenna AA can be expressed as a "vector" having M elements, by Math. 1.

$$S = [s_1, s_2, \ldots, s_M]^T \qquad \text{(Math. 1)}$$

In the above, $s_m$ (where m is an integer from 1 to M; the same will also be true hereinbelow) is the value of a signal which is received by an $m^{th}$ antenna element. The superscript $^T$ means transposition. S is a column vector. The column vector S is defined by a product of multiplication between a direction vector (referred to as a steering vector or a mode vector) as determined by the construction of the array antenna and a complex vector representing a signal from each target (also referred to as a wave source or a signal source). When the number of wave sources is K, the waves of signals arriving at each individual antenna element from the respective K wave sources are linearly superposed. In this state, $s_m$ can be expressed by Math. 2.

$$s_m = \sum_{k=1}^{K} a_k \exp\left\{ j\left( \frac{2\pi}{\lambda} d_m \sin\theta_k + \varphi_k \right) \right\} \qquad \text{[Math. 2]}$$

In Math. 2, $a_k$, $\theta_k$ and $\phi_k$ respectively denote the amplitude, incident angle, and initial phase of the $k^{th}$ arriving wave. Moreover, λ denotes the wavelength of an arriving wave, and j is an imaginary unit.

As will be understood from Math. 2, $s_m$ is expressed as a complex number consisting of a real part (Re) and an imaginary part (Im).

When this is further generalized by taking noise (internal noise or thermal noise) into consideration, the array reception signal X can be expressed as Math. 3.

$$X = S + N \qquad \text{(Math. 3)}$$

N is a vector expression of noise.

The signal processing circuit generates a spatial covariance matrix Rxx (Math. 4) of arriving waves by using the array reception signal X expressed by Math. 3, and further determines eigenvalues of the spatial covariance matrix Rxx.

$$R_{xx} = XX^H = \begin{bmatrix} Rxx_{11} & \cdots & Rxx_{1M} \\ \vdots & \ddots & \vdots \\ Rxx_{M1} & \cdots & Rxx_{MM} \end{bmatrix} \qquad \text{[Math. 4]}$$

In the above, the superscript $^H$ means complex conjugate transposition (Hermitian conjugate).

Among the eigenvalues, the number of eigenvalues which have values equal to or greater than a predetermined value that is defined based on thermal noise (signal space eigenvalues) corresponds to the number of arriving waves. Then, angles that produce the highest likelihood as to the directions of arrival of reflected waves (i.e. maximum likelihood) are calculated, whereby the number of targets and the angles at which the respective targets are present can be identified. This process is known as a maximum likelihood estimation technique.

Figure 45:
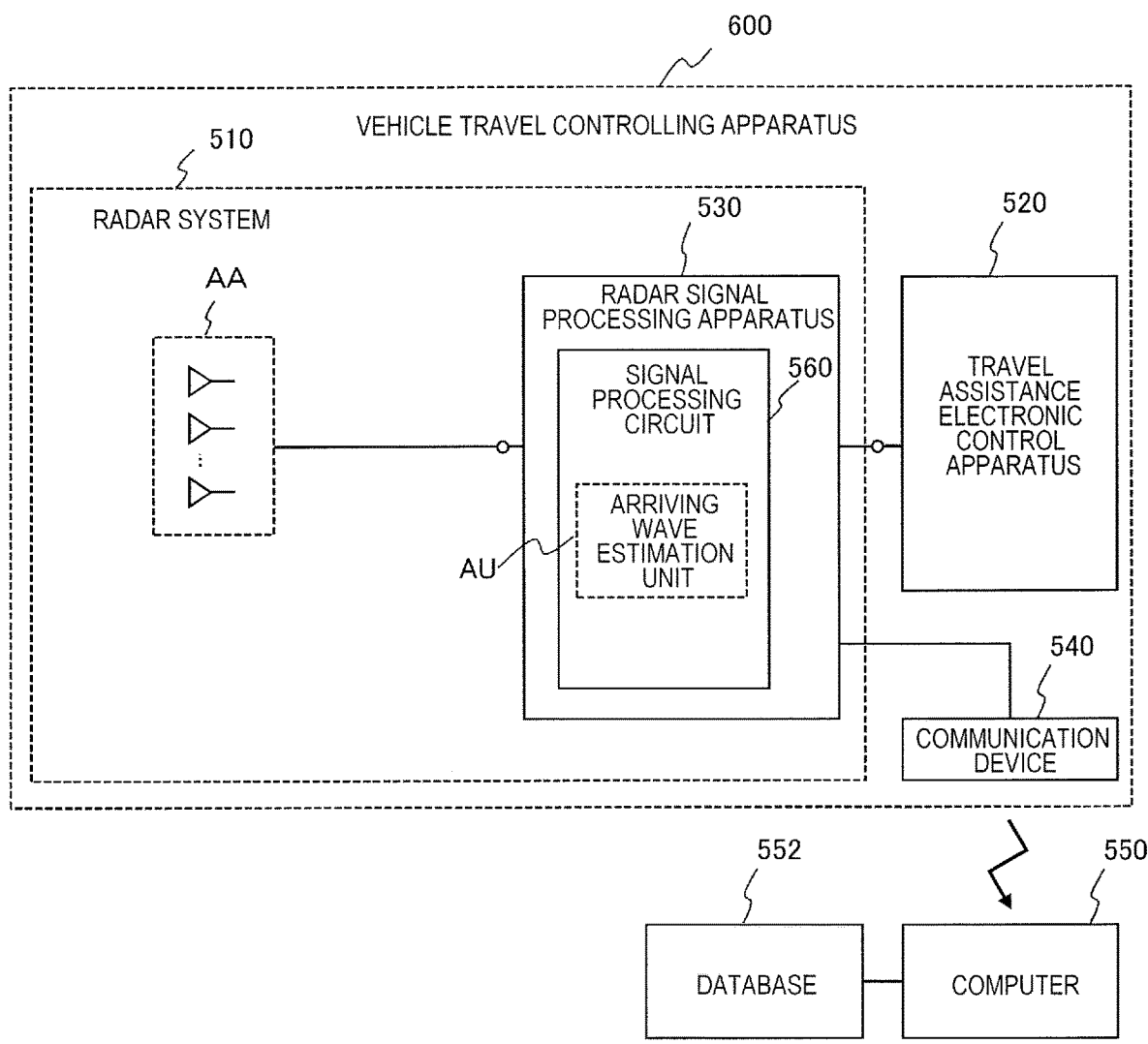
FIG. 45 is a block diagram showing an exemplary fundamental construction of a vehicle travel controlling apparatus 600 according to the present disclosure.

Next, see FIG. 45. FIG. 45 is a block diagram showing an exemplary fundamental construction of a vehicle travel controlling apparatus 600 according to the present disclosure. The vehicle travel controlling apparatus 600 shown in FIG. 45 includes a radar system 510 which is mounted in a vehicle, and a travel assistance electronic control apparatus 520 which is connected to the radar system 510. The radar system 510 includes an array antenna AA and a radar signal processing apparatus 530.

The array antenna AA includes a plurality of antenna elements, each of which outputs a reception signal in response to one or plural arriving waves. As mentioned earlier, the array antenna AA is capable of radiating a millimeter wave of a high frequency.

In the radar system 510, the array antenna AA needs to be attached to the vehicle, while at least some of the functions of the radar signal processing apparatus 530 may be implemented by a computer 550 and a database 552 which are provided externally to the vehicle travel controlling apparatus 600 (e.g., outside of the driver's vehicle). In that case, the portions of the radar signal processing apparatus 530 that are located within the vehicle may be perpetually or occasionally connected to the computer 550 and database 552 external to the vehicle so that bidirectional communications of signal or data are possible. The communications are to be performed via a communication device 540 of the vehicle and a commonly-available communications network.

The database 552 may store a program which defines various signal processing algorithms. The content of the data and program needed for the operation of the radar system 510 may be externally updated via the communication device 540. Thus, at least some of the functions of the radar system 510 can be realized externally to the driver's vehicle (which is inclusive of the interior of another vehicle), by a cloud computing technique. Therefore, an "onboard" radar system in the meaning of the present disclosure does not require that all of its constituent elements be mounted within the (driver's) vehicle. However, for simplicity, the present application will describe an implementation in which all constituent elements according to the present disclosure are mounted in a single vehicle (i.e., the driver's vehicle), unless otherwise specified.

The radar signal processing apparatus 530 includes a signal processing circuit 560. The signal processing circuit 560 directly or indirectly receives reception signals from the array antenna AA, and inputs the reception signals, or a secondary signal(s) which has been generated from the reception signals, to an arriving wave estimation unit AU. A part or a whole of the circuit (not shown) which generates a secondary signal(s) from the reception signals does not need to be provided inside of the signal processing circuit 560. A part or a whole of such a circuit (preprocessing circuit) may be provided between the array antenna AA and the radar signal processing apparatus 530.

The signal processing circuit 560 is configured to perform computation by using the reception signals or secondary signal(s), and output a signal indicating the number of arriving waves. As used herein, a "signal indicating the number of arriving waves" can be said to be a signal indicating the number of preceding vehicles (which may be one preceding vehicle or plural preceding vehicles) ahead of the driver's vehicle.

The signal processing circuit 560 may be configured to execute various signal processing which is executable by known radar signal processing apparatuses. For example, the signal processing circuit 560 may be configured to execute "super-resolution algorithms" such as the MUSIC method, the ESPRIT method, or the SAGE method, or other algorithms for direction-of-arrival estimation of relatively low resolution.

The arriving wave estimation unit AU shown in FIG. 45 estimates an angle representing the azimuth of each arriving wave by an arbitrary algorithm for direction-of-arrival estimation, and outputs a signal indicating the estimation result. The signal processing circuit 560 estimates the distance to each target as a wave source of an arriving wave, the relative velocity of the target, and the azimuth of the target by using a known algorithm which is executed by the arriving wave estimation unit AU, and output a signal indicating the estimation result.

In the present disclosure, the term "signal processing circuit" is not limited to a single circuit, but encompasses any implementation in which a combination of plural circuits is conceptually regarded as a single functional part. The signal processing circuit 560 may be realized by one or more System-on-Chips (SoCs). For example, a part or a whole of the signal processing circuit 560 may be an FPGA (Field-Programmable Gate Array), which is a programmable logic device (PLD). In that case, the signal processing circuit 560 includes a plurality of computation elements (e.g., general-purpose logics and multipliers) and a plurality of memory elements (e.g., look-up tables or memory blocks). Alternatively, the signal processing circuit 560 may be a set of a general-purpose processor(s) and a main memory device(s). The signal processing circuit 560 may be a circuit which includes a processor core(s) and a memory device(s). These may function as the signal processing circuit 560.

The travel assistance electronic control apparatus 520 is configured to provide travel assistance for the vehicle based on various signals which are output from the radar signal processing apparatus 530. The travel assistance electronic control apparatus 520 instructs various electronic control units to fulfill predetermined functions, e.g., a function of issuing an alarm to prompt the driver to make a braking operation when the distance to a preceding vehicle (vehicular gap) has become shorter than a predefined value; a function of controlling the brakes; and a function of controlling the accelerator. For example, in the case of an operation mode which performs adaptive cruise control of the driver's vehicle, the travel assistance electronic control apparatus 520 sends predetermined signals to various electronic control units (not shown) and actuators, to maintain the distance of the driver's vehicle to a preceding vehicle at a predefined value, or maintain the traveling velocity of the driver's vehicle at a predefined value.

In the case of the MUSIC method, the signal processing circuit 560 determines eigenvalues of the spatial covariance matrix, and, as a signal indicating the number of arriving waves, outputs a signal indicating the number of those eigenvalues ("signal space eigenvalues") which are greater than a predetermined value (thermal noise power) that is defined based on thermal noise.

Figure 46:
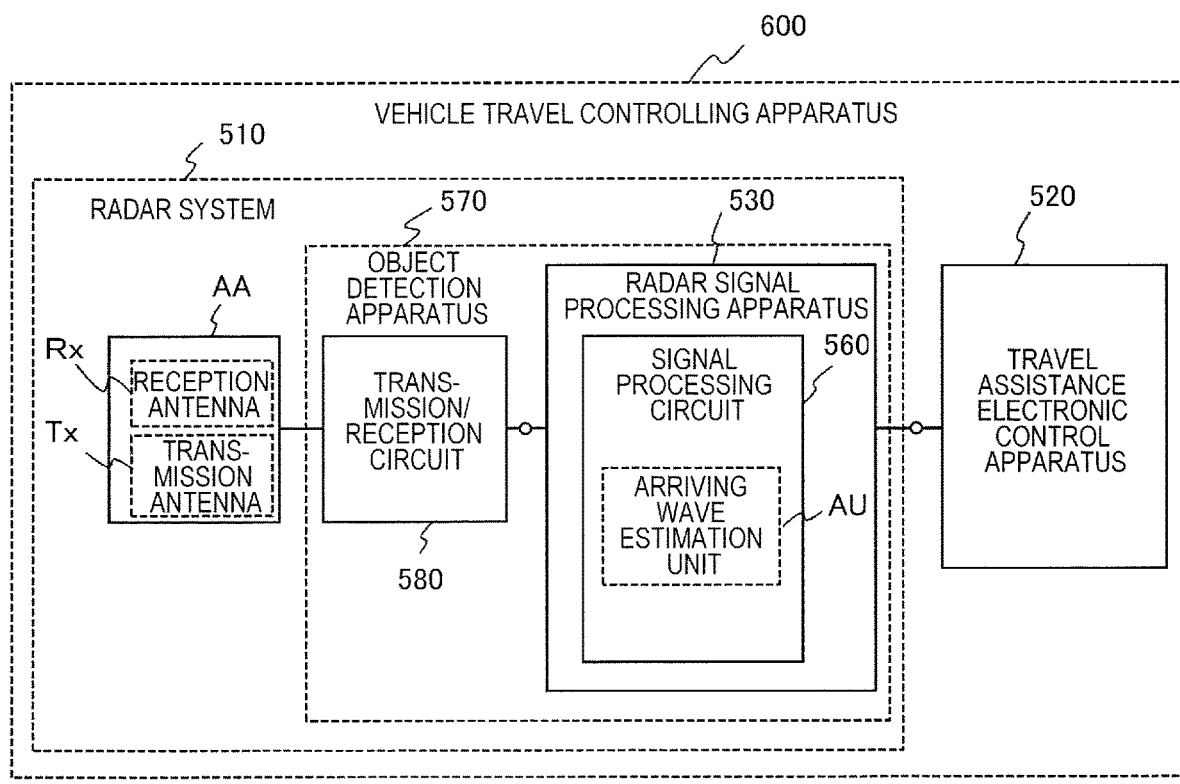
FIG. 46 is a block diagram showing another exemplary construction for the vehicle travel controlling apparatus 600.

Next, see FIG. 46. FIG. 46 is a block diagram showing another exemplary construction for the vehicle travel controlling apparatus 600. The radar system 510 in the vehicle travel controlling apparatus 600 of FIG. 46 includes an array antenna AA, which includes an array antenna that is dedicated to reception only (also referred to as a reception antenna) Rx and an array antenna that is dedicated to transmission only (also referred to as a transmission antenna) Tx; and an object detection apparatus 570.

At least one of the transmission antenna Tx and the reception antenna Rx has the aforementioned waveguide structure. The transmission antenna Tx radiates a transmission wave, which may be a millimeter wave, for example. The reception antenna Rx that is dedicated to reception only outputs a reception signal in response to one or plural arriving waves (e.g., a millimeter wave(s)).

A transmission/reception circuit 580 sends a transmission signal for a transmission wave to the transmission antenna Tx, and performs "preprocessing" for reception signals of reception waves received at the reception antenna Rx. A part or a whole of the preprocessing may be performed by the signal processing circuit 560 in the radar signal processing apparatus 530. A typical example of preprocessing to be performed by the transmission/reception circuit 580 may be generating a beat signal from a reception signal, and converting a reception signal of analog format into a reception signal of digital format.

In the present specification, any device that includes a transmission antenna, a reception antenna, a transmission/reception circuit, and a waveguide device which allows electromagnetic waves to propagate between the transmission antenna and reception antenna and the transmission/reception circuit is referred to as a "radar device". Moreover, a system that includes a signal processing apparatus (including a signal processing circuit), e.g., an object detection apparatus, in addition to a radar device is referred to as a "radar system".

Note that the radar system according to the present disclosure may, without being limited to the implementation where it is mounted in the driver's vehicle, be used while being fixed on the road or a building.

Next, an example of a more specific construction of the vehicle travel controlling apparatus 600 will be described.

Figure 47:
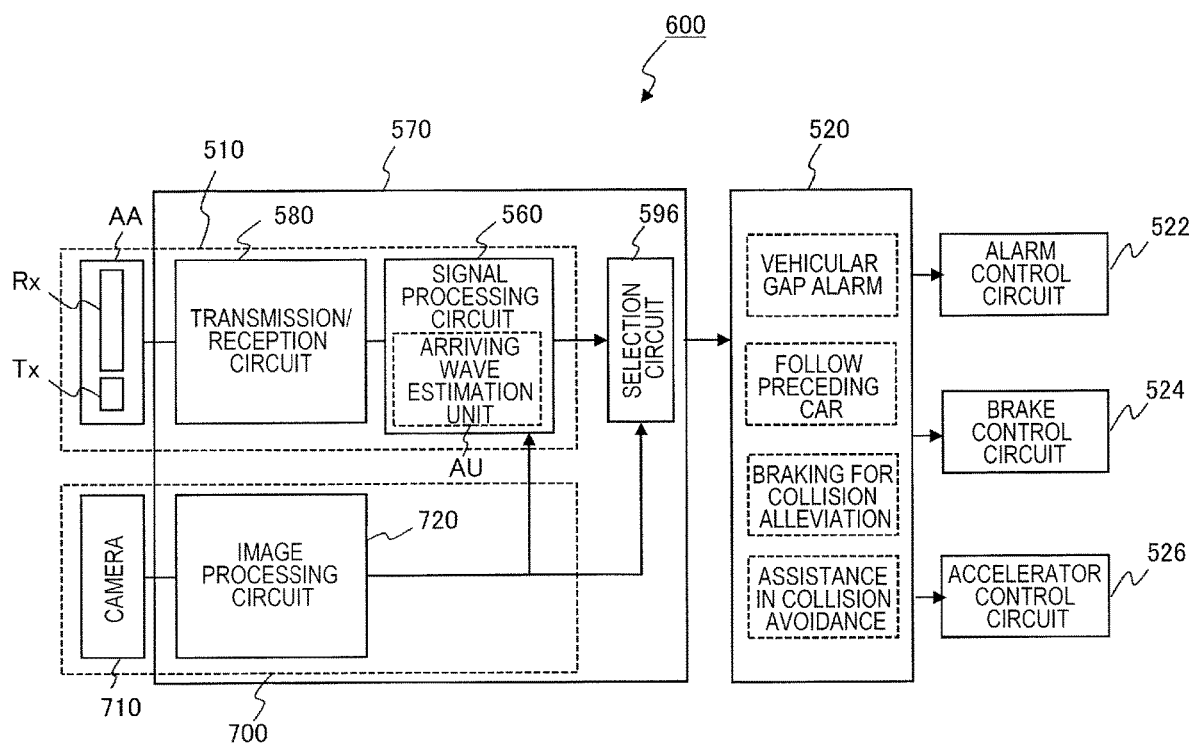
FIG. 47 is a block diagram showing an example of a more specific construction of the vehicle travel controlling apparatus 600.

FIG. 47 is a block diagram showing an example of a more specific construction of the vehicle travel controlling apparatus 600. The vehicle travel controlling apparatus 600 shown in FIG. 47 includes a radar system 510 and an onboard camera system 700. The radar system 510 includes an array antenna AA, a transmission/reception circuit 580 which is connected to the array antenna AA, and a signal processing circuit 560.

The onboard camera system 700 includes an onboard camera 710 which is mounted in a vehicle, and an image processing circuit 720 which processes an image or video that is acquired by the onboard camera 710.

The vehicle travel controlling apparatus 600 of this Application Example includes an object detection apparatus 570 which is connected to the array antenna AA and the onboard camera 710, and a travel assistance electronic control apparatus 520 which is connected to the object detection apparatus 570. The object detection apparatus 570 includes a transmission/reception circuit 580 and an image processing circuit 720, in addition to the above-described radar signal processing apparatus 530 (including the signal processing circuit 560). The object detection apparatus 570 detects a target on the road or near the road, by using not only the information which is obtained by the radar system 510 but also the information which is obtained by the image processing circuit 720. For example, while the driver's vehicle is traveling in one of two or more lanes of the same direction, the image processing circuit 720 can distinguish which lane the driver's vehicle is traveling in, and supply that result of distinction to the signal processing circuit 560. When the number and azimuth(s) of preceding vehicles are to be recognized by using a predetermined algorithm for direction-of-arrival estimation (e.g., the MUSIC method), the signal processing circuit 560 is able to provide more reliable information concerning a spatial distribution of preceding vehicles by referring to the information from the image processing circuit 720.

Note that the onboard camera system 700 is an example of a means for identifying which lane the driver's vehicle is traveling in. The lane position of the driver's vehicle may be identified by any other means. For example, by utilizing an ultra-wide band (UWB) technique, it is possible to identify which one of a plurality of lanes the driver's vehicle is traveling in. It is widely known that the ultra-wide band technique is applicable to position measurement and/or radar. Using the ultra-wide band technique enhances the range resolution of the radar, so that, even when a large number of vehicles exist ahead, each individual target can be detected with distinction, based on differences in distance. This makes it possible to accurately identify distance from a guardrail on the road shoulder, or from the median strip. The width of each lane is predefined based on each country's law or the like. By using such information, it becomes possible to identify where the lane in which the driver's vehicle is currently traveling is. Note that the ultra-wide band technique is an example. A radio wave based on any other wireless technique may be used. Moreover, LIDAR (Light Detection and Ranging) may be used together with a radar. LIDAR is sometimes called "laser radar".

The array antenna AA may be a generic millimeter wave array antenna for onboard use. The transmission antenna Tx in this Application Example radiates a millimeter wave as a transmission wave ahead of the vehicle. A portion of the transmission wave is reflected off a target which is typically a preceding vehicle, whereby a reflected wave occurs from the target being a wave source. A portion of the reflected wave reaches the array antenna (reception antenna) AA as an arriving wave. Each of the plurality of antenna elements of the array antenna AA outputs a reception signal in response to one or plural arriving waves. In the case where the number of targets functioning as wave sources of reflected waves is K (where K is an integer of one or more), the number of arriving waves is K, but this number K of arriving waves is not known beforehand.

The example of FIG. 45 assumes that the radar system 510 is provided as an integral piece, including the array antenna AA, on the rearview mirror. However, the number and positions of array antennas AA are not limited to any specific number or specific positions. An array antenna AA may be disposed on the rear surface of the vehicle so as to be able to detect targets that are behind the vehicle. Moreover, a plurality of array antennas AA may be disposed on the front surface and the rear surface of the vehicle. The array antenna(s) AA may be disposed inside the vehicle. Even in the case where a horn antenna whose respective antenna elements include horns as mentioned above is to be adopted as the array antenna(s) AA, the array antenna(s) with such antenna elements may be situated inside the vehicle.

The signal processing circuit 560 receives and processes the reception signals which have been received by the reception antenna Rx and subjected to preprocessing by the transmission/reception circuit 580. This process encompasses inputting the reception signals to the arriving wave estimation unit AU, or alternatively, generating a secondary signal(s) from the reception signals and inputting the secondary signal(s) to the arriving wave estimation unit AU.

In the example of FIG. 47, a selection circuit 596 which receives the signal being output from the signal processing circuit 560 and the signal being output from the image processing circuit 720 is provided in the object detection apparatus 570. The selection circuit 596 allows one or both of the signal being output from the signal processing circuit 560 and the signal being output from the image processing circuit 720 to be fed to the travel assistance electronic control apparatus 520.

Figure 48:
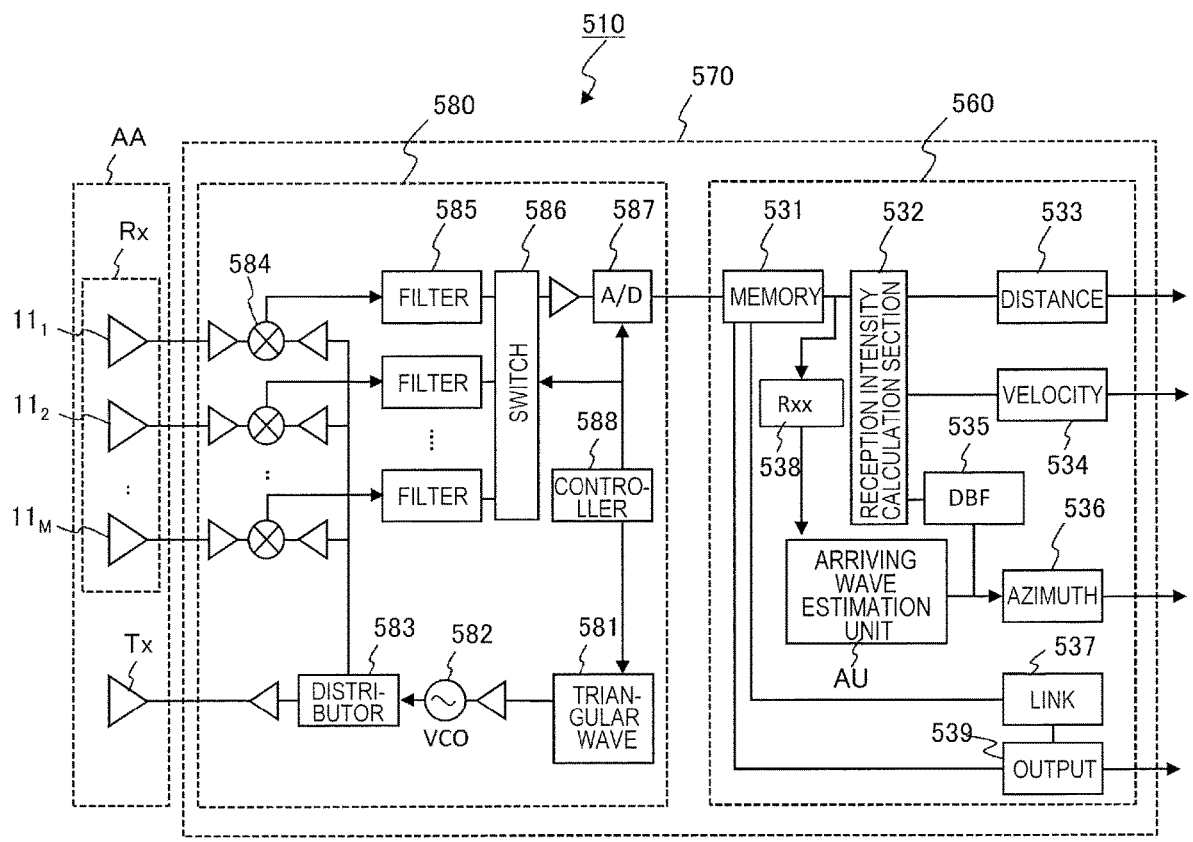
FIG. 48 is a block diagram showing a more detailed exemplary construction of the radar system 510 according to this Application Example.

FIG. 48 is a block diagram showing a more detailed exemplary construction of the radar system 510 according to this Application Example.

As shown in FIG. 48, the array antenna AA includes a transmission antenna Tx which transmits a millimeter wave and reception antennas Rx which receive arriving waves reflected from targets. Although only one transmission antenna Tx is illustrated in the figure, two or more kinds of transmission antennas with different characteristics may be provided. The array antenna AA includes M antenna elements $11_1$, $11_2$, ..., $11_M$ (where M is an integer of 3 or more). In response to the arriving waves, the plurality of antenna elements $11_1$, $11_2$, ..., $11_M$ respectively output reception signals $s_1$, $s_2$, ..., $s_M$ (FIG. 44B).

In the array antenna AA, the antenna elements $11_1$ to $11_M$ are arranged in a linear array or a two-dimensional array at fixed intervals, for example. Each arriving wave will impinge on the array antenna AA from a direction at an angle θ with respect to the normal of the plane in which the antenna elements $11_1$ to $11_M$ are arrayed. Thus, the direction of arrival of an arriving wave is defined by this angle θ.

When an arriving wave from one target impinges on the array antenna AA, this approximates to a plane wave impinging on the antenna elements $11_1$ to $11_M$ from azimuths of the same angle θ. When K arriving waves impinge on the array antenna AA from K targets with different azimuths, the individual arriving waves can be identified in terms of respectively different angles $θ_1$ to $θ_K$.

As shown in FIG. 48, the object detection apparatus 570 includes the transmission/reception circuit 580 and the signal processing circuit 560.

The transmission/reception circuit 580 includes a triangular wave generation circuit 581, a VCO (voltage controlled oscillator) 582, a distributor 583, mixers 584, filters 585, a switch 586, an A/D converter 587, and a controller 588. Although the radar system in this Application Example is configured to perform transmission and reception of millimeter waves by the FMCW method, the radar system of the present disclosure is not limited to this method. The transmission/reception circuit 580 is configured to generate a beat signal based on a reception signal from the array antenna AA and a transmission signal from the transmission antenna Tx.

The signal processing circuit 560 includes a distance detection section 533, a velocity detection section 534, and an azimuth detection section 536. The signal processing circuit 560 is configured to process a signal from the A/D converter 587 in the transmission/reception circuit 580, and output signals respectively indicating the detected distance to the target, the relative velocity of the target, and the azimuth of the target.

First, the construction and operation of the transmission/reception circuit 580 will be described in detail.

The triangular wave generation circuit 581 generates a triangular wave signal, and supplies it to the VCO 582. The VCO 582 outputs a transmission signal having a frequency as modulated based on the triangular wave signal.

Figure 49:
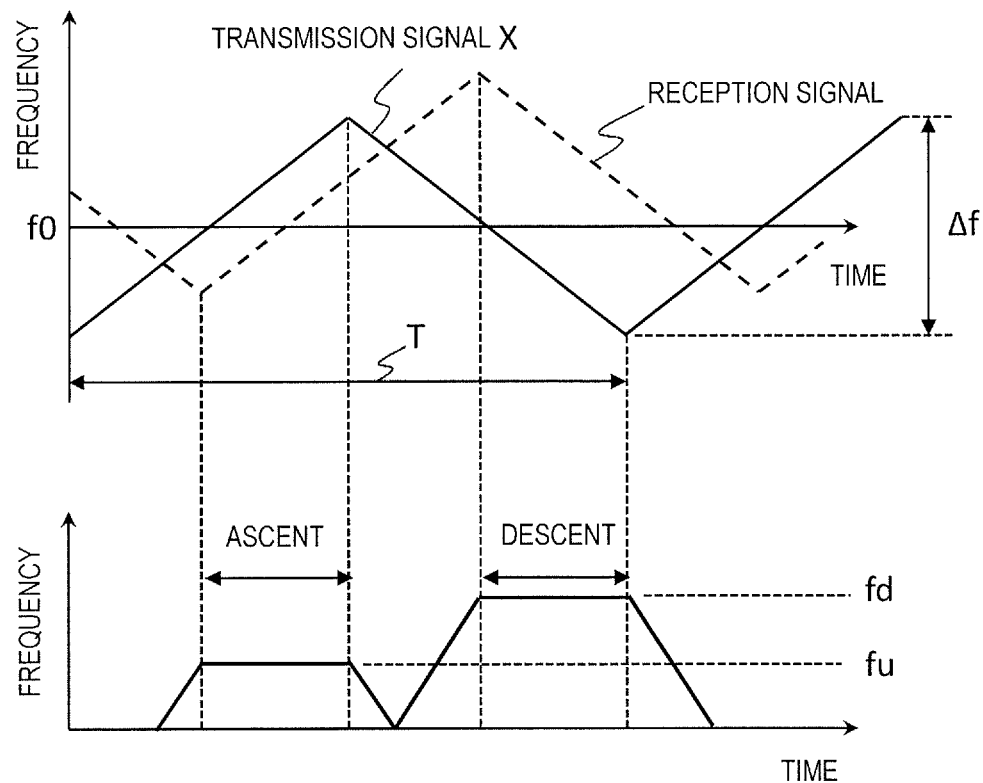
FIG. 49 is a diagram showing change in frequency of a transmission signal which is modulated based on the signal that is generated by a triangular wave generation circuit 581.

FIG. 49 is a diagram showing change in frequency of a transmission signal which is modulated based on the signal that is generated by the triangular wave generation circuit 581. This waveform has a modulation width Δf and a center frequency of f0. The transmission signal having a thus modulated frequency is supplied to the distributor 583. The distributor 583 allows the transmission signal obtained from the VCO 582 to be distributed among the mixers 584 and the transmission antenna Tx. Thus, the transmission antenna radiates a millimeter wave having a frequency which is modulated in triangular waves, as shown in FIG. 49.

In addition to the transmission signal, FIG. 49 also shows an example of a reception signal from an arriving wave which is reflected from a single preceding vehicle. The reception signal is delayed from the transmission signal. This delay is in proportion to the distance between the driver's vehicle and the preceding vehicle. Moreover, the frequency of the reception signal increases or decreases in accordance with the relative velocity of the preceding vehicle, due to the Doppler effect.

When the reception signal and the transmission signal are mixed, a beat signal is generated based on their frequency difference. The frequency of this beat signal (beat frequency) differs between a period in which the transmission signal increases in frequency (ascent) and a period in which the transmission signal decreases in frequency (descent). Once a beat frequency for each period is determined, based on such beat frequencies, the distance to the target and the relative velocity of the target are calculated.

Figure 50:
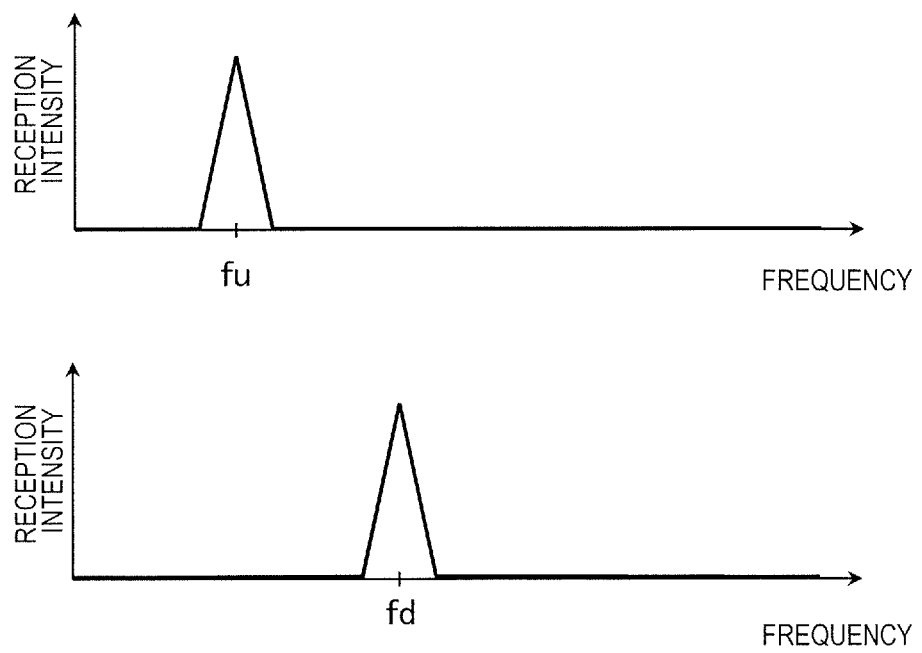
FIG. 50 is a diagram showing a beat frequency fu in an "ascent" period and a beat frequency fd in a "descent" period.

FIG. 50 shows a beat frequency fu in an "ascent" period and a beat frequency fd in a "descent" period. In the graph of FIG. 50, the horizontal axis represents frequency, and the vertical axis represents signal intensity. This graph is obtained by subjecting the beat signal to time-frequency conversion. Once the beat frequencies fu and fd are obtained, based on a known equation, the distance to the target and the relative velocity of the target are calculated. In this Application Example, with the construction and operation described below, beat frequencies corresponding to each antenna element of the array antenna AA are obtained, thus enabling estimation of the position information of a target.

In the example shown in FIG. 48, reception signals from channels $Ch_1$ to $Ch_M$ corresponding to the respective antenna elements $11_1$ to $11_M$ are each amplified by an amplifier, and input to the corresponding mixers 584. Each mixer 584 mixes the transmission signal into the amplified reception signal. Through this mixing, a beat signal is generated corresponding to the frequency difference between the reception signal and the transmission signal. The generated beat signal is fed to the corresponding filter 585. The filters 585 apply bandwidth control to the beat signals on the channels $Ch_1$ to $Ch_M$, and supply bandwidth-controlled beat signals to the switch 586.

The switch 586 performs switching in response to a sampling signal which is input from the controller 588. The controller 588 may be composed of a microcomputer, for example. Based on a computer program which is stored in a memory such as a ROM, the controller 588 controls the entire transmission/reception circuit 580. The controller 588 does not need to be provided inside the transmission/reception circuit 580, but may be provided inside the signal processing circuit 560. In other words, the transmission/reception circuit 580 may operate in accordance with a control signal from the signal processing circuit 560. Alternatively, some or all of the functions of the controller 588 may be realized by a central processing unit which controls the entire transmission/reception circuit 580 and signal processing circuit 560.

The beat signals on the channels $Ch_1$ to $Ch_M$ having passed through the respective filters 585 are consecutively supplied to the A/D converter 587 via the switch 586. In synchronization with the sampling signal, the A/D converter 587 converts the beat signals on the channels $Ch_1$ to $Ch_M$, which are input from the switch 586, into digital signals.

Hereinafter, the construction and operation of the signal processing circuit 560 will be described in detail. In this Application Example, the distance to the target and the relative velocity of the target are estimated by the FMCW method. Without being limited to the FMCW method as described below, the radar system can also be implemented by using other methods, e.g., 2 frequency CW and spread spectrum methods.

In the example shown in FIG. 48, the signal processing circuit 560 includes a memory 531, a reception intensity calculation section 532, a distance detection section 533, a velocity detection section 534, a DBF (digital beam forming) processing section 535, an azimuth detection section 536, a target link processing section 537, a matrix generation section 538, a target output processing section 539, and an arriving wave estimation unit AU. As mentioned earlier, a part or a whole of the signal processing circuit 560 may be implemented by FPGA, or by a set of a general-purpose processor(s) and a main memory device(s). The memory 531, the reception intensity calculation section 532, the DBF processing section 535, the distance detection section 533, the velocity detection section 534, the azimuth detection section 536, the target link processing section 537, and the arriving wave estimation unit AU may be individual parts that are implemented in distinct pieces of hardware, or functional blocks of a single signal processing circuit.

Figure 51:
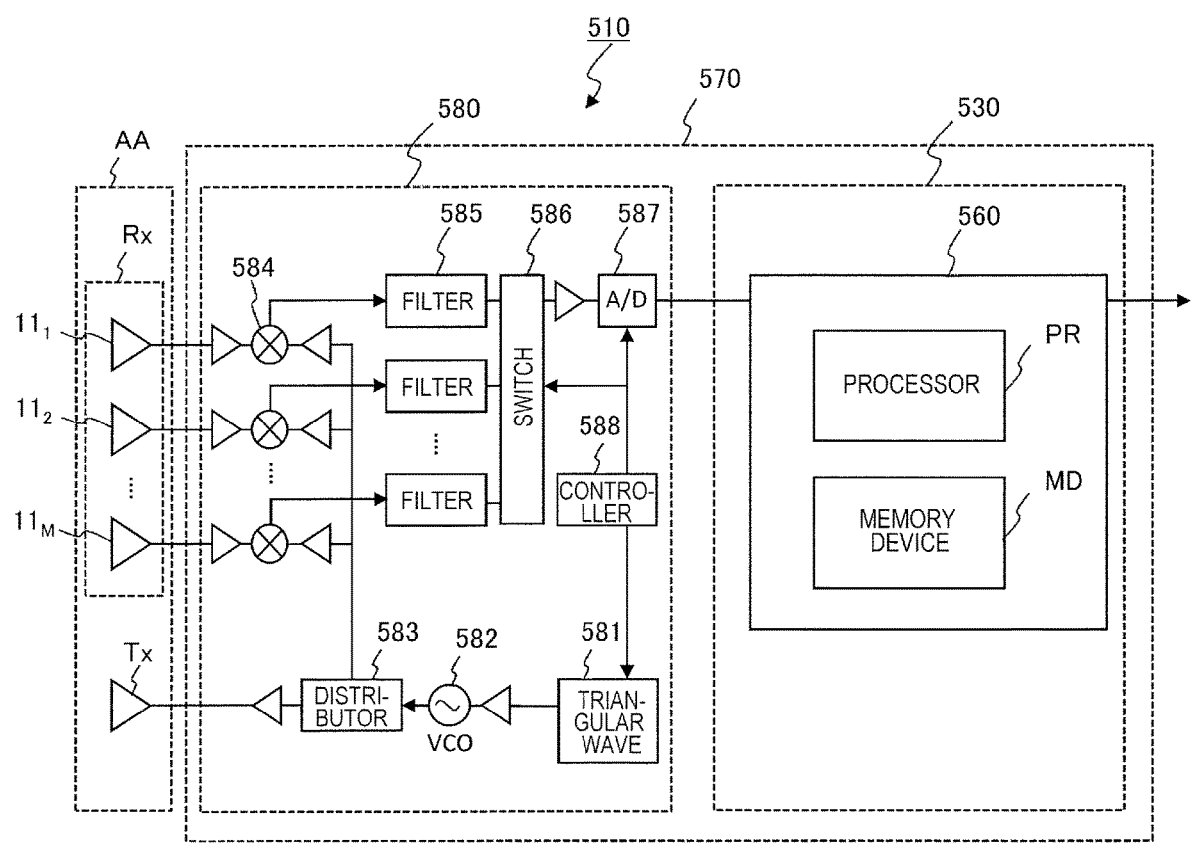
FIG. 51 is a diagram showing an exemplary implementation in which a signal processing circuit 560 is implemented in hardware including a processor PR and a memory device MD.

FIG. 51 shows an exemplary implementation in which the signal processing circuit 560 is implemented in hardware including a processor PR and a memory device MD. In the signal processing circuit 560 with this construction, too, a computer program that is stored in the memory device MD may fulfill the functions of the reception intensity calculation section 532, the DBF processing section 535, the distance detection section 533, the velocity detection section 534, the azimuth detection section 536, the target link processing section 537, the matrix generation section 538, and the arriving wave estimation unit AU shown in FIG. 48.

The signal processing circuit 560 in this Application Example is configured to estimate the position information of a preceding vehicle by using each beat signal converted into a digital signal as a secondary signal of the reception signal, and output a signal indicating the estimation result. Hereinafter, the construction and operation of the signal processing circuit 560 in this Application Example will be described in detail.

For each of the channels $Ch_1$ to $Ch_M$, the memory 531 in the signal processing circuit 560 stores a digital signal which is output from the A/D converter 587. The memory 531 may be composed of a generic storage medium such as a semiconductor memory or a hard disk and/or an optical disk.

The reception intensity calculation section 532 applies Fourier transform to the respective beat signals for the channels $Ch_1$ to $Ch_M$ (shown in the lower graph of FIG. 49) that are stored in the memory 531. In the present specification, the amplitude of a piece of complex number data after the Fourier transform is referred to as "signal intensity". The reception intensity calculation section 532 converts the complex number data of a reception signal from one of the plurality of antenna elements, or a sum of the complex number data of all reception signals from the plurality of antenna elements, into a frequency spectrum. In the resultant spectrum, beat frequencies corresponding to respective peak values, which are indicative of presence and distance of targets (preceding vehicles), can be detected. Taking a sum of the complex number data of the reception signals from all antenna elements will allow the noise components to average out, whereby the S/N ratio is improved.

In the case where there is one target, i.e., one preceding vehicle, as shown in FIG. 50, the Fourier transform will produce a spectrum having one peak value in a period of increasing frequency (the "ascent" period) and one peak value in a period of decreasing frequency ("the descent" period). The beat frequency of the peak value in the "ascent" period is denoted by "fu", whereas the beat frequency of the peak value in the "descent" period is denoted by "fd".

From the signal intensities of beat frequencies, the reception intensity calculation section 532 detects any signal intensity that exceeds a predefined value (threshold value), thus determining the presence of a target. Upon detecting a signal intensity peak, the reception intensity calculation section 532 outputs the beat frequencies (fu, fd) of the peak values to the distance detection section 533 and the velocity detection section 534 as the frequencies of the object of interest. The reception intensity calculation section 532 outputs information indicating the frequency modulation width Δf to the distance detection section 533, and outputs information indicating the center frequency f0 to the velocity detection section 534.

In the case where signal intensity peaks corresponding to plural targets are detected, the reception intensity calculation section 532 find associations between the ascents peak values and the descent peak values based on predefined conditions. Peaks which are determined as belonging to signals from the same target are given the same number, and thus are fed to the distance detection section 533 and the velocity detection section 534.

When there are plural targets, after the Fourier transform, as many peaks as there are targets will appear in the ascent portions and the descent portions of the beat signal. In proportion to the distance between the radar and a target, the reception signal will become more delayed and the reception signal in FIG. 49 will shift more toward the right. Therefore, a beat signal will have a greater frequency as the distant between the target and the radar increases.

Based on the beat frequencies fu and fd which are input from the reception intensity calculation section 532, the distance detection section 533 calculates a distance R through the equation below, and supplies it to the target link processing section 537.

$$R=\{c \cdot T/(2 \cdot \Delta f)\} \cdot \{(fu+fd)/2\}$$

Moreover, based on the beat frequencies fu and fd being input from the reception intensity calculation section 532, the velocity detection section 534 calculates a relative velocity V through the equation below, and supplies it to the target link processing section 537.

$$V=\{c/(2 \cdot f0)\} \cdot \{(fu-fd)/2\}$$

In the equation which calculates the distance R and the relative velocity V, c is velocity of light, and T is the modulation period.

Note that the lower limit resolution of distance R is expressed as $c/(2\Delta f)$. Therefore, as $\Delta f$ increases, the resolution of distance R increases. In the case where the frequency f0 is in the 76 GHz band, when $\Delta f$ is set on the order of 660 megahertz (MHz), the resolution of distance R will be on the order of 0.23 meters (m), for example. Therefore, if two preceding vehicles are traveling abreast of each other, it may be difficult with the FMCW method to identify whether there is one vehicle or two vehicles. In such a case, it might be possible to run an algorithm for direction-of-arrival estimation that has an extremely high angular resolution to separate between the azimuths of the two preceding vehicles and enable detection.

By utilizing phase differences between signals from the antenna elements $11_1, 11_2, \ldots, 11_M$, the DBF processing section 535 allows the incoming complex data corresponding to the respective antenna elements, which has been Fourier transformed with respect to the time axis, to be Fourier transformed with respect to the direction in which the antenna elements are arrayed. Then, the DBF processing section 535 calculates spatial complex number data indicating the spectrum intensity for each angular channel as determined by the angular resolution, and outputs it to the azimuth detection section 536 for the respective beat frequencies.

The azimuth detection section 536 is provided for the purpose of estimating the azimuth of a preceding vehicle. Among the values of spatial complex number data that has been calculated for the respective beat frequencies, the azimuth detection section 536 chooses an angle θ that takes the largest value, and outputs it to the target link processing section 537 as the azimuth at which an object of interest exists.

Note that the method of estimating the angle θ indicating the direction of arrival of an arriving wave is not limited to this example. Various algorithms for direction-of-arrival estimation that have been mentioned earlier can be employed.

The target link processing section 537 calculates absolute values of the differences between the respective values of distance, relative velocity, and azimuth of the object of interest as calculated in the current cycle and the respective values of distance, relative velocity, and azimuth of the object of interest as calculated 1 cycle before, which are read from the memory 531. Then, if the absolute value of each difference is smaller than a value which is defined for the respective value, the target link processing section 537 determines that the target that was detected 1 cycle before and the target detected in the current cycle are an identical target. In that case, the target link processing section 537 increments the count of target link processes, which is read from the memory 531, by one.

If the absolute value of a difference is greater than predetermined, the target link processing section 537 determines that a new object of interest has been detected. The target link processing section 537 stores the respective values of distance, relative velocity, and azimuth of the object of interest as calculated in the current cycle and also the count of target link processes for that object of interest to the memory 531.

In the signal processing circuit 560, the distance to the object of interest and its relative velocity can be detected by using a spectrum which is obtained through a frequency analysis of beat signals, which are signals generated based on received reflected waves.

The matrix generation section 538 generates a spatial covariance matrix by using the respective beat signals for the channels $Ch_1$ to $Ch_M$ (lower graph in FIG. 49) stored in the memory 531. In the spatial covariance matrix of Math. 4, each component is the value of a beat signal which is expressed in terms of real and imaginary parts. The matrix generation section 538 further determines eigenvalues of the spatial covariance matrix Rxx, and inputs the resultant eigenvalue information to the arriving wave estimation unit AU.

When a plurality of signal intensity peaks corresponding to plural objects of interest have been detected, the reception intensity calculation section 532 numbers the peak values respectively in the ascent portion and in the descent portion, beginning from those with smaller frequencies first, and output them to the target output processing section 539. In the ascent and descent portions, peaks of any identical number correspond to the same object of interest. The identification numbers are to be regarded as the numbers assigned to the objects of interest. For simplicity of illustration, a leader line from the reception intensity calculation section 532 to the target output processing section 539 is conveniently omitted from FIG. 48.

When the object of interest is a structure ahead, the target output processing section 539 outputs the identification number of that object of interest as indicating a target. When receiving results of determination concerning plural objects of interest, such that all of them are structures ahead, the target output processing section 539 outputs the identification number of an object of interest that is in the lane of the driver's vehicle as the object position information indicating where a target is. Moreover, When receiving results of determination concerning plural objects of interest, such that all of them are structures ahead and that two or more objects of interest are in the lane of the driver's vehicle, the target output processing section 539 outputs the identification number of an object of interest that is associated with the largest count of target being read from the link processes memory 531 as the object position information indicating where a target is.

Referring back to FIG. 47, an example where the onboard radar system 510 is incorporated in the exemplary construction shown in FIG. 47 will be described. The image processing circuit 720 acquires information of an object from the video, and detects target position information from the object information. For example, the image processing circuit 720 is configured to estimate distance information of an object by detecting the depth value of an object within an acquired video, or detect size information and the like of an object from characteristic amounts in the video, thus detecting position information of the object.

The selection circuit 596 selectively feeds position information which is received from the signal processing circuit 560 or the image processing circuit 720 to the travel assistance electronic control apparatus 520. For example, the selection circuit 596 compares a first distance, i.e., the distance from the driver's vehicle to a detected object as contained in the object position information from the signal processing circuit 560, against a second distance, i.e., the distance from the driver's vehicle to the detected object as contained in the object position information from the image processing circuit 720, and determines which is closer to the driver's vehicle. For example, based on the result of determination, the selection circuit 596 may select the object position information which indicates a closer distance to the driver's vehicle, and output it to the travel assistance electronic control apparatus 520. If the result of determination indicates the first distance and the second distance to be of the same value, the selection circuit 596 may output either one, or both of them, to the travel assistance electronic control apparatus 520.

If information indicating that there is no prospective target is input from the reception intensity calculation section 532, the target output processing section 539 (FIG. 48) outputs zero, indicating that there is no target, as the object position information. Then, on the basis of the object position information from the target output processing section 539, through comparison against a predefined threshold value, the selection circuit 596 chooses either the object position information from the signal processing circuit 560 or the object position information from the image processing circuit 720 to be used.

Based on predefined conditions, the travel assistance electronic control apparatus 520 having received the position information of a preceding object from the object detection apparatus 570 performs control to make the operation safer or easier for the driver who is driving the driver's vehicle, in accordance with the distance and size indicated by the object position information, the velocity of the driver's vehicle, road surface conditions such as rainfall, snowfall or clear weather, or other conditions. For example, if the object position information indicates that no object has been detected, the travel assistance electronic control apparatus 520 may send a control signal to an accelerator control circuit 526 to increase speed up to a predefined velocity, thereby controlling the accelerator control circuit 526 to make an operation that is equivalent to stepping on the accelerator pedal.

In the case where the object position information indicates that an object has been detected, if it is found to be at a predetermined distance from the driver's vehicle, the travel assistance electronic control apparatus 520 controls the brakes via a brake control circuit 524 through a brake-by-wire construction or the like. In other words, it makes an operation of decreasing the velocity to maintain a constant vehicular gap. Upon receiving the object position information, the travel assistance electronic control apparatus 520 sends a control signal to an alarm control circuit 522 so as to control lamp illumination or control audio through a loudspeaker which is provided within the vehicle, so that the driver is informed of the nearing of a preceding object. Upon receiving object position information including a spatial distribution of preceding vehicles, the travel assistance electronic control apparatus 520 may, if the traveling velocity is within a predefined range, automatically make the steering wheel easier to operate to the right or left, or control the hydraulic pressure on the steering wheel side so as to force a change in the direction of the wheels, thereby providing assistance in collision avoidance with respect to the preceding object.

The object detection apparatus 570 may be arranged so that, if a piece of object position information which was being continuously detected by the selection circuit 596 for a while in the previous detection cycle but which is not detected in the current detection cycle becomes associated with a piece of object position information from a camera-detected video indicating a preceding object, then continued tracking is chosen, and object position information from the signal processing circuit 560 is output with priority.

An exemplary specific construction and an exemplary operation for the selection circuit 596 to make a selection between the outputs from the signal processing circuit 560 and the image processing circuit 720 are disclosed in the specification of U.S. Pat. No. 8,446,312, the specification of U.S. Pat. No. 8,730,096, and the specification of U.S. Pat. No. 8,730,099. The entire disclosure thereof is incorporated herein by reference.

[First Variant]

In the radar system for onboard use of the above Application Example, the (sweep) condition for a single instance of FMCW (Frequency Modulated Continuous Wave) frequency modulation, i.e., a time span required for such a modulation (sweep time), is e.g. 1 millisecond, although the sweep time could be shortened to about 100 microseconds.

However, in order to realize such a rapid sweep condition, not only the constituent elements involved in the radiation of a transmission wave, but also the constituent elements involved in the reception under that sweep condition must also be able to rapidly operate. For example, an A/D converter 587 (FIG. 48) which rapidly operates under that sweep condition will be needed. The sampling frequency of the A/D converter 587 may be 10 MHz, for example. The sampling frequency may be faster than 10 MHz.

In the present variant, a relative velocity with respect to a target is calculated without utilizing any Doppler shift-based frequency component. In this variant, the sweep time is Tm=100 microseconds, which is very short. The lowest frequency of a detectable beat signal, which is 1/Tm, equals 10 kHz in this case. This would correspond to a Doppler shift of a reflected wave from a target which has a relative velocity of approximately 20 m/second. In other words, so long as one relies on a Doppler shift, it would be impossible to detect relative velocities that are equal to or smaller than this. Thus, a method of calculation which is different from a Doppler shift-based method of calculation is preferably adopted.

As an example, this variant illustrates a process that utilizes a signal (upbeat signal) representing a difference between a transmission wave and a reception wave which is obtained in an upbeat (ascent) portion where the transmission wave increases in frequency. A single sweep time of FMCW is 100 microseconds, and its waveform is a sawtooth shape which is composed only of an upbeat portion. In other words, in this variant, the signal wave which is generated by the triangular wave/CW wave generation circuit 581 has a sawtooth shape. The sweep width in frequency is 500 MHz. Since no peaks are to be utilized that are associated with Doppler shifts, the process is not one that generates an upbeat signal and a downbeat signal to utilize the peaks of both, but will rely on only one of such signals. Although a case of utilizing an upbeat signal will be illustrated herein, a similar process can also be performed by using a downbeat signal.

The A/D converter 587 (FIG. 48) samples each upbeat signal at a sampling frequency of 10 MHz, and outputs several hundred pieces of digital data (hereinafter referred to as "sampling data"). The sampling data is generated based on upbeat signals after a point in time where a reception wave is obtained and until a point in time at which a transmission wave completes transmission, for example. Note that the process may be ended as soon as a certain number of pieces of sampling data are obtained.

In this variant, 128 upbeat signals are transmitted/received in series, for each of which some several hundred pieces of sampling data are obtained. The number of upbeat signals is not limited to 128. It may be 256, or 8. An arbitrary number may be selected depending on the purpose.

The resultant sampling data is stored to the memory 531. The reception intensity calculation section 532 applies a two-dimensional fast Fourier transform (FFT) to the sampling data. Specifically, first, for each of the sampling data pieces that have been obtained through a single sweep, a first FFT process (frequency analysis process) is performed to generate a power spectrum. Next, the velocity detection section 534 performs a second FFT process for the processing results that have been collected from all sweeps.

When the reflected waves are from the same target, peak components in the power spectrum to be detected in each sweep period will be of the same frequency. On the other hand, for different targets, the peak components will differ in frequency. Through the first FFT process, plural targets that are located at different distances can be separated.

In the case where a relative velocity with respect to a target is non-zero, the phase of the upbeat signal changes slightly from sweep to sweep. In other words, through the second FFT process, a power spectrum whose elements are the data of frequency components that are associated with such phase changes will be obtained for the respective results of the first FFT process.

The reception intensity calculation section 532 extracts peak values in the second power spectrum above, and sends them to the velocity detection section 534.

The velocity detection section 534 determines a relative velocity from the phase changes. For example, suppose that a series of obtained upbeat signals undergo phase changes by every phase θ [RXd]. Assuming that the transmission wave has an average wavelength λ, this means there is a $\lambda/(4\pi/\theta)$ change in distance every time an upbeat signal is obtained. Since this change has occurred over an interval of upbeat signal transmission Tm (=100 microseconds), the relative velocity is determined to be $\{\lambda/(4 \pi/\theta)\}/Tm$.

Through the above processes, a relative velocity with respect to a target as well as a distance from the target can be obtained.

[Second Variant]

The radar system 510 is able to detect a target by using a continuous wave(s) CW of one or plural frequencies. This method is especially useful in an environment where a multitude of reflected waves impinge on the radar system 510 from still objects in the surroundings, e.g., when the vehicle is in a tunnel.

The radar system 510 has an antenna array for reception purposes, including five channels of independent reception elements. In such a radar system, the azimuth-of-arrival estimation for incident reflected waves is only possible if there are four or fewer reflected waves that are simultaneously incident. In an FMCW-type radar, the number of reflected waves to be simultaneously subjected to an azimuth-of-arrival estimation can be reduced by exclusively selecting reflected waves from a specific distance. However, in an environment where a large number of still objects exist in the surroundings, e.g., in a tunnel, it is as if there were a continuum of objects to reflect radio waves; therefore, even if one narrows down on the reflected waves based on distance, the number of reflected waves may still not be equal to or smaller than four. However, any such still object in the surroundings will have an identical relative velocity with respect to the driver's vehicle, and the relative velocity will be greater than that associated with any other vehicle that is traveling ahead. On this basis, such still objects can be distinguished from any other vehicle based on the magnitudes of Doppler shifts.

Therefore, the radar system 510 performs a process of: radiating continuous waves CW of plural frequencies; and, while ignoring Doppler shift peaks that correspond to still objects in the reception signals, detecting a distance by using a Doppler shift peak(s) of any smaller shift amount(s). Unlike in the FMCW method, in the CW method, a frequency difference between a transmission wave and a reception wave is ascribable only to a Doppler shift. In other words, any peak frequency that appears in a beat signal is ascribable only to a Doppler shift.

In the description of this variant, too, a continuous wave to be used in the CW method will be referred to as a "continuous wave CW". As described above, a continuous wave CW has a constant frequency; that is, it is unmodulated.

Suppose that the radar system 510 has radiated a continuous wave CW of a frequency fp, and detected a reflected wave of a frequency fq that has been reflected off a target. The difference between the transmission frequency fp and the reception frequency fq is called a Doppler frequency, which approximates to fp−fq=2·Vr·fp/c. Herein, Vr is a relative velocity between the radar system and the target, and c is the velocity of light. The transmission frequency fp, the Doppler frequency (fp−fq), and the velocity of light c are known. Therefore, from this equation, the relative velocity Vr=(fp−fq)·c/2fp can be determined. The distance to the target is calculated by utilizing phase information as will be described later.

In order to detect a distance to a target by using continuous waves CW, a 2 frequency CW method is adopted. In the 2 frequency CW method, continuous waves CW of two frequencies which are slightly apart are radiated each for a certain period, and their respective reflected waves are acquired. For example, in the case of using frequencies in the 76 GHz band, the difference between the two frequencies would be several hundred kHz. As will be described later, it is more preferable to determine the difference between the two frequencies while taking into account the minimum distance at which the radar used is able to detect a target.

Suppose that the radar system 510 has sequentially radiated continuous waves CW of frequencies fp1 and fp2 (fp1<fp2), and that the two continuous waves CW have been reflected off a single target, resulting in reflected waves of frequencies fq1 and fq2 being received by the radar system 510.

Based on the continuous wave CW of the frequency fp1 and the reflected wave (frequency fq1) thereof, a first Doppler frequency is obtained. Based on the continuous wave CW of the frequency fp2 and the reflected wave (frequency fq2) thereof, a second Doppler frequency is obtained. The two Doppler frequencies have substantially the same value. However, due to the difference between the frequencies fp1 and fp2, the complex signals of the respective reception waves differ in phase. By utilizing this phase information, a distance (range) to the target can be calculated.

Specifically, the radar system 510 is able to determine the distance R as R=c·Δφ/4 π(fp2−fp1). Herein, Δφ denotes the phase difference between two beat signals, i.e., beat signal fb1 which is obtained as a difference between the continuous wave CW of the frequency fp1 and the reflected wave (frequency fq1) thereof and beat signal fb2 which is obtained as a difference between the continuous wave CW of the frequency fp2 and the reflected wave (frequency fq2) thereof. The method of identifying the frequency fb1 and fb2 of the respective beat signals is identical to that in the aforementioned instance of a beat signal from a continuous wave CW of a single frequency.

Note that a relative velocity Vr under the 2 frequency CW method is determined as follows.

$$Vr = fb1 \cdot c/2 \cdot fp1 \text{ or } Vr = fb2 \cdot c/2 \cdot fp2$$

Moreover, the range in which a distance to a target can be uniquely identified is limited to the range defined by Rmax<c/2(fp2−fp1). The reason is that beat signals resulting from a reflected wave from any farther target would produce a Δϕ which is greater than 2 π, such that they are indistinguishable from beat signals associated with targets at closer positions. Therefore, it is more preferable to adjust the difference between the frequencies of the two continuous waves CW so that Rmax becomes greater than the minimum detectable distance of the radar. In the case of a radar whose minimum detectable distance is 100 m, fp2−fp1 may be made e.g. 1.0 MHz. In this case, Rmax=150 m, so that a signal from any target from a position beyond Rmax is not detected. In the case of mounting a radar which is capable of detection up to 250 m, fp2−fp1 may be made e.g. 500 kHz. In this case, Rmax=300 m, so that a signal from any target from a position beyond Rmax is not detected, either. In the case where the radar has both of an operation mode in which the minimum detectable distance is 100 m and the horizontal viewing angle is 120 degrees and an operation mode in which the minimum detectable distance is 250 m and the horizontal viewing angle is 5 degrees, it is preferable to switch the fp2−fp1 value be 1.0 MHz and 500 kHz for operation in the respective operation modes.

A detection approach is known which, by transmitting continuous waves CW at N different frequencies (where N is an integer of 3 or more), and utilizing phase information of the respective reflected waves, detects a distance to each target. Under this detection approach, distance can be properly recognized up to N−1 targets. As the processing to enable this, a fast Fourier transform (FFT) is used, for example. Given N=64 or 128, an FFT is performed for sampling data of a beat signal as a difference between a transmission signal and a reception signal for each frequency, thus obtaining a frequency spectrum (relative velocity). Thereafter, at the frequency of the CW wave, a further FFT is performed for peaks of the same frequency, thus to derive distance information.

Hereinafter, this will be described more specifically.

Figure 52:
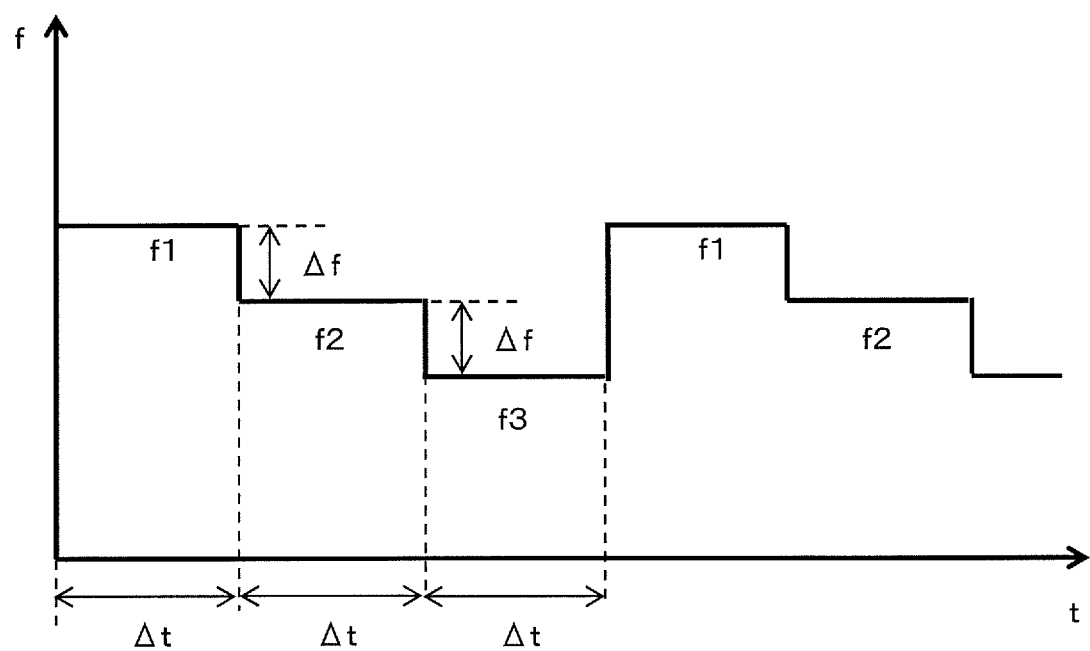
FIG. 52 is a diagram showing a relationship between three frequencies f1, f2 and f3.

For ease of explanation, first, an instance will be described where signals of three frequencies f1, f2 and f3 are transmitted while being switched over time. It is assumed that f1>f2>f3, and f1−f2=f2−f3=Δf. A transmission time Δt is assumed for the signal wave for each frequency. FIG. 52 shows a relationship between three frequencies f1, f2 and f3.

Via the transmission antenna Tx, the triangular wave/CW wave generation circuit 581 (FIG. 48) transmits continuous waves CW of frequencies f1, f2 and f3, each lasting for the time Δt. The reception antennas Rx receive reflected waves resulting by the respective continuous waves CW being reflected off one or plural targets.

Each mixer 584 mixes a transmission wave and a reception wave to generate a beat signal. The A/D converter 587 converts the beat signal, which is an analog signal, into several hundred pieces of digital data (sampling data), for example.

Using the sampling data, the reception intensity calculation section 532 performs FFT computation. Through the FFT computation, frequency spectrum information of reception signals is obtained for the respective transmission frequencies f1, f2 and f3.

Thereafter, the reception intensity calculation section 532 separates peak values from the frequency spectrum information of the reception signals. The frequency of any peak value which is predetermined or greater is in proportion to a relative velocity with respect to a target. Separating a peak value(s) from the frequency spectrum information of reception signals is synonymous with separating one or plural targets with different relative velocities.

Next, with respect to each of the transmission frequencies f1 to f3, the reception intensity calculation section 532 measures spectrum information of peak values of the same relative velocity or relative velocities within a predefined range.

Now, consider a scenario where two targets A and B exist which have about the same relative velocity but are at respectively different distances. A transmission signal of the frequency f1 will be reflected from both of targets A and B to result in reception signals being obtained. The reflected waves from targets A and B will result in substantially the same beat signal frequency. Therefore, the power spectra at the Doppler frequencies of the reception signals, corresponding to their relative velocities, are obtained as a synthetic spectrum F1 into which the power spectra of two targets A and B have been merged.

Similarly, for each of the frequencies f2 and f3, the power spectra at the Doppler frequencies of the reception signals, corresponding to their relative velocities, are obtained as a synthetic spectrum F1 into which the power spectra of two targets A and B have been merged.

Figure 53:
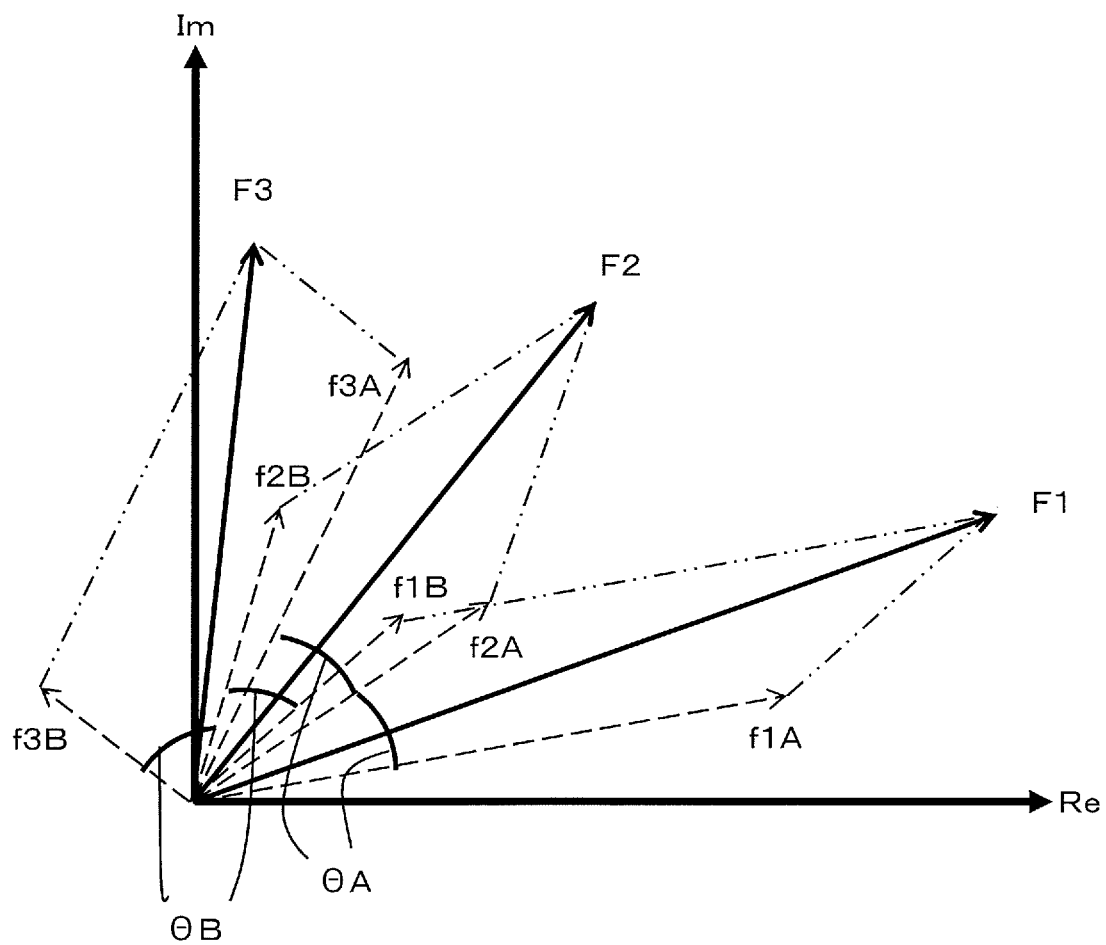
FIG. 53 is a diagram showing a relationship between synthetic spectra F1 to F3 on a complex plane.

FIG. 53 shows a relationship between synthetic spectra F1 to F3 on a complex plane. In the directions of the two vectors composing each of the synthetic spectra F1 to F3, the right vector corresponds to the power spectrum of a reflected wave from target A; i.e., vectors f1A, f2A and f3A, in FIG. 53. On the other hand, in the directions of the two vectors composing each of the synthetic spectra F1 to F3, the left vector corresponds to the power spectrum of a reflected wave from target B; i.e., vectors f1B, f2B and f3B in FIG. 53.

Under a constant difference Δf between the transmission frequencies, the phase difference between the reception signals corresponding to the respective transmission signals of the frequencies f1 and f2 is in proportion to the distance to a target. Therefore, the phase difference between the vectors f1A and f2A and the phase difference between the vectors f2A and f3A are of the same value θA, this phase difference θA being in proportion to the distance to target A. Similarly, the phase difference between the vectors f1B and f2B and the phase difference between the vectors f2B and f3B are of the same value θB, this phase difference θB being in proportion to the distance to target B.

By using a well-known method, the respective distances to targets A and B can be determined from the synthetic spectra F1 to F3 and the difference Δf between the transmission frequencies. This technique is disclosed in U.S. Pat. No. 6,703,967, for example. The entire disclosure of this publication is incorporated herein by reference.

Similar processing is also applicable when the transmitted signals have four or more frequencies.

Note that, before transmitting continuous waves CW at N different frequencies, a process of determining the distance to and relative velocity of each target may be performed by the 2 frequency CW method. Then, under predetermined conditions, this process may be switched to a process of transmitting continuous waves CW at N different frequencies. For example, FFT computation may be performed by using the respective beat signals at the two frequencies, and if the power spectrum of each transmission frequency undergoes a change over time of 30% or more, the process may be switched. The amplitude of a reflected wave from each target undergoes a large change over time due to multipath influences and the like. When there exists a change of a predetermined magnitude or greater, it may be considered that plural targets may exist.

Moreover, the CW method is known to be unable to detect a target when the relative velocity between the radar system and the target is zero, i.e., when the Doppler frequency is zero. However, when a pseudo Doppler signal is determined by the following methods, for example, it is possible to detect a target by using that frequency.

(Method 1) A mixer that causes a certain frequency shift in the output of a receiving antenna is added. By using a transmission signal and a reception signal with a shifted frequency, a pseudo Doppler signal can be obtained.

(Method 2) A variable phase shifter to introduce phase changes continuously over time is inserted between the output of a receiving antenna and a mixer, thus adding a pseudo phase difference to the reception signal. By using a transmission signal and a reception signal with an added phase difference, a pseudo Doppler signal can be obtained.

An example of specific construction and operation of inserting a variable phase shifter to generate a pseudo Doppler signal under Method 2 is disclosed in Japanese Laid-Open Patent Publication No. 2004-257848. The entire disclosure of this publication is incorporated herein by reference.

When targets with zero or very little relative velocity need to be detected, the aforementioned processes of generating a pseudo Doppler signal may be adopted, or the process may be switched to a target detection process under the FMCW method.

Next, with reference to FIG. 54, a procedure of processing to be performed by the object detection apparatus 570 of the onboard radar system 510 will be described.

The example below will illustrate a case where continuous waves CW are transmitted at two different frequencies fp1 and fp2 (fp1<fp2), and the phase information of each reflected wave is utilized to respectively detect a distance with respect to a target.

Figure 54:
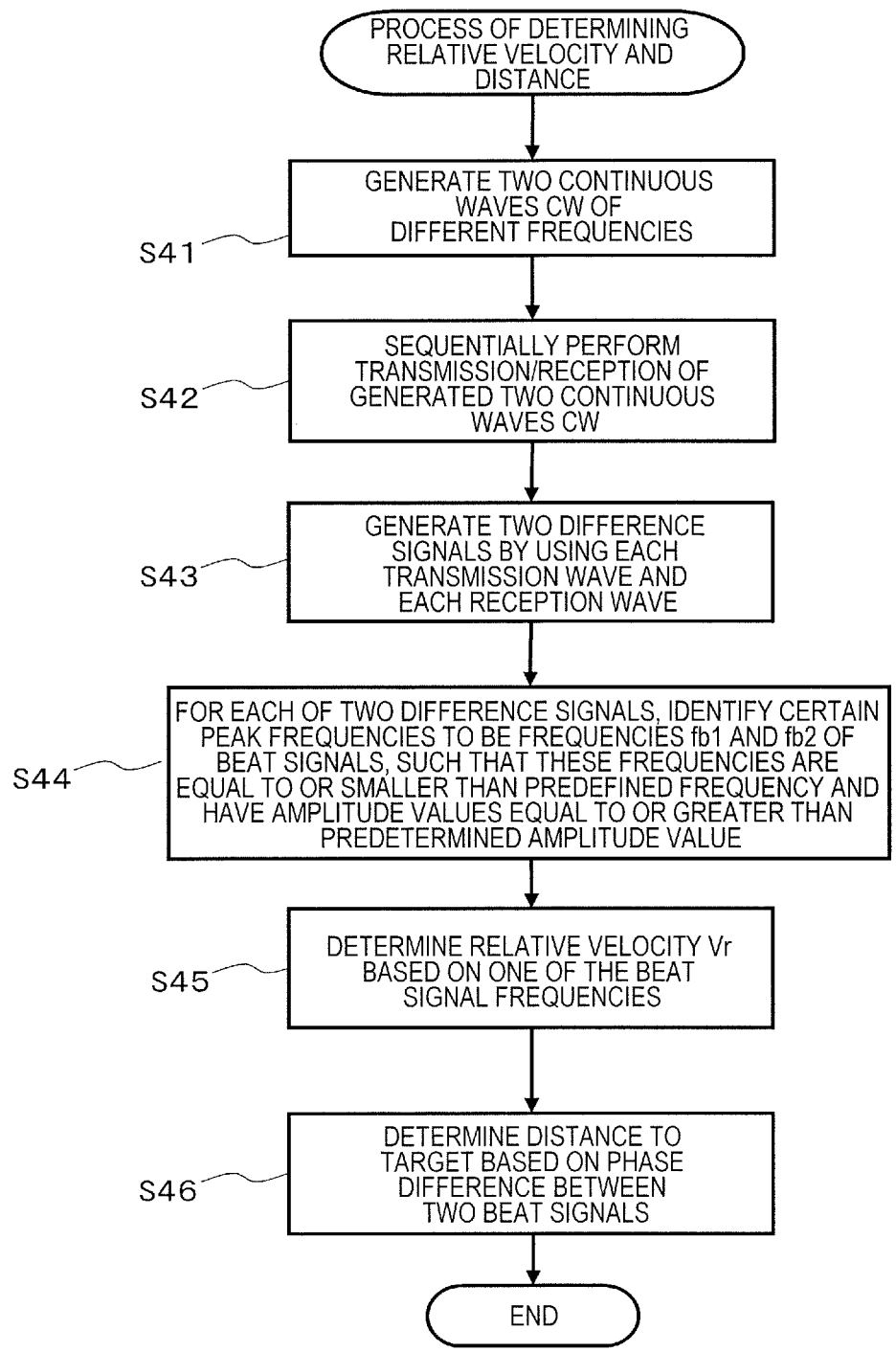
FIG. 54 is a flowchart showing the procedure of a process of determining relative velocity and distance.

FIG. 54 is a flowchart showing the procedure of a process of determining relative velocity and distance according to this variant.

At step S41, the triangular wave/CW wave generation circuit 581 generates two continuous waves CW of frequencies which are slightly apart, i.e., frequencies fp1 and fp2.

At step S42, the transmission antenna Tx and the reception antennas Rx perform transmission/reception of the generated series of continuous waves CW. Note that the process of step S41 and the process of step S42 are to be performed in parallel fashion respectively by the triangular wave/CW wave generation circuit 581 and the transmission antenna Tx/reception antenna Rx, rather than step S42 following only after completion of step S41.

At step S43, each mixer 584 generates a difference signal by utilizing each transmission wave and each reception wave, whereby two difference signals are obtained. Each reception wave is inclusive of a reception wave emanating from a still object and a reception wave emanating from a target. Therefore, next, a process of identifying frequencies to be utilized as the beat signals is performed. Note that the process of step S41, the process of step S42, and the process of step S43 are to be performed in parallel fashion by the triangular wave/CW wave generation circuit 581, the transmission antenna Tx/reception antenna Rx, and the mixers 584, rather than step S42 following only after completion of step S41, or step S43 following only after completion of step S42.

At step S44, for each of the two difference signals, the object detection apparatus 570 identifies certain peak frequencies to be frequencies fb1 and fb2 of beat signals, such that these frequencies are equal to or smaller than a frequency which is predefined as a threshold value and yet they have amplitude values which are equal to or greater than a predetermined amplitude value, and that the difference between the two frequencies is equal to or smaller than a predetermined value.

At step S45, based on one of the two beat signal frequencies identified, the reception intensity calculation section 532 detects a relative velocity. The reception intensity calculation section 532 calculates the relative velocity according to Vr=fb1·c/2·fp1, for example. Note that a relative velocity may be calculated by utilizing each of the two beat signal frequencies, which will allow the reception intensity calculation section 532 to verify whether they match or not, thus enhancing the precision of relative velocity calculation.

At step S46, the reception intensity calculation section 532 determines a phase difference $\Delta\phi$ between two beat signals fb1 and fb2, and determines a distance R=c·$\Delta\phi$/4$\pi$(fp2−fp1) to the target.

Through the above processes, the relative velocity and distance to a target can be detected.

Note that continuous waves CW may be transmitted at N different frequencies (where N is 3 or more), and by utilizing phase information of the respective reflected wave, distances to plural targets which are of the same relative velocity but at different positions may be detected.

In addition to the radar system 510, the vehicle 500 described above may further include another radar system. For example, the vehicle 500 may further include a radar system having a detection range toward the rear or the sides of the vehicle body. In the case of incorporating a radar system having a detection range toward the rear of the vehicle body, the radar system may monitor the rear, and if there is any danger of having another vehicle bump into the rear, make a response by issuing an alarm, for example. In the case of incorporating a radar system having a detection range toward the sides of the vehicle body, the radar system may monitor an adjacent lane when the driver's vehicle changes its lane, etc., and make a response by issuing an alarm or the like as necessary.

The applications of the above-described radar system 510 are not limited to onboard use only. Rather, the radar system 510 may be used as sensors for various purposes. For example, it may be used as a radar for monitoring the surroundings of a house or any other building. Alternatively, it may be used as a sensor for detecting the presence or absence of a person at a specific indoor place, or whether or not such a person is undergoing any motion, etc., without utilizing any optical images.

[Supplementary Details of Processing]

Other embodiments will be described in connection with the 2 frequency CW or FMCW techniques for array antennas as described above. As described earlier, in the example of FIG. 48, the reception intensity calculation section 532 applies a Fourier transform to the respective beat signals for the channels $Ch_1$ to $Ch_M$ (lower graph in FIG. 49) stored in the memory 531. These beat signals are complex signals, in order that the phase of the signal of computational interest be identified. This allows the direction of an arriving wave to be accurately identified. In this case, however, the computational load for Fourier transform increases, thus calling for a larger-scaled circuit.

In order to solve this problem, a scalar signal may be generated as a beat signal. For each of a plurality of beat signals that have been generated, two complex Fourier transforms may be performed with respect to the spatial axis direction, which conforms to the antenna array, and to the time axis direction, which conforms to the lapse of time, thus to obtain results of frequency analysis. As a result, with only a small amount of computation, beam formation can eventually be achieved so that directions of arrival of reflected waves can be identified, whereby results of frequency analysis can be obtained for the respective beams. As a patent document related to the present disclosure, the entire disclosure of the specification of U.S. Pat. No. 6,339,395 is incorporated herein by reference.

[Optical Sensor, e.g., Camera, and Millimeter Wave Radar]

Next, a comparison between the above-described array antenna and conventional antennas, as well as an exemplary application in which both of the present array antenna and an optical sensor (e.g., a camera) are utilized, will be described. Note that LIDAR or the like may be employed as the optical sensor.

A millimeter wave radar is able to directly detect a distance (range) to a target and a relative velocity thereof. Another characteristic is that its detection performance is not much deteriorated in the nighttime (including dusk), or in bad weather, e.g., rainfall, fog, or snowfall. On the other hand, it is believed that it is not just as easy for a millimeter wave radar to take a two-dimensional grasp of a target as it is for a camera. On the other hand, it is relatively easy for a camera to take a two-dimensional grasp of a target and recognize its shape. However, a camera may not be able to image a target in nighttime or bad weather, which presents a considerable problem. This problem is particularly outstanding when droplets of water have adhered to the portion through which to ensure lighting, or the eyesight is narrowed by a fog. This problem similarly exists for LIDAR or the like, which also pertains to the realm of optical sensors.

In these years, in answer to increasing demand for safer vehicle operation, driver assist systems for preventing collisions or the like are being developed. A driver assist system acquires an image in the direction of vehicle travel with a sensor such as a camera or a millimeter wave radar, and when any obstacle is recognized that is predicted to hinder vehicle travel, brakes or the like are automatically applied to prevent collisions or the like. Such a function of collision avoidance is expected to operate normally, even in nighttime or bad weather.

Hence, driver assist systems of a so-called fusion construction are gaining prevalence, where, in addition to a conventional optical sensor such as a camera, a millimeter wave radar is mounted as a sensor, thus realizing a recognition process that takes advantage of both. Such a driver assist system will be discussed later.

On the other hand, higher and higher functions are being required of the millimeter wave radar itself. A millimeter wave radar for onboard use mainly uses electromagnetic waves of the 76 GHz band. The antenna power of its antenna is restricted to below a certain level under each country's law or the like. For example, it is restricted to 0.01 W or below in Japan. Under such restrictions, a millimeter wave radar for onboard use is expected to satisfy the required performance that, for example, its detection range is 200 m or more; the antenna size is 60 mm×60 mm or less; its horizontal detection angle is 90 degrees or more; its range resolution is 20 cm or less; it is capable of short-range detection within 10 m; and so on. Conventional millimeter wave radars have used microstrip lines as waveguides, and patch antennas as antennas (hereinafter, these will both be referred to as "patch antennas"). However, with a patch antenna, it has been difficult to attain the aforementioned performance.

By using a slot array antenna to which the technique of the present disclosure is applied, the inventors have successfully achieved the aforementioned performance. As a result, a millimeter wave radar has been realized which is smaller in size, more efficient, and higher-performance than are conventional patch antennas and the like. In addition, by combining this millimeter wave radar and an optical sensor such as a camera, a small-sized, highly efficient, and high-performance fusion apparatus has been realized which has existed never before. This will be described in detail below.

Figure 55:
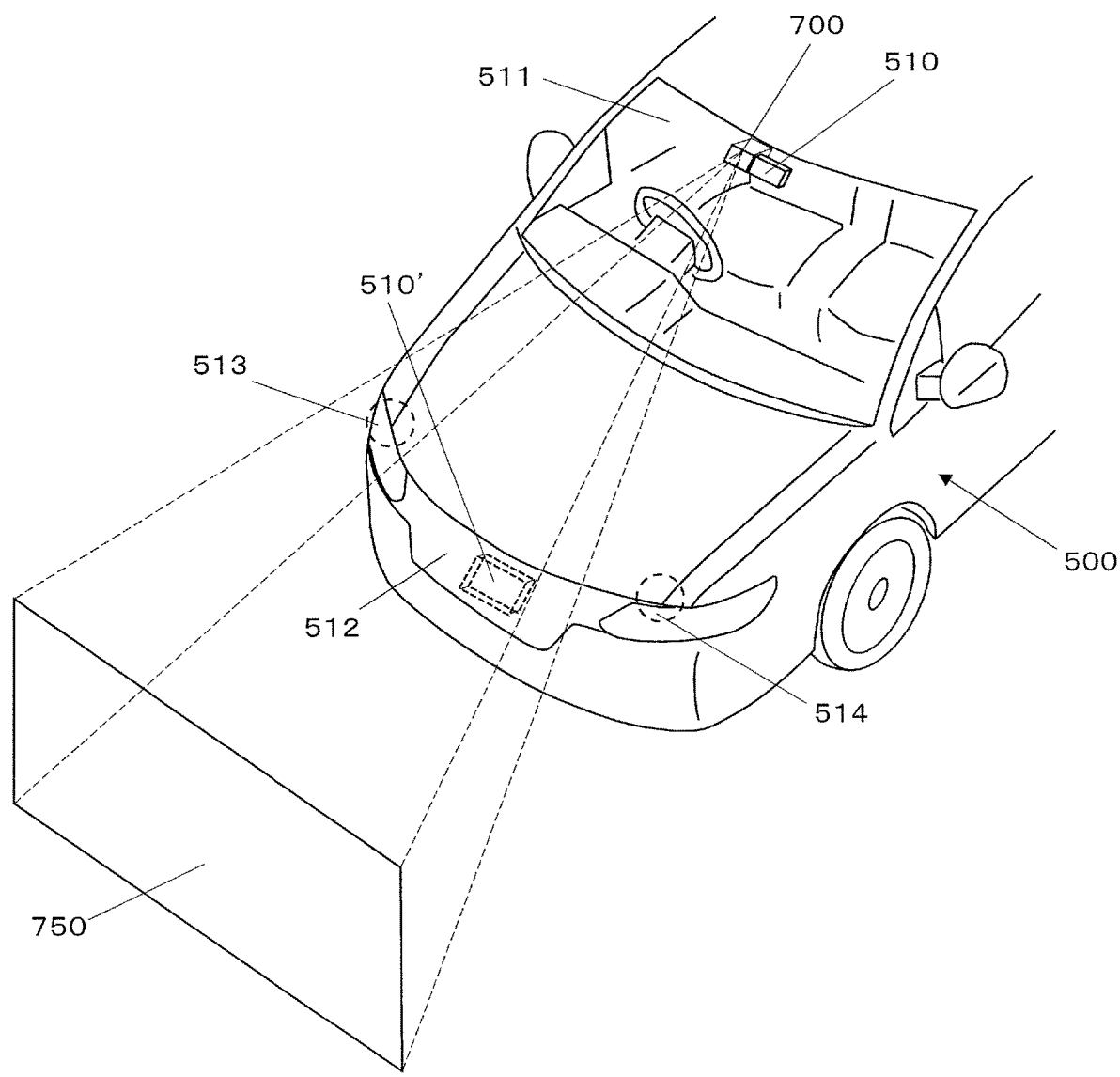
FIG. 55 is a diagram concerning a fusion apparatus in which a radar system 510 having a slot array antenna and an onboard camera system 700 are included.

FIG. 55 is a diagram concerning a fusion apparatus in a vehicle 500, the fusion apparatus including an onboard camera system 700 and a radar system 510 (hereinafter referred to also as the millimeter wave radar 510) having a slot array antenna to which the technique of the present disclosure is applied. With reference to this figure, various embodiments will be described below.

[Installment of Millimeter Wave Radar within Vehicle Room]

A conventional patch antenna-based millimeter wave radar 510' is placed behind and inward of a grill 512 which is at the front nose of a vehicle. An electromagnetic wave that is radiated from an antenna goes through the apertures in the grill 512, and is radiated ahead of the vehicle 500. In this case, no dielectric layer, e.g., glass, exists that decays or reflects electromagnetic wave energy, in the region through which the electromagnetic wave passes. As a result, an electromagnetic wave that is radiated from the patch antenna-based millimeter wave radar 510' reaches over a long range, e.g., to a target which is 150 m or farther away. By receiving with the antenna the electromagnetic wave reflected therefrom, the millimeter wave radar 510' is able to detect a target. In this case, however, since the antenna is placed behind and inward of the grill 512 of the vehicle, the radar may be broken when the vehicle collides into an obstacle. Moreover, it may be soiled with mud or the like in rain, etc., and the soil that has adhered to the antenna may hinder radiation and reception of electromagnetic waves.

Similarly to the conventional manner, the millimeter wave radar 510 incorporating a slot array antenna according to an embodiment of the present disclosure may be placed behind the grill 512, which is located at the front nose of the vehicle (not shown). This allows the energy of the electromagnetic wave to be radiated from the antenna to be utilized by 100%, thus enabling long-range detection beyond the conventional level, e.g., detection of a target which is at a distance of 250 m or more.

Furthermore, the millimeter wave radar 510 according to an embodiment of the present disclosure can also be placed within the vehicle room, i.e., inside the vehicle. In that case, the millimeter wave radar 510 is placed inward of the windshield 511 of the vehicle, to fit in a space between the windshield 511 and a face of the rearview mirror (not shown) that is opposite to its specular surface. On the other hand, the conventional patch antenna-based millimeter wave radar 510' cannot be placed inside the vehicle room mainly for the two following reasons. A first reason is its large size, which prevents itself from being accommodated within the space between the windshield 511 and the rearview mirror.

A second reason is that an electromagnetic wave that is radiated ahead reflects off the windshield 511 and decays due to dielectric loss, thus becoming unable to travel the desired distance. As a result, if a conventional patch antenna-based millimeter wave radar is placed within the vehicle room, only targets which are 100 m ahead or less can be detected, for example. On the other hand, a millimeter wave radar according to an embodiment of the present disclosure is able to detect a target which is at a distance of 200 m or more, despite reflection or decay at the windshield 511. This performance is equivalent to, or even greater than, the case where a conventional patch antenna-based millimeter wave radar is placed outside the vehicle room.

[Fusion Construction Based on Millimeter Wave Radar and Camera, Etc., being Placed within Vehicle Room]

Currently, an optical imaging device such as a CCD camera is used as the main sensor in many a driver assist system (Driver Assist System). Usually, a camera or the like is placed within the vehicle room, inward of the windshield 511, in order to account for unfavorable influences of the external environment, etc. In this context, in order to minimize the optical effect of raindrops and the like, the camera or the like is placed in a region which is swept by the wipers (not shown) but is inward of the windshield 511.

In recent years, due to needs for improved performance of a vehicle in terms of e.g. automatic braking, there has been a desire for automatic braking or the like that is guaranteed to work regardless of whatever external environment may exist. In this case, if the only sensor in the driver assist system is an optical device such as a camera, a problem exists in that reliable operation is not guaranteed in nighttime or bad weather. This has led to the need for a driver assist system that incorporates not only an optical sensor (such as a camera) but also a millimeter wave radar, these being used for cooperative processing, so that reliable operation is achieved even in nighttime or bad weather.

Figure 56:
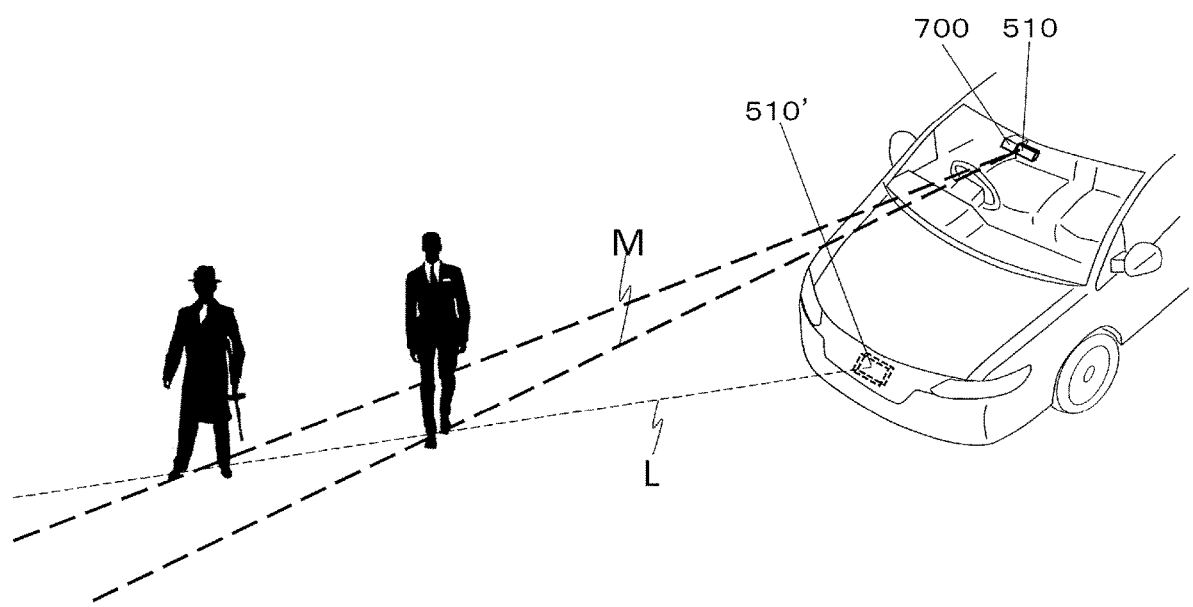
FIG. 56 is a diagram illustrating how placing a millimeter wave radar 510 and a camera at substantially the same position within the vehicle room may allow them to acquire an identical field of view and line of sight, thus facilitating a matching process.

As described earlier, a millimeter wave radar incorporating the present slot array antenna permits itself to be placed within the vehicle room, due to downsizing and remarkable enhancement in the efficiency of the radiated electromagnetic wave over that of a conventional patch antenna. By taking advantage of these properties, as shown in FIG. 55, the millimeter wave radar 510, which incorporates not only an optical sensor (onboard camera system) 700 such as a camera but also a slot array antenna according to the present disclosure, allows both to be placed inward of the windshield 511 of the vehicle 500. This has created the following novel effects. (1) It is easier to install the driver assist system on the vehicle 500. The conventional patch antenna-based millimeter wave radar 510' has required a space behind the grill 512, which is at the front nose, in order to accommodate the radar. Since this space may include some sites that affect the structural design of the vehicle, if the size of the radar device is changed, it may have been necessary to reconsider the structural design. This inconvenience is avoided by placing the millimeter wave radar within the vehicle room. (2) Free from the influences of rain, nighttime, or other external environment factors to the vehicle, more reliable operation can be achieved. Especially, as shown in FIG. 56, by placing the millimeter wave radar (onboard camera system) 510 and the onboard camera system 700 at substantially the same position within the vehicle room, they can attain an identical field of view and line of sight, thus facilitating the "matching process" which will be described later, i.e., a process through which to establish that respective pieces of target information captured by them actually come from an identical object. On the other hand, if the millimeter wave radar 510' were placed behind the grill 512, which is at the front nose outside the vehicle room, its radar line of sight L would differ from a radar line of sight M of the case where it was placed within the vehicle room, thus resulting in a large offset with the image to be acquired by the onboard camera system 700. (3) Reliability of the millimeter wave radar device is improved. As described above, since the conventional patch antenna-based millimeter wave radar 510' is placed behind the grill 512, which is at the front nose, it is likely to gather soil, and may be broken even in a minor collision accident or the like. For these reasons, cleaning and functionality checks are always needed. Moreover, as will be described below, if the position or direction of attachment of the millimeter wave radar becomes shifted due to an accident or the like, it is necessary to reestablish alignment with respect to the camera. The chances of such occurrences are reduced by placing the millimeter wave radar within the vehicle room, whereby the aforementioned inconveniences are avoided.

In a driver assist system of such fusion construction, the optical sensor, e.g., a camera, and the millimeter wave radar 510 incorporating the present slot array antenna may have an integrated construction, i.e., being in fixed position with respect to each other. In that case, certain relative positioning should be kept between the optical axis of the optical sensor such as a camera and the directivity of the antenna of the millimeter wave radar, as will be described later. When this driver assist system having an integrated construction is fixed within the vehicle room of the vehicle 500, the optical axis of the camera, etc., should be adjusted so as to be oriented in a certain direction ahead of the vehicle. For these matters, see US Patent Application Publication No. 2015/0264230, US Patent Application Publication No. 2016/0264065, U.S. patent application Ser. No. 15/248,141, U.S. patent application Ser. No. 15/248,149, and U.S. patent application Ser. No. 15/248,156, which are incorporated herein by reference. Related techniques concerning the camera are described in the specification of U.S. Pat. No. 7,355,524, and the specification of U.S. Pat. No. 7,420,159, the entire disclosure of each which is incorporated herein by reference.

Regarding placement of an optical sensor such as a camera and a millimeter wave radar within the vehicle room, see, for example, the specification of U.S. Pat. No. 8,604,968, the specification of U.S. Pat. No. 8,614,640, and the specification of U.S. Pat. No. 7,978,122, the entire disclosure of each which is incorporated herein by reference. However, at the time when these patents were filed for, only conventional antennas with patch antennas were the known millimeter wave radars, and thus observation was not possible over sufficient distances. For example, the distance that is observable with a conventional millimeter wave radar is considered to be at most 100 m to 150 m. Moreover, when a millimeter wave radar is placed inward of the windshield, the large radar size inconveniently blocks the driver's field of view, thus hindering safe driving. On the other hand, a millimeter wave radar incorporating a slot array antenna according to an embodiment of the present disclosure is capable of being placed within the vehicle room because of its small size and remarkable enhancement in the efficiency of the radiated electromagnetic wave over that of a conventional patch antenna. This enables a long-range observation over 200 m, while not blocking the driver's field of view.

[Adjustment of Position of Attachment Between Millimeter Wave Radar and Camera, Etc.,]

In the processing under fusion construction (which hereinafter may be referred to as a "fusion process"), it is desired that an image which is obtained with a camera or the like and the radar information which is obtained with the millimeter wave radar map onto the same coordinate system because, if they differ as to position and target size, cooperative processing between both will be hindered.

This involves adjustment from the following three standpoints.

(1) The optical axis of the camera or the like and the antenna directivity of the millimeter wave radar must have a certain fixed relationship.

It is required that the optical axis of the camera or the like and the antenna directivity of the millimeter wave radar are matched. Alternatively, a millimeter wave radar may include two or more transmission antennas and two or more reception antennas, the directivities of these antennas being intentionally made different. Therefore, it is necessary to guarantee that at least a certain known relationship exists between the optical axis of the camera or the like and the directivities of these antennas.

In the case where the camera or the like and the millimeter wave radar have the aforementioned integrated construction, i.e., being in fixed position to each other, the relative positioning between the camera or the like and the millimeter wave radar stays fixed. Therefore, the aforementioned requirements are satisfied with respect to such an integrated construction. On the other hand, in a conventional patch antenna or the like, where the millimeter wave radar is placed behind the grill 512 of the vehicle 500, the relative positioning between them is usually to be adjusted according to (2) below.

(2) A certain fixed relationship exists between an image acquired with the camera or the like and radar information of the millimeter wave radar in an initial state (e.g., upon shipment) of having been attached to the vehicle.

The positions of attachment of the optical sensor such as a camera and the millimeter wave radar 510 or 510' on the vehicle 500 will finally be determined in the following manner. At a predetermined position 800 ahead of the vehicle 500, a chart to serve as a reference or a target which is subject to observation by the radar (which will hereinafter be referred to as, respectively, a "reference chart" and a "reference target", and collectively as the "benchmark") is accurately positioned. This is observed with an optical sensor such as a camera or with the millimeter wave radar 510. The observation information regarding the observed benchmark is compared against previously-stored shape information or the like of the benchmark, and the current offset information is quantitated. Based on this offset information, by at least one of the following means, the positions of attachment of an optical sensor such as a camera and the millimeter wave radar 510 or 510' are adjusted or corrected. Any other means may also be employed that can provide similar results.

(i) Adjust the positions of attachment of the camera and the millimeter wave radar so that the benchmark will come at a midpoint between the camera and the millimeter wave radar. This adjustment may be done by using a jig or tool, etc., which is separately provided.

(ii) Determine an offset amounts of the camera and the axis/directivity of the millimeter wave radar relative to the benchmark, and through image processing of the camera image and radar processing, correct for these offset amounts in the axis/directivity.

What is to be noted is that, in the case where the optical sensor such as a camera and the millimeter wave radar 510 incorporating a slot array antenna according to an embodiment of the present disclosure have an integrated construction, i.e., being in fixed position to each other, adjusting an offset of either the camera or the radar with respect to the benchmark will make the offset amount known for the other as well, thus making it unnecessary to check for the other's offset with respect to the benchmark.

Specifically, with respect to the onboard camera system 700, a reference chart may be placed at a predetermined position 750, and an image taken by the camera is compared against advance information indicating where in the field of view of the camera the reference chart image is supposed to be located, thereby detecting an offset amount. Based on this, the camera is adjusted by at least one of the above means (i) and (ii). Next, the offset amount which has been ascertained for the camera is translated into an offset amount of the millimeter wave radar. Thereafter, an offset amount adjustment is made with respect to the radar information, by at least one of the above means (i) and (ii).

Alternatively, this may be performed on the basis of the millimeter wave radar 510. In other words, with respect to the millimeter wave radar 510, a reference target may be placed at a predetermined position 800, and the radar information thereof is compared against advance information indicating where in the field of view of the millimeter wave radar 510 the reference target is supposed to be located, thereby detecting an offset amount. Based on this, the millimeter wave radar 510 is adjusted by at least one of the above means (i) and (ii). Next, the offset amount which has been ascertained for the millimeter wave radar is translated into an offset amount of the camera. Thereafter, an offset amount adjustment is made with respect to the image information obtained by the camera, by at least one of the above means (i) and (ii).

(3) Even after an initial state of the vehicle, a certain relationship is maintained between an image acquired with the camera or the like and radar information of the millimeter wave radar.

Usually, an image acquired with the camera or the like and radar information of the millimeter wave radar are supposed to be fixed in the initial state, and hardly vary unless in an accident of the vehicle or the like. However, if an offset in fact occurs between these, an adjustment is possible by the following means.

The camera is attached in such a manner that portions 513 and 514 (characteristic points) that are characteristic of the driver's vehicle fit within its field of view, for example. The positions at which these characteristic points are actually imaged by the camera are compared against the information of the positions to be assumed by these characteristic points when the camera is attached accurately in place, and an offset amount(s) is detected therebetween. Based on this detected offset amount(s), the position of any image that is taken thereafter may be corrected, whereby an offset of the physical position of attachment of the camera can be corrected for. If this correction sufficiently embodies the performance that is required of the vehicle, then the adjustment per the above (2) may not be needed. By regularly performing this adjustment during startup or operation of the vehicle 500, even if an offset of the camera or the like occurs anew, it is possible to correct for the offset amount, thus helping safe travel.

However, this means is generally considered to result in poorer accuracy of adjustment than with the above means (2). When making an adjustment based on an image which is obtained by imaging a benchmark with the camera, the azimuth of the benchmark can be determined with a high precision, whereby a high accuracy of adjustment can be easily achieved. However, since this means utilizes a part of the vehicle body for the adjustment instead of a benchmark, it is rather difficult to enhance the accuracy of azimuth determination. Thus, the resultant accuracy of adjustment will be somewhat inferior. However, it may still be effective as a means of correction when the position of attachment of the camera or the like is considerably altered for reasons such as an accident or a large external force being applied to the camera or the like within the vehicle room, etc.

[Mapping of Target as Detected by Millimeter Wave Radar and Camera or the Like: Matching Process]

In a fusion process, for a given target, it needs to be established that an image thereof which is acquired with a camera or the like and radar information which is acquired with the millimeter wave radar pertain to "the same target". For example, suppose that two obstacles (first and second obstacles), e.g., two bicycles, have appeared ahead of the vehicle 500. These two obstacles will be captured as camera images, and detected as radar information of the millimeter wave radar. At this time, the camera image and the radar information with respect to the first obstacle need to be mapped to each other so that they are both directed to the same target. Similarly, the camera image and the radar information with respect to the second obstacle need to be mapped to each other so that they are both directed to the same target. If the camera image of the first obstacle and the radar information of the second obstacle are mistakenly recognized to pertain to an identical object, a considerable accident may occur. Hereinafter, in the present specification, such a process of determining whether a target in the camera image and a target in the radar image pertain to the same target may be referred to as a "matching process".

This matching process may be implemented by various detection devices (or methods) described below. Hereinafter, these will be specifically described. Note that the each of the following detection devices is to be installed in the vehicle, and at least includes a millimeter wave radar detection section, an image detection section (e.g., a camera) which is oriented in a direction overlapping the direction of detection by the millimeter wave radar detection section, and a matching section. Herein, the millimeter wave radar detection section includes a slot array antenna according to any of the embodiments of the present disclosure, and at least acquires radar information in its own field of view. The image acquisition section at least acquires image information in its own field of view. The matching section includes a processing circuit which matches a result of detection by the millimeter wave radar detection section against a result of detection by the image detection section to determine whether or not the same target is being detected by the two detection sections. Herein, the image detection section may be composed of a selected one of, or selected two or more of, an optical camera, LIDAR, an infrared radar, and an ultrasonic radar. The following detection devices differ from one another in terms of the detection process at their respective matching section.

In a first detection device, the matching section performs two matches as follows. A first match involves, for a target of interest that has been detected by the millimeter wave radar detection section, obtaining distance information and lateral position information thereof, and also finding a target that is the closest to the target of interest among a target or two or more targets detected by the image detection section, and detecting a combination(s) thereof. A second match involves, for a target of interest that has been detected by the image detection section, obtaining distance information and lateral position information thereof, and also finding a target that is the closest to the target of interest among a target or two or more targets detected by the millimeter wave radar detection section, and detecting a combination(s) thereof. Furthermore, this matching section determines whether there is any matching combination between the combination(s) of such targets as detected by the millimeter wave radar detection section and the combination(s) of such targets as detected by the image detection section. Then, if there is any matching combination, it is determined that the same object is being detected by the two detection sections. In this manner, a match is attained between the respective targets that have been detected by the millimeter wave radar detection section and the image detection section.

A related technique is described in the specification of U.S. Pat. No. 7,358,889, the entire disclosure of which is incorporated herein by reference. In this publication, the image detection section is illustrated by way of a so-called stereo camera that includes two cameras. However, this technique is not limited thereto. In the case where the image detection section includes a single camera, detected targets may be subjected to an image recognition process or the like as appropriate, in order to obtain distance information and lateral position information of the targets. Similarly, a laser sensor such as a laser scanner may be used as the image detection section.

In a second detection device, the matching section matches a result of detection by the millimeter wave radar detection section and a result of detection by the image detection section every predetermined period of time. If the matching section determines that the same target was being detected by the two detection sections in the previous result of matching, it performs a match by using this previous result of matching. Specifically, the matching section matches a target which is currently detected by the millimeter wave radar detection section and a target which is currently detected by the image detection section, against the target which was determined in the previous result of matching to be being detected by the two detection sections. Then, based on the result of matching for the target which is currently detected by the millimeter wave radar detection section and the result of matching for the target which is currently detected by the image detection section, the matching section determines whether or not the same target is being detected by the two detection sections. Thus, rather than directly matching the results of detection by the two detection sections, this detection device performs a chronological match between the two results of detection and a previous result of matching. Therefore, the accuracy of detection is improved over the case of only performing a momentary match, whereby stable matching is realized. In particular, even if the accuracy of the detection section drops momentarily, matching is still possible because of utilizing past results of matching. Moreover, by utilizing the previous result of matching, this detection device is able to easily perform a match between the two detection sections.

In the current match which utilizes the previous result of matching, if the matching section of this detection device determines that the same object is being detected by the two detection sections, then the matching section of this detection device excludes this determined object in performing matching between objects which are currently detected by the millimeter wave radar detection section and objects which are currently detected by the image detection section. Then, this matching section determines whether there exists any identical object that is currently detected by the two detection sections. Thus, while taking into account the result of chronological matching, the detection device also makes a momentary match based on two results of detection that are obtained from moment to moment. As a result, the detection device is able to surely perform a match for any object that is detected during the current detection.

A related technique is described in the specification of U.S. Pat. No. 7,417,580, the entire disclosure of which is incorporated herein by reference. In this publication, the image detection section is illustrated by way of a so-called stereo camera that includes two cameras. However, this technique is not limited thereto. In the case where the image detection section includes a single camera, detected targets may be subjected to an image recognition process or the like as appropriate, in order to obtain distance information and lateral position information of the targets. Similarly, a laser sensor such as a laser scanner may be used as the image detection section.

In a third detection device, the two detection sections and matching section perform detection of targets and performs matches therebetween at predetermined time intervals, and the results of such detection and the results of such matching are chronologically stored to a storage medium, e.g., memory. Then, based on a rate of change in the size of a target in the image as detected by the image detection section, and on a distance to a target from the driver's vehicle and its rate of change (relative velocity with respect to the driver's vehicle) as detected by the millimeter wave radar detection section, the matching section determines whether the target which has been detected by the image detection section and the target which has been detected by the millimeter wave radar detection section are an identical object.

When determining that these targets are an identical object, based on the position of the target in the image as detected by the image detection section, and on the distance to the target from the driver's vehicle and/or its rate of change as detected by the millimeter wave radar detection section, the matching section predicts a possibility of collision with the vehicle.

A related technique is described in the specification of U.S. Pat. No. 6,903,677, the entire disclosure of which is incorporated herein by reference.

As described above, in a fusion process of a millimeter wave radar and an imaging device such as a camera, an image which is obtained with the camera or the like and radar information which is obtained with the millimeter wave radar are matched against each other. A millimeter wave radar incorporating the aforementioned array antenna according to an embodiment of the present disclosure can be constructed so as to have a small size and high performance. Therefore, high performance and downsizing, etc., can be achieved for the entire fusion process including the aforementioned matching process. This improves the accuracy of target recognition, and enables safer travel control for the vehicle.

[Other Fusion Processes]

In a fusion process, various functions are realized based on a matching process between an image which is obtained with a camera or the like and radar information which is obtained with the millimeter wave radar detection section. Examples of processing apparatuses that realize representative functions of a fusion process will be described below.

Each of the following processing apparatuses is to be installed in a vehicle, and at least includes: a millimeter wave radar detection section to transmit or receive electromagnetic waves in a predetermined direction; an image acquisition section, such as a monocular camera, that has a field of view overlapping the field of view of the millimeter wave radar detection section; and a processing section which obtains information therefrom to perform target detection and the like. The millimeter wave radar detection section acquires radar information in its own field of view. The image acquisition section acquires image information in its own field of view. A selected one, or selected two or more of, an optical camera, LIDAR, an infrared radar, and an ultrasonic radar may be used as the image acquisition section. The processing section can be implemented by a processing circuit which is connected to the millimeter wave radar detection section and the image acquisition section. The following processing apparatuses differ from one another with respect to the content of processing by this processing section.

In a first processing apparatus, the processing section extracts, from an image which is captured by the image acquisition section, a target which is recognized to be the same as the target which is detected by the millimeter wave radar detection section. In other words, a matching process according to the aforementioned detection device is performed. Then, it acquires information of a right edge and a left edge of the extracted target image, and derives locus approximation lines, which are straight lines or predetermined curved lines for approximating loci of the acquired right edge and the left edge, are derived for both edges. The edge which has a larger number of edges existing on the locus approximation line is selected as a true edge of the target. The lateral position of the target is derived on the basis of the position of the edge that has been selected as a true edge. This permits a further improvement on the accuracy of detection of a lateral position of the target.

A related technique is described in the specification of U.S. Pat. No. 8,610,620, the entire disclosure of which is incorporated herein by reference.

In a second processing apparatus, in determining the presence of a target, the processing section alters a determination threshold to be used in checking for a target presence in radar information, on the basis of image information. Thus, if a target image that may be an obstacle to vehicle travel has been confirmed with a camera or the like, or if the presence of a target has been estimated, etc., for example, the determination threshold for the target detection by the millimeter wave radar detection section can be optimized so that more accurate target information can be obtained. In other words, if the possibility of the presence of an obstacle is high, the determination threshold is altered so that this processing apparatus will surely be activated. On the other hand, if the possibility of the presence of an obstacle is low, the determination threshold is altered so that unwanted activation of this processing apparatus is prevented. This permits appropriate activation of the system.

Furthermore in this case, based on radar information, the processing section may designate a region of detection for the image information, and estimate a possibility of the presence of an obstacle on the basis of image information within this region. This makes for a more efficient detection process.

A related technique is described in the specification of U.S. Pat. No. 7,570,198, the entire disclosure of which is incorporated herein by reference.

In a third processing apparatus, the processing section performs combined displaying where images obtained from a plurality of different imaging devices and a millimeter wave radar detection section and an image signal based on radar information are displayed on at least one display device. In this displaying process, horizontal and vertical synchronizing signals are synchronized between the plurality of imaging devices and the millimeter wave radar detection section, and among the image signals from these devices, selective switching to a desired image signal is possible within one horizontal scanning period or one vertical scanning period. This allows, on the basis of the horizontal and vertical synchronizing signals, images of a plurality of selected image signals to be displayed side by side; and, from the display device, a control signal for setting a control operation in the desired imaging device and the millimeter wave radar detection section is sent.

When a plurality of different display devices display respective images or the like, it is difficult to compare the respective images against one another. Moreover, when display devices are provided separately from the third processing apparatus itself, there is poor operability for the device. The third processing apparatus would overcome such shortcomings.

A related technique is described in the specification of U.S. Pat. No. 6,628,299 and the specification of U.S. Pat. No. 7,161,561, the entire disclosure of each of which is incorporated herein by reference.

In a fourth processing apparatus, with respect to a target which is ahead of a vehicle, the processing section instructs an image acquisition section and a millimeter wave radar detection section to acquire an image and radar information containing that target. From within such image information, the processing section determines a region in which the target is contained. Furthermore, the processing section extracts radar information within this region, and detects a distance from the vehicle to the target and a relative velocity between the vehicle and the target. Based on such information, the processing section determines a possibility that the target will collide against the vehicle. This enables an early detection of a possible collision with a target.

A related technique is described in the specification of U.S. Pat. No. 8,068,134, the entire disclosure of which is incorporated herein by reference.

In a fifth processing apparatus, based on radar information or through a fusion process which is based on radar information and image information, the processing section recognizes a target or two or more targets ahead of the vehicle. The "target" encompasses any moving entity such as other vehicles or pedestrians, traveling lanes indicated by white lines on the road, road shoulders and any still objects (including gutters, obstacles, etc.), traffic lights, pedestrian crossings, and the like that may be there. The processing section may encompass a GPS (Global Positioning System) antenna. By using a GPS antenna, the position of the driver's vehicle may be detected, and based on this position, a storage device (referred to as a map information database device) that stores road map information may be searched in order to ascertain a current position on the map. This current position on the map may be compared against a target or two or more targets that have been recognized based on radar information or the like, whereby the traveling environment may be recognized. On this basis, the processing section may extract any target that is estimated to hinder vehicle travel, find safer traveling information, and display it on a display device, as necessary, to inform the driver.

A related technique is described in the specification of U.S. Pat. No. 6,191,704, the entire disclosure of which is incorporated herein by reference.

The fifth processing apparatus may further include a data communication device (having communication circuitry) that communicates with a map information database device which is external to the vehicle. The data communication device may access the map information database device, with a period of e.g. once a week or once a month, to download the latest map information therefrom. This allows the aforementioned processing to be performed with the latest map information.

Furthermore, the fifth processing apparatus may compare between the latest map information that was acquired during the aforementioned vehicle travel and information that is recognized of a target or two or more targets based on radar information, etc., in order to extract target information (hereinafter referred to as "map update information") that is not included in the map information. Then, this map update information may be transmitted to the map information database device via the data communication device. The map information database device may store this map update information in association with the map information that is within the database, and update the current map information itself, if necessary. In performing the update, respective pieces of map update information that are obtained from a plurality of vehicles may be compared against one another to check certainty of the update.

Note that this map update information may contain more detailed information than the map information which is carried by any currently available map information database device. For example, schematic shapes of roads may be known from commonly-available map information, but it typically does not contain information such as the width of the road shoulder, the width of the gutter that may be there, any newly occurring bumps or dents, shapes of buildings, and so on. Neither does it contain heights of the roadway and the sidewalk, how a slope may connect to the sidewalk, etc. Based on conditions which are separately set, the map information database device may store such detailed information (hereinafter referred to as "map update details information") in association with the map information. Such map update details information provides a vehicle (including the driver's vehicle) with information which is more detailed than the original map information, thereby rending itself available for not only the purpose of ensuring safe vehicle travel but also some other purposes. As used herein, a "vehicle (including the driver's vehicle)" may be e.g. an automobile, a motorcycle, a bicycle, or any autonomous vehicle to become available in the future, e.g., an electric wheelchair. The map update details information is to be used when any such vehicle may travel.

(Recognition Via Neural Network)

Each of the first to fifth processing apparatuses may further include a sophisticated apparatus of recognition. The sophisticated apparatus of recognition may be provided external to the vehicle. In that case, the vehicle may include a high-speed data communication device that communicates with the sophisticated apparatus of recognition. The sophisticated apparatus of recognition may be constructed from a neural network, which may encompass so-called deep learning and the like. This neural network may include a convolutional neural network (hereinafter referred to as "CNN"), for example. A CNN, a neural network that has proven successful in image recognition, is characterized by possessing one or more sets of two layers, namely, a convolutional layer and a pooling layer.

There exists at least three kinds of information as follows, any of which may be input to a convolutional layer in the processing apparatus:

(1) information that is based on radar information which is acquired by the millimeter wave radar detection section;

(2) information that is based on specific image information which is acquired, based on radar information, by the image acquisition section; or (3) fusion information that is based on radar information and image information which is acquired by the image acquisition section, or information that is obtained based on such fusion information.

Based on information of any of the above kinds, or information based on a combination thereof, product-sum operations corresponding to a convolutional layer are performed. The results are input to the subsequent pooling layer, where data is selected according to a predetermined rule. In the case of max pooling where a maximum value among pixel values is chosen, for example, the rule may dictate that a maximum value be chosen for each split region in the convolutional layer, this maximum value being regarded as the value of the corresponding position in the pooling layer.

A sophisticated apparatus of recognition that is composed of a CNN may include a single set of a convolutional layer and a pooling layer, or a plurality of such sets which are cascaded in series. This enables accurate recognition of a target, which is contained in the radar information and the image information, that may be around a vehicle.

Related techniques are described in the U.S. Pat. No. 8,861,842, the specification of U.S. Pat. No. 9,286,524, and the specification of US Patent Application Publication No. 2016/0140424, the entire disclosure of each of which is incorporated herein by reference.

In a sixth processing apparatus, the processing section performs processing that is related to headlamp control of a vehicle. When a vehicle travels in nighttime, the driver may check whether another vehicle or a pedestrian exists ahead of the driver's vehicle, and control a beam(s) from the headlamp(s) of the driver's vehicle to prevent the driver of the other vehicle or the pedestrian from being dazzled by the headlamp(s) of the driver's vehicle. This sixth processing apparatus automatically controls the headlamp(s) of the driver's vehicle by using radar information, or a combination of radar information and an image taken by a camera or the like.

Based on radar information, or through a fusion process based on radar information and image information, the processing section detects a target that corresponds to a vehicle or pedestrian ahead of the vehicle. In this case, a vehicle ahead of a vehicle may encompass a preceding vehicle that is ahead, a vehicle or a motorcycle in the oncoming lane, and so on. When detecting any such target, the processing section issues a command to lower the beam(s) of the headlamp(s). Upon receiving this command, the control section (control circuit) which is internal to the vehicle may control the headlamp(s) to lower the beam(s) therefrom.

Related techniques are described in the specification of U.S. Pat. No. 6,403,942, the specification of U.S. Pat. No. 6,611,610, the specification of U.S. Pat. No. 8,543,277, the specification of U.S. Pat. No. 8,593,521, and the specification of U.S. Pat. No. 8,636,393, the entire disclosure of each of which is incorporated herein by reference.

According to the above-described processing by the millimeter wave radar detection section, and the above-described fusion process by the millimeter wave radar detection section and an imaging device such as a camera, the millimeter wave radar can be constructed so as to have a small size and high performance, whereby high performance and downsizing, etc., can be achieved for the radar processing or the entire fusion process. This improves the accuracy of target recognition, and enables safer travel control for the vehicle.

Application Example 2: Various Monitoring Systems (Natural Elements, Buildings, Roads, Watch, Security)

A millimeter wave radar (radar system) incorporating an array antenna according to an embodiment of the present disclosure also has a wide range of applications in the fields of monitoring, which may encompass natural elements, weather, buildings, security, nursing care, and the like. In a monitoring system in this context, a monitoring apparatus that includes the millimeter wave radar may be installed e.g. at a fixed position, in order to perpetually monitor a subject(s) of monitoring. Regarding the given subject(s) of monitoring, the millimeter wave radar has its resolution of detection adjusted and set to an optimum value.

A millimeter wave radar incorporating an array antenna according to an embodiment of the present disclosure is capable of detection with a radio frequency electromagnetic wave exceeding e.g. 100 GHz. As for the modulation band in those schemes which are used in radar recognition, e.g., the FMCW method, the millimeter wave radar currently achieves a wide band exceeding 4 GHz, which supports the aforementioned Ultra Wide Band (UWB). Note that the modulation band is related to the range resolution. In a conventional patch antenna, the modulation band was up to about 600 MHz, thus resulting in a range resolution of 25 cm. On the other hand, a millimeter wave radar associated with the present array antenna has a range resolution of 3.75 cm, indicative of a performance which rivals the range resolution of conventional LIDAR. Whereas an optical sensor such as LIDAR is unable to detect a target in nighttime or bad weather as mentioned above, a millimeter wave radar is always capable of detection, regardless of daytime or nighttime and irrespective of weather. As a result, a millimeter wave radar associated with the present array antenna is available for a variety of applications which were not possible with a millimeter wave radar incorporating any conventional patch antenna.

Figure 57:
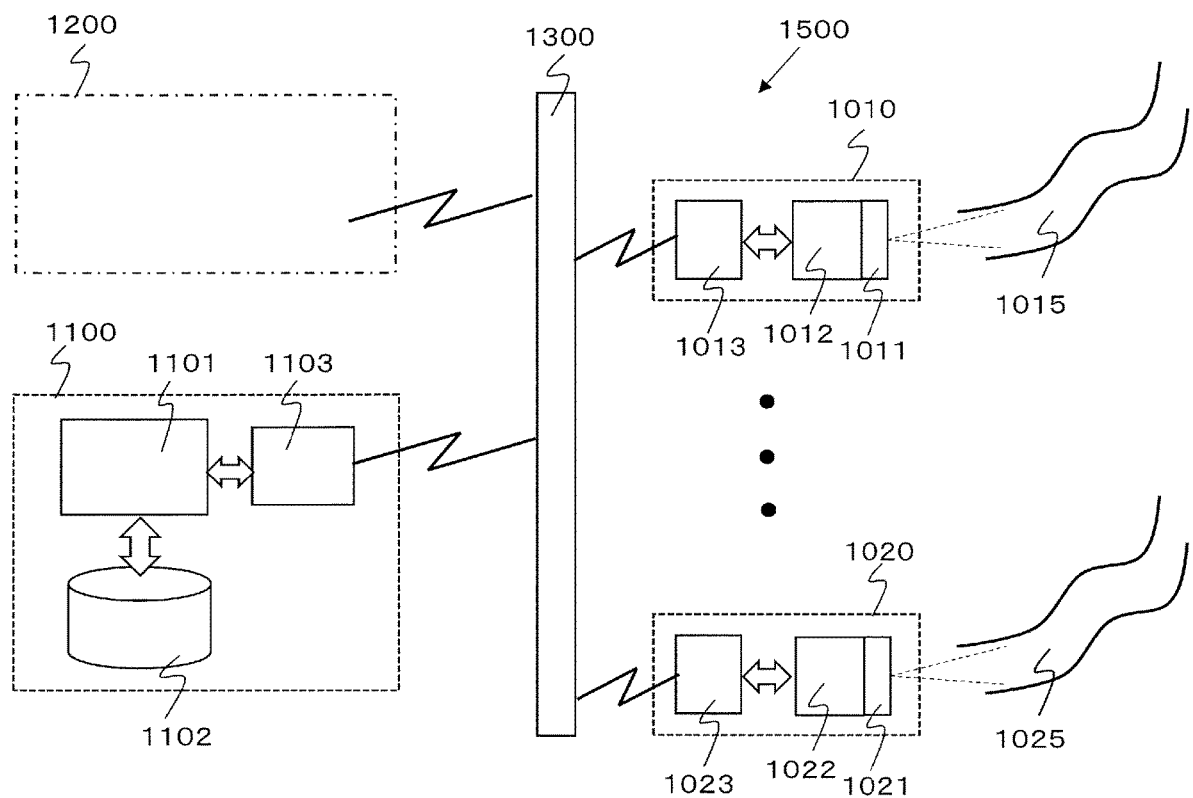
FIG. 57 is a diagram showing an exemplary construction for a monitoring system 1500 based on millimeter wave radar.

FIG. 57 is a diagram showing an exemplary construction for a monitoring system 1500 based on millimeter wave radar. The monitoring system 1500 based on millimeter wave radar at least includes a sensor section 1010 and a main section 1100. The sensor section 1010 at least includes an antenna 1011 which is aimed at the subject of monitoring 1015, a millimeter wave radar detection section 1012 which detects a target based on a transmitted or received electromagnetic wave, and a communication section (communication circuit) 1013 which transmits detected radar information. The main section 1100 at least includes a communication section (communication circuit) 1103 which receives radar information, a processing section (processing circuit) 1101 which performs predetermined processing based on the received radar information, and a data storage section (storage medium) 1102 in which past radar information and other information that is needed for the predetermined processing, etc., are stored. Telecommunication lines 1300 exist between the sensor section 1010 and the main section 1100, via which transmission and reception of information and commands occur between them. As used herein, the telecommunication lines may encompass any of a general-purpose communications network such as the Internet, a mobile communications network, dedicated telecommunication lines, and so on, for example. Note that the present monitoring system 1500 may be arranged so that the sensor section 1010 and the main section 1100 are directly connected, rather than via telecommunication lines. In addition to the millimeter wave radar, the sensor section 1010 may also include an optical sensor such as a camera. This will permit target recognition through a fusion process which is based on radar information and image information from the camera or the like, thus enabling a more sophisticated detection of the subject of monitoring 1015 or the like.

Hereinafter, examples of monitoring systems embodying these applications will be specifically described.

[Natural Element Monitoring System]

A first monitoring system is a system that monitors natural elements (hereinafter referred to as a "natural element monitoring system"). With reference to FIG. 57, this natural element monitoring system will be described. Subjects of monitoring 1015 of the natural element monitoring system 1500 may be, for example, a river, the sea surface, a mountain, a volcano, the ground surface, or the like. For example, when a river is the subject of monitoring 1015, the sensor section 1010 being secured to a fixed position perpetually monitors the water surface of the river 1015. This water surface information is perpetually transmitted to a processing section 1101 in the main section 1100. Then, if the water surface reaches a certain height or above, the processing section 1101 informs a distinct system 1200 which separately exists from the monitoring system (e.g., a weather observation monitoring system), via the telecommunication lines 1300. Alternatively, the processing section 1101 may send information to a system (not shown) which manages the water gate, whereby the system if instructed to automatically close a water gate, etc. (not shown) which is provided at the river 1015.

The natural element monitoring system 1500 is able to monitor a plurality of sensor sections 1010, 1020, etc., with the single main section 1100. When the plurality of sensor sections are distributed over a certain area, the water levels of rivers in that area can be grasped simultaneously. This allows to make an assessment as to how the rainfall in this area may affect the water levels of the rivers, possibly leading to disasters such as floods. Information concerning this can be conveyed to the distinct system 1200 (e.g., a weather observation monitoring system) via the telecommunication lines 1300. Thus, the distinct system 1200 (e.g., a weather observation monitoring system) is able to utilize the conveyed information for weather observation or disaster prediction in a wider area.

The natural element monitoring system 1500 is also similarly applicable to any natural element other than a river. For example, the subject of monitoring of a monitoring system that monitors tsunamis or storm surges is the sea surface level. It is also possible to automatically open or close the water gate of a seawall in response to a rise in the sea surface level. Alternatively, the subject of monitoring of a monitoring system that monitors landslides to be caused by rainfall, earthquakes, or the like may be the ground surface of a mountainous area, etc.

[Traffic Monitoring System]

A second monitoring system is a system that monitors traffic (hereinafter referred to as a "traffic monitoring system"). The subject of monitoring of this traffic monitoring system may be, for example, a railroad crossing, a specific railroad, an airport runway, a road intersection, a specific road, a parking lot, etc.

For example, when the subject of monitoring is a railroad crossing, the sensor section 1010 is placed at a position where the inside of the crossing can be monitored. In this case, in addition to the millimeter wave radar, the sensor section 1010 may also include an optical sensor such as a camera, which will allow a target (subject of monitoring) to be detected from more perspectives, through a fusion process based on radar information and image information. The target information which is obtained with the sensor section 1010 is sent to the main section 1100 via the telecommunication lines 1300. The main section 1100 collects other information (e.g., train schedule information) that may be needed in a more sophisticated recognition process or control, and issues necessary control instructions or the like based thereon. As used herein, a necessary control instruction may be, for example, an instruction to stop a train when a person, a vehicle, etc. is found inside the crossing when it is closed.

If the subject of monitoring is a runway at an airport, for example, a plurality of sensor sections 1010, 1020, etc., may be placed along the runway so as to set the runway to a predetermined resolution, e.g., a resolution that allows any foreign object on the runway that is 5 cm by 5 cm or larger to be detected. The monitoring system 1500 perpetually monitors the runway, regardless of daytime or nighttime and irrespective of weather. This function is enabled by the very ability of the millimeter wave radar according to an embodiment of the present disclosure to support UWB. Moreover, since the present millimeter wave radar device can be embodied with a small size, a high resolution, and a low cost, it provides a realistic solution for covering the entire runway surface from end to end. In this case, the main section 1100 keeps the plurality of sensor sections 1010, 1020, etc., under integrated management. If a foreign object is found on the runway, the main section 1100 transmits information concerning the position and size of the foreign object to an air-traffic control system (not shown). Upon receiving this, the air-traffic control system temporarily prohibits takeoff and landing on that runway. In the meantime, the main section 1100 transmits information concerning the position and size of the foreign object to a separately-provided vehicle, which automatically cleans the runway surface, etc., for example. Upon receive this, the cleaning vehicle may autonomously move to the position where the foreign object exists, and automatically remove the foreign object. Once removal of the foreign object is completed, the cleaning vehicle transmits information of the completion to the main section 1100. Then, the main section 1100 again confirms that the sensor section 1010 or the like which has detected the foreign object now reports that "no foreign object exists" and that it is safe now, and informs the air-traffic control system of this. Upon receiving this, the air-traffic control system may lift the prohibition of takeoff and landing from the runway.

Furthermore, in the case where the subject of monitoring is a parking lot, for example, it may be possible to automatically recognize which position in the parking lot is currently vacant. A related technique is described in the specification of U.S. Pat. No. 6,943,726, the entire disclosure of which is incorporated herein by reference.

[Security Monitoring System]

A third monitoring system is a system that monitors a trespasser into a piece of private land or a house (hereinafter referred to as a "security monitoring system"). The subject of monitoring of this security monitoring system may be, for example, a specific region within a piece of private land or a house, etc.

For example, if the subject of monitoring is a piece of private land, the sensor section(s) 1010 may be placed at one position, or two or more positions where the sensor section(s) 1010 is able to monitor it. In this case, in addition to the millimeter wave radar, the sensor section(s) 1010 may also include an optical sensor such as a camera, which will allow a target (subject of monitoring) to be detected from more perspectives, through a fusion process based on radar information and image information. The target information which was obtained by the sensor section 1010(*s*) is sent to the main section 1100 via the telecommunication lines 1300. The main section 1100 collects other information (e.g., reference data or the like needed to accurately recognize whether the trespasser is a person or an animal such as a dog or a bird) that may be needed in a more sophisticated recognition process or control, and issues necessary control instructions or the like based thereon. As used herein, a necessary control instruction may be, for example, an instruction to sound an alarm or activate lighting that is installed in the premises, and also an instruction to directly report to a person in charge of the premises via mobile telecommunication lines or the like, etc. The processing section 1101 in the main section 1100 may allow an internalized, sophisticated apparatus of recognition (that adopts deep learning or a like technique) to recognize the detected target. Alternatively, such a sophisticated apparatus of recognition may be provided externally, in which case the sophisticated apparatus of recognition may be connected via the telecommunication lines 1300.

A related technique is described in the specification of U.S. Pat. No. 7,425,983, the entire disclosure of which is incorporated herein by reference.

Another embodiment of such a security monitoring system may be a human monitoring system to be installed at a boarding gate at an airport, a station wicket, an entrance of a building, or the like. The subject of monitoring of such a human monitoring system may be, for example, a boarding gate at an airport, a station wicket, an entrance of a building, or the like.

If the subject of monitoring is a boarding gate at an airport, the sensor section(s) 1010 may be installed in a machine for checking personal belongings at the boarding gate, for example. In this case, there may be two checking methods as follows. In a first method, the millimeter wave radar transmits an electromagnetic wave, and receives the electromagnetic wave as it reflects off a passenger (which is the subject of monitoring), thereby checking personal belongings or the like of the passenger. In a second method, a weak millimeter wave which is radiated from the passenger's own body is received by the antenna, thus checking for any foreign object that the passenger may be hiding. In the latter method, the millimeter wave radar preferably has a function of scanning the received millimeter wave. This scanning function may be implemented by using digital beam forming, or through a mechanical scanning operation. Note that the processing by the main section 1100 may utilize a communication process and a recognition process similar to those in the above-described examples.

[Building Inspection System (Non-Destructive Inspection)]

A fourth monitoring system is a system that monitors or checks the concrete material of a road, a railroad overpass, a building, etc., or the interior of a road or the ground, etc., (hereinafter referred to as a "building inspection system"). The subject of monitoring of this building inspection system may be, for example, the interior of the concrete material of an overpass or a building, etc., or the interior of a road or the ground, etc.

For example, if the subject of monitoring is the interior of a concrete building, the sensor section 1010 is structured so that the antenna 1011 can make scan motions along the surface of a concrete building. As used herein, "scan motions" may be implemented manually, or a stationary rail for the scan motion may be separately provided, upon which to cause the movement by using driving power from an electric motor or the like. In the case where the subject of monitoring is a road or the ground, the antenna 1011 may be installed face-down on a vehicle or the like, and the vehicle may be allowed to travel at a constant velocity, thus creating a "scan motion". The electromagnetic wave to be used by the sensor section 1010 may be a millimeter wave in e.g. the so-called terahertz region, exceeding 100 GHz. As described earlier, even with an electromagnetic wave over e.g. 100 GHz, an array antenna according to an embodiment of the present disclosure can be adapted to have smaller losses than do conventional patch antennas or the like. An electromagnetic wave of a higher frequency is able to permeate deeper into the subject of checking, such as concrete, thereby realizing a more accurate non-destructive inspection. Note that the processing by the main section 1100 may also utilize a communication process and a recognition process similar to those in the other monitoring systems described above.

A related technique is described in the specification of U.S. Pat. No. 6,661,367, the entire disclosure of which is incorporated herein by reference.

[Human Monitoring System]

A fifth monitoring system is a system that watches over a person who is subject to nursing care (hereinafter referred to as a "human watch system"). The subject of monitoring of this human watch system may be, for example, a person under nursing care or a patient in a hospital, etc.

For example, if the subject of monitoring is a person under nursing care within a room of a nursing care facility, the sensor section(s) 1010 is placed at one position, or two or more positions inside the room where the sensor section(s) 1010 is able to monitor the entirety of the inside of the room. In this case, in addition to the millimeter wave radar, the sensor section 1010 may also include an optical sensor such as a camera. In this case, the subject of monitoring can be monitored from more perspectives, through a fusion process based on radar information and image information. On the other hand, when the subject of monitoring is a person, from the standpoint of privacy protection, monitoring with a camera or the like may not be appropriate. Therefore, sensor selections must be made while taking this aspect into consideration. Note that target detection by the millimeter wave radar will allow a person, who is the subject of monitoring, to be captured not by his or her image, but by a signal (which is, as it were, a shadow of the person). Therefore, the millimeter wave radar may be considered as a desirable sensor from the standpoint of privacy protection.

Information of the person under nursing care which has been obtained by the sensor section(s) 1010 is sent to the main section 1100 via the telecommunication lines 1300. The main section 1100 collects other information (e.g., reference data or the like needed to accurately recognize target information of the person under nursing care) that may be needed in a more sophisticated recognition process or control, and issues necessary control instructions or the like based thereon. As used herein, a necessary control instruction may be, for example, an instruction to directly report a person in charge based on the result of detection, etc. The processing section 1101 in the main section 1100 may allow an internalized, sophisticated apparatus of recognition (that adopts deep learning or a like technique) to recognize the detected target. Alternatively, such a sophisticated apparatus of recognition may be provided externally, in which case the sophisticated apparatus of recognition may be connected via the telecommunication lines 1300.

In the case where a person is the subject of monitoring of the millimeter wave radar, at least the two following functions may be added.

A first function is a function of monitoring the heart rate and/or the respiratory rate. In the case of a millimeter wave radar, an electromagnetic wave is able to see through the clothes to detect the position and motions of the skin surface of a person's body. First, the processing section 1101 detects a person who is the subject of monitoring and an outer shape thereof. Next, in the case of detecting a heart rate, for example, a position on the body surface where the heartbeat motions are easy to detect may be identified, and the motions there may be chronologically detected. This allows a heart rate per minute to be detected, for example. The same is also true when detecting a respiratory rate. By using this function, the health status of a person under nursing care can be perpetually checked, thus enabling a higher-quality watch over a person under nursing care.

A second function is a function of fall detection. A person under nursing care such as an elderly person may fall from time to time, due to weakened legs and feet. When a person falls, the velocity or acceleration of a specific site of the person's body, e.g., the head, will reach a certain level or greater. When the subject of monitoring of the millimeter wave radar is a person, the relative velocity or acceleration of the target of interest can be perpetually detected. Therefore, by identifying the head as the subject of monitoring, for example, and chronologically detecting its relative velocity or acceleration, a fall can be recognized when a velocity of a certain value or greater is detected. When recognizing a fall, the processing section 1101 can issue an instruction or the like corresponding to pertinent nursing care assistance, for example.

Note that the sensor section(s) 1010 is secured to a fixed position(s) in the above-described monitoring system or the like. However, the sensor section(s) 1010 can also be installed on a moving entity, e.g., a robot, a vehicle, a flying object such as a drone. As used herein, the vehicle or the like may encompass not only an automobile, but also a smaller sized moving entity such as an electric wheelchair, for example. In this case, this moving entity may include an internal GPS unit which allows its own current position to be always confirmed. In addition, this moving entity may also have a function of further improving the accuracy of its own current position by using map information and the map update information which has been described with respect to the aforementioned fifth processing apparatus.

Furthermore, in any device or system that is similar to the above-described first to third detection devices, first to sixth processing apparatuses, first to fifth monitoring systems, etc., a like construction may be adopted to utilize an array antenna or a millimeter wave radar according to an embodiment of the present disclosure.

Application Example 3: Communication System

[First Example of Communication System]

The waveguide device and antenna device (array antenna) according to the present disclosure can be used for the transmitter and/or receiver with which a communication system (telecommunication system) is constructed. The waveguide device and antenna device according to the present disclosure are composed of layered conductive members, and therefore are able to keep the transmitter and/or receiver size smaller than in the case of using a hollow waveguide. Moreover, there is no need for dielectric, and thus the dielectric loss of electromagnetic waves can be kept smaller than in the case of using a microstrip line. Therefore, a communication system including a small and highly efficient transmitter and/or receiver can be constructed.

Such a communication system may be an analog type communication system which transmits or receives an analog signal that is directly modulated. However, a digital communication system may be adopted in order to construct a more flexible and higher-performance communication system.

Hereinafter, with reference to FIG. 58, a digital communication system 800A in which a waveguide device and an antenna device according to an embodiment of the present disclosure are used will be described.

Figure 58:
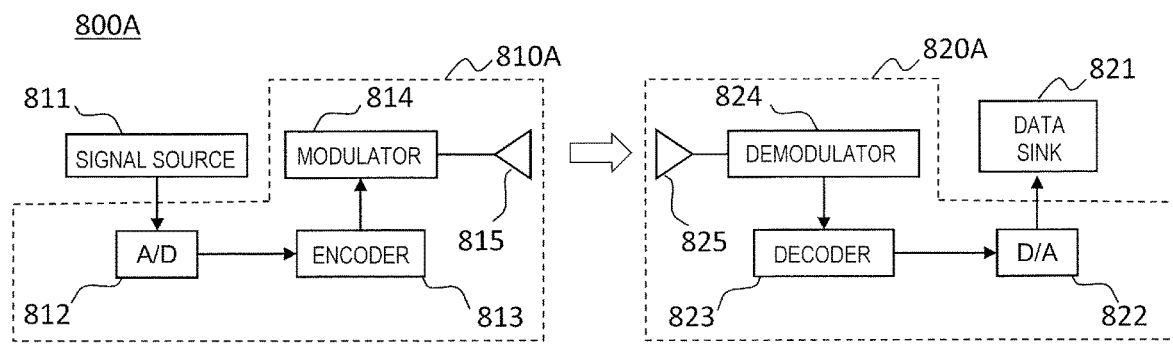
FIG. 58 is a block diagram showing a construction for a digital communication system 800A.

FIG. 58 is a block diagram showing a construction for the digital communication system 800A. The communication system 800A includes a transmitter 810A and a receiver 820A. The transmitter 810A includes an analog to digital (A/D) converter 812, an encoder 813, a modulator 814, and a transmission antenna 815. The receiver 820A includes a reception antenna 825, a demodulator 824, a decoder 823, and a digital to analog (D/A) converter 822. The at least one of the transmission antenna 815 and the reception antenna 825 may be implemented by using an array antenna according to an embodiment of the present disclosure. In this exemplary application, the circuitry including the modulator 814, the encoder 813, the A/D converter 812, and so on, which are connected to the transmission antenna 815, is referred to as the transmission circuit. The circuitry including the demodulator 824, the decoder 823, the D/A converter 822, and so on, which are connected to the reception antenna 825, is referred to as the reception circuit. The transmission circuit and the reception circuit may be collectively referred to as the communication circuit.

With the analog to digital (A/D) converter 812, the transmitter 810A converts an analog signal which is received from the signal source 811 to a digital signal. Next, the digital signal is encoded by the encoder 813. As used herein, "encoding" means altering the digital signal to be transmitted into a format which is suitable for communication. Examples of such encoding include CDM (Code-Division Multiplexing) and the like. Moreover, any conversion for effecting TDM (Time-Division Multiplexing) or FDM (Frequency Division Multiplexing), or OFDM (Orthogonal Frequency Division Multiplexing) is also an example of encoding. The encoded signal is converted by the modulator 814 into a radio frequency signal, so as to be transmitted from the transmission antenna 815.

In the field of communications, a wave representing a signal to be superposed on a carrier wave may be referred to as a "signal wave"; however, the term "signal wave" as used in the present specification does not carry that definition. A "signal wave" as referred to in the present specification is broadly meant to be any electromagnetic wave to propagate in a waveguide, or any electromagnetic wave for transmission/reception via an antenna element.

The receiver 820A restores the radio frequency signal that has been received by the reception antenna 825 to a low-frequency signal at the demodulator 824, and to a digital signal at the decoder 823. The decoded digital signal is restored to an analog signal by the digital to analog (D/A) converter 822, and is sent to a data sink (data receiver) 821. Through the above processes, a sequence of transmission and reception processes is completed.

When the communicating agent is a digital appliance such as a computer, analog to digital conversion of the transmission signal and digital to analog conversion of the reception signal are not needed in the aforementioned processes. Thus, the analog to digital converter 812 and the digital to analog converter 822 in FIG. 58 may be omitted. A system of such construction is also encompassed within a digital communication system.

In a digital communication system, in order to ensure signal intensity or expand channel capacity, various methods may be adopted. Many such methods are also effective in a communication system which utilizes radio waves of the millimeter wave band or the terahertz band.

Radio waves in the millimeter wave band or the terahertz band have higher straightness than do radio waves of lower frequencies, and undergoes less diffraction, i.e., bending around into the shadow side of an obstacle. Therefore, it is not uncommon for a receiver to fail to directly receive a radio wave that has been transmitted from a transmitter. Even in such situations, reflected waves may often be received, but a reflected wave of a radio wave signal is often poorer in quality than is the direct wave, thus making stable reception more difficult. Furthermore, a plurality of reflected waves may arrive through different paths. In that case, the reception waves with different path lengths might differ in phase from one another, thus causing multi-path fading.

As a technique for improving such situations, a so-called antenna diversity technique may be used. In this technique, at least one of the transmitter and the receiver includes a plurality of antennas. If the plurality of antennas are parted by distances which differ from one another by at least about the wavelength, the resulting states of the reception waves will be different. Accordingly, the antenna that is capable of transmission/reception with the highest quality among all is selectively used, thereby enhancing the reliability of communication. Alternatively, signals which are obtained from more than one antenna may be merged for an improved signal quality.

In the communication system 800A shown in FIG. 58, for example, the receiver 820A may include a plurality of reception antennas 825. In this case, a switcher exists between the plurality of reception antennas 825 and the demodulator 824. Through the switcher, the receiver 820A connects the antenna that provides the highest-quality signal among the plurality of reception antennas 825 to the demodulator 824. In this case, the transmitter 810A may also include a plurality of transmission antennas 815.

[Second Example of Communication System]

Figure 59:
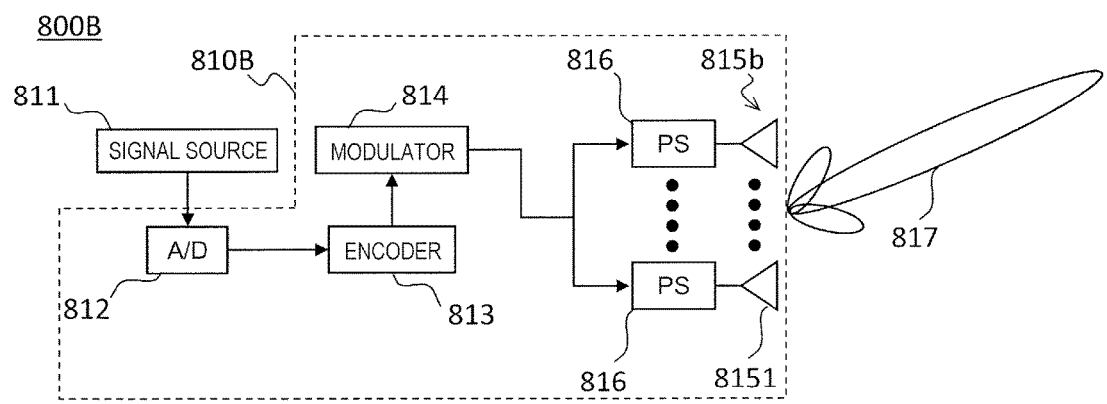
FIG. 59 is a block diagram showing an exemplary communication system 800B including a transmitter 810B which is capable of changing its radio wave radiation pattern.

FIG. 59 is a block diagram showing an example of a communication system 800B including a transmitter 810B which is capable of varying the radiation pattern of radio waves. In this exemplary application, the receiver is identical to the receiver 820A shown in FIG. 58; for this reason, the receiver is omitted from illustration in FIG. 59. In addition to the construction of the transmitter 810A, the transmitter 810B also includes an antenna array 815*b*, which includes a plurality of antenna elements 8151. The antenna array 815*b* may be an array antenna according to an embodiment of the present disclosure. The transmitter 810B further includes a plurality of phase shifters (PS) 816 which are respectively connected between the modulator 814 and the plurality of antenna elements 8151. In the transmitter 810B, an output of the modulator 814 is sent to the plurality of phase shifters 816, where phase differences are imparted and the resultant signals are led to the plurality of antenna elements 8151. In the case where the plurality of antenna elements 8151 are disposed at equal intervals, if a radio frequency signal whose phase differs by a certain amount with respect to an adjacent antenna element is fed to each antenna element 8151, a main lobe 817 of the antenna array 815*b* will be oriented in an azimuth which is inclined from the front, this inclination being in accordance with the phase difference. This method may be referred to as beam forming.

The azimuth of the main lobe 817 may be altered by allowing the respective phase shifters 816 to impart varying phase differences. This method may be referred to as beam steering. By finding phase differences that are conducive to the best transmission/reception state, the reliability of communication can be enhanced. Although the example here illustrates a case where the phase difference to be imparted by the phase shifters 816 is constant between any adjacent antenna elements 8151, this is not limiting. Moreover, phase differences may be imparted so that the radio wave will be radiated in an azimuth which allows not only the direct wave but also reflected waves to reach the receiver.

A method called null steering can also be used in the transmitter 810B. This is a method where phase differences are adjusted to create a state where the radio wave is radiated in no specific direction. By performing null steering, it becomes possible to restrain radio waves from being radiated toward any other receiver to which transmission of the radio wave is not intended. This can avoid interference. Although a very broad frequency band is available to digital communication utilizing millimeter waves or terahertz waves, it is nonetheless preferable to make as efficient a use of the bandwidth as possible. By using null steering, plural instances of transmission/reception can be performed within the same band, whereby efficiency of utility of the bandwidth can be enhanced. A method which enhances the efficiency of utility of the bandwidth by using techniques such as beam forming, beam steering, and null steering may sometimes be referred to as SDMA (Spatial Division Multiple Access).

[Third Example of Communication System]

In order to increase the channel capacity in a specific frequency band, a method called MIMO (Multiple-Input and Multiple-Output) may be adopted. Under MIMO, a plurality of transmission antennas and a plurality of reception antennas are used. A radio wave is radiated from each of the plurality of transmission antennas. In one example, respectively different signals may be superposed on the radio waves to be radiated. Each of the plurality of reception antennas receives all of the transmitted plurality of radio waves. However, since different reception antennas will receive radio waves that arrive through different paths, differences will occur among the phases of the received radio waves. By utilizing these differences, it is possible to, at the receiver side, separate the plurality of signals which were contained in the plurality of radio waves.

The waveguide device and antenna device according to the present disclosure can also be used in a communication system which utilizes MIMO. Hereinafter, an example such a communication system will be described.

Figure 60:
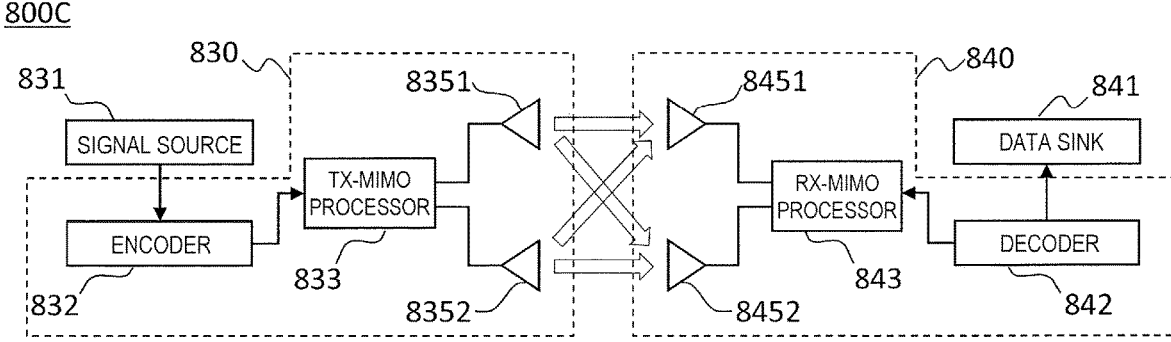
FIG. 60 is a block diagram showing an exemplary communication system 800C implementing a MIMO function.

FIG. 60 is a block diagram showing an example of a communication system 800C implementing a MIMO function. In the communication system 800C, a transmitter 830 includes an encoder 832, a TX-MIMO processor 833, and two transmission antennas 8351 and 8352. A receiver 840 includes two reception antennas 8451 and 8452, an RX-MIMO processor 843, and a decoder 842. Note that the number of transmission antennas and the number of reception antennas may each be greater than two. Herein, for ease of explanation, an example where there are two antennas of each kind will be illustrated. In general, the channel capacity of an MIMO communication system will increase in proportion to the number of whichever is the fewer between the transmission antennas and the reception antennas.

Having received a signal from the data signal source 831, the transmitter 830 encodes the signal at the encoder 832 so that the signal is ready for transmission. The encoded signal is distributed by the TX-MIMO processor 833 between the two transmission antennas 8351 and 8352.

In a processing method according to one example of the MIMO method, the TX-MIMO processor 833 splits a sequence of encoded signals into two, i.e., as many as there are transmission antennas 8352, and sends them in parallel to the transmission antennas 8351 and 8352. The transmission antennas 8351 and 8352 respectively radiate radio waves containing information of the split signal sequences. When there are N transmission antennas, the signal sequence is split into N. The radiated radio waves are simultaneously received by the two reception antennas 8451 and 8452. In other words, in the radio waves which are received by each of the reception antennas 8451 and 8452, the two signals which were split at the time of transmission are mixedly contained. Separation between these mixed signals is achieved by the RX-MIMO processor 843.

The two mixed signals can be separated by paying attention to the phase differences between the radio waves, for example. A phase difference between two radio waves of the case where the radio waves which have arrived from the transmission antenna 8351 are received by the reception antennas 8451 and 8452 is different from a phase difference between two radio waves of the case where the radio waves which have arrived from the transmission antenna 8352 are received by the reception antennas 8451 and 8452. That is, the phase difference between reception antennas differs depending on the path of transmission/reception. Moreover, unless the spatial relationship between a transmission antenna and a reception antenna is changed, the phase difference therebetween remains unchanged. Therefore, based on correlation between reception signals received by the two reception antennas, as shifted by a phase difference which is determined by the path of transmission/reception, it is possible to extract any signal that is received through that path of transmission/reception. The RX-MIMO processor 843 may separate the two signal sequences from the reception signal e.g. by this method, thus restoring the signal sequence before the split. The restored signal sequence still remains encoded, and therefore is sent to the decoder 842 so as to be restored to the original signal there. The restored signal is sent to the data sink 841.

Although the MIMO communication system 800C in this example transmits or receives a digital signal, an MIMO communication system which transmits or receives an analog signal can also be realized. In that case, in addition to the construction of FIG. 60, an analog to digital converter and a digital to analog converter as have been described with reference to FIG. 58 are provided. Note that the information to be used in distinguishing between signals from different transmission antennas is not limited to phase difference information. Generally speaking, for a different combination of a transmission antenna and a reception antenna, the received radio wave may differ not only in terms of phase, but also in scatter, fading, and other conditions. These are collectively referred to as CSI (Channel State Information). CSI may be utilized in distinguishing between different paths of transmission/reception in a system utilizing MIMO.

Note that it is not an essential requirement that the plurality of transmission antennas radiate transmission waves containing respectively independent signals. So long as separation is possible at the reception antenna side, each transmission antenna may radiate a radio wave containing a plurality of signals. Moreover, beam forming may be performed at the transmission antenna side, while a transmission wave containing a single signal, as a synthetic wave of the radio waves from the respective transmission antennas, may be formed at the reception antenna. In this case, too, each transmission antenna is adapted so as to radiate a radio wave containing a plurality of signals.

In this third example, too, as in the first and second examples, various methods such as CDM, FDM, TDM, and OFDM may be used as a method of signal encoding.

In a communication system, a circuit board that implements an integrated circuit (referred to as a signal processing circuit or a communication circuit) for processing signals may be stacked as a layer on the waveguide device and antenna device according to an embodiment of the present disclosure. Since the waveguide device and antenna device according to an embodiment of the present disclosure is structured so that plate-like conductive members are layered therein, it is easy to further stack a circuit board thereupon. By adopting such an arrangement, a transmitter and a receiver which are smaller in volume than in the case where a hollow waveguide or the like is employed can be realized.

In the first to third examples of the communication system as described above, each element of a transmitter or a receiver, e.g., an analog to digital converter, a digital to analog converter, an encoder, a decoder, a modulator, a demodulator, a TX-MIMO processor, or an RX-MIMO processor, is illustrated as one independent element in FIGS. 58, 59, and 60; however, these do not need to be discrete. For example, all of these elements may be realized by a single integrated circuit. Alternatively, some of these elements may be combined so as to be realized by a single integrated circuit. Either case qualifies as an embodiment of the present invention so long as the functions which have been described in the present disclosure are realized thereby.

As described above, the present disclosure encompasses slot array antennas, antenna devices, radars, radar systems, and communication systems as recited in the following Items.

[Item 1]

A slot array antenna to be connected to a transmitter or a receiver in use, comprising:

a first conductive member having a first electrically conductive surface;

a second electrically conductive member having a second electrically conductive surface opposed to the first electrically conductive surface;

a waveguide member located between the first electrically conductive member and the second electrically conductive member and extending alongside the first electrically conductive surface, the waveguide member having a stripe-shaped electrically-conductive waveguide face opposed to the first electrically conductive surface; and an artificial magnetic conductor extending on both sides of the waveguide member in between the first electrically conductive member and the second electrically conductive member, wherein, at least one of the first electrically conductive member and the second electrically conductive member has a plurality of slots arranged along the first electrically conductive surface or the second electrically conductive surface;

the plurality of slots include two slots which are adjacent to each other and which couple to the waveguide face;

in between two positions respectively coupled to the two slots, the waveguide face includes at least one deflecting portion at which a direction that the waveguide face extends changes;

as viewed from a normal direction of the waveguide face, the waveguide face includes an extension that extends beyond at least one of the two slots and away from the at least one deflecting portion;

a distance between the two slots as measured along the waveguide face is greater than half a length of at least one of the two slots;

a straight distance between centers of the two slots is smaller than four times the length of either of the two slots; and the transmitter or the receiver couples to the waveguide face at the extension side.

[Item 2]

The slot array antenna of Item 1, wherein the waveguide face includes two linear portions that extend in the form of straight lines, the two linear portions being connected via the at least one deflecting portion; and the two slots respectively couple to the two linear portions.

[Item 3]

The slot array antenna of Item 2, wherein an angle of deflection of the at least one deflecting portion is not less than 30 degrees and not more than 120 degrees.

[Item 4]

The slot array antenna of Item 1, wherein the at least one deflecting portion includes two deflecting portions;

the waveguide face includes two linear portions extending in the form of straight lines, the two linear portions being connected via the two deflecting portions; and the two slots respectively couple to the two linear portions.

[Item 5]

The slot array antenna of Item 4, wherein the two linear portions are parallel to each other.

[Item 6]

The slot array antenna of Item 1, wherein the at least one deflecting portion includes a plurality of deflecting portions;

the waveguide face includes two linear portions extending on one straight line;

the two linear portions are connected via the plurality of deflecting portions; and the two slots respectively couple to the two linear portions.

[Item 7]

The slot array antenna of any of Items 1 to 6, wherein the at least one deflecting portion includes a deflecting portion having a curve shape.

[Item 8]

The slot array antenna of any of Items 1 to 6, wherein, in at least one of the deflecting portions, an outer edge of the waveguide member is chamfered.

[Item 9]

The slot array antenna of any of Items 1 to 6, wherein at least one of the deflecting portions comprises a gap enlarging portion where a spacing between the waveguide face and the first electrically conductive surface is locally enlarged.

[Item 10]

The slot array antenna of any of Items 2 to 6, wherein the two slots respectively couple to midpoints of the two linear portions.

[Item 11]

The slot array antenna of any of Items 1 to 10, wherein at least one of the two slots is opposed to the waveguide face.

[Item 12]

The slot array antenna of any of Items 1 to 11, wherein, the waveguide face has two edges that together define width of the waveguide face;

the two slots are disposed on the first electrically conductive member;

each of the two slots has an opening that extends through the first electrically conductive member and is open on the first electrically conductive surface; and, as viewed from a normal direction of the first electrically conductive surface, the opening of at least one of the two slots includes, at least in a central portion of the opening along a length direction thereof, a small-angle portion at which a width direction of the opening and a width direction of the waveguide face form an angle that is smaller than 45 degrees, at least a portion of the small-angle portion overlaps the second electrically conductive surface on an outside of one of the two edges of the waveguide face, and the small-angle portion intersects the one edge but does not intersect the other edge of the waveguide face, or is located from the one edge at a distance which is shorter than the width of the waveguide face.

[Item 13]

The slot array antenna of any of Items 1 to 11, wherein, the waveguide face has two edges that together define width of the waveguide face;

the two slots are disposed on the first electrically conductive member;

one of the two slots has a first opening that extends through the first electrically conductive member and is open on the first electrically conductive surface;

another of the two slots has a second opening that extends through the first electrically conductive member and is open on the first electrically conductive surface; and, as viewed from a normal direction of the first electrically conductive surface, the first opening includes, at least in a central portion of the first opening along a length direction thereof, a first small-angle portion at which a width direction of the first opening and a width direction of the waveguide face form an angle that is smaller than 45 degrees, at least a portion of the first small-angle portion overlaps the second electrically conductive surface on an outside of one of the two edges of the waveguide face, the first small-angle portion intersects the one edge but does not intersect the other edge of the waveguide face, or is located from the one edge at a distance which is shorter than the width of the waveguide face, the second opening includes, at least in a central portion of the second opening along a length direction thereof, a second small-angle portion at which a width direction of the second opening and a width direction of the waveguide face form an angle that is smaller than 45 degrees, at least a portion of the second small-angle portion overlaps the second electrically conductive surface on an outside of the other edge of the waveguide face, and the second small-angle portion intersects the other edge but does not intersect the one edge of the waveguide face, or is located from the other edge at a distance which is shorter than the width of the waveguide face.

[Item 14]

The slot array antenna of any of Items 1 to 13, wherein each of the two slots is of a shape having a length that is defined by a straight line.

[Item 15]

The slot array antenna of any of Items 1 to 13, wherein each of the two slots is of a shape having a length that is defined by a combination of one straight line and two other straight lines respectively intersecting opposite ends of the one straight line.

[Item 16]

The slot array antenna of any of Items 1 to 15, wherein, the slot array antenna is used for at least one of transmission and reception of an electromagnetic wave of a band having a central wavelength λo in free space;

an electromagnetic wave having a wavelength λo in free space has a wavelength λg when propagating in a waveguide extending between the waveguide face and the first electrically conductive surface; and a difference between a distance between the two slots as measured along the waveguide face and either one of λg, an odd multiple of λg/2, and an odd multiple of λg/4 is smaller than a sum of widths of the two slots.

[Item 17]

The slot array antenna of any of Items 1 to 15, wherein, the slot array antenna is used for at least one of transmission and reception of an electromagnetic wave of a band having a central wavelength λo in free space;

a difference between a distance between the two slots as measured along the waveguide face and either one of a distance a, an odd multiple of a/2, and an odd multiple of a/4 is smaller than a sum of widths of the two slots; and the distance a is equal to or greater than 0.5 λo but less than 1.5λo.

[Item 18]

The slot array antenna of any of Items 1 to 7 and Items 10 to 17, wherein the waveguide member includes, at least between two positions respectively coupled to the two slots, at least one of: a portion at which distance between the waveguide face and the first electrically conductive surface changes; and a portion at which width of the waveguide face changes.

[Item 19]

The slot array antenna of Item 8 or 9, wherein the waveguide member includes, at least at a position lying between two positions respectively coupled to the two slots but excluding the deflecting portion, at least one of: a portion at which distance between the waveguide face and the first electrically conductive surface changes; and a portion at which width of the waveguide face changes.

[Item 20]

The slot array antenna of any of Items 1 to 19, wherein, the two slots are a first slot and a second slot;

the plurality of slots include a third slot which is adjacent to the second slot;

the waveguide face includes, in between two positions respectively coupled to the second slot and the third slot, at least one deflecting portion at which the direction that the waveguide face extends changes;

a direction of deflection of the deflecting portion located between the first slot and the second slot and a direction of deflection of the deflecting portion located between the second slot and the third slot are opposite;

a distance between the second slot and the third slot as measured along the waveguide face is equal to or greater than half a length of a shorter one of the second slot and the third slot; and a straight distance between centers of the second slot and the third slot is smaller than four times a length of the shorter slot.

[Item 21]

The slot array antenna of Item 20, wherein the first to third slots are on a straight line.

[Item 22]

The slot array antenna of any of Items 1 to 21, wherein, the artificial magnetic conductor includes a plurality of electrically conductive rods each having a leading end opposing the first electrically conductive surface;

the plurality of electrically conductive rods include one or more rows of electrically conductive rods that are adjacent to and arrayed along the waveguide member;

at a position adjacent to the deflecting portion, a row of the electrically conductive rods deflects in accordance with a direction of deflection of the deflecting portion; and at least one of the plurality of electrically conductive rods is disposed between the two slots.

[Item 23]

The slot array antenna of Item 22, wherein the one or more rows of electrically conductive rods include an outer rod row arrayed on an outside of the deflecting portion and an inner rod row arrayed on an inside of the deflecting portion; and, between a plane which passes through a center of one of the two slots and which contains a width direction of the waveguide face and a plane which passes through a center of the other of the two slots and which contains the width direction of the waveguide face, there are more electrically conductive rods included in the outer rod row than there are electrically conductive rods included in the inner rod row.

[Item 24]

The slot array antenna of any of Items 1 to 23, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

a distance between the at least two further slots as measured along the second waveguide face is equal to or greater than half a length of a shorter one of the at least two further slots;

a straight distance between centers of the at least two further slots is smaller than four times a length of the shorter slot;

a first line segment connecting between centers of the two slots and a second line segment connecting between centers of the at least two further slots are parallel;

shifting the first line segment in a direction which is orthogonal to a direction that the first line segment extends allows at least a portion of the first line segment to overlap the second line segment; and a direction of deflection of the at least one deflecting portion located between the two slots is identical to a direction of deflection of the at least one deflecting portion located between the at least two further slots.

[Item 25]

The slot array antenna of any of Items 1 to 23, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

lines interconnecting respective centers of the two slots and respective centers of the at least two further slots present a convex quadrilateral; and a direction of deflection of the at least one deflecting portion located between the two slots is identical to a direction of deflection of the at least one deflecting portion located between the at least two further slots.

[Item 26]

The slot array antenna of Item 24 or 25, wherein the artificial magnetic conductor exists between at least two adjacent waveguide members among the plurality of waveguide members.

[Item 27]

An antenna device comprising a plurality of slot array antennas, wherein, each of the plurality of slot array antennas is the slot array antenna of any of Items 1 to 23; and the respective waveguide members of the plurality of slot array antennas are arranged side by side.

[Item 28]

The antenna device of Item 27, wherein, the respective first electrically conductive members of the plurality of slot array antennas are portions of a single electrically conductive member of a plate shape; and the respective second electrically conductive members of the plurality of slot array antennas are portions of another single electrically conductive member of a plate shape.

[Item 29]

A radar device comprising:

the slot array antenna of any of Items 1 to 26 or the antenna device of Item 27 or 28; and at least one microwave integrated circuit connected to the slot array antenna or the antenna device.

[Item 30]

A slot array antenna to be connected to a transmitter or a receiver in use, comprising:

a first electrically conductive member having a first electrically conductive surface;

a second electrically conductive member having a second electrically conductive surface opposed to the first electrically conductive surface;

a waveguide member located between the first electrically conductive member and the second electrically conductive member and extending alongside the first electrically conductive surface, the waveguide member having a stripe-shaped electrically-conductive waveguide face opposed to the first electrically conductive surface; and an artificial magnetic conductor extending on both sides of the waveguide member in between the first electrically conductive member and the second electrically conductive member, wherein, at least one of the first electrically conductive member and the second electrically conductive member has a plurality of slots arranged along the first electrically conductive surface or the second electrically conductive surface;

the plurality of slots include two slots which are adjacent to each other and which couple to the waveguide face;

the waveguide face includes at least two deflecting portions at which a direction that the waveguide face extends changes;

the two slots respectively couple to the two deflecting portions;

a distance between the two slots as measured along the waveguide face is greater than half a length of at least one of the two slots;

a straight distance between centers of the two slots is smaller than four times the length of either of the two slots; and the transmitter or the receiver couples to the waveguide face at an end portion of the waveguide member.

[Item 31]

The slot array antenna of Item 30, wherein an angle of deflection of the at least two deflecting portions is not less than 30 degrees and not more than 120 degrees.

[Item 32]

The slot array antenna of Item 30 or 31, wherein the at least two deflecting portions include a deflecting portion having a curve shape.

[Item 33]

The slot array antenna of any of Items 30 to 32, wherein, in the at least two deflecting portions, an outer edge of the waveguide member is chamfered.

[Item 34]

The slot array antenna of any of Items 30 to 33, wherein, the waveguide face has two edges that together define width of the waveguide face;

the two slots are disposed on the first electrically conductive member;

each of the two slots has an opening that extends through the first electrically conductive member and is open on the first electrically conductive surface; and, as viewed from a normal direction of the first electrically conductive surface, the opening of at least one of the two slots includes, at least in a central portion of the opening along a length direction thereof, a small-angle portion at which a width direction of the opening and a width direction of the waveguide face form an angle that is smaller than 45 degrees, at least a portion of the small-angle portion overlaps the second electrically conductive surface on an outside of one of the two edges of the waveguide face, and the small-angle portion intersects the one edge but does not intersect the other edge of the waveguide face, or is located from the one edge at a distance which is shorter than the width of the waveguide face.

[Item 35]

The slot array antenna of any of Items 30 to 33, wherein, the waveguide face has two edges that together define width of the waveguide face;

the two slots are disposed on the first electrically conductive member;

one of the two slots has a first opening that extends through the first electrically conductive member and is open on the first electrically conductive surface;

another of the two slots has a second opening that extends through the first electrically conductive member and is open on the first electrically conductive surface; and, as viewed from a normal direction of the first electrically conductive surface, the first opening includes, at least in a central portion of the first opening along a length direction thereof, a first small-angle portion at which a width direction of the first opening and a width direction of the waveguide face form an angle that is smaller than 45 degrees, at least a portion of the first small-angle portion overlaps the second electrically conductive surface on an outside of one of the two edges of the waveguide face, the first small-angle portion intersects the one edge but does not intersect the other edge of the waveguide face, or is located from the one edge at a distance which is shorter than the width of the waveguide face, the second opening includes, at least in a central portion of the second opening along a length direction thereof, a second small-angle portion at which a width direction of the second opening and a width direction of the waveguide face form an angle that is smaller than 45 degrees, at least a portion of the second small-angle portion overlaps the second electrically conductive surface on an outside of the other edge of the waveguide face, and the second small-angle portion intersects the other edge but does not intersect the one edge of the waveguide face, or is located from the other edge at a distance which is shorter than the width of the waveguide face.

[Item 36]

The slot array antenna of any of Items 30 to 35, wherein, the two slots are a first slot and a second slot;

the plurality of slots include a third slot which is adjacent to the second slot;

the waveguide face includes, in between two positions respectively coupled to the second slot and the third slot, or at a position that is coupled to the third slot, a third deflecting portion at which the direction that the waveguide face extends changes;

a direction of deflection of the deflecting portion coupling to the first slot and a direction of deflection of the deflecting portion coupling to the second slot are opposite;

a direction of deflection of the deflecting portion coupling to the second slot and a direction of deflection of the third deflecting portion are opposite;

a distance between the second slot and the third slot as measured along the waveguide face is equal to or greater than half a length of a shorter one of the second slot and the third slot; and a straight distance between centers of the second slot and the third slot is smaller than four times a length of the shorter slot.

[Item 37]

The slot array antenna of any of Items 30 to 36, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

the second waveguide face includes at least two other deflecting portions at which a direction that the second waveguide face extends changes;

the at least two further slots respectively couple to the at least two other deflecting portions;

a distance between the at least two further slots as measured along the second waveguide face is equal to or greater than half a length of a shorter one of the at least two further slots;

a straight distance between centers of the at least two further slots is smaller than four times a length of the shorter slot;

a first line segment connecting between centers of the two slots and a second line segment connecting between centers of the at least two further slots are parallel;

shifting the first line segment in a direction which is orthogonal to a direction that the first line segment extends allows at least a portion of the first line segment to overlap the second line segment;

a direction of deflection of a deflecting portion coupling to one of the two slots is identical to a direction of deflection of a deflecting portion coupling to one of the at least two further slots; and a direction of deflection of a deflecting portion coupling to another of the two slots is identical to a direction of deflection of a deflecting portion coupling to another of the at least two further slots.

[Item 38]

The slot array antenna of any of Items 30 to 36, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

the second waveguide face includes at least two other deflecting portions at which a direction that the second waveguide face extends changes;

the at least two further slots respectively couple to the at least two other deflecting portions;

lines interconnecting respective centers of the two slots and respective centers of the at least two further slots present a convex quadrilateral;

a direction of deflection of a deflecting portion coupling to one of the two slots is identical to a direction of deflection of a deflecting portion coupling to one of the at least two further slots; and a direction of deflection of a deflecting portion coupling to another of the two slots is identical to a direction of deflection of a deflecting portion coupling to another of the at least two further slots.

[Item 39]

An antenna device comprising a plurality of slot array antennas, wherein, each of the plurality of slot array antennas is the slot array antenna of any of Items 30 to 36; and the respective waveguide members of the plurality of slot array antennas are arranged side by side.

[Item 40]

The antenna device of Item 39, wherein, the respective first electrically conductive members of the plurality of slot array antennas are portions of a single electrically conductive member of a plate shape; and the respective second electrically conductive members of the plurality of slot array antennas are portions of another single electrically conductive member of a plate shape.

[Item 41]

A radar device comprising:

the slot array antenna of any of Items 30 to 38 or the antenna device of Item 39 or 40; and at least one microwave integrated circuit connected to the slot array antenna or the antenna device.

[Item 42]

A wireless communication system comprising:

the slot array antenna of any of Items 1 to 26 and Items 30 to 38; and a communication circuit connected to the slot array antenna.

[Item 43]

A wireless communication system comprising:

the antenna device of any of Items 27, 28, 39 and 40; and a communication circuit connected to the antenna device.

A slot antenna device and an antenna array according to the present disclosure are usable in any technological field that makes use of an antenna. For example, they are available to various applications where transmission/reception of electromagnetic waves of the gigahertz band or the terahertz band is performed. In particular, they may be suitably used in onboard radar systems, various types of monitoring systems, indoor positioning systems, wireless communication systems, etc., where downsizing is desired.

This application is based on Japanese Patent Application No. 2017-080019 filed on Apr. 13, 2017, the entire contents of which are hereby incorporated by reference.

What is claimed is:

1. A slot array antenna to be connected to a transmitter or a receiver in use, comprising:

a first conductive member having a first electrically conductive surface;

a second electrically conductive member having a second electrically conductive surface opposed to the first electrically conductive surface;

a waveguide member located between the first electrically conductive member and the second electrically conductive member and extending alongside the first electrically conductive surface, the waveguide member having a stripe-shaped electrically-conductive waveguide face opposed to the first electrically conductive surface; and an artificial magnetic conductor extending on both sides of the waveguide member in between the first electrically conductive member and the second electrically conductive member, wherein, at least one of the first electrically conductive member and the second electrically conductive member has a plurality of slots arranged along the first electrically conductive surface or the second electrically conductive surface;

the plurality of slots include two slots which are adjacent to each other and which couple to the waveguide face;

in between two positions respectively coupled to the two slots, the waveguide face includes at least one deflecting portion at which a direction that the waveguide face extends changes;

as viewed from a normal direction of the waveguide face, the waveguide face includes an extension that extends beyond at least one of the two slots and away from the at least one deflecting portion;

a distance between the two slots as measured along the waveguide face is greater than half a length of at least one of the two slots;

a straight distance between centers of the two slots is smaller than four times the length of either of the two slots; and the transmitter or the receiver couples to the waveguide face at the extension side.

2. The slot array antenna of claim 1, wherein the at least one deflecting portion includes a plurality of deflecting portions;

the waveguide face includes two linear portions extending on one straight line;

the two linear portions are connected via the plurality of deflecting portions; and the two slots respectively couple to the two linear portions.

3. The slot array antenna of claim 2, wherein the at least one deflecting portion includes a deflecting portion having a curve shape.

4. The slot array antenna of claim 2, wherein, in at least one of the deflecting portions, an outer edge of the waveguide member is chamfered.

5. The slot array antenna of claim 2, wherein at least one of the deflecting portions comprises a gap enlarging portion where a spacing between the waveguide face and the first electrically conductive surface is locally enlarged.

6. The slot array antenna of claim 2, wherein, the waveguide face has two edges that together define width of the waveguide face;

the two slots are disposed on the first electrically conductive member;

one of the two slots has a first opening that extends through the first electrically conductive member and is open on the first electrically conductive surface;

another of the two slots has a second opening that extends through the first electrically conductive member and is open on the first electrically conductive surface; and, as viewed from a normal direction of the first electrically conductive surface, the first opening includes, at least in a central portion of the first opening along a length direction thereof, a first small-angle portion at which a width direction of the first opening and a width direction of the waveguide face form an angle that is smaller than 45 degrees, at least a portion of the first small-angle portion overlaps the second electrically conductive surface on an outside of one of the two edges of the waveguide face, the first small-angle portion intersects the one edge but does not intersect the other edge of the waveguide face, or is located from the one edge at a distance which is shorter than the width of the waveguide face, the second opening includes, at least in a central portion of the second opening along a length direction thereof, a second small-angle portion at which a width direction of the second opening and a width direction of the waveguide face form an angle that is smaller than 45 degrees, at least a portion of the second small-angle portion overlaps the second electrically conductive surface on an outside of the other edge of the waveguide face, and the second small-angle portion intersects the other edge but does not intersect the one edge of the waveguide face, or is located from the other edge at a distance which is shorter than the width of the waveguide face.

7. The slot array antenna of claim 4, wherein at least one of the deflecting portions comprises a gap enlarging portion where a spacing between the waveguide face and the first electrically conductive surface is locally enlarged.

8. The slot array antenna of claim 1, wherein the at least one deflecting portion includes a deflecting portion having a curve shape.

9. The slot array antenna of claim 8, wherein at least one of the deflecting portions comprises a gap enlarging portion where a spacing between the waveguide face and the first electrically conductive surface is locally enlarged.

10. The slot array antenna of claim 1, wherein, in at least one of the deflecting portions, an outer edge of the waveguide member is chamfered.

11. The slot array antenna of claim 10, wherein at least one of the deflecting portions comprises a gap enlarging portion where a spacing between the waveguide face and the first electrically conductive surface is locally enlarged.

12. The slot array antenna of claim 10, wherein
the at least one deflecting portion includes two deflecting portions;
the waveguide face includes two linear portions extending in the form of straight lines, the two linear portions being connected via the two deflecting portions; and
the two slots respectively couple to the two linear portions.

13. The slot array antenna of claim 10, wherein the two slots respectively couple to midpoints of the two linear portions.

14. The slot array antenna of claim 10, wherein at least one of the two slots is opposed to the waveguide face.

15. The slot array antenna of claim 10, wherein the waveguide member includes, at least at a position lying between two positions respectively coupled to the two slots but excluding the deflecting portion, at least one of: a portion at which distance between the waveguide face and the first electrically conductive surface changes; and a portion at which width of the waveguide face changes.

16. The slot array antenna of claim 10, wherein,
the two slots are a first slot and a second slot;
the plurality of slots include a third slot which is adjacent to the second slot;
the waveguide face includes, in between two positions respectively coupled to the second slot and the third slot, at least one deflecting portion at which the direction that the waveguide face extends changes;
a direction of deflection of the deflecting portion located between the first slot and the second slot and a direction of deflection of the deflecting portion located between the second slot and the third slot are opposite;
a distance between the second slot and the third slot as measured along the waveguide face is equal to or greater than half a length of a shorter one of the second slot and the third slot; and
a straight distance between centers of the second slot and the third slot is smaller than four times a length of the shorter slot.

17. The slot array antenna of claim 11, wherein,
the two slots are a first slot and a second slot;
the plurality of slots include a third slot which is adjacent to the second slot;
the waveguide face includes, in between two positions respectively coupled to the second slot and the third slot, at least one deflecting portion at which the direction that the waveguide face extends changes;
a direction of deflection of the deflecting portion located between the first slot and the second slot and a direction of deflection of the deflecting portion located between the second slot and the third slot are opposite;
a distance between the second slot and the third slot as measured along the waveguide face is equal to or greater than half a length of a shorter one of the second slot and the third slot; and
a straight distance between centers of the second slot and the third slot is smaller than four times a length of the shorter slot.

18. The slot array antenna of claim 11, wherein,
the artificial magnetic conductor includes a plurality of electrically conductive rods each having a leading end opposing the first electrically conductive surface;
the plurality of electrically conductive rods include one or more rows of electrically conductive rods that are adjacent to and arrayed along the waveguide member;
at a position adjacent to the deflecting portion, a row of the electrically conductive rods deflects in accordance with a direction of deflection of the deflecting portion; and
at least one of the plurality of electrically conductive rods is disposed between the two slots.

19. A radar device comprising:
the slot array antenna of claim 11; and
at least one microwave integrated circuit connected to the slot array antenna or the antenna device.

20. The slot array antenna of claim 18, wherein the one or more rows of electrically conductive rods include an outer rod row arrayed on an outside of the deflecting portion and an inner rod row arrayed on an inside of the deflecting portion; and,
between a plane which passes through a center of one of the two slots and which contains a width direction of the waveguide face and a plane which passes through a center of the other of the two slots and which contains the width direction of the waveguide face, there are more electrically conductive rods included in the outer rod row than there are electrically conductive rods included in the inner rod row.

21. The slot array antenna of claim 1, wherein at least one of the deflecting portions comprises a gap enlarging portion where a spacing between the waveguide face and the first electrically conductive surface is locally enlarged.

22. The slot array antenna of claim 21, wherein the waveguide face includes two linear portions that extend in the form of straight lines, the two linear portions being connected via the at least one deflecting portion; and
the two slots respectively couple to the two linear portions.

23. The slot array antenna of claim 21, wherein
the at least one deflecting portion includes two deflecting portions;
the waveguide face includes two linear portions extending in the form of straight lines, the two linear portions being connected via the two deflecting portions; and
the two slots respectively couple to the two linear portions.

24. The slot array antenna of claim 21, wherein the two slots respectively couple to midpoints of the two linear portions.

25. The slot array antenna of claim 21, wherein at least one of the two slots is opposed to the waveguide face.

26. The slot array antenna of claim 21, wherein the waveguide member includes, at least at a position lying between two positions respectively coupled to the two slots but excluding the deflecting portion, at least one of: a portion at which distance between the waveguide face and the first electrically conductive surface changes; and a portion at which width of the waveguide face changes.

27. The slot array antenna of claim 21, wherein,
the two slots are a first slot and a second slot;
the plurality of slots include a third slot which is adjacent to the second slot;
the waveguide face includes, in between two positions respectively coupled to the second slot and the third slot, at least one deflecting portion at which the direction that the waveguide face extends changes;
a direction of deflection of the deflecting portion located between the first slot and the second slot and a direction of deflection of the deflecting portion located between the second slot and the third slot are opposite;
a distance between the second slot and the third slot as measured along the waveguide face is equal to or greater than half a length of a shorter one of the second slot and the third slot; and
a straight distance between centers of the second slot and the third slot is smaller than four times a length of the shorter slot.

28. The slot array antenna of claim 21, wherein,
the artificial magnetic conductor includes a plurality of electrically conductive rods each having a leading end opposing the first electrically conductive surface;
the plurality of electrically conductive rods include one or more rows of electrically conductive rods that are adjacent to and arrayed along the waveguide member;
at a position adjacent to the deflecting portion, a row of the electrically conductive rods deflects in accordance with a direction of deflection of the deflecting portion; and
at least one of the plurality of electrically conductive rods is disposed between the two slots.

29. The slot array antenna of claim 22, wherein an angle of deflection of the at least one deflecting portion is not less than 30 degrees and not more than 120 degrees.

30. The slot array antenna of claim 28, wherein the one or more rows of electrically conductive rods include an outer rod row arrayed on an outside of the deflecting portion and an inner rod row arrayed on an inside of the deflecting portion; and,
between a plane which passes through a center of one of the two slots and which contains a width direction of the waveguide face and a plane which passes through a center of the other of the two slots and which contains the width direction of the waveguide face, there are more electrically conductive rods included in the outer rod row than there are electrically conductive rods included in the inner rod row.

31. The slot array antenna of claim 29, wherein the waveguide member includes, at least between two positions respectively coupled to the two slots, at least one of: a portion at which distance between the waveguide face and the first electrically conductive surface changes; and a portion at which width of the waveguide face changes.

32. The slot array antenna of claim 1, wherein
the at least one deflecting portion includes two deflecting portions;
the waveguide face includes two linear portions extending in the form of straight lines, the two linear portions being connected via the two deflecting portions; and
the two slots respectively couple to the two linear portions.

33. The slot array antenna of claim 32, wherein the two linear portions are parallel to each other.

34. The slot array antenna of claim 32, wherein,
the waveguide face has two edges that together define width of the waveguide face;
the two slots are disposed on the first electrically conductive member;
each of the two slots has an opening that extends through the first electrically conductive member and is open on the first electrically conductive surface; and,
as viewed from a normal direction of the first electrically conductive surface,
the opening of at least one of the two slots includes, at least in a central portion of the opening along a length direction thereof, a small-angle portion at which a width direction of the opening and a width direction of the waveguide face form an angle that is smaller than 45 degrees,
at least a portion of the small-angle portion overlaps the second electrically conductive surface on an outside of one of the two edges of the waveguide face, and
the small-angle portion intersects the one edge but does not intersect the other edge of the waveguide face, or is located from the one edge at a distance which is shorter than the width of the waveguide face.

35. The slot array antenna of claim 32, wherein,
the waveguide face has two edges that together define width of the waveguide face;
the two slots are disposed on the first electrically conductive member;
one of the two slots has a first opening that extends through the first electrically conductive member and is open on the first electrically conductive surface;
another of the two slots has a second opening that extends through the first electrically conductive member and is open on the first electrically conductive surface; and,
as viewed from a normal direction of the first electrically conductive surface,
the first opening includes, at least in a central portion of the first opening along a length direction thereof, a first small-angle portion at which a width direction of the first opening and a width direction of the waveguide face form an angle that is smaller than 45 degrees,
at least a portion of the first small-angle portion overlaps the second electrically conductive surface on an outside of one of the two edges of the waveguide face,
the first small-angle portion intersects the one edge but does not intersect the other edge of the waveguide face, or is located from the one edge at a distance which is shorter than the width of the waveguide face,
the second opening includes, at least in a central portion of the second opening along a length direction thereof, a second small-angle portion at which a width direction of the second opening and a width direction of the waveguide face form an angle that is smaller than 45 degrees,
at least a portion of the second small-angle portion overlaps the second electrically conductive surface on an outside of the other edge of the waveguide face, and
the second small-angle portion intersects the other edge but does not intersect the one edge of the waveguide face, or is located from the other edge at a distance which is shorter than the width of the waveguide face.

36. The slot array antenna of claim 32, wherein,
the slot array antenna is used for at least one of transmission and reception of an electromagnetic wave of a band having a central wavelength $\lambda o$ in free space;
an electromagnetic wave having a wavelength $\lambda o$ in free space has a wavelength $\lambda g$ when propagating in a waveguide extending between the waveguide face and the first electrically conductive surface; and a difference between a distance between the two slots as measured along the waveguide face and either one of λg, an odd multiple of λg/2, and an odd multiple of λg/4 is smaller than a sum of widths of the two slots.

37. The slot array antenna of claim 32, wherein,
the slot array antenna is used for at least one of transmission and reception of an electromagnetic wave of a band having a central wavelength λo in free space;
a difference between a distance between the two slots as measured along the waveguide face and either one of a distance a, an odd multiple of a/2, and an odd multiple of a/4 is smaller than a sum of widths of the two slots; and
the distance a is equal to or greater than 0.5λo but less than 1.5λo.

38. A radar device comprising:
the slot array antenna of claim 32; and
at least one microwave integrated circuit connected to the slot array antenna or the antenna device.

39. The slot array antenna of claim 1, wherein at least one of the two slots is opposed to the waveguide face.

40. The slot array antenna of claim 1, wherein,
the waveguide face has two edges that together define width of the waveguide face;
the two slots are disposed on the first electrically conductive member;
each of the two slots has an opening that extends through the first electrically conductive member and is open on the first electrically conductive surface; and,
as viewed from a normal direction of the first electrically conductive surface,
the opening of at least one of the two slots includes, at least in a central portion of the opening along a length direction thereof, a small-angle portion at which a width direction of the opening and a width direction of the waveguide face form an angle that is smaller than 45 degrees,
at least a portion of the small-angle portion overlaps the second electrically conductive surface on an outside of one of the two edges of the waveguide face, and
the small-angle portion intersects the one edge but does not intersect the other edge of the waveguide face, or is located from the one edge at a distance which is shorter than the width of the waveguide face.

41. The slot array antenna of claim 1, wherein,
the waveguide face has two edges that together define width of the waveguide face;
the two slots are disposed on the first electrically conductive member;
one of the two slots has a first opening that extends through the first electrically conductive member and is open on the first electrically conductive surface;
another of the two slots has a second opening that extends through the first electrically conductive member and is open on the first electrically conductive surface; and,
as viewed from a normal direction of the first electrically conductive surface,
the first opening includes, at least in a central portion of the first opening along a length direction thereof, a first small-angle portion at which a width direction of the first opening and a width direction of the waveguide face form an angle that is smaller than 45 degrees,
at least a portion of the first small-angle portion overlaps the second electrically conductive surface on an outside of one of the two edges of the waveguide face,
the first small-angle portion intersects the one edge but does not intersect the other edge of the waveguide face, or is located from the one edge at a distance which is shorter than the width of the waveguide face,
the second opening includes, at least in a central portion of the second opening along a length direction thereof, a second small-angle portion at which a width direction of the second opening and a width direction of the waveguide face form an angle that is smaller than 45 degrees,
at least a portion of the second small-angle portion overlaps the second electrically conductive surface on an outside of the other edge of the waveguide face, and
the second small-angle portion intersects the other edge but does not intersect the one edge of the waveguide face, or is located from the other edge at a distance which is shorter than the width of the waveguide face.

42. The slot array antenna of claim 41, wherein each of the two slots is of a shape having a length that is defined by a straight line.

43. The slot array antenna of claim 41, wherein each of the two slots is of a shape having a length that is defined by a combination of one straight line and two other straight lines respectively intersecting opposite ends of the one straight line.

44. The slot array antenna of claim 1, wherein each of the two slots is of a shape having a length that is defined by a combination of one straight line and two other straight lines respectively intersecting opposite ends of the one straight line.

45. The slot array antenna of claim 1, wherein,
the slot array antenna is used for at least one of transmission and reception of an electromagnetic wave of a band having a central wavelength λo in free space;
an electromagnetic wave having a wavelength λo in free space has a wavelength λg when propagating in a waveguide extending between the waveguide face and the first electrically conductive surface; and
a difference between a distance between the two slots as measured along the waveguide face and either one of λg, an odd multiple of λg/2, and an odd multiple of λg/4 is smaller than a sum of widths of the two slots.

46. The slot array antenna of claim 1, wherein,
the slot array antenna is used for at least one of transmission and reception of an electromagnetic wave of a band having a central wavelength λo in free space;
a difference between a distance between the two slots as measured along the waveguide face and either one of a distance a, an odd multiple of a/2, and an odd multiple of a/4 is smaller than a sum of widths of the two slots; and
the distance a is equal to or greater than 0.5λo but less than 1.5λo.

47. The slot array antenna of claim 1, wherein,
the two slots are a first slot and a second slot;
the plurality of slots include a third slot which is adjacent to the second slot;
the waveguide face includes, in between two positions respectively coupled to the second slot and the third slot, at least one deflecting portion at which the direction that the waveguide face extends changes;
a direction of deflection of the deflecting portion located between the first slot and the second slot and a direction of deflection of the deflecting portion located between the second slot and the third slot are opposite;
a distance between the second slot and the third slot as measured along the waveguide face is equal to or greater than half a length of a shorter one of the second slot and the third slot; and a straight distance between centers of the second slot and the third slot is smaller than four times a length of the shorter slot.

48. The slot array antenna of claim 47, wherein the first to third slots are on a straight line.

49. The slot array antenna of claim 47, comprising a plurality of waveguide members including the said waveguide member and a second waveguide member adjacent to the said waveguide member, wherein,
the second waveguide member has an electrically-conductive second waveguide face of a stripe shape opposed to the first electrically conductive surface;
the artificial magnetic conductor is disposed at least on both sides of a region where the plurality of waveguide members are arranged;
the plurality of slots include at least two further slots coupling to the second waveguide face;
in between two positions respectively coupled to the at least two further slots, the second waveguide face includes at least one deflecting portion at which a direction that the second waveguide face extends changes;
a distance between the at least two further slots as measured along the second waveguide face is equal to or greater than half a length of a shorter one of the at least two further slots;
a straight distance between centers of the at least two further slots is smaller than four times a length of the shorter slot;
a first line segment connecting between centers of the two slots and a second line segment connecting between centers of the at least two further slots are parallel;
shifting the first line segment in a direction which is orthogonal to a direction that the first line segment extends allows at least a portion of the first line segment to overlap the second line segment; and
a direction of deflection of the at least one deflecting portion located between the two slots is identical to a direction of deflection of the at least one deflecting portion located between the at least two further slots.

50. The slot array antenna of claim 47, comprising a plurality of waveguide members including the said waveguide member and a second waveguide member adjacent to the said waveguide member, wherein,
the second waveguide member has an electrically-conductive second waveguide face of a stripe shape opposed to the first electrically conductive surface;
the artificial magnetic conductor is disposed at least on both sides of a region where the plurality of waveguide members are arranged;
the plurality of slots include at least two further slots coupling to the second waveguide face;
in between two positions respectively coupled to the at least two further slots, the second waveguide face includes at least one deflecting portion at which a direction that the second waveguide face extends changes;
lines interconnecting respective centers of the two slots and respective centers of the at least two further slots present a convex quadrilateral; and
a direction of deflection of the at least one deflecting portion located between the two slots is identical to a direction of deflection of the at least one deflecting portion located between the at least two further slots.

51. A radar device comprising:
the slot array antenna of claim 47; and
at least one microwave integrated circuit connected to the slot array antenna or the antenna device.

52. The slot array antenna of claim 48, comprising a plurality of waveguide members including the said waveguide member and a second waveguide member adjacent to the said waveguide member, wherein,
the second waveguide member has an electrically-conductive second waveguide face of a stripe shape opposed to the first electrically conductive surface;
the artificial magnetic conductor is disposed at least on both sides of a region where the plurality of waveguide members are arranged;
the plurality of slots include at least two further slots coupling to the second waveguide face;
in between two positions respectively coupled to the at least two further slots, the second waveguide face includes at least one deflecting portion at which a direction that the second waveguide face extends changes;
a distance between the at least two further slots as measured along the second waveguide face is equal to or greater than half a length of a shorter one of the at least two further slots;
a straight distance between centers of the at least two further slots is smaller than four times a length of the shorter slot;
a first line segment connecting between centers of the two slots and a second line segment connecting between centers of the at least two further slots are parallel;
shifting the first line segment in a direction which is orthogonal to a direction that the first line segment extends allows at least a portion of the first line segment to overlap the second line segment; and
a direction of deflection of the at least one deflecting portion located between the two slots is identical to a direction of deflection of the at least one deflecting portion located between the at least two further slots.

53. The slot array antenna of claim 48, comprising a plurality of waveguide members including the said waveguide member and a second waveguide member adjacent to the said waveguide member, wherein,
the second waveguide member has an electrically-conductive second waveguide face of a stripe shape opposed to the first electrically conductive surface;
the artificial magnetic conductor is disposed at least on both sides of a region where the plurality of waveguide members are arranged;
the plurality of slots include at least two further slots coupling to the second waveguide face;
in between two positions respectively coupled to the at least two further slots, the second waveguide face includes at least one deflecting portion at which a direction that the second waveguide face extends changes;
lines interconnecting respective centers of the two slots and respective centers of the at least two further slots present a convex quadrilateral; and
a direction of deflection of the at least one deflecting portion located between the two slots is identical to a direction of deflection of the at least one deflecting portion located between the at least two further slots.

54. The slot array antenna of claim 1, wherein,
the artificial magnetic conductor includes a plurality of electrically conductive rods each having a leading end opposing the first electrically conductive surface;

the plurality of electrically conductive rods include one or more rows of electrically conductive rods that are adjacent to and arrayed along the waveguide member;

at a position adjacent to the deflecting portion, a row of the electrically conductive rods deflects in accordance with a direction of deflection of the deflecting portion; and at least one of the plurality of electrically conductive rods is disposed between the two slots.

55. The slot array antenna of claim 54, wherein the one or more rows of electrically conductive rods include an outer rod row arrayed on an outside of the deflecting portion and an inner rod row arrayed on an inside of the deflecting portion; and, between a plane which passes through a center of one of the two slots and which contains a width direction of the waveguide face and a plane which passes through a center of the other of the two slots and which contains the width direction of the waveguide face, there are more electrically conductive rods included in the outer rod row than there are electrically conductive rods included in the inner rod row.

56. The slot array antenna of claim 54, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

a distance between the at least two further slots as measured along the second waveguide face is equal to or greater than half a length of a shorter one of the at least two further slots;

a straight distance between centers of the at least two further slots is smaller than four times a length of the shorter slot;

a first line segment connecting between centers of the two slots and a second line segment connecting between centers of the at least two further slots are parallel;

shifting the first line segment in a direction which is orthogonal to a direction that the first line segment extends allows at least a portion of the first line segment to overlap the second line segment; and a direction of deflection of the at least one deflecting portion located between the two slots is identical to a direction of deflection of the at least one deflecting portion located between the at least two further slots.

57. The slot array antenna of claim 54, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

lines interconnecting respective centers of the two slots and respective centers of the at least two further slots present a convex quadrilateral; and a direction of deflection of the at least one deflecting portion located between the two slots is identical to a direction of deflection of the at least one deflecting portion located between the at least two further slots.

58. The slot array antenna of claim 55, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

a distance between the at least two further slots as measured along the second waveguide face is equal to or greater than half a length of a shorter one of the at least two further slots;

a straight distance between centers of the at least two further slots is smaller than four times a length of the shorter slot;

a first line segment connecting between centers of the two slots and a second line segment connecting between centers of the at least two further slots are parallel;

shifting the first line segment in a direction which is orthogonal to a direction that the first line segment extends allows at least a portion of the first line segment to overlap the second line segment; and a direction of deflection of the at least one deflecting portion located between the two slots is identical to a direction of deflection of the at least one deflecting portion located between the at least two further slots.

59. The slot array antenna of claim 55, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

lines interconnecting respective centers of the two slots and respective centers of the at least two further slots present a convex quadrilateral; and a direction of deflection of the at least one deflecting portion located between the two slots is identical to a direction of deflection of the at least one deflecting portion located between the at least two further slots.

60. The slot array antenna of claim 1, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

a distance between the at least two further slots as measured along the second waveguide face is equal to or greater than half a length of a shorter one of the at least two further slots;

a straight distance between centers of the at least two further slots is smaller than four times a length of the shorter slot;

a first line segment connecting between centers of the two slots and a second line segment connecting between centers of the at least two further slots are parallel;

shifting the first line segment in a direction which is orthogonal to a direction that the first line segment extends allows at least a portion of the first line segment to overlap the second line segment; and a direction of deflection of the at least one deflecting portion located between the two slots is identical to a direction of deflection of the at least one deflecting portion located between the at least two further slots.

61. The slot array antenna of claim 60, wherein the artificial magnetic conductor exists between at least two adjacent waveguide members among the plurality of waveguide members.

62. The slot array antenna of claim 1, comprising a plurality of waveguide members including the said waveguide member and a second waveguide member adjacent to the said waveguide member, wherein, the second waveguide member has an electrically-conductive second waveguide face of a stripe shape opposed to the first electrically conductive surface;

the artificial magnetic conductor is disposed at least on both sides of a region where the plurality of waveguide members are arranged;

the plurality of slots include at least two further slots coupling to the second waveguide face;

in between two positions respectively coupled to the at least two further slots, the second waveguide face includes at least one deflecting portion at which a direction that the second waveguide face extends changes;

lines interconnecting respective centers of the two slots and respective centers of the at least two further slots present a convex quadrilateral; and a direction of deflection of the at least one deflecting portion located between the two slots is identical to a direction of deflection of the at least one deflecting portion located between the at least two further slots.

63. The slot array antenna of claim 62, wherein the artificial magnetic conductor exists between at least two adjacent waveguide members among the plurality of waveguide members.

64. An antenna device comprising a plurality of slot array antennas, wherein, each of the plurality of slot array antennas is the slot array antenna of claim 1;

the respective waveguide members of the plurality of slot array antennas are arranged side by side;

the artificial magnetic conductor includes a plurality of electrically conductive rods each having a leading end opposing the first electrically conductive surface;

the plurality of electrically conductive rods include one or more rows of electrically conductive rods that are adjacent to and arrayed along the waveguide member;

at a position adjacent to the deflecting portion, a row of the electrically conductive rods deflects in accordance with a direction of deflection of the deflecting portion;

at least one of the plurality of electrically conductive rods is disposed between the two slots;

the one or more rows of electrically conductive rods include an outer rod row arrayed on an outside of the deflecting portion and an inner rod row arrayed on an inside of the deflecting portion; and, between a plane which passes through a center of one of the two slots and which contains a width direction of the waveguide face and a plane which passes through a center of the other of the two slots and which contains the width direction of the waveguide face, there are more electrically conductive rods included in the outer rod row than there are electrically conductive rods included in the inner rod row.

65. The antenna device of claim 64, wherein, the respective first electrically conductive members of the plurality of slot array antennas are portions of a single electrically conductive member of a plate shape; and the respective second electrically conductive members of the plurality of slot array antennas are portions of another single electrically conductive member of a plate shape.

66. A radar device comprising:

the slot array antenna of claim 1; and at least one microwave integrated circuit connected to the slot array antenna or the antenna device.

* * * * *